United States Patent [19]
Kamada et al.

[11] Patent Number: 5,810,694
[45] Date of Patent: Sep. 22, 1998

[54] CONTROL SYSTEM FOR AUTOMATIC TRANSMISSION

[75] Inventors: Shinya Kamada; Koichi Yamamoto, both of Hiroshima; Tomoo Sawazaki, Higashihiroshima; Hiroshi Shinozuka, Hiroshima; Kazushi Kurokawa, Hiroshima; Takamichi Teraoka, Hiroshima; Masakazu Hombo, Hiroshima; Naotaka Hirami, Hiroshima; Yasunori Kanda; Akinobu Aoki, both of Higashihiroshima; Tatsuhiko Iwasaki, Hiroshima-ken; Takeyoshi Kawa; Kenji Sawa, both of Hiroshima, all of Japan

[73] Assignee: Mazda Motor Corporation, Hiroshima-ken, Japan

[21] Appl. No.: 595,139

[22] Filed: Jan. 30, 1996

Related U.S. Application Data

[63] Continuation of Ser. No. 536,488, Sep. 29, 1995, abandoned.

[30] Foreign Application Priority Data

Sep. 30, 1994 [JP] Japan .................................. 6-261247
Mar. 31, 1995 [JP] Japan .................................. 7-100005

[51] Int. Cl.⁶ .......................... F16H 61/04; F16H 61/26
[52] U.S. Cl. ...................... 477/150; 477/117; 477/158
[58] Field of Search ................................ 477/116, 117, 477/143, 150, 156, 158

[56] References Cited

U.S. PATENT DOCUMENTS 4,034,628  7/1977  Sakai et al. .
4,533,030  8/1985  Gabriel .
4,561,528  12/1985  Sugano ................................ 192/0.052
4,602,529  7/1986  Sugano .
4,843,917  7/1989  Van Selous .
4,930,080  5/1990  Suzuki ................................... 477/117
5,113,724  5/1992  Hayasaki ............................... 477/117
5,240,096  8/1993  Ueki ..................................... 192/87.11

FOREIGN PATENT DOCUMENTS 0 072 631  2/1983  European Pat. Off. .
621643  3/1984  Japan .
5296328  11/1993  Japan .

OTHER PUBLICATIONS

Patent Abstracts of Japan, vol. 014, No. 266, (M–0982) Jun. 8, 1990 & JP–A–02 076967 (Toyota Motor Corp) Mar. 16, 1990 *abstract*.

*Primary Examiner*—Charles A. Marmor
*Assistant Examiner*—Sherry Lynn Estremsky
*Attorney, Agent, or Firm*—Sixbey, Friedman, Leedom & Ferguson, PC; Gerald J. Ferguson, Jr.; Donald R. Studebaker

[57] ABSTRACT

A control system for an automatic transmission having at least a friction coupling element which is coupled with a hydraulic pressure increasing by way of a leveled transitional pressure has an accumulator which discharge a high level of pressure accumulated therein into the friction coupling element during a gear shift under the condition where the line pressure is low.

8 Claims, 154 Drawing Sheets

| | OUTPUT PRESSURE (Kg/cm²) | | | | |
|---|---|---|---|---|---|
| | 0.2 | 0.4 | 0.6 | 0.8 | 1.0 |
| ORIGINAL PRESSURE (Kg/cm²) 0.4 | 49 % | | | | |
| 0.6 | 47 % | .. % | | | |
| 0.8 | 75 % | .. % | .. % | | |
| 1.0 | 81 % | .. % | .. % | .. % | |
| 1.2 | 18 % | .. % | .. % | .. % | |

| | OUTPUT / ORIGINAL (%) | | | | |
|---|---|---|---|---|---|
| | 10 % | 30 % | 50 % | 70 % | 90 % |
| ORIGINAL PRESSURE (Kg/cm²) 0.4 | .. % | .. % | 47 % | .. % | .. % |
| 0.6 | .. % | .. % | 48 % | .. % | .. % |
| 0.8 | .. % | .. % | 50 % | .. % | .. % |
| 1.0 | .. % | .. % | 52 % | .. % | .. % |
| 1.2 | .. % | .. % | 53 % | .. % | .. % |

Fig. 124
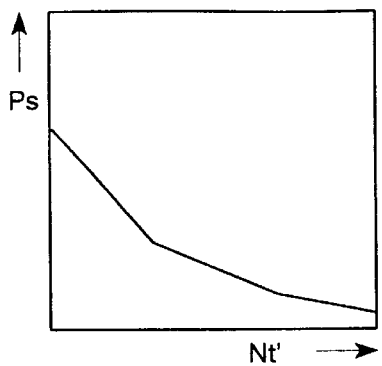
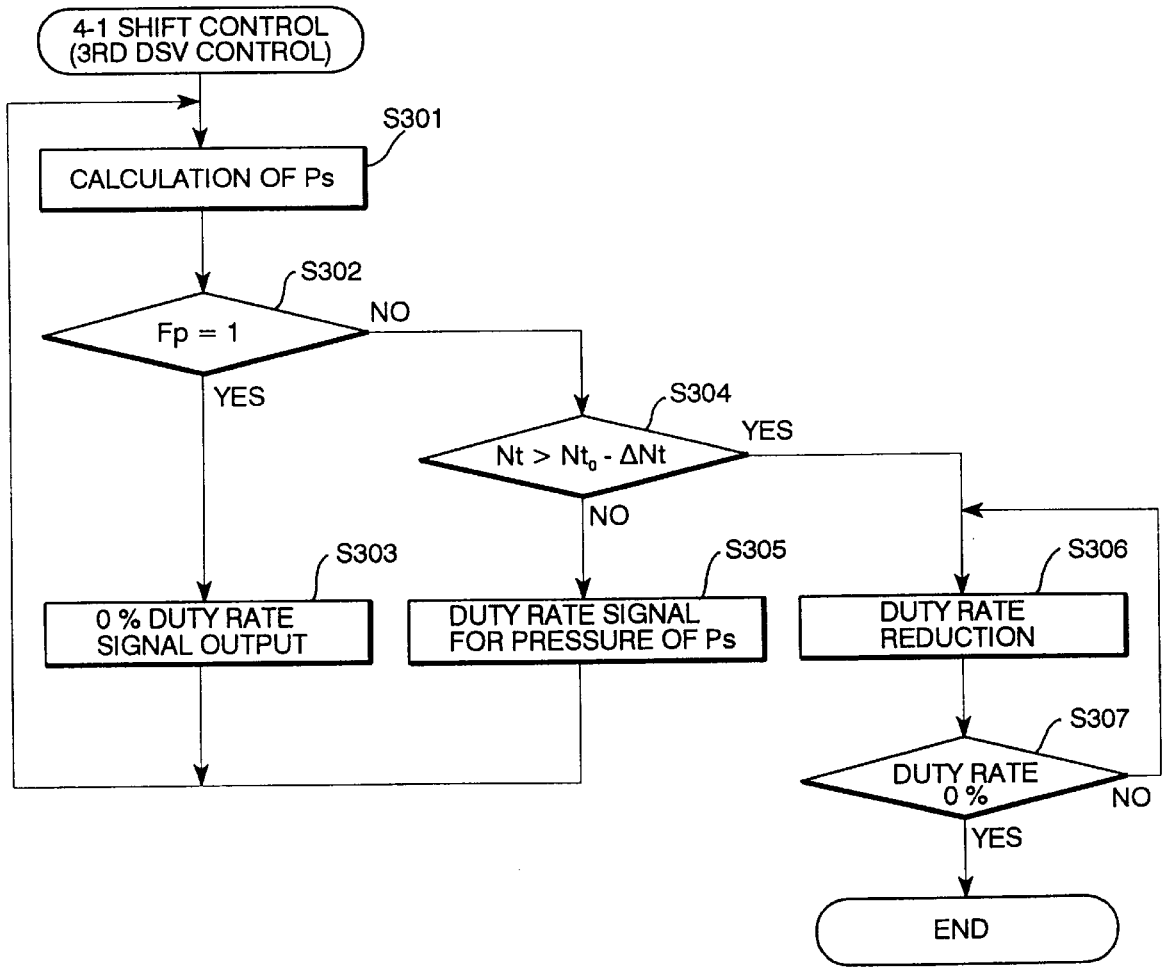
Fig. 125

CONTROL SYSTEM FOR AUTOMATIC TRANSMISSION

This application is a Continuation of Ser. No. 08/536,488, filed Sep. 29, 1995, now abandoned.

BACKGROUND OF THE INVENTION

1. Field of the invention

The present invention relates to an automatic transmission control system, and, more particularly, to a control system for an automatic transmission having a friction coupling element for creating a specific gear which is coupled with a hydraulic pressure increasing by way of a levelled transitional pressure.

2. Description of Related Art

Typically, an automatic transmission for an automobile has a torque converter and a transmission gear mechanism driven by the torque converter. Each such a transmission gear mechanism includes a plurality of friction coupling elements, such as clutches and brakes, which are selective coupled and uncoupled so as to place automatically the automatic transmission into desired gears according to driving conditions. Selective coupling and uncoupling of these friction coupling elements is performed by means of hydraulic pressure control. If hydraulic pressure is too high, the friction coupling element is brought into coupling abruptly, causing the automatic transmission to produce a strong shock during shifting. On the other hand, if the hydraulic pressure is kept down in excess so as to prevent the automatic transmission from causing a shift shock, the friction coupling element takes a long time to be coupled. In order for the automatic transmission to achieve a gear shift in a short time without causing shocks, it is typical to provide an accumulator and an orifice in a hydraulic control circuit so as to increase the hydraulic pressure by way of a levelled transitional pressure to a desired level. Such a hydraulic pressure control is precisely accomplished by utilization of electrically controlled valves, such as duty solenoid valves and linear solenoid valves, as known from, for instance, Japanese Patent Publication No. 5-296328.

While the prior art hydraulic control circuit including such an electrically controlled valve has various advantages, nevertheless, constraints must be imposed upon the precise control of a low hydraulic pressure during which a small amount of pressure flows in the hydraulic control circuit. For instance, in the case where a specific friction coupling element is changed into its coupled state from its uncoupled state during a manual down-shift from a fourth gear to a third gear during which the engine operates with a low load or, in other words, the engine throttle is at its fully closed, a basic line pressure, which is typically controlled according to engine loads, is at a low level. Consequently, the hydraulic pressure for the specific friction coupling element takes a long time to attain a leveled transitional pressure, providing aggravation of response in gear shift operation of the automatic transmission.

SUMMARY OF THE INVENTION

It is an object of the present invention to provide a hydraulic control system for an automatic transmission of the type having a friction coupling element by a coupling pressure increasing by way of an even transitional level, in which the frictional coupling element can be locked with an improved responsiveness.

The foregoing object of the present invention is accomplished by providing a hydraulic pressure control system for locking and unlocking selectively friction coupling elements so as to place the automatic transmission into desired gears, a specific one of the friction coupling elements being locked with a hydraulic pressure increasing by way of a leveled transitional pressure. The hydraulic pressure control system includes an accumulator which is in communication selectively with a pressure supply circuit for supplying an operating pressure to the friction coupling elements and with a high pressure source means for providing a hydraulic pressure higher in pressure level than an operating hydraulic pressure provided by the pressure supply circuit, and a switching means for changing the hydraulic communication of the accumulator from with the high pressure source to with the pressure supply circuit so as to discharge the high level of hydraulic pressure from the accumulator into the pressure supply circuit when the pressure supply circuit supplies the operating hydraulic pressure to the specific friction coupling element.

The control system further includes a pressure regulating means for regulating the operating hydraulic pressure to be supplied to the friction coupling elements according, for example, to engine loads.

The control system may further include a secondary switching means which brings the pressure supply circuit into hydraulic communication with the high pressure source means independently from the pressure regulating means. Further the secondary switching means brings a control circuit for controlling lock-up clutch operating pressure into into hydraulic communication with the pressure regulating means when the pressure supply circuit is brought into hydraulic communication with the high pressure source means.

The switching means may change the hydraulic communication of the accumulator from with the high pressure source to with the pressure supply circuit when the engine load is less than a predetermined level, when a down-shift takes place, or when a neutral to drive range shift takes place.

With the control system of the present invention, when the pressure supply circuit supplies an operating pressure to a specific friction coupling element, the accumulator discharges a high level of pressure into the pressure supply circuit, shortening a time necessary to fill the pressure supply circuit and a pressure chamber of the friction coupling element with the operating pressure. As a result, the friction coupling element is locked or coupled rapidly with improved responsiveness and a significantly reduced shock. In particular, the accumulator discharges the high level pressure into the pressure supply circuit when the line pressure is held relatively at a low level, such as when an engine load is low or when a down-shift or a neutral to drive range shift takes place.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 119 is a flowchart illustrating a control sequence for the second duty solenoid valve (DSV) during 4-2 shifting;

FIG. 120 is a flowchart illustrating a control sequence for the third duty solenoid valve (DSV) during 4-2 shifting;

FIG. 121 is a time chart showing changes in various factors during 4-2 shifting;

FIG. 122 is a flowchart illustrating a control sequence for the first duty solenoid valve (DSV) during 4-1 shifting;

FIG. 123 is a flowchart illustrating a control sequence for the second duty solenoid valve (DSV) during 4-1 shifting;

FIG. 124 is a diagram illustrating a map of output pressure during 4-1 shifting;

FIG. 125 is a flowchart illustrating a control sequence for the third duty solenoid valve (DSV) during 4-1 shifting;

FIG. 126 is a time chart showing changes in various factors during 4-1 shifting;

FIG. 127 is a flowchart illustrating a control sequence for the first duty solenoid valve (DSV) during 3-1 shifting;

FIG. 128 is a flowchart illustrating a control sequence for the second duty solenoid valve (DSV) during 3-1 shifting;

FIG. 129 is a time chart showing changes in various factors during 3-1 shifting;

FIG. 130 is a flowchart illustrating a control sequence for the first duty solenoid valve (DSV) during 2-L1 shifting;

Figure 131:
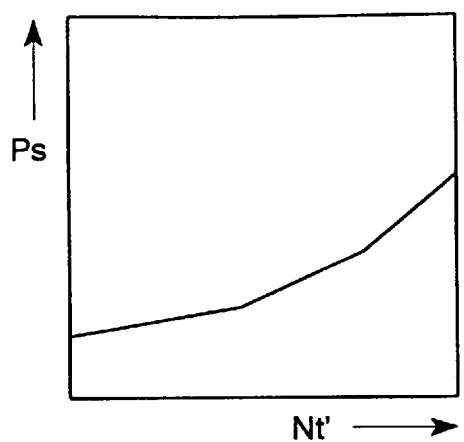
Figure 132:
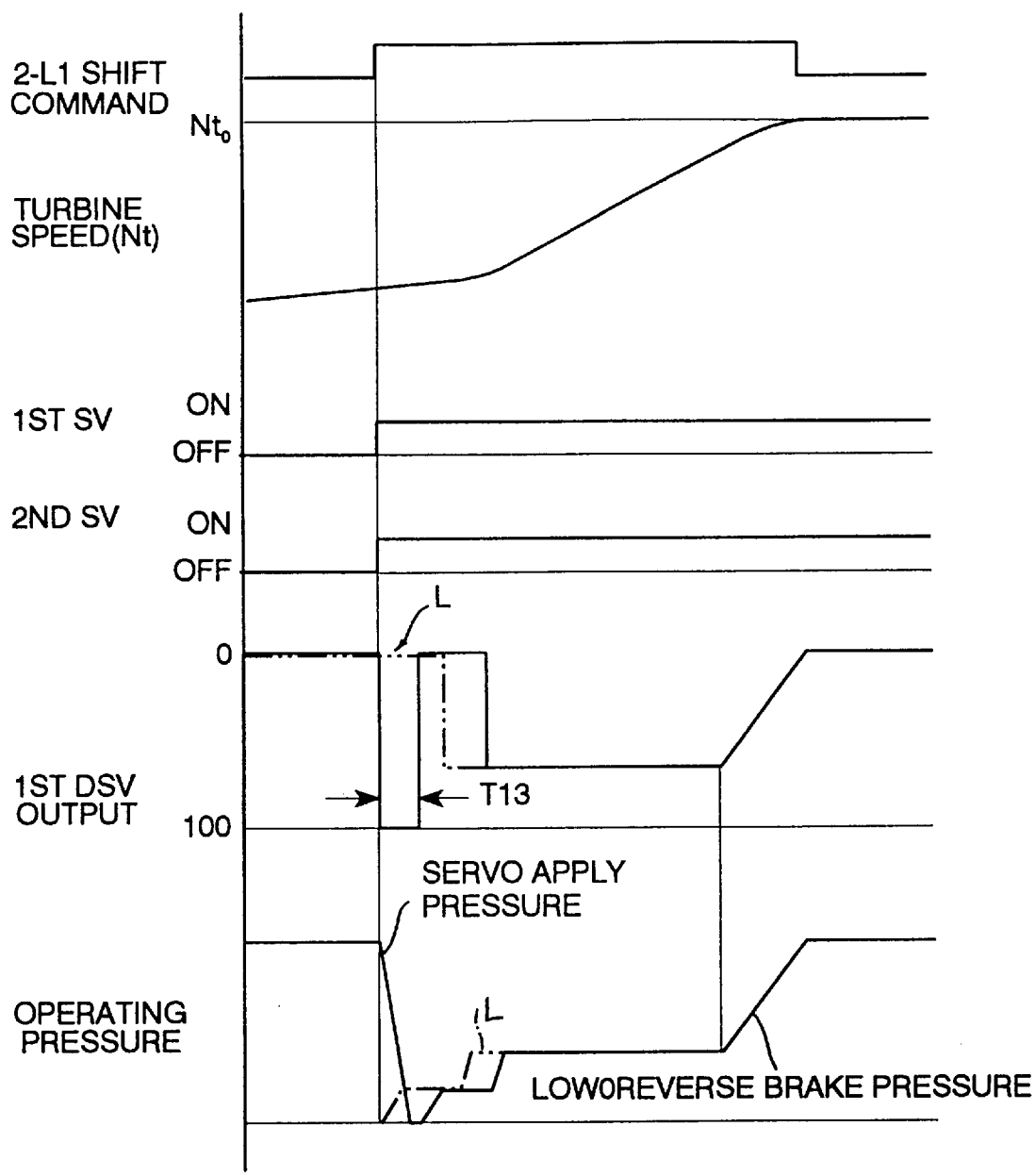
Figure 133:
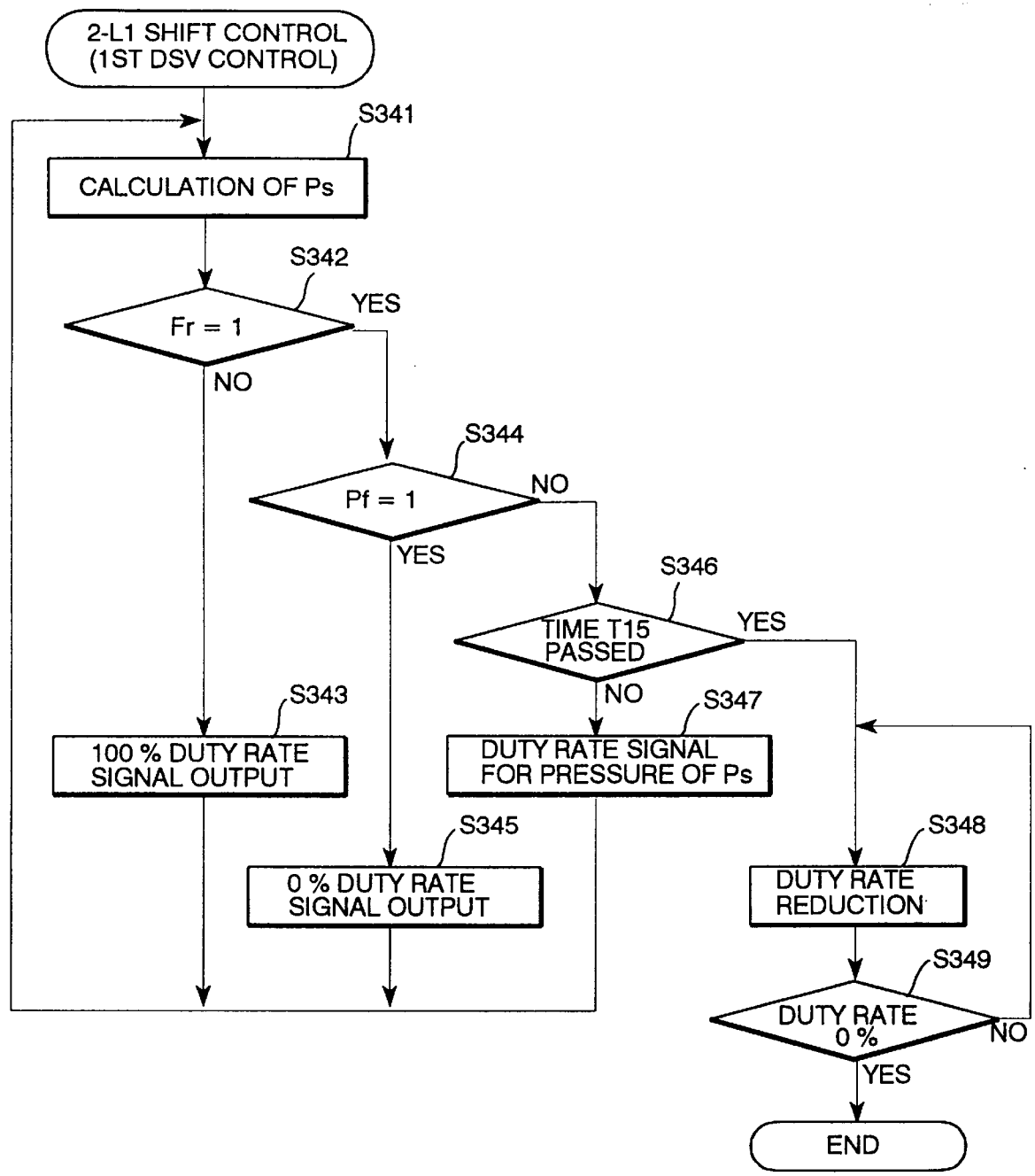
Figure 134:
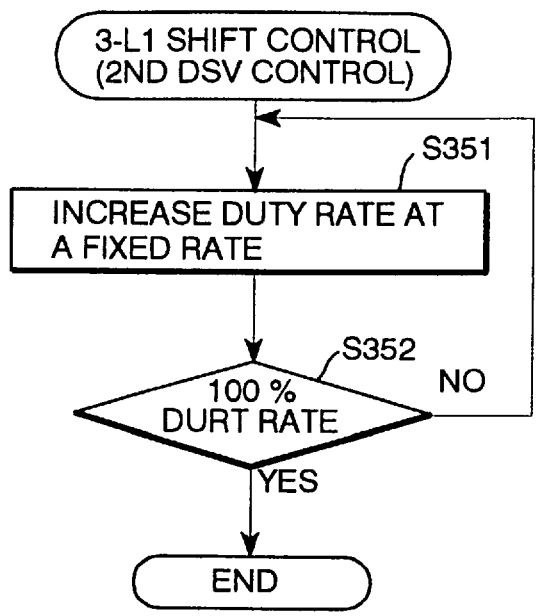
Figure 135:
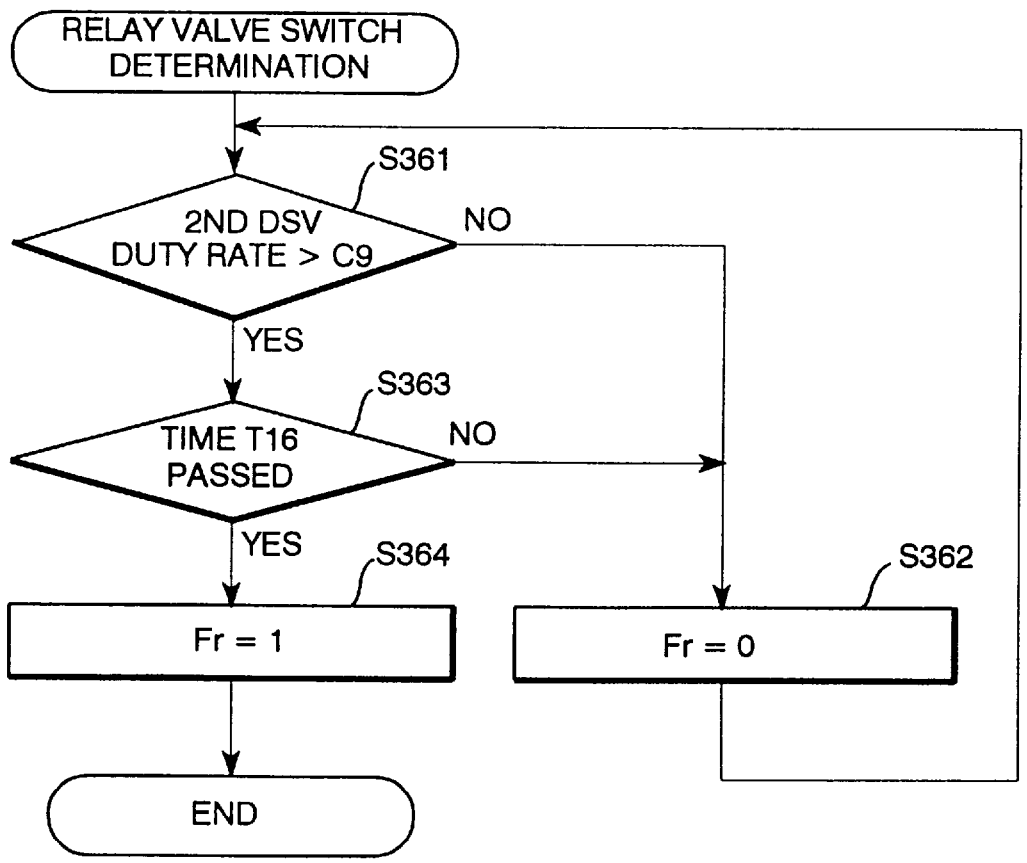
Figure 136:
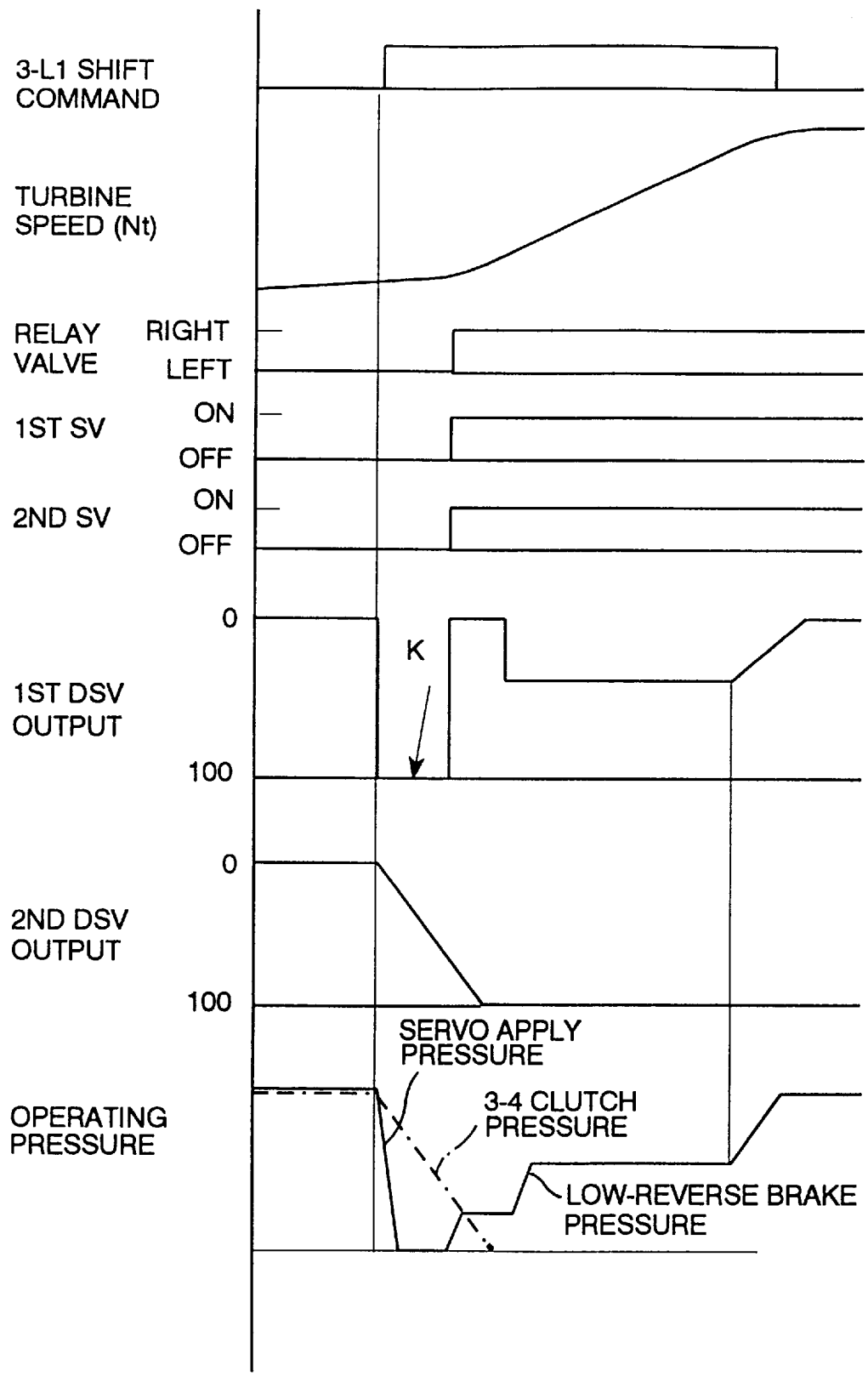
Figure 137:
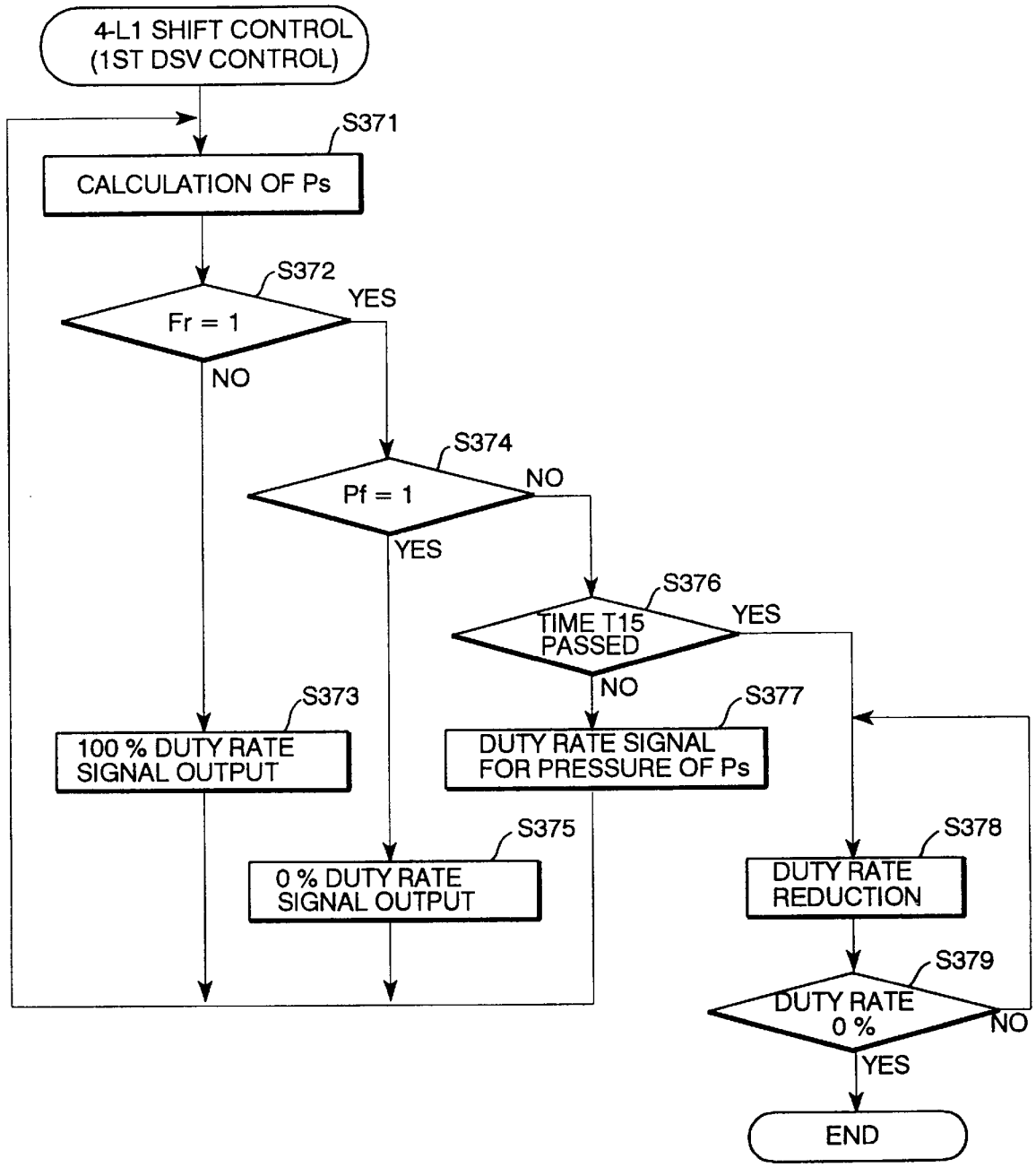
Figure 138:
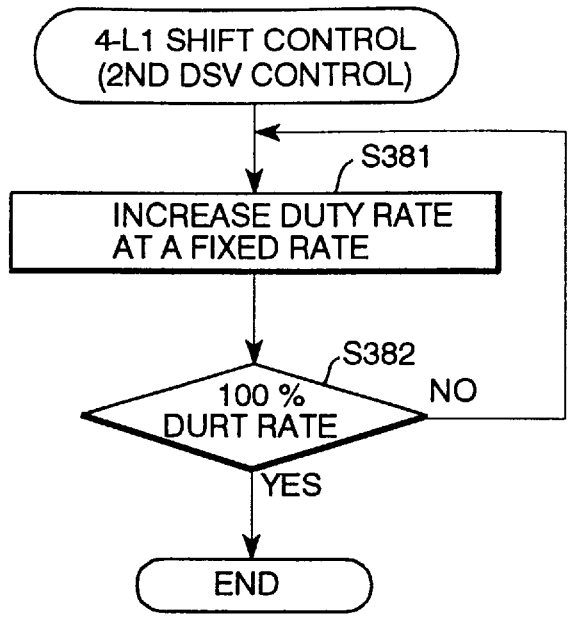
Figure 139:
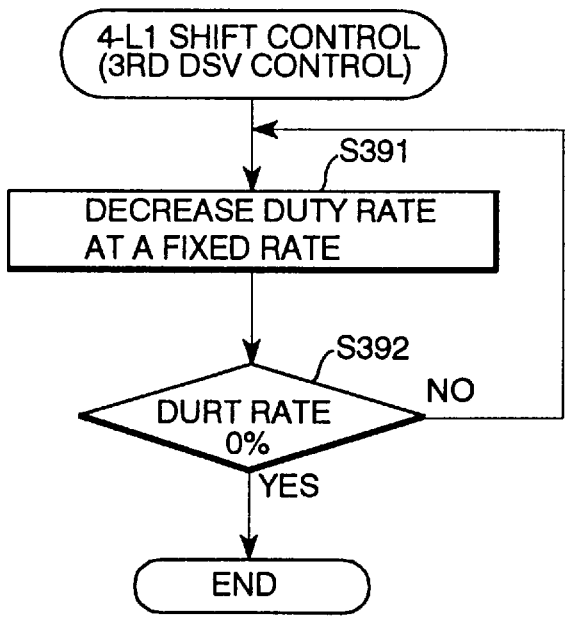
Figure 140:
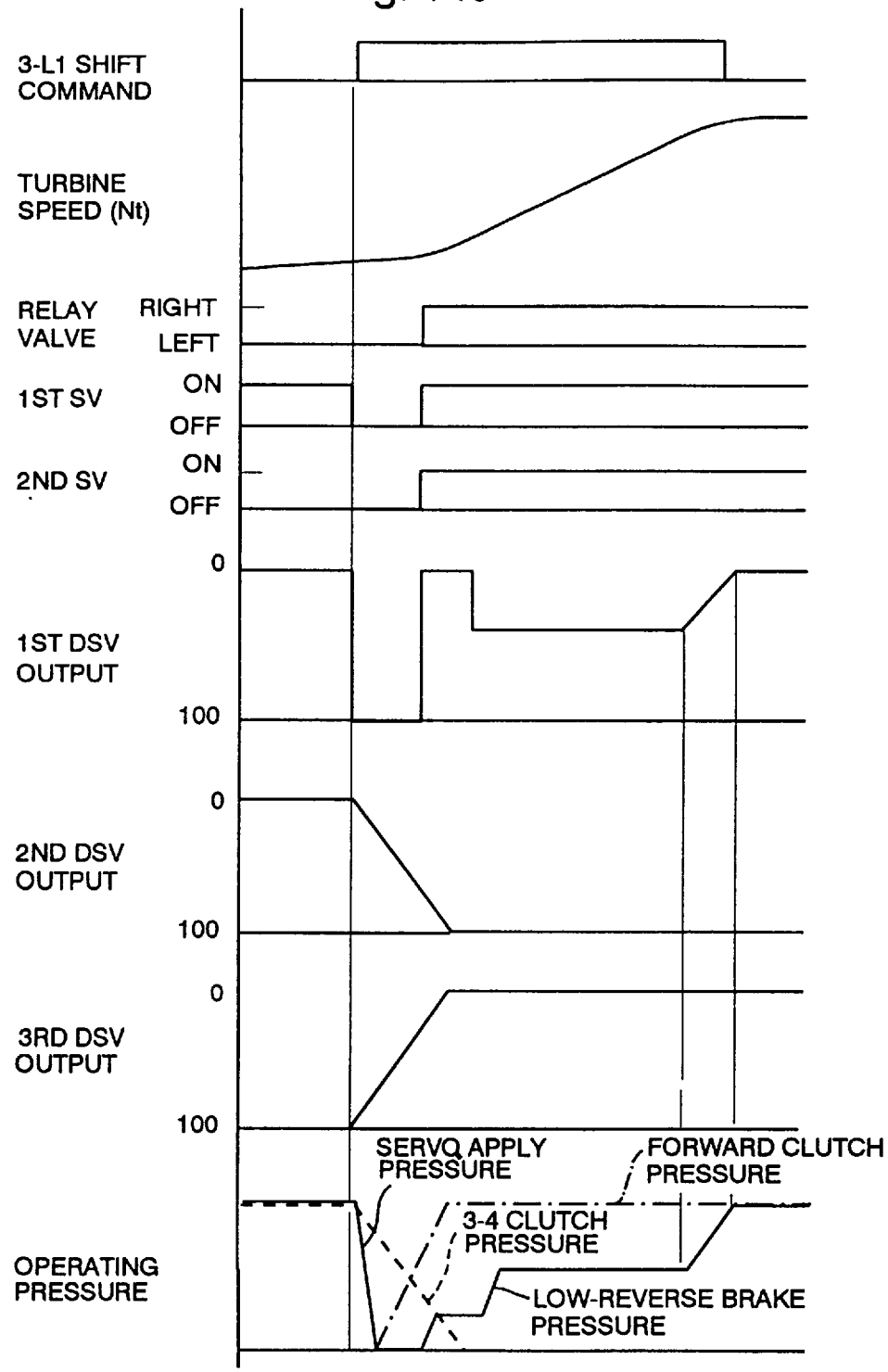
Figure 141:
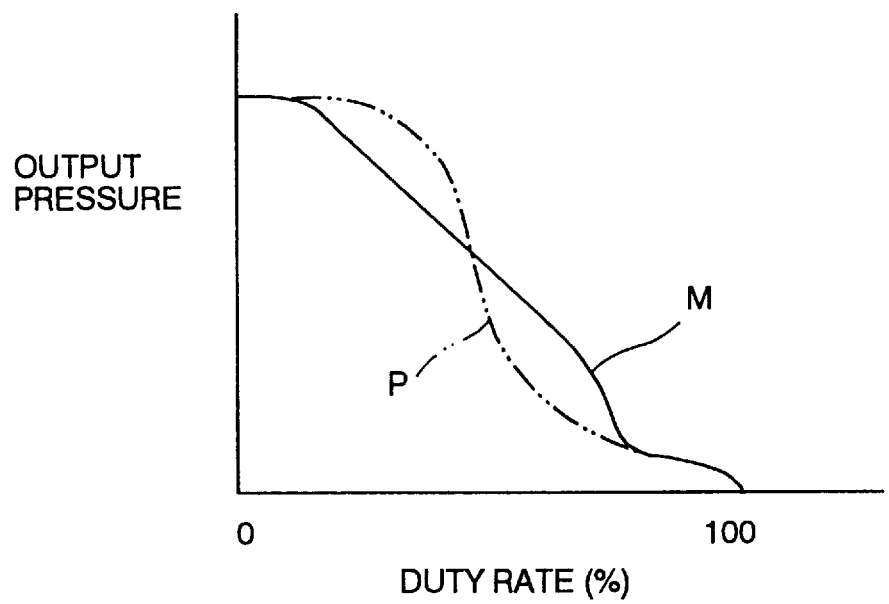
Figure 142:
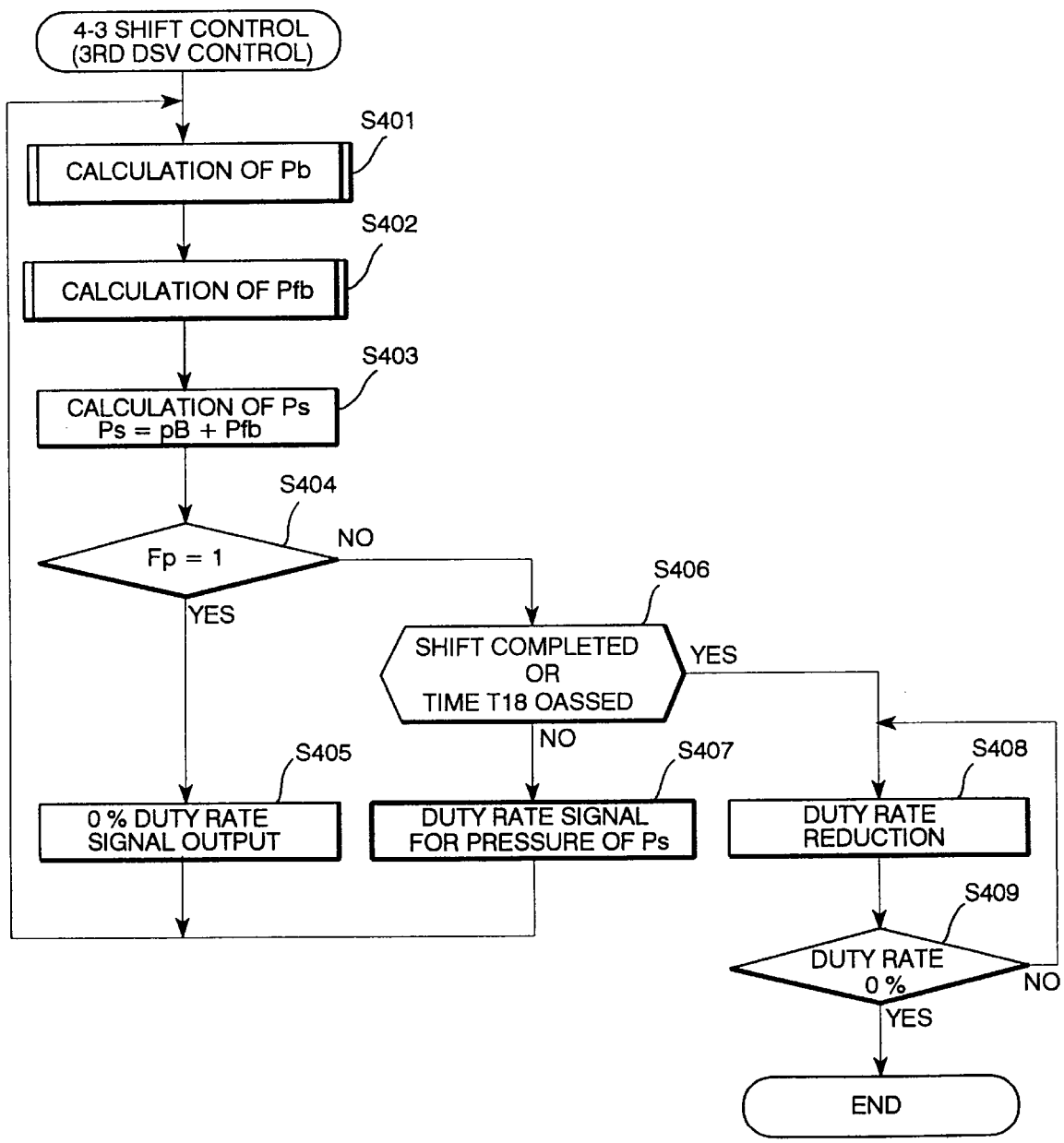
Figure 143:
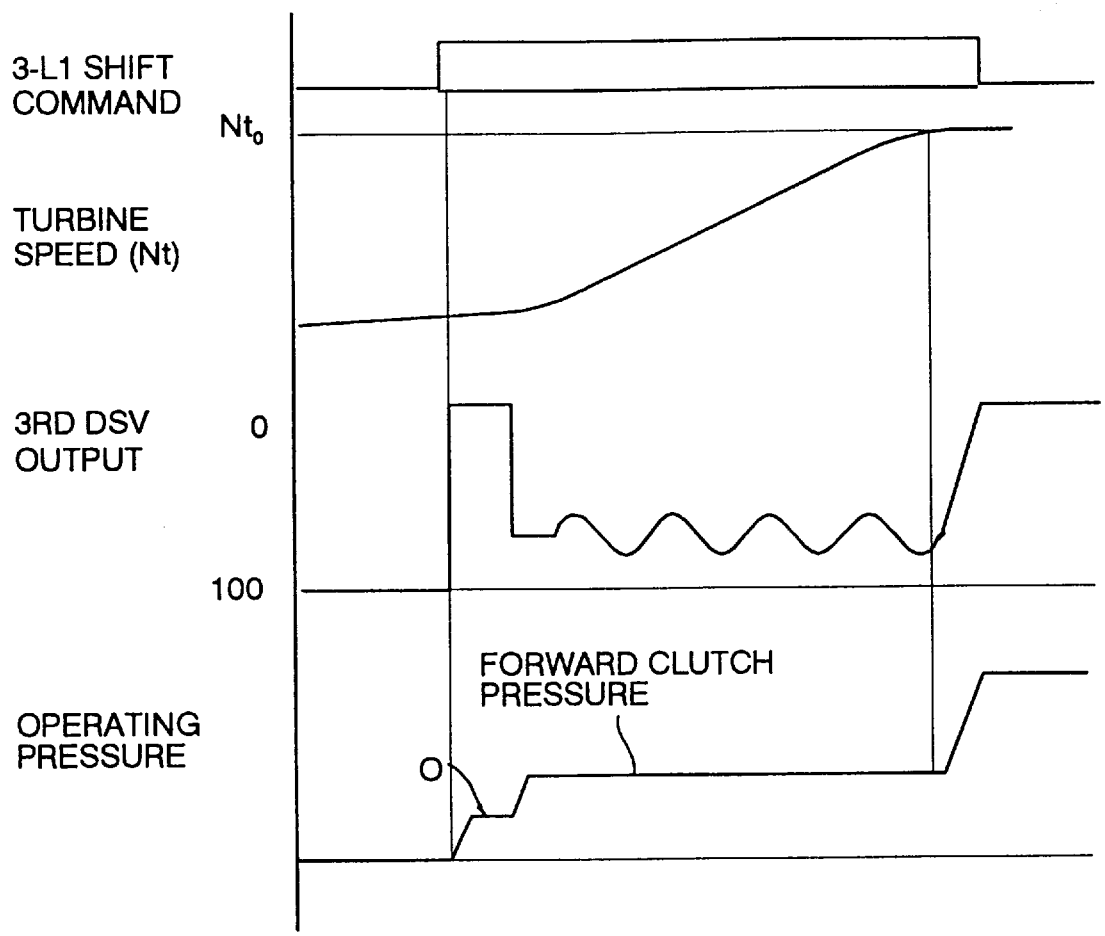
Figure 144:
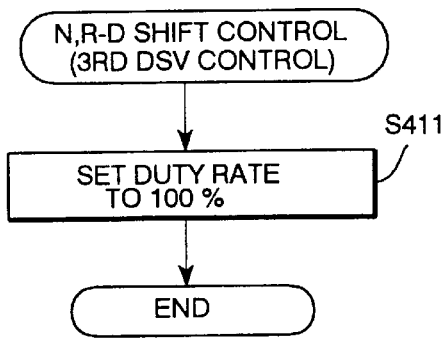
Figure 145:
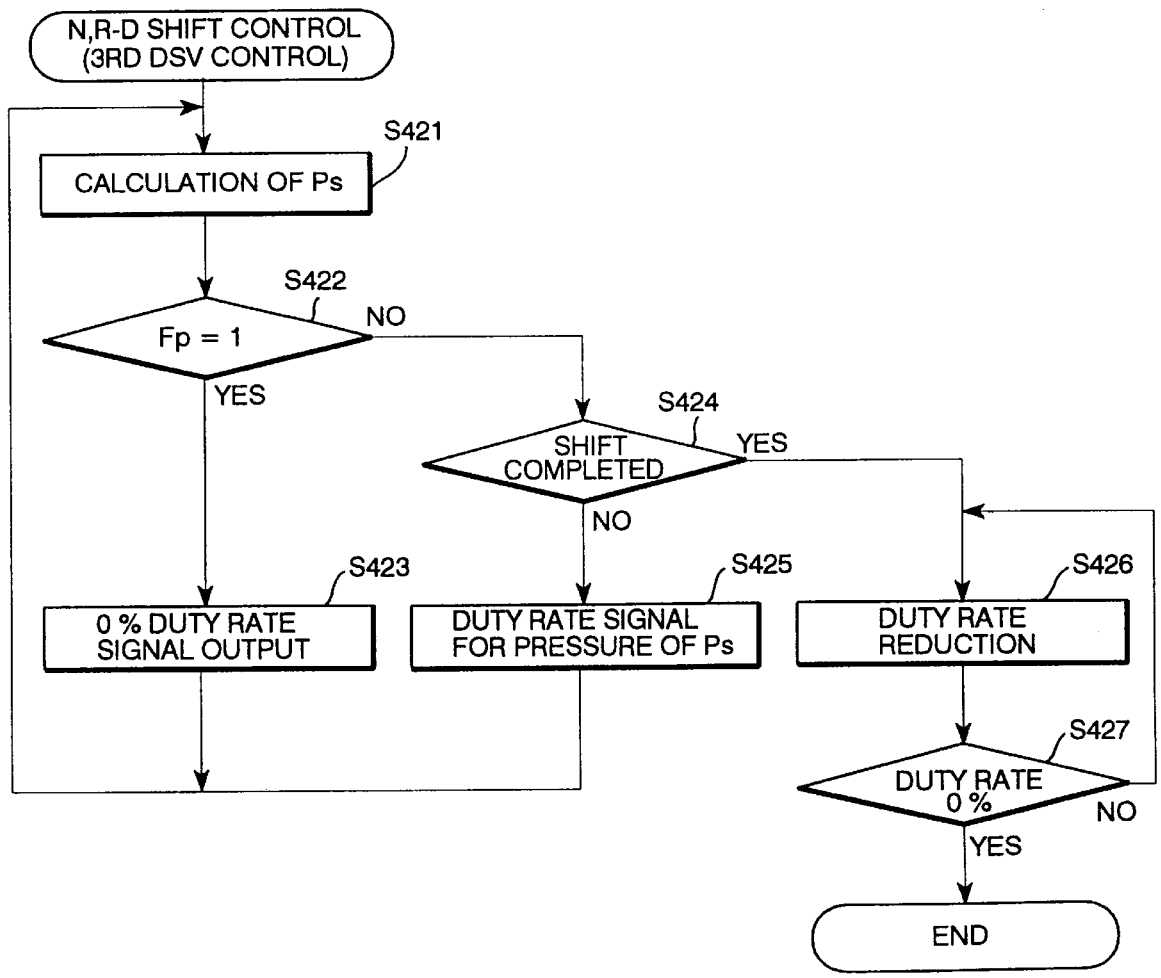
Figure 146:
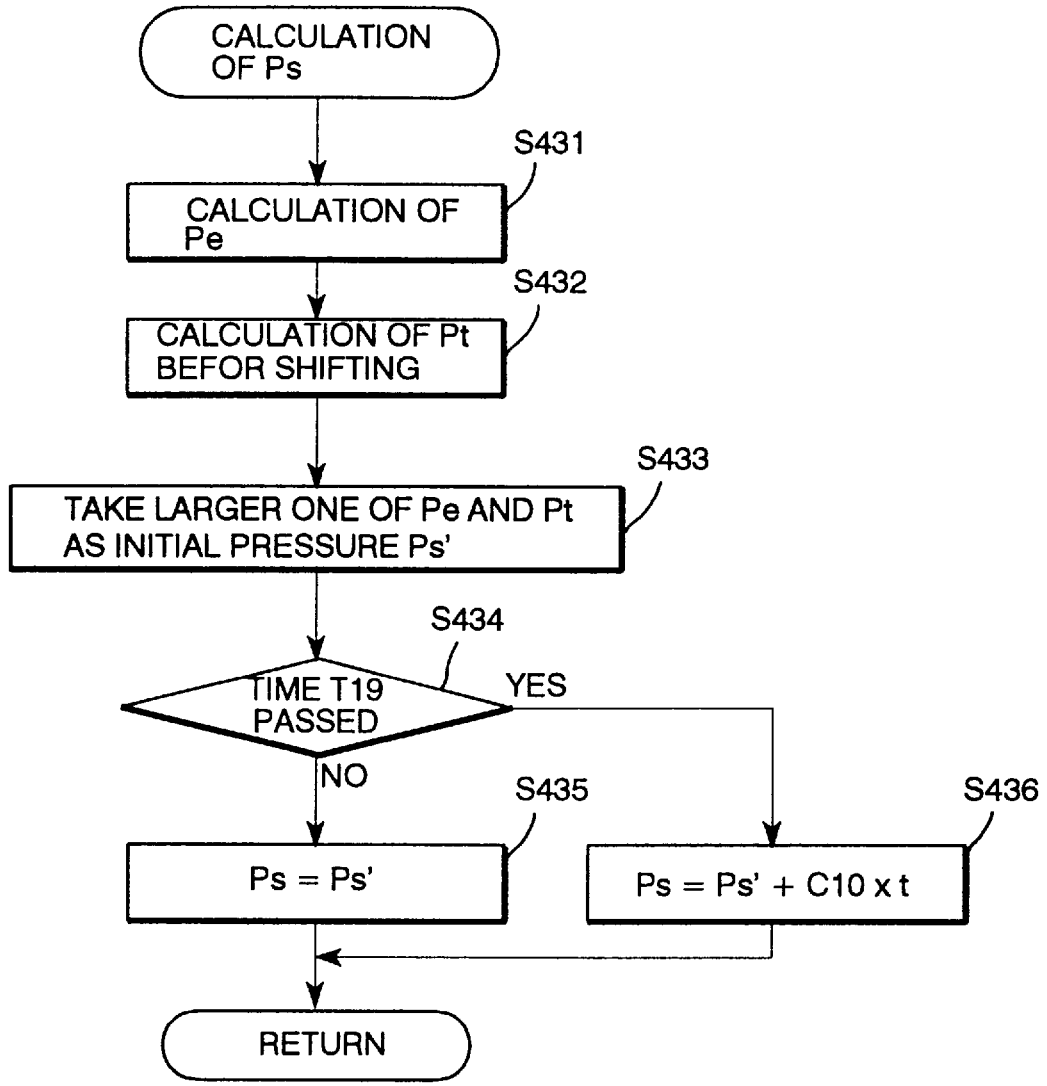
Figure 147:
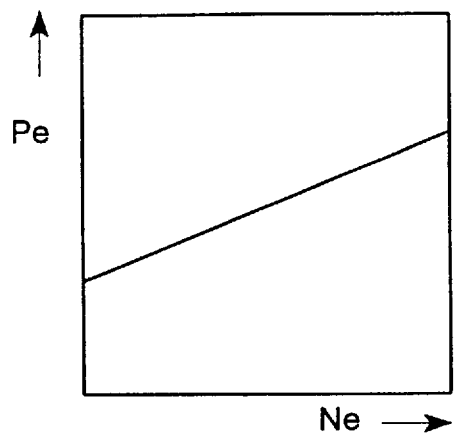
Figure 148:
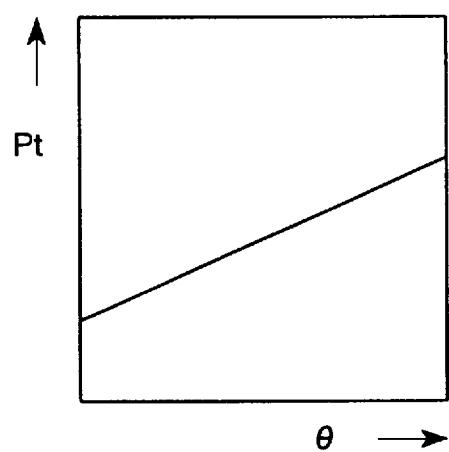
Figure 149:
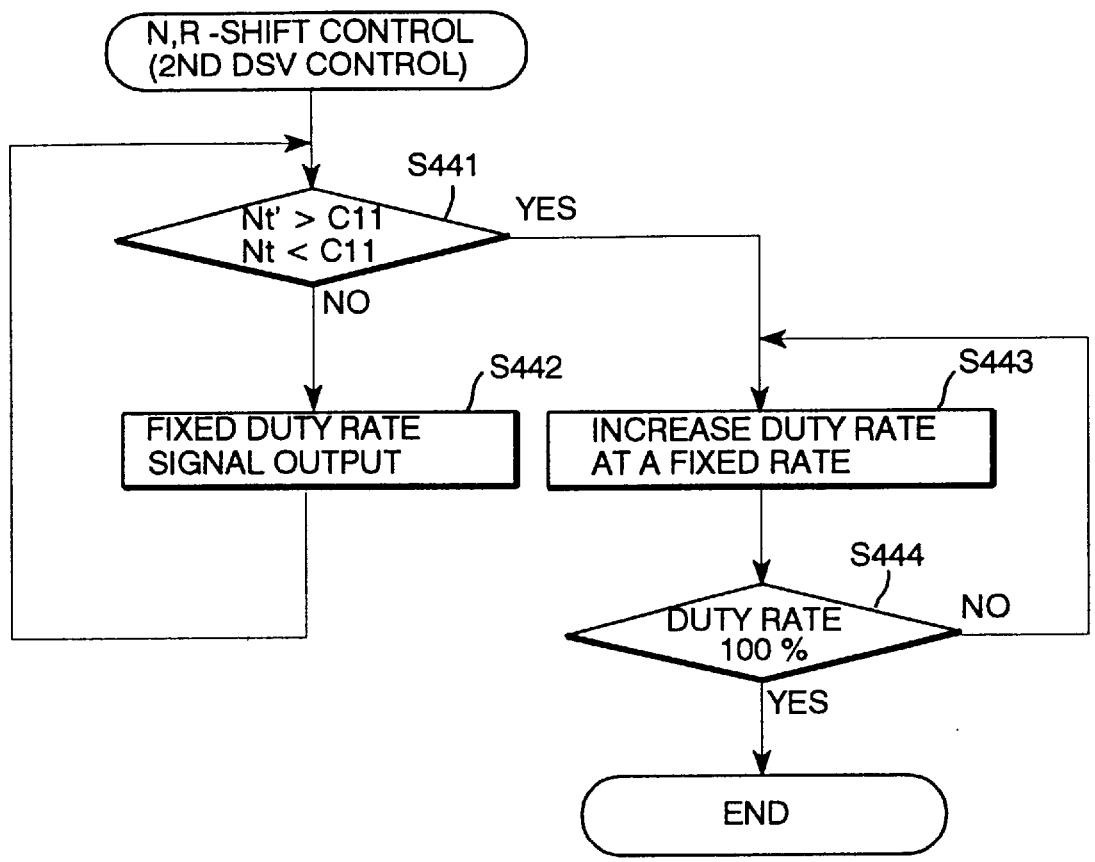
Figure 150:
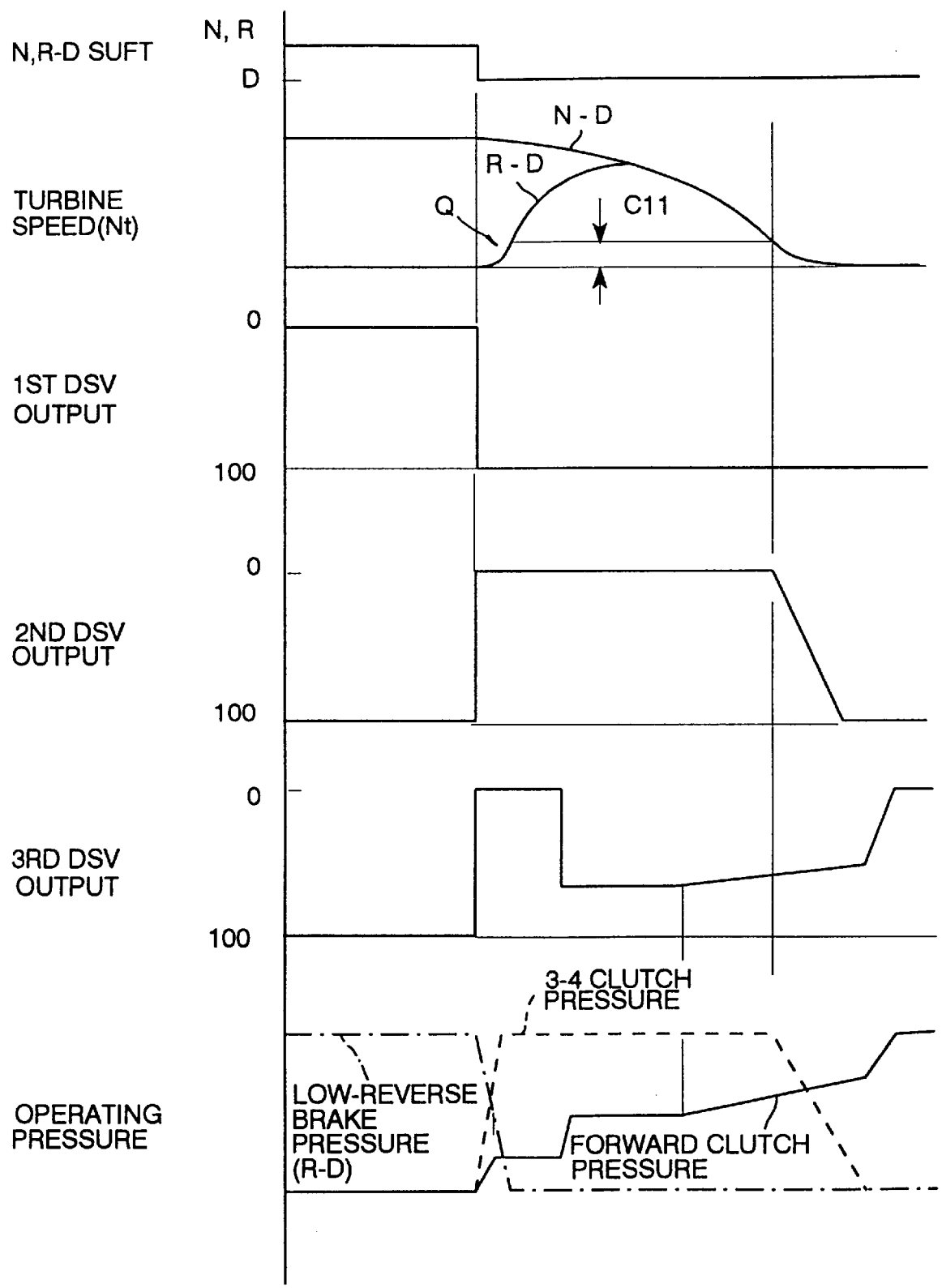
Figure 151:
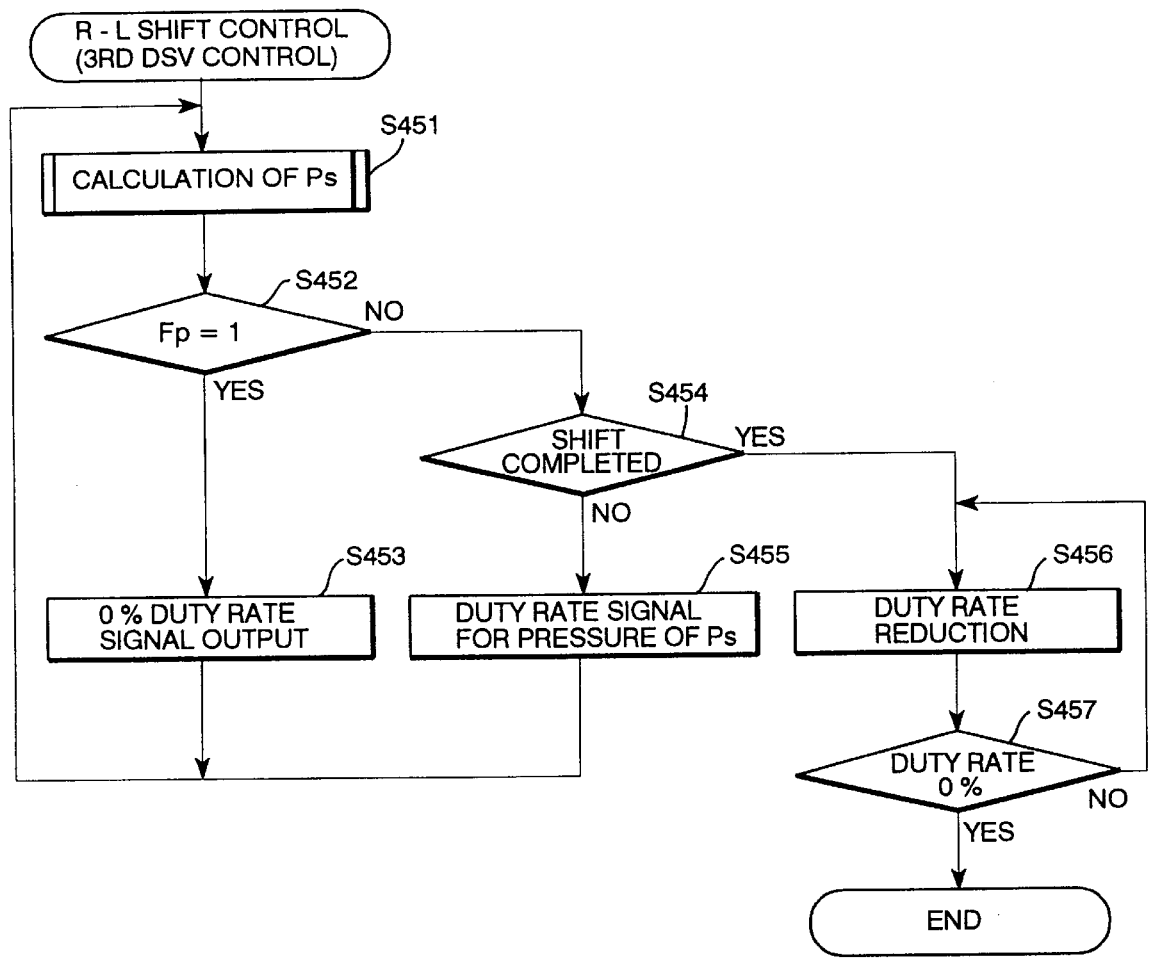
Figure 152:
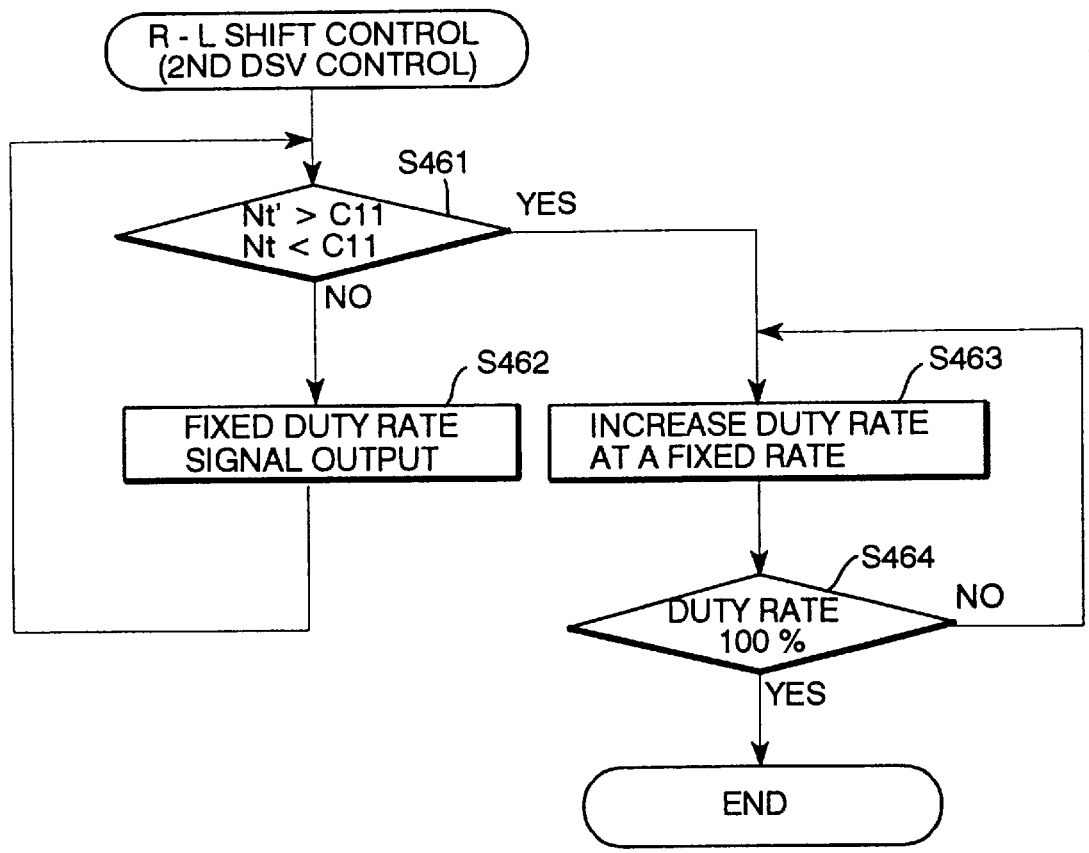
Figure 153:
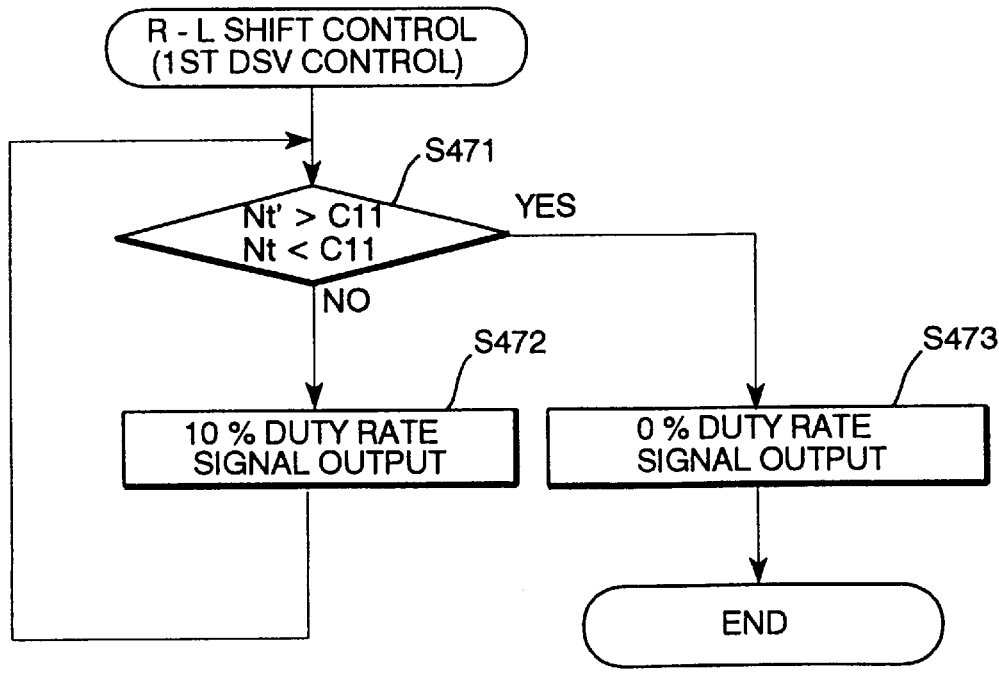
Figure 154:
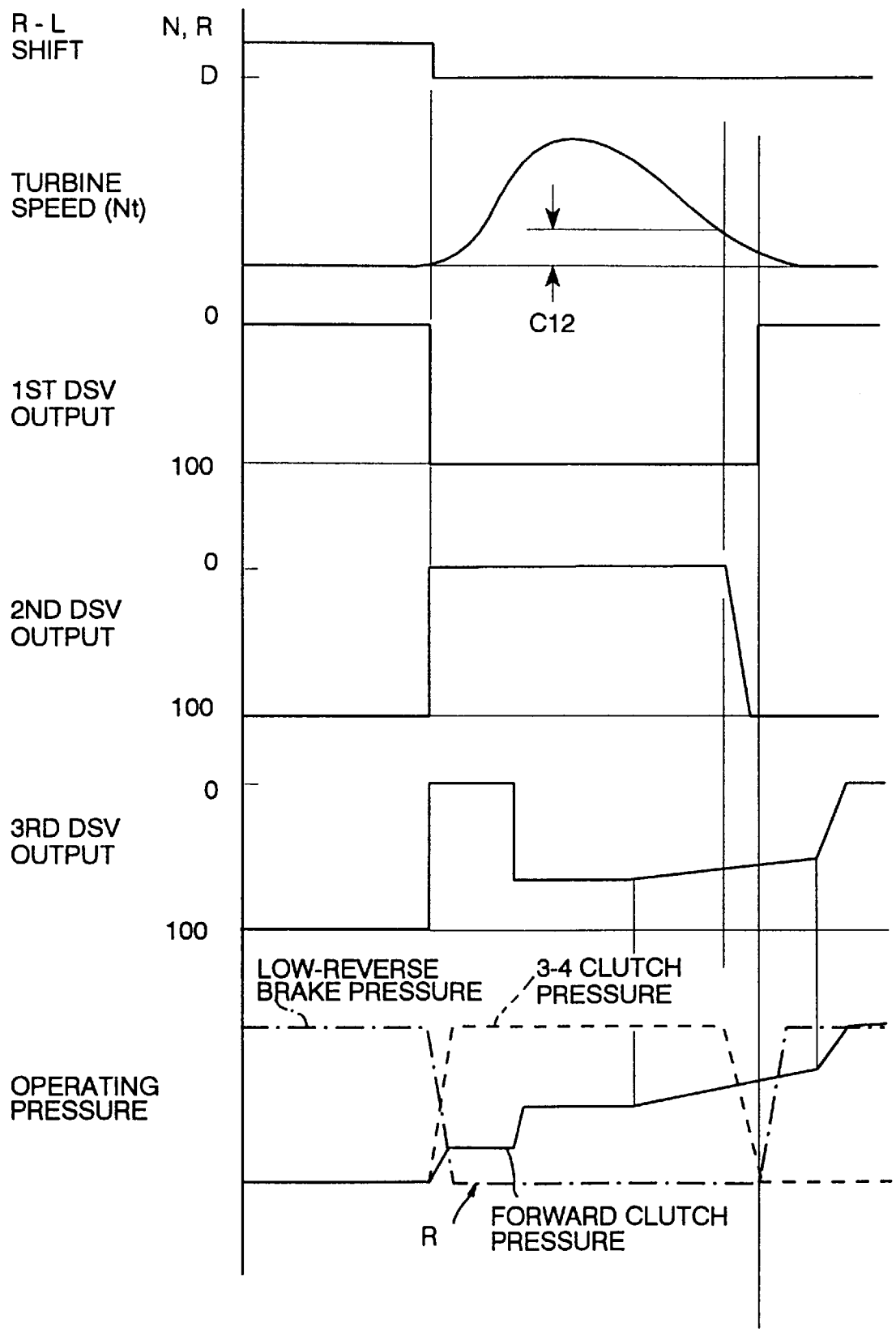
Figure 155:
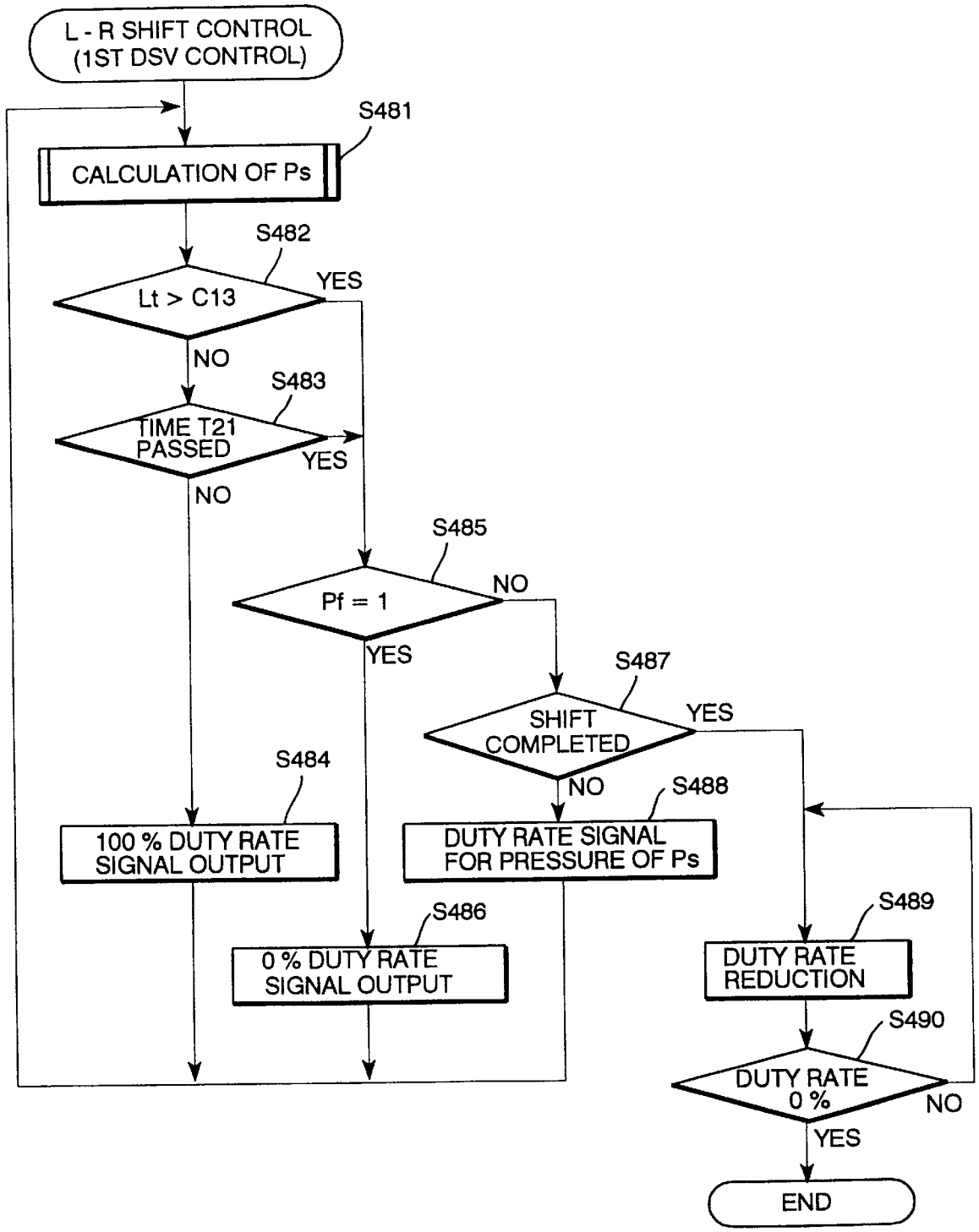
Figure 156:
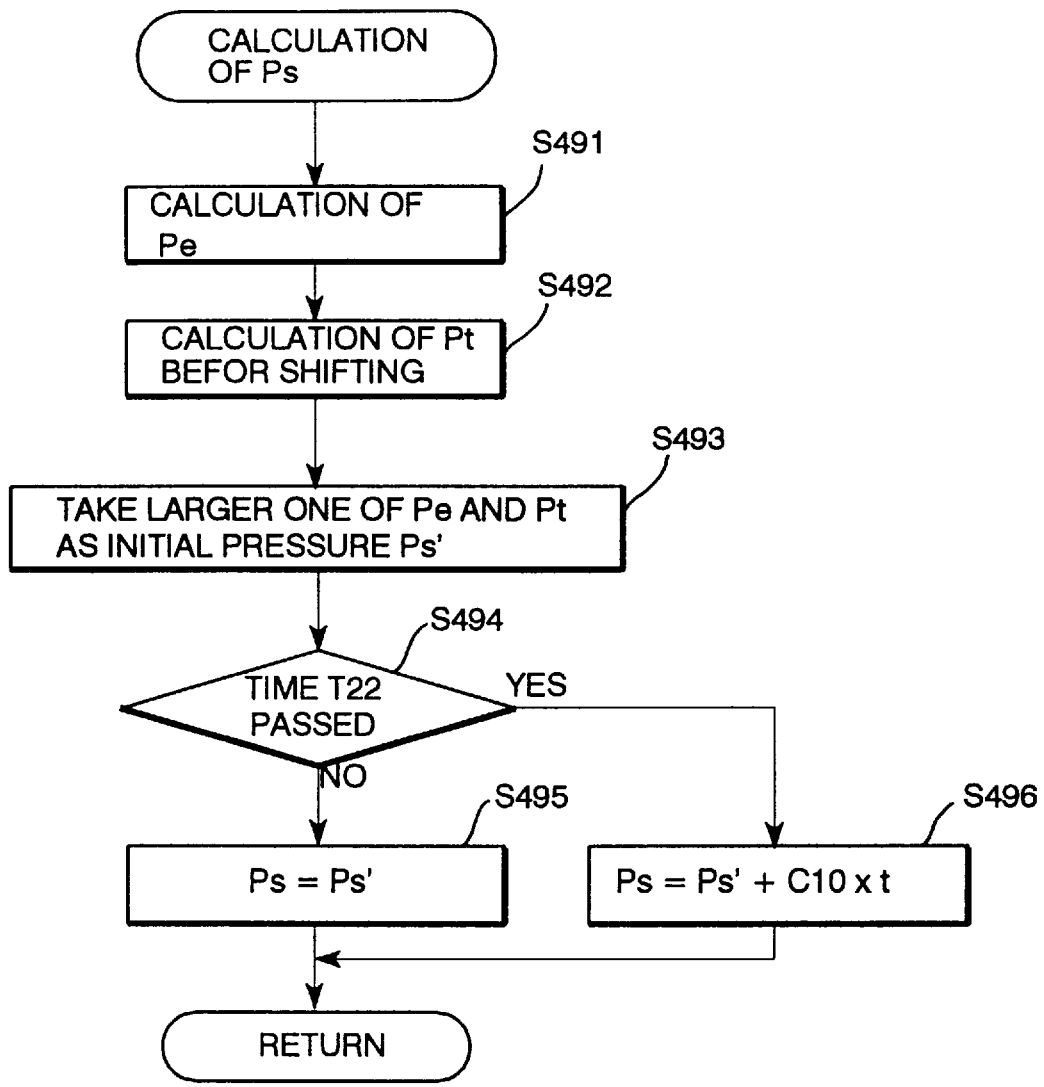
Figure 157:
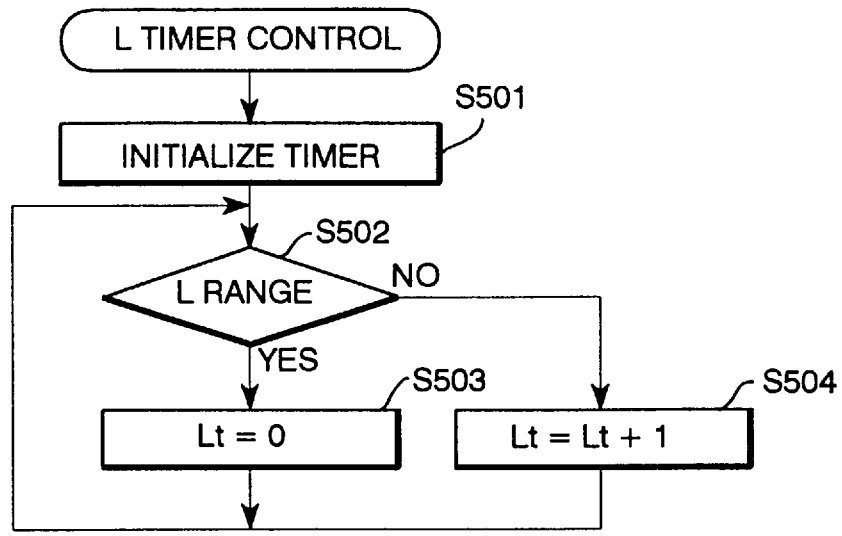
Figure 158:
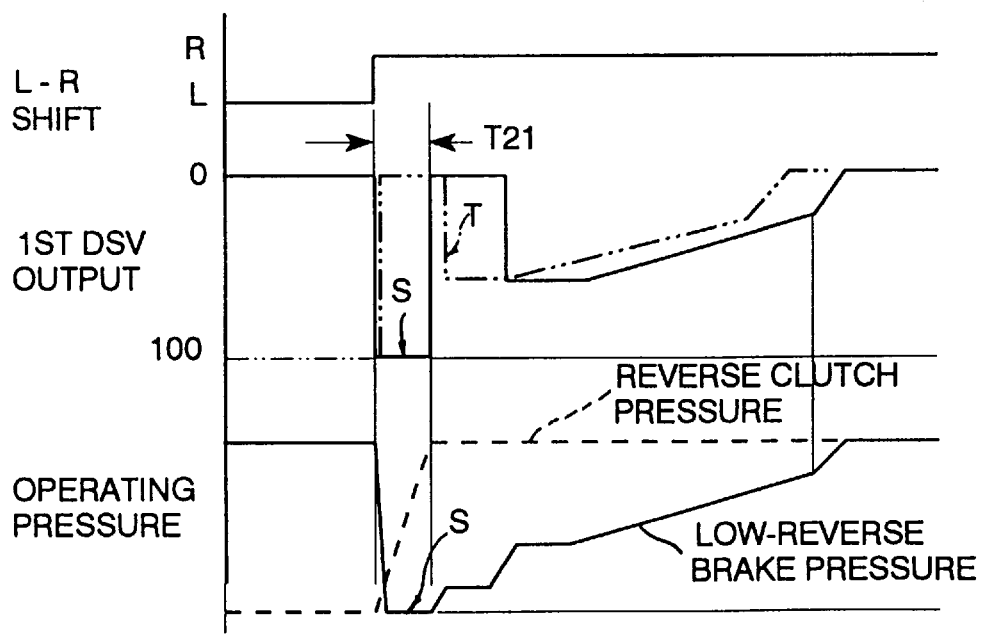
Figure 159:
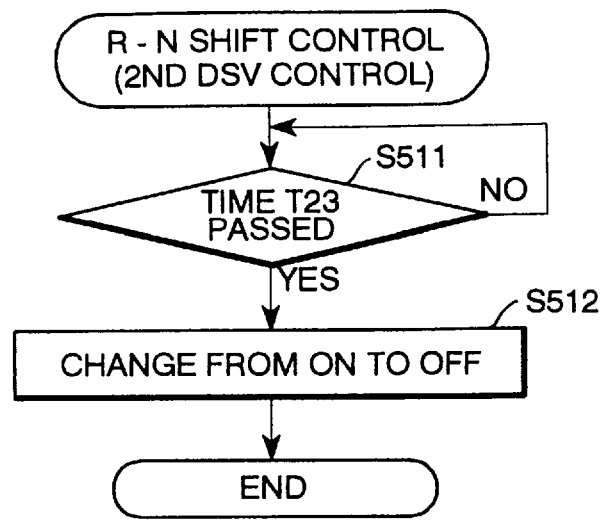
Figure 160:
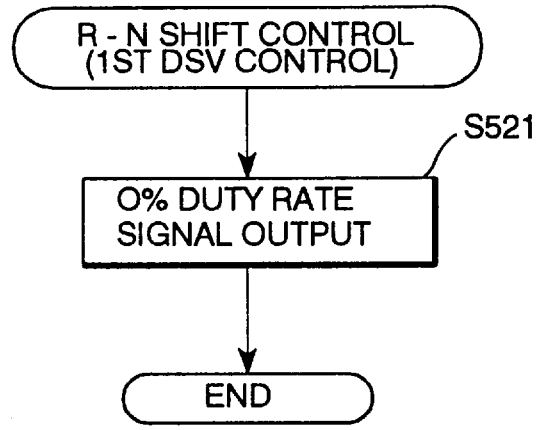
Figure 161:
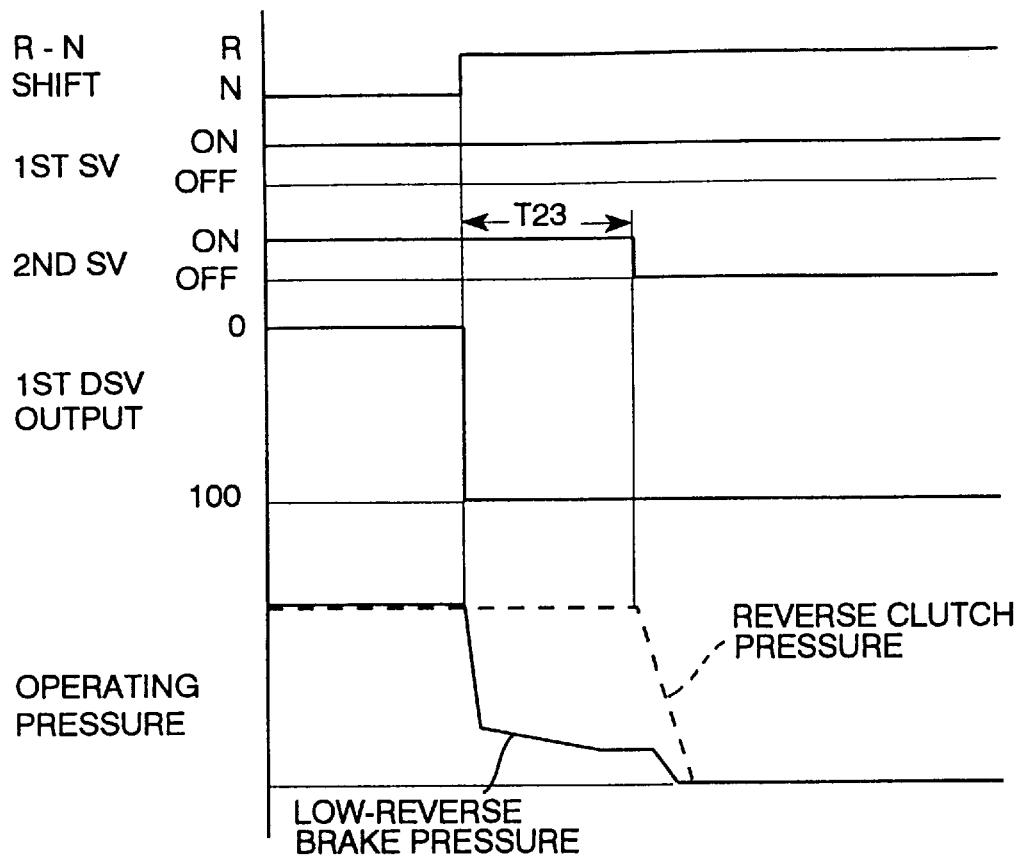
Figure 162:
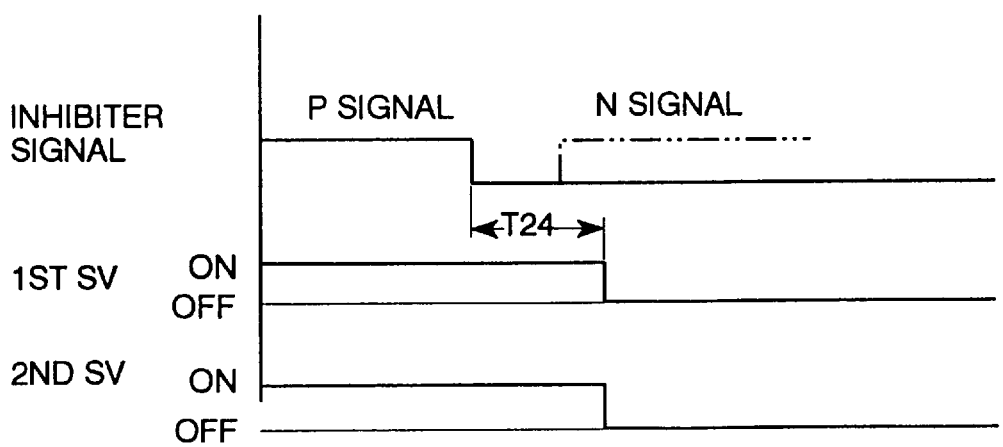
Figure 163:
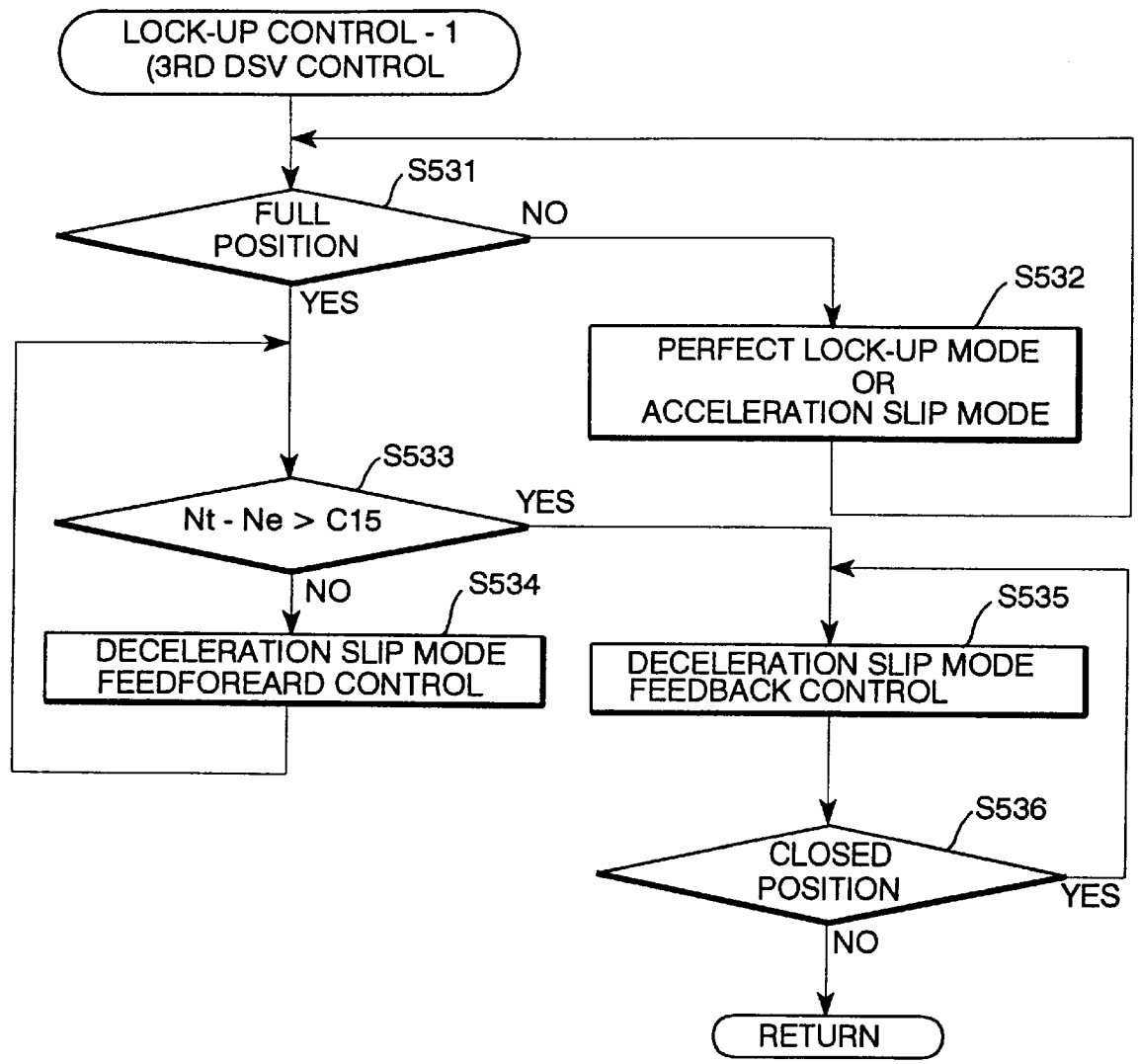
Figure 164:
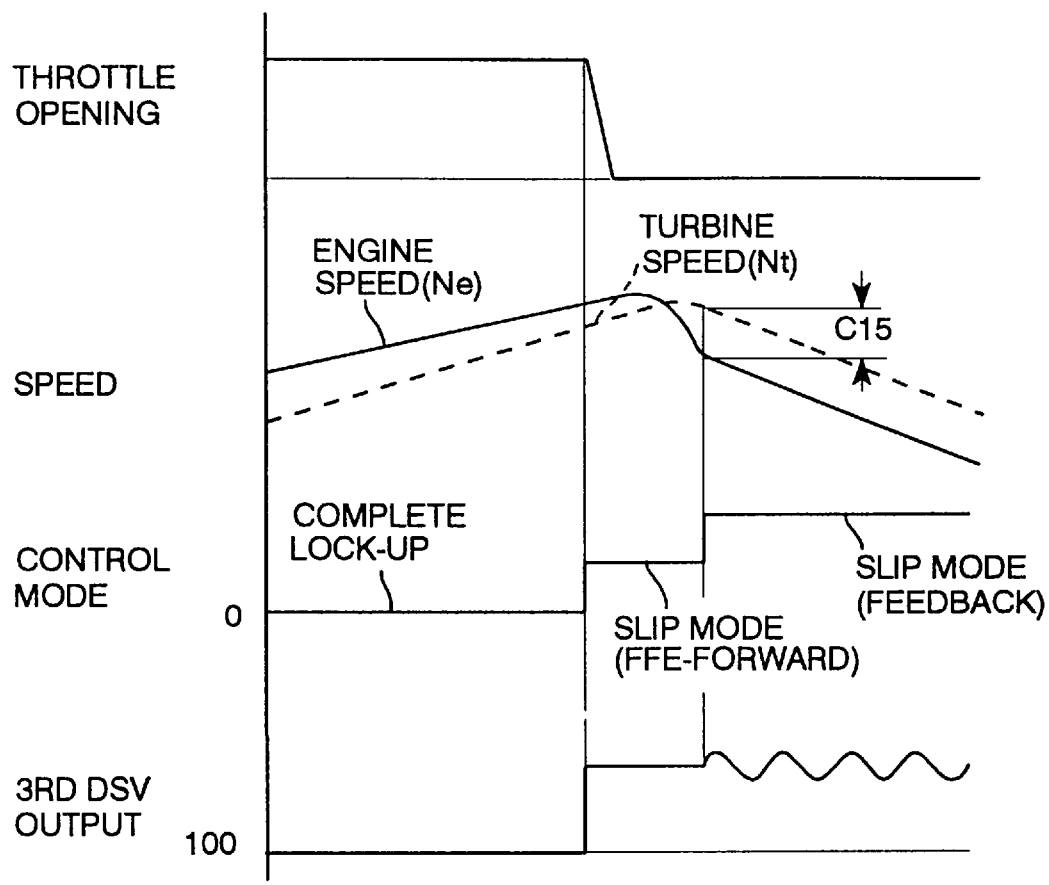
Figure 165:
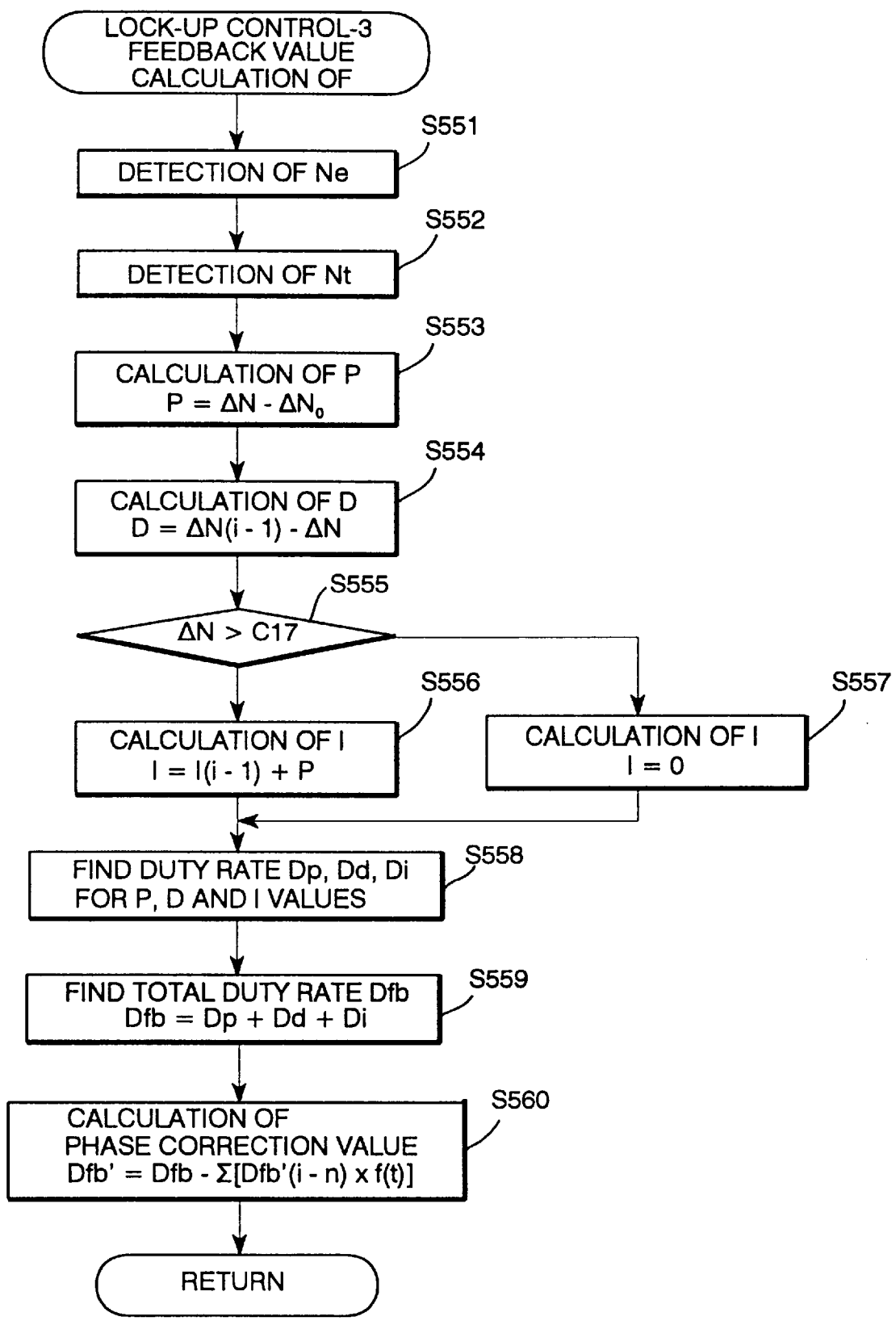
Figure 166:
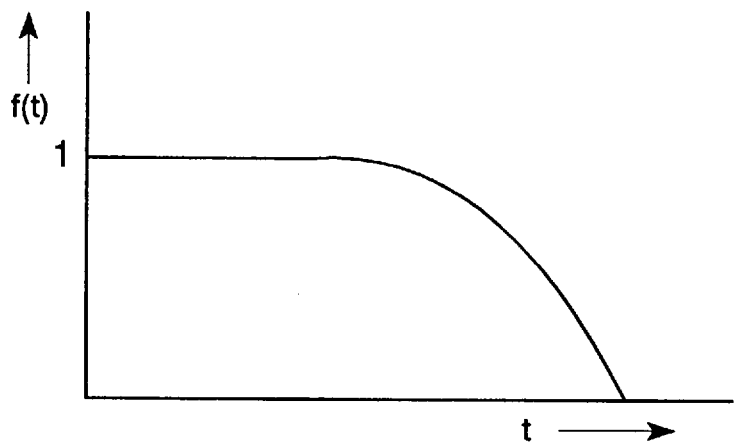
Figure 167:
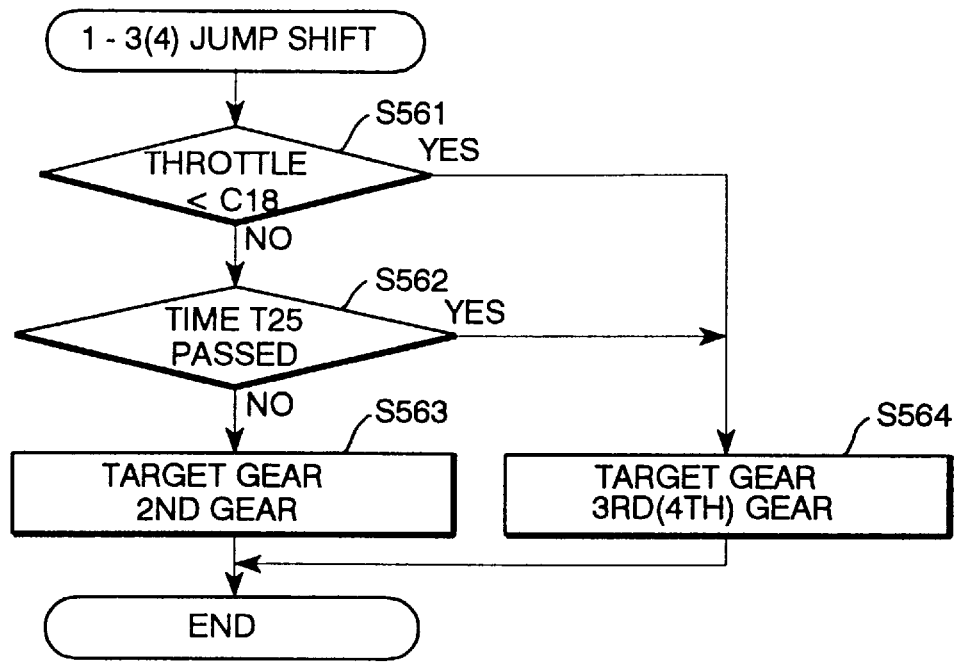
Figure 168:
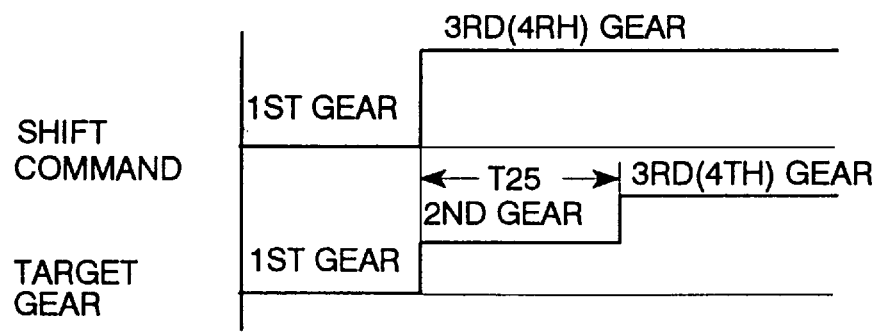
Figure 169:
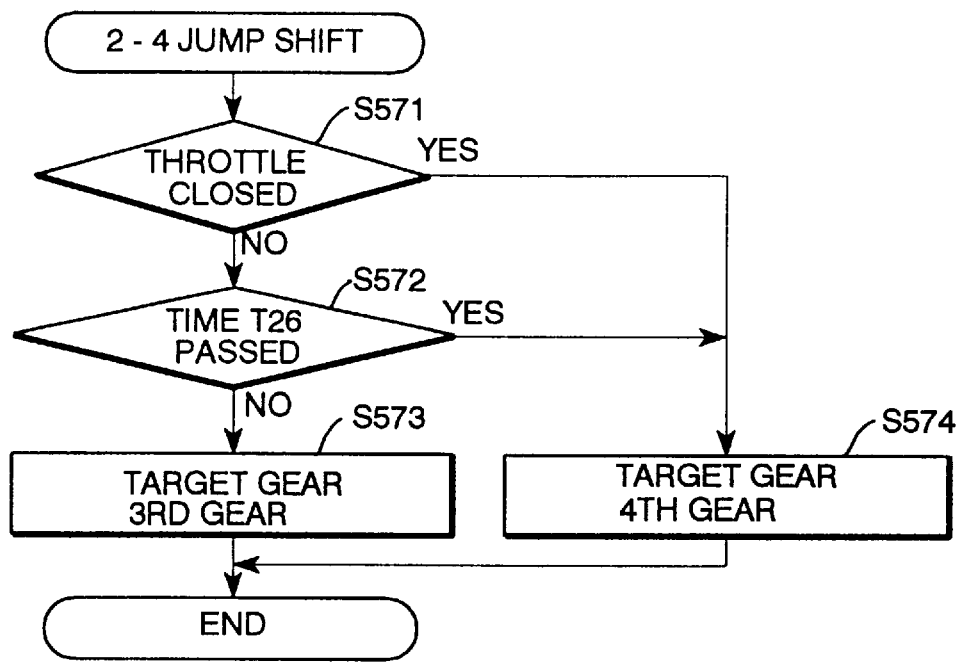
Figure 170:
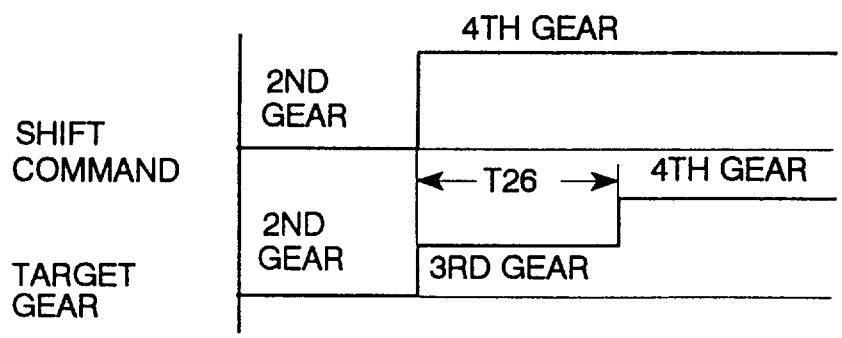
Figure 171:
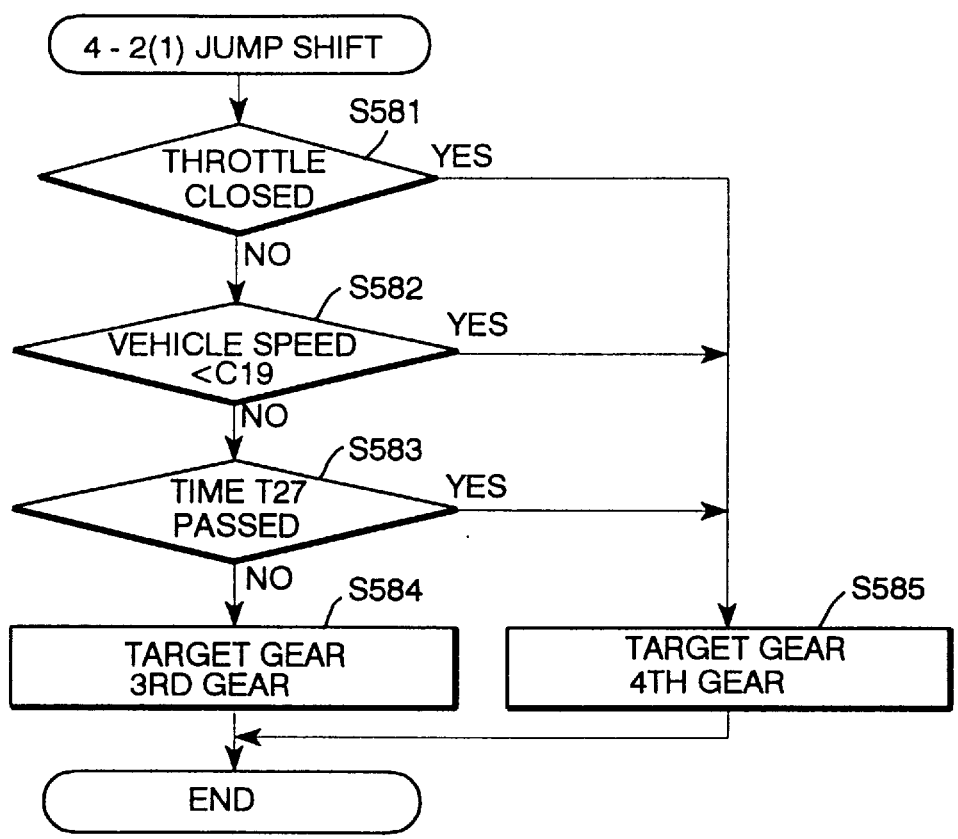
Figure 172:
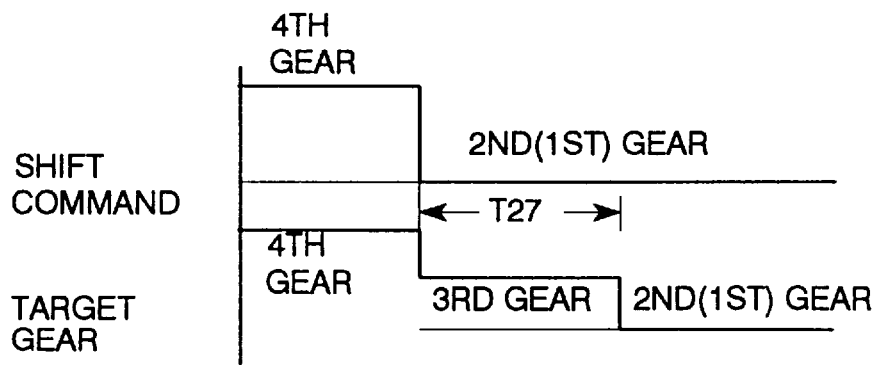
Figure 173:
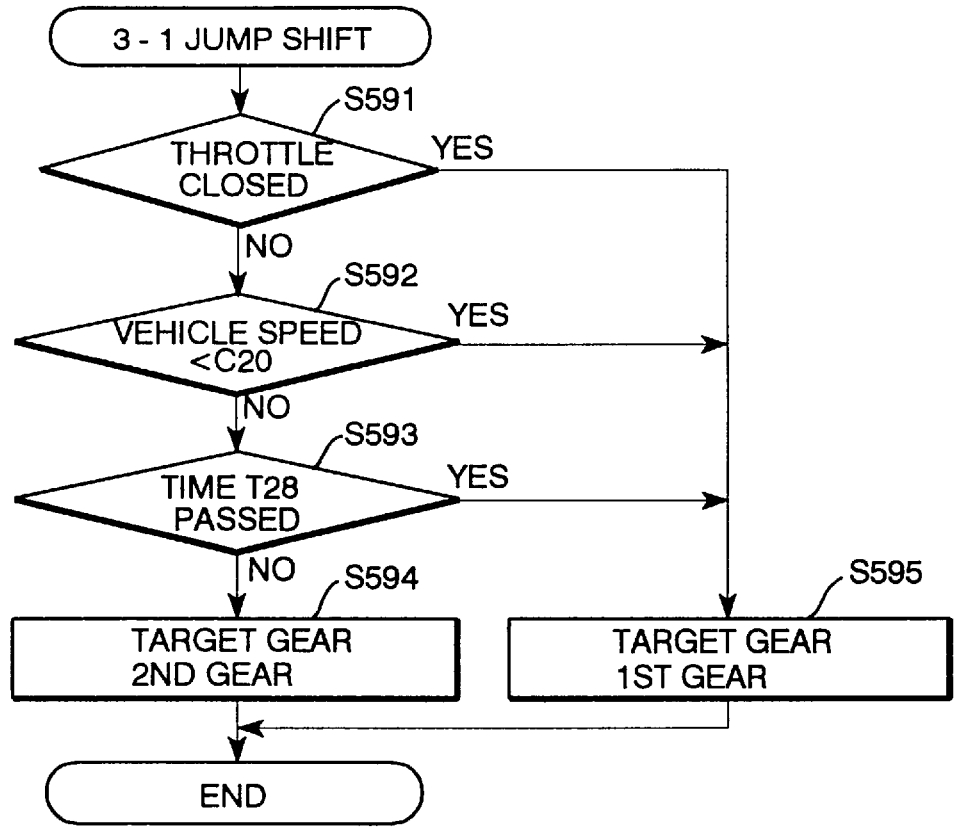
Figure 174:
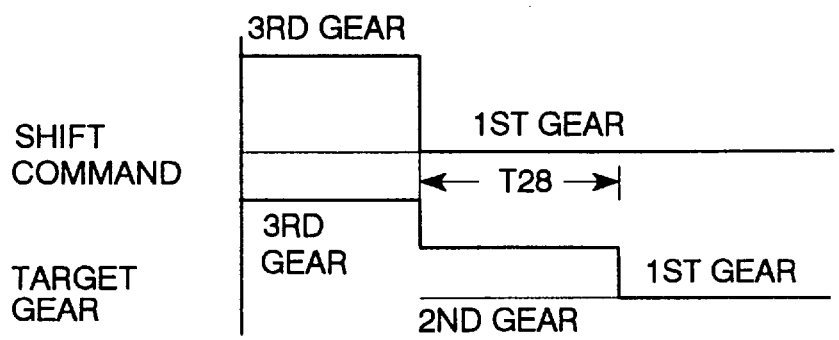
Figure 175:
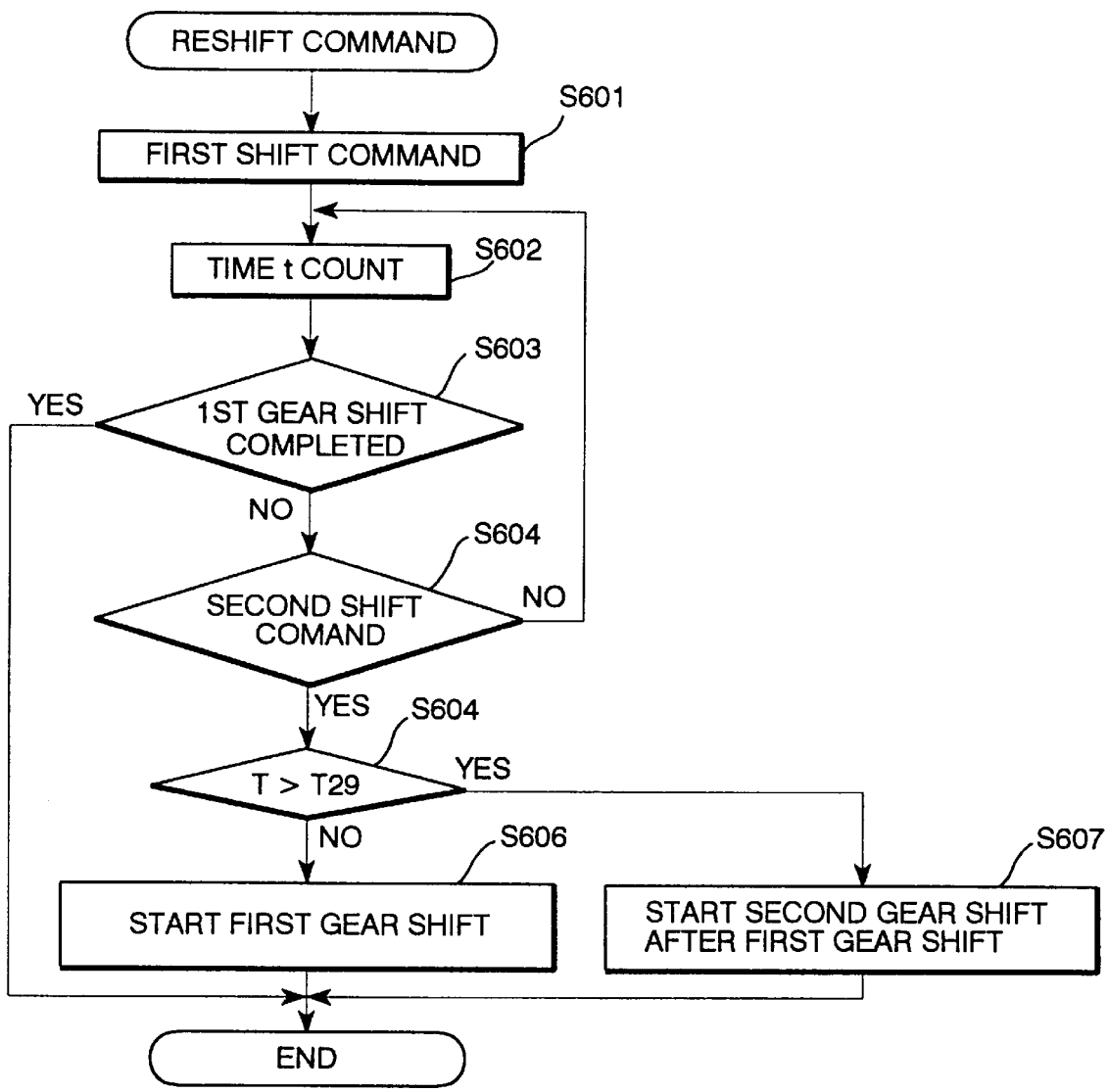
Figure 176:
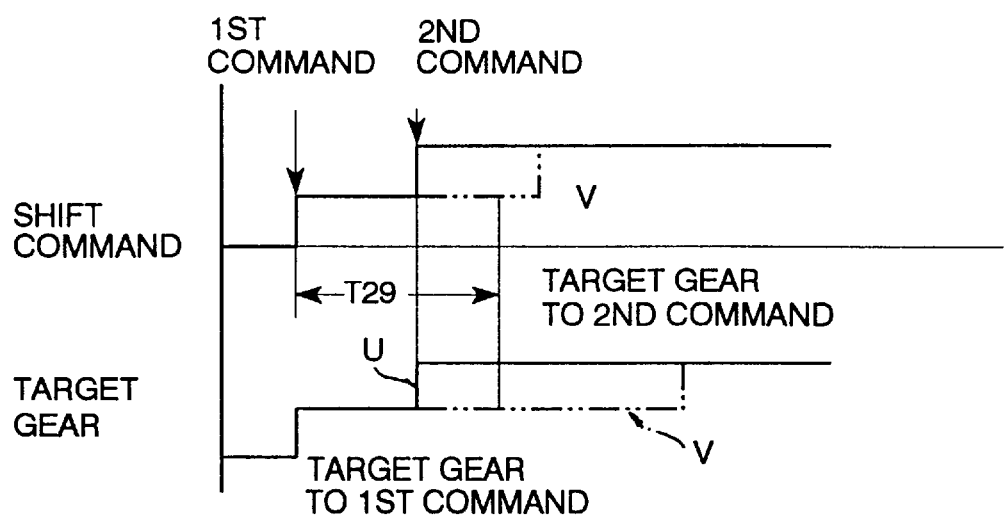
Figure 177:
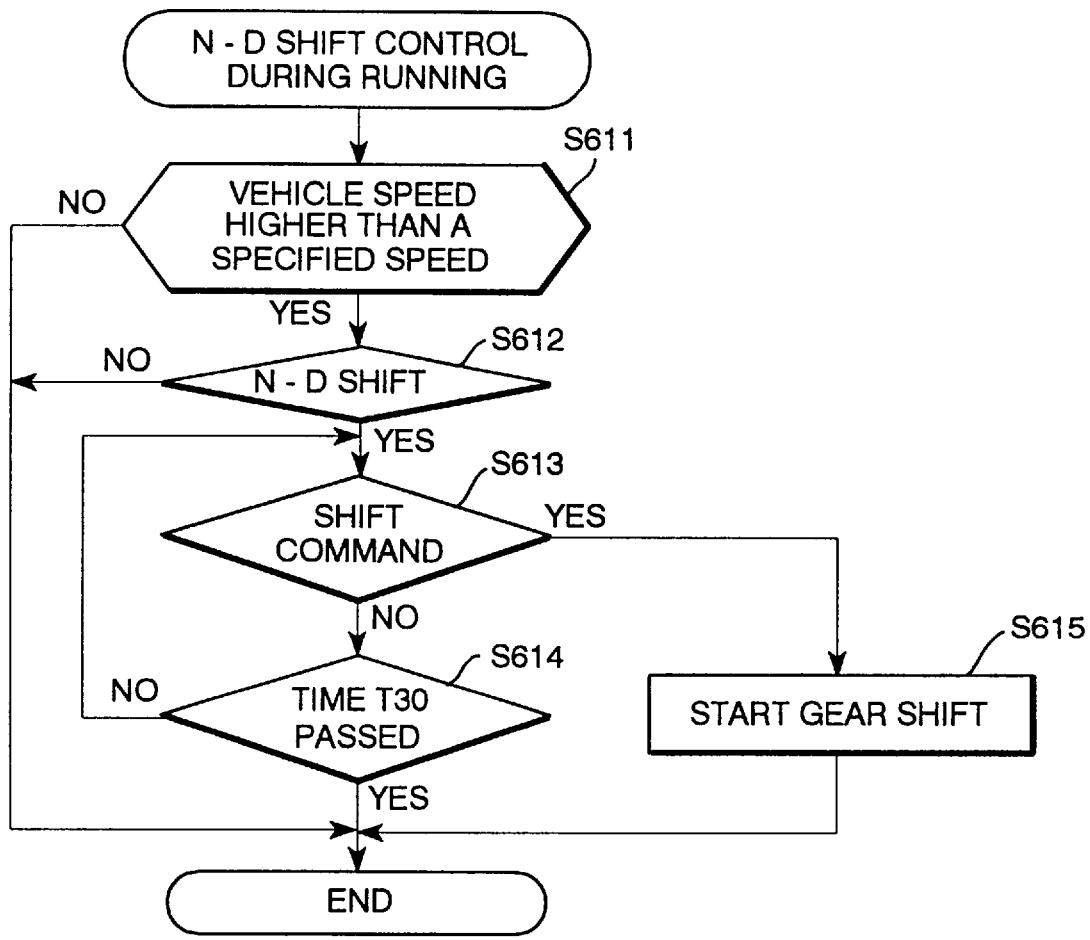
Figure 178:
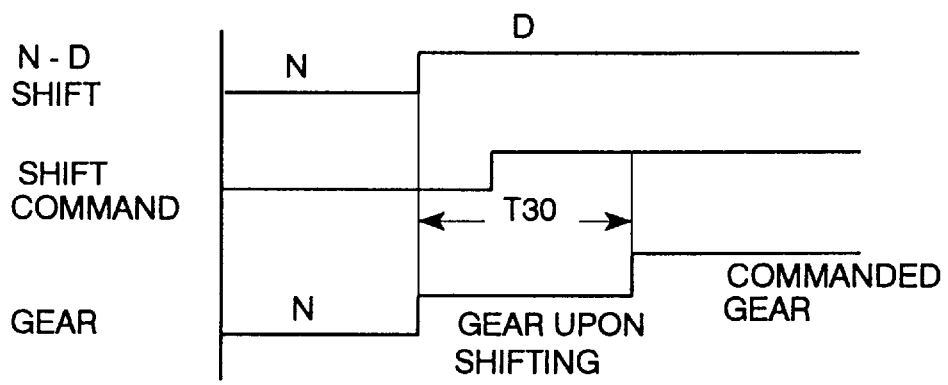
Figure 179:
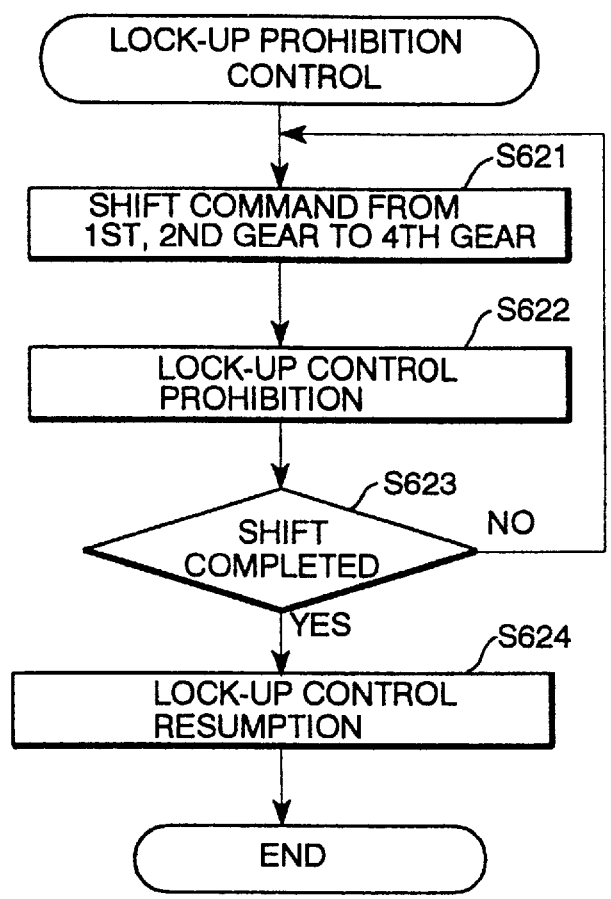
Figure 180:
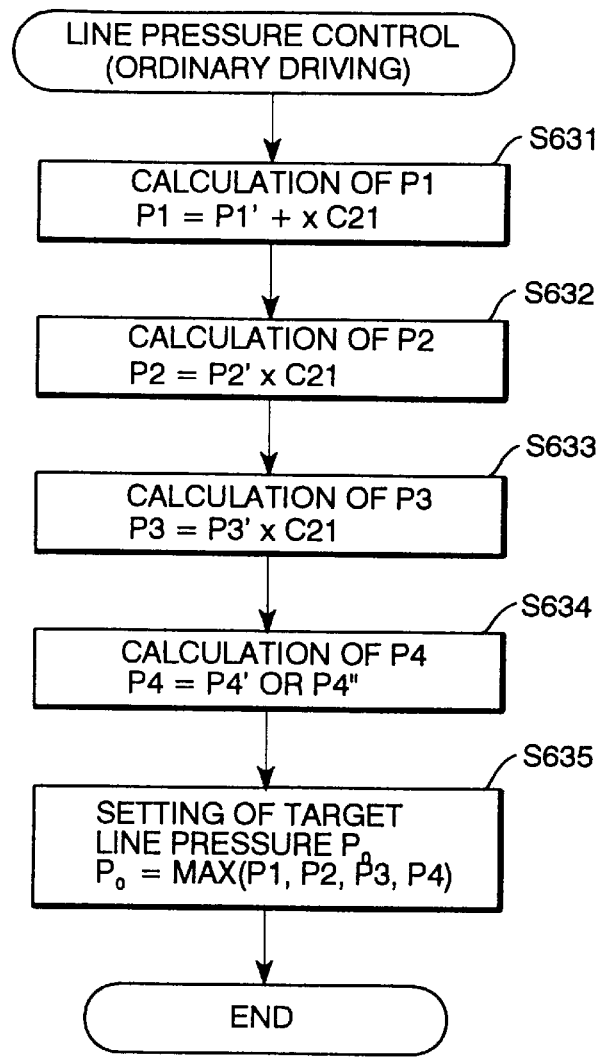
Figure 181:
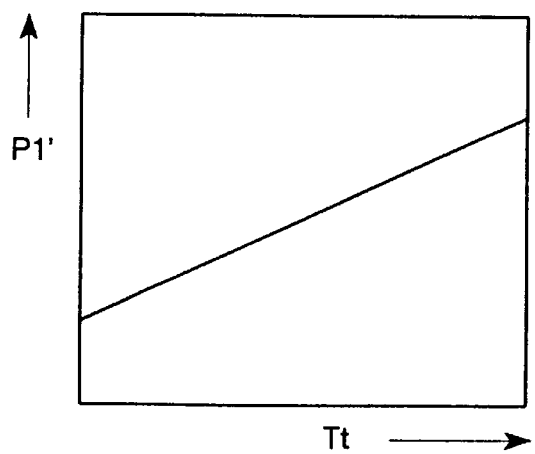
Figure 182:
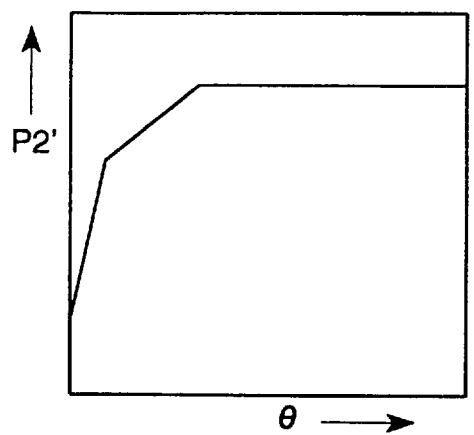
Figure 183:
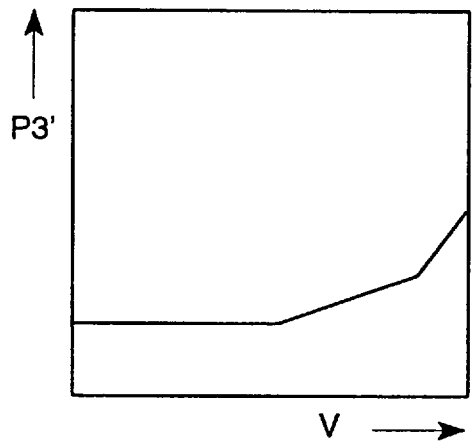
Figure 184:
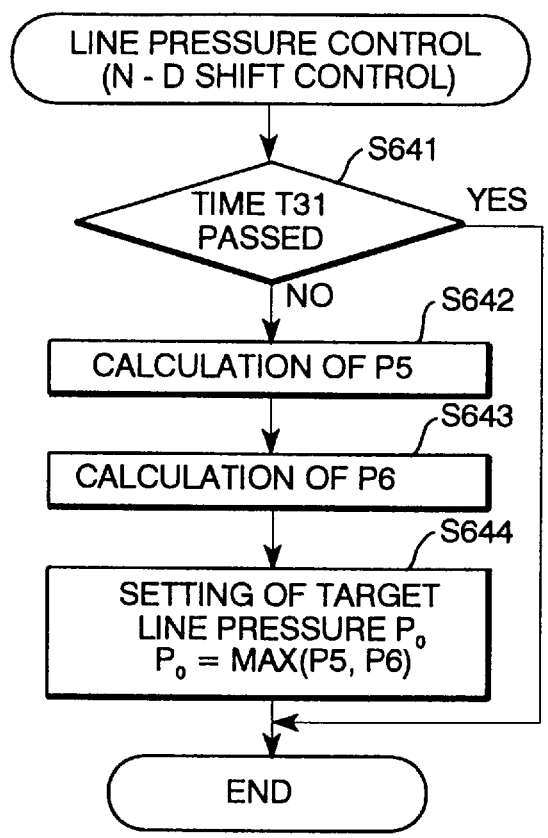
Figure 185:
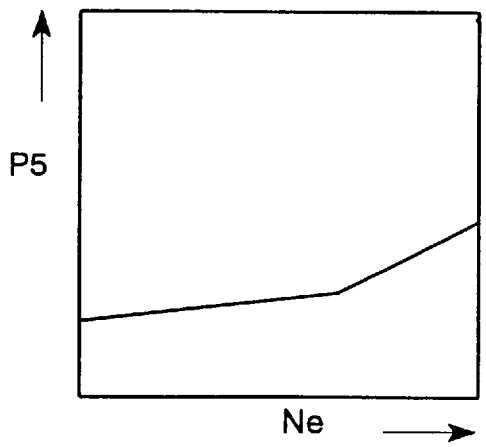
Figure 186:
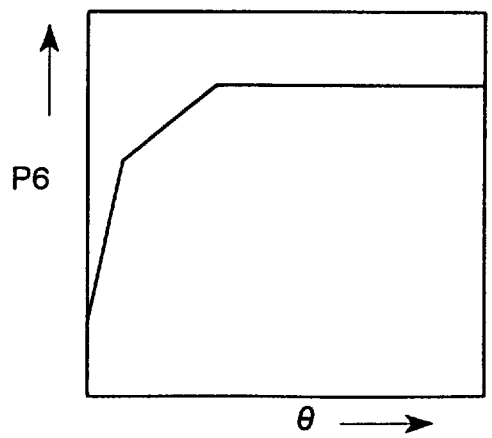
Figure 187:
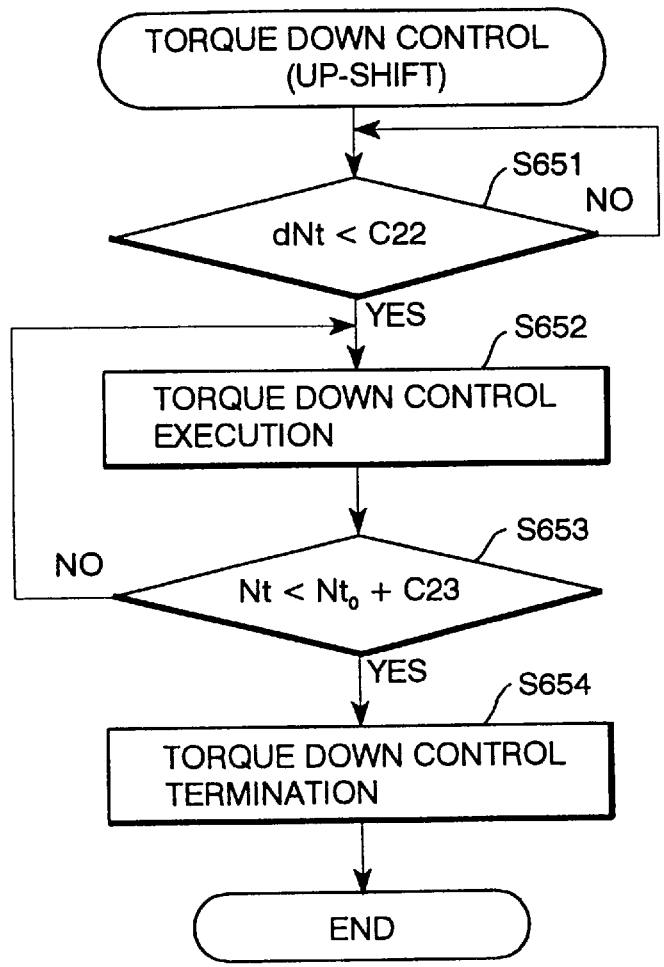
Figure 188:
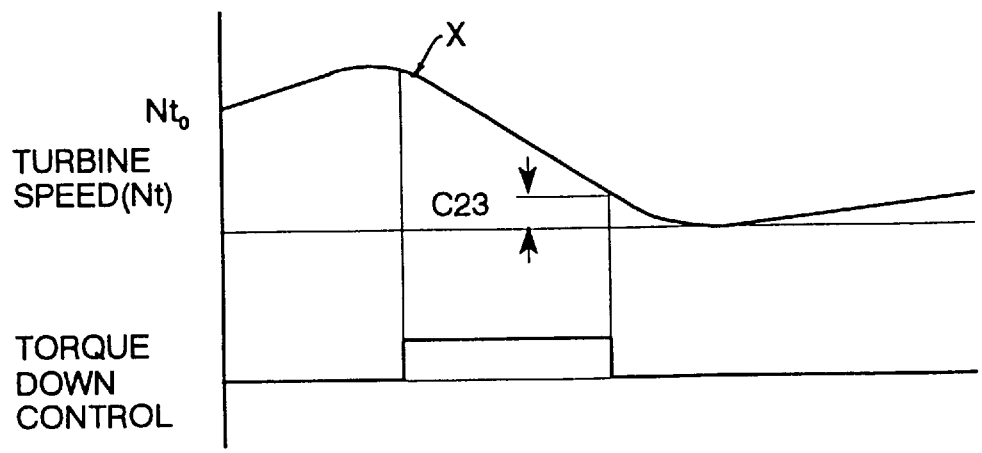
Figure 189:
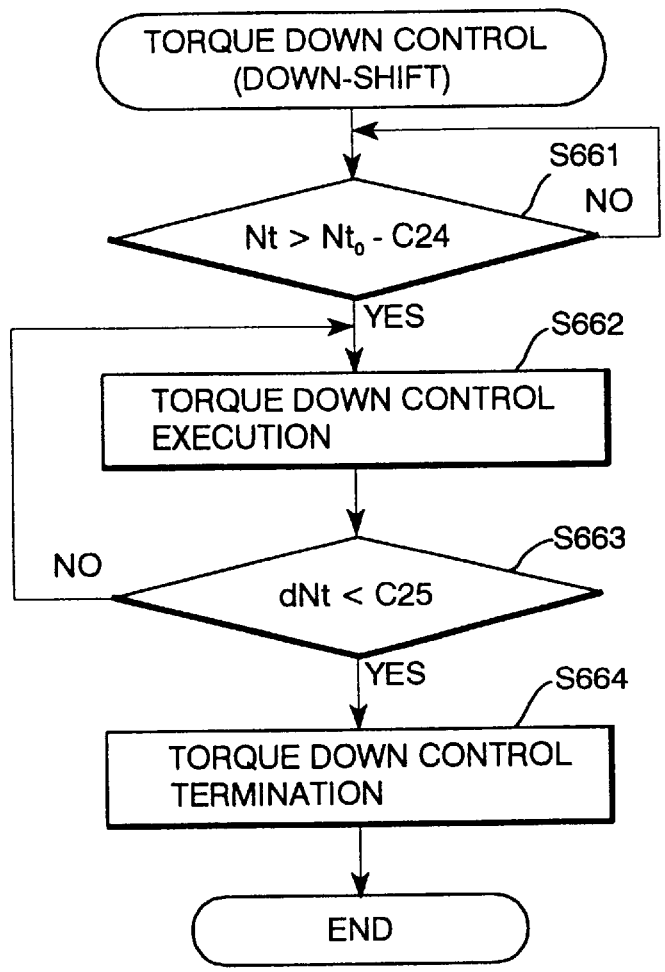
Figure 190:
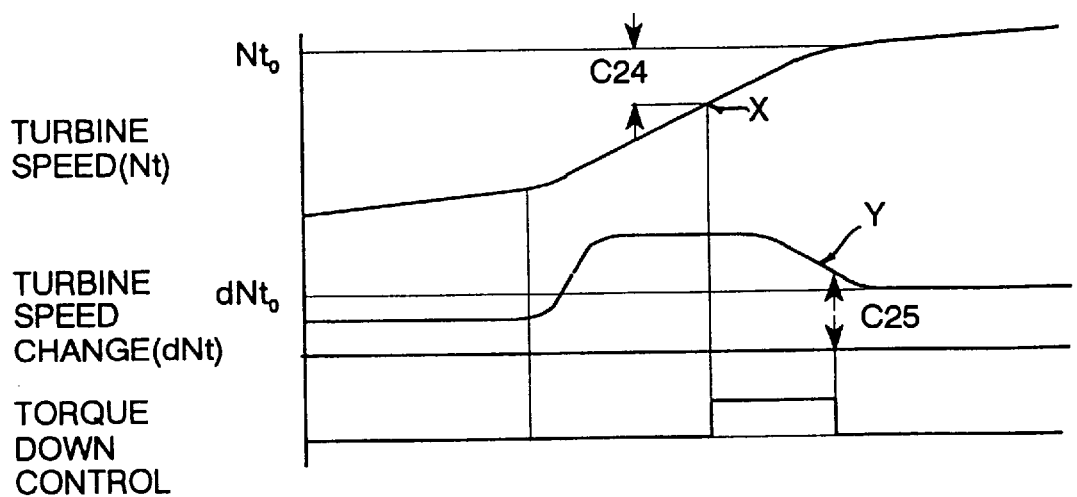
Figure 191:
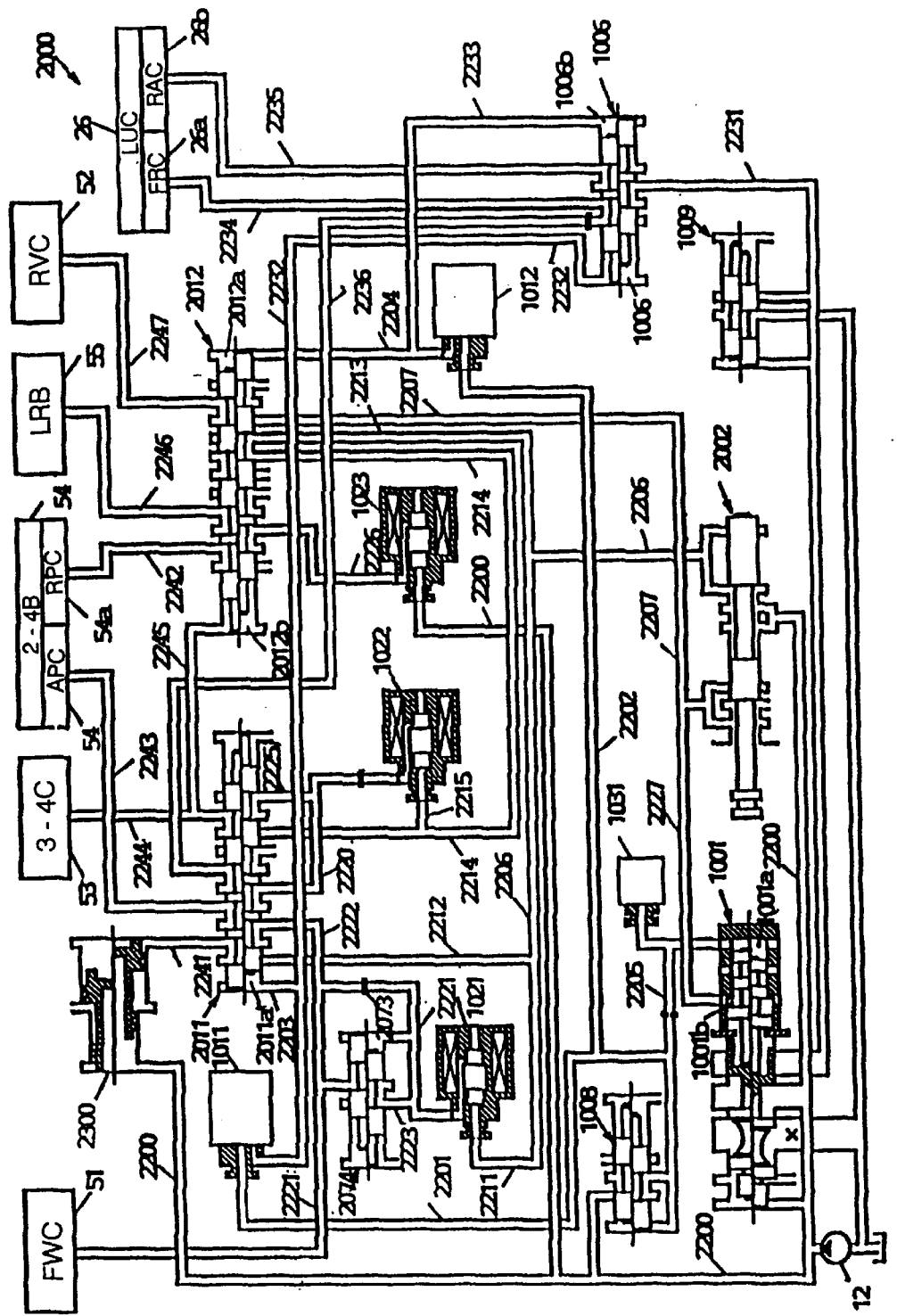
Figure 192:
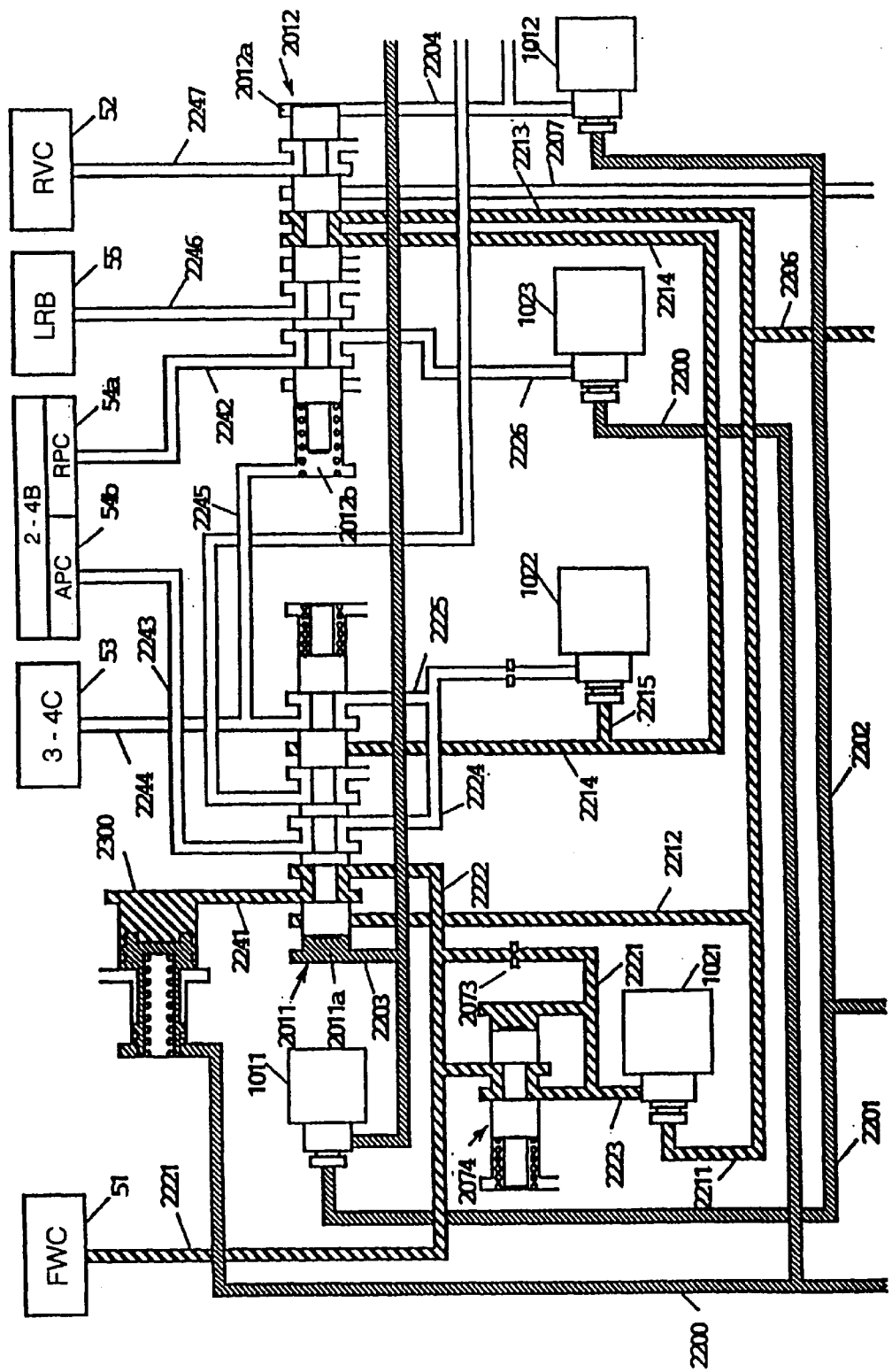
Figure 193:
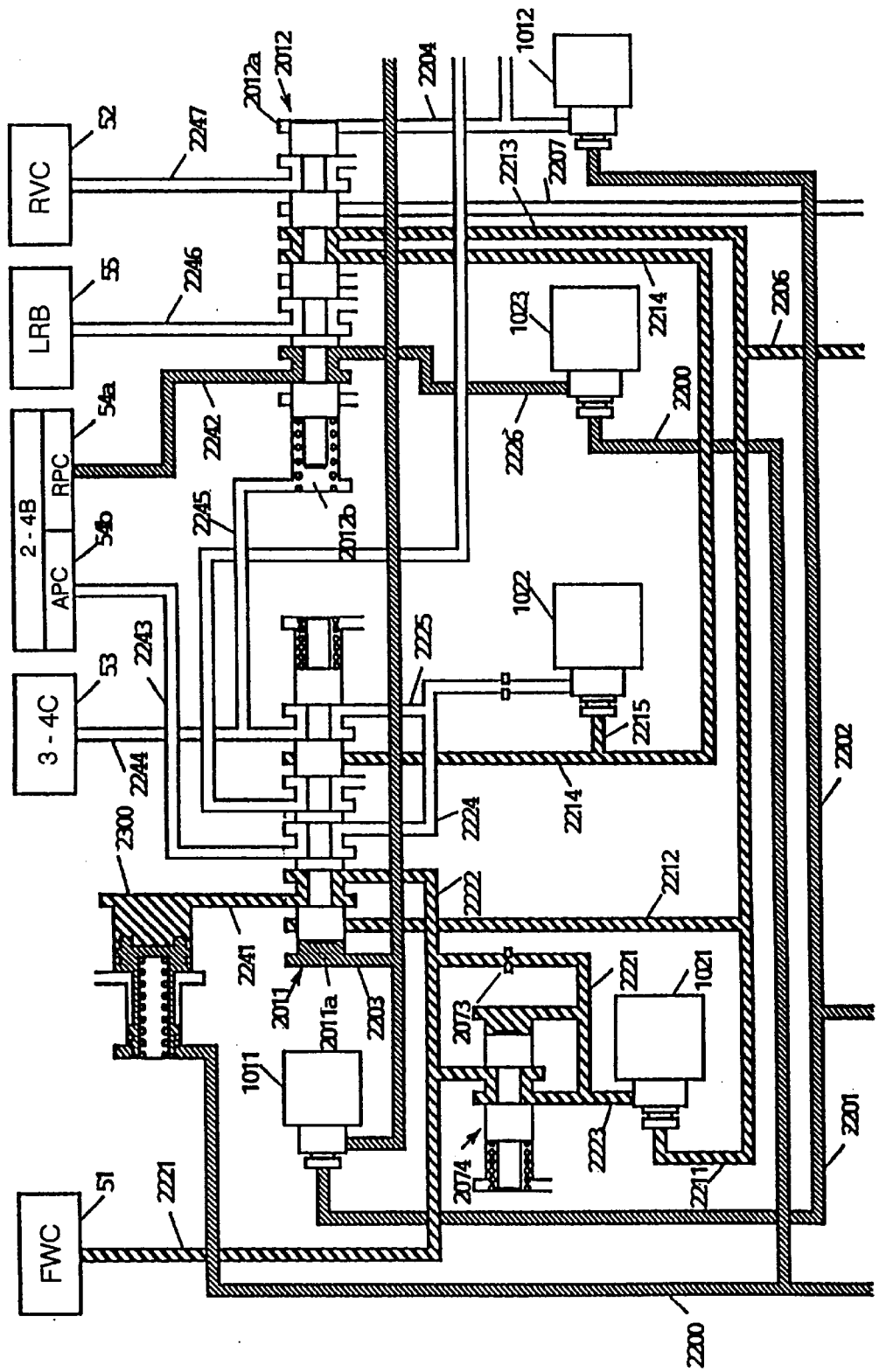
Figure 194:
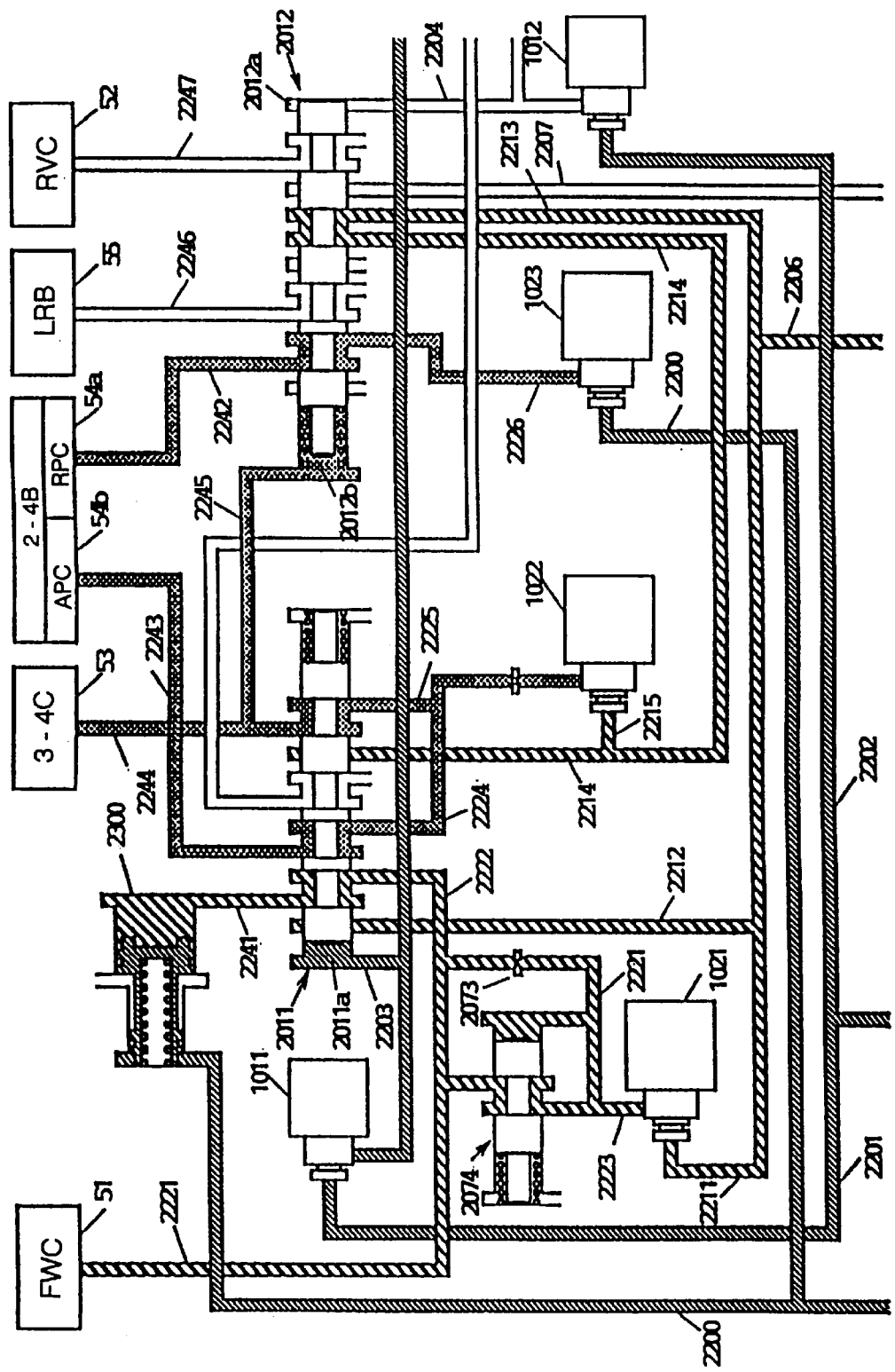
Figure 195:
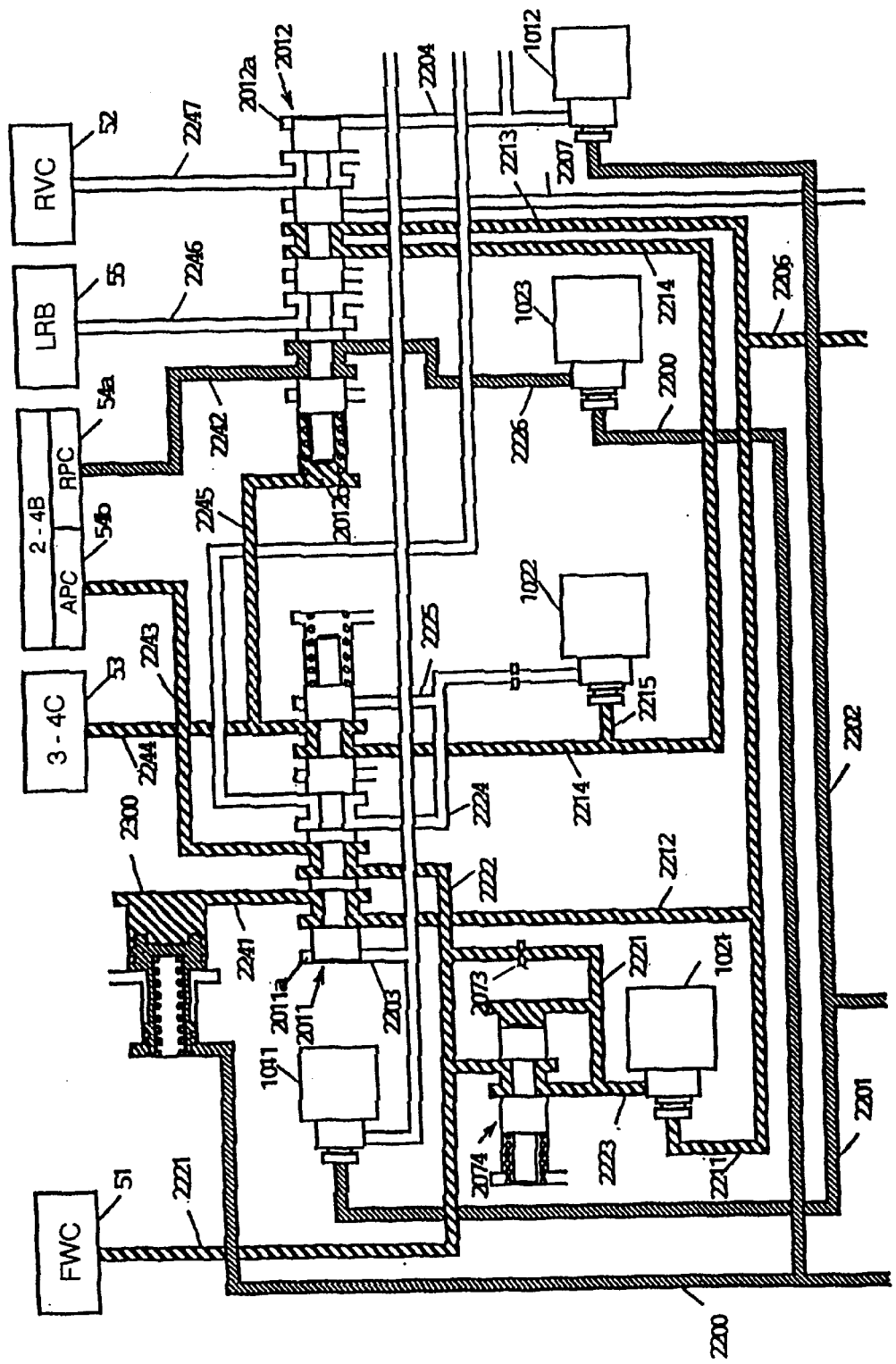
Figure 196:
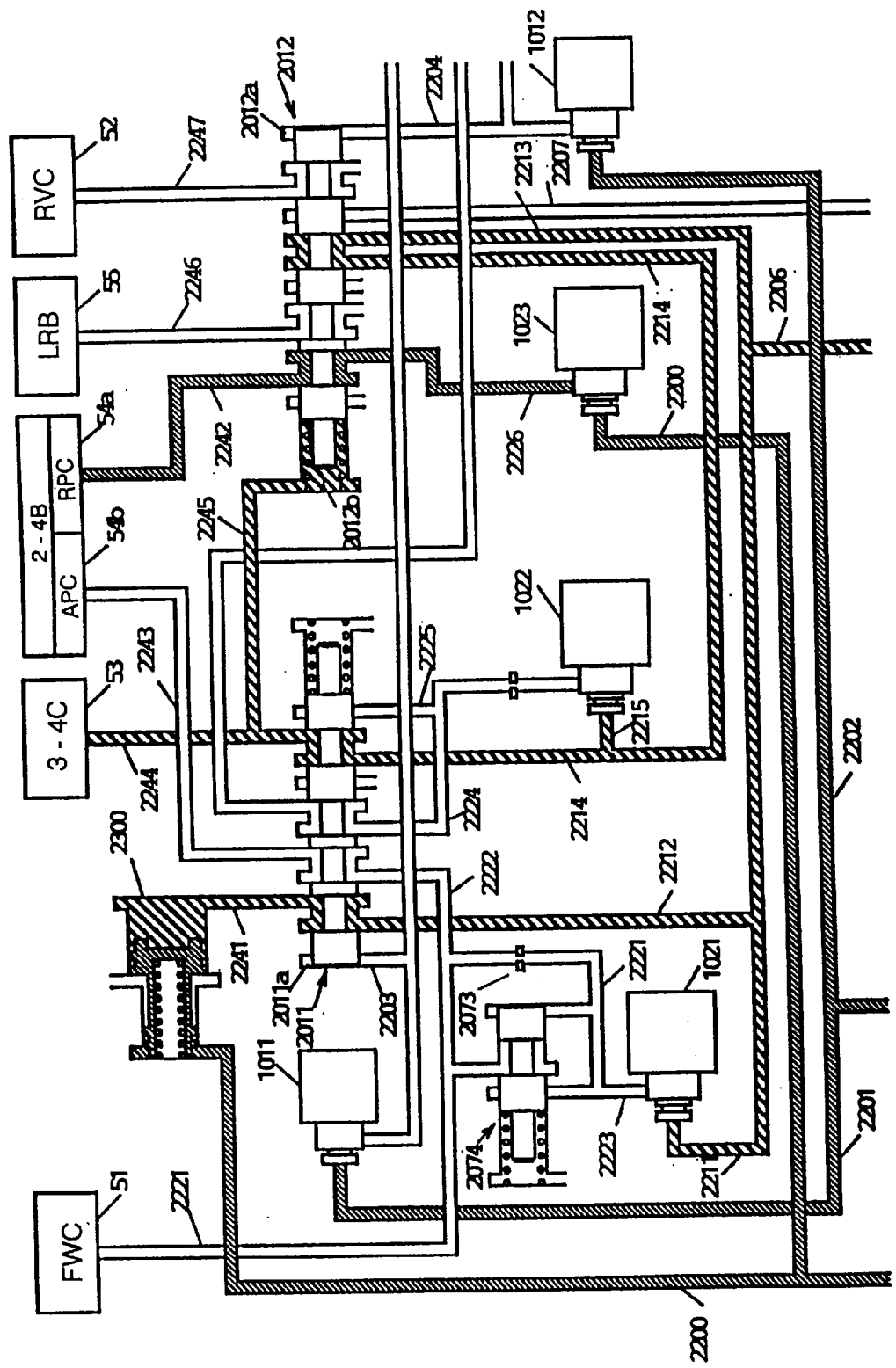
Figure 197:
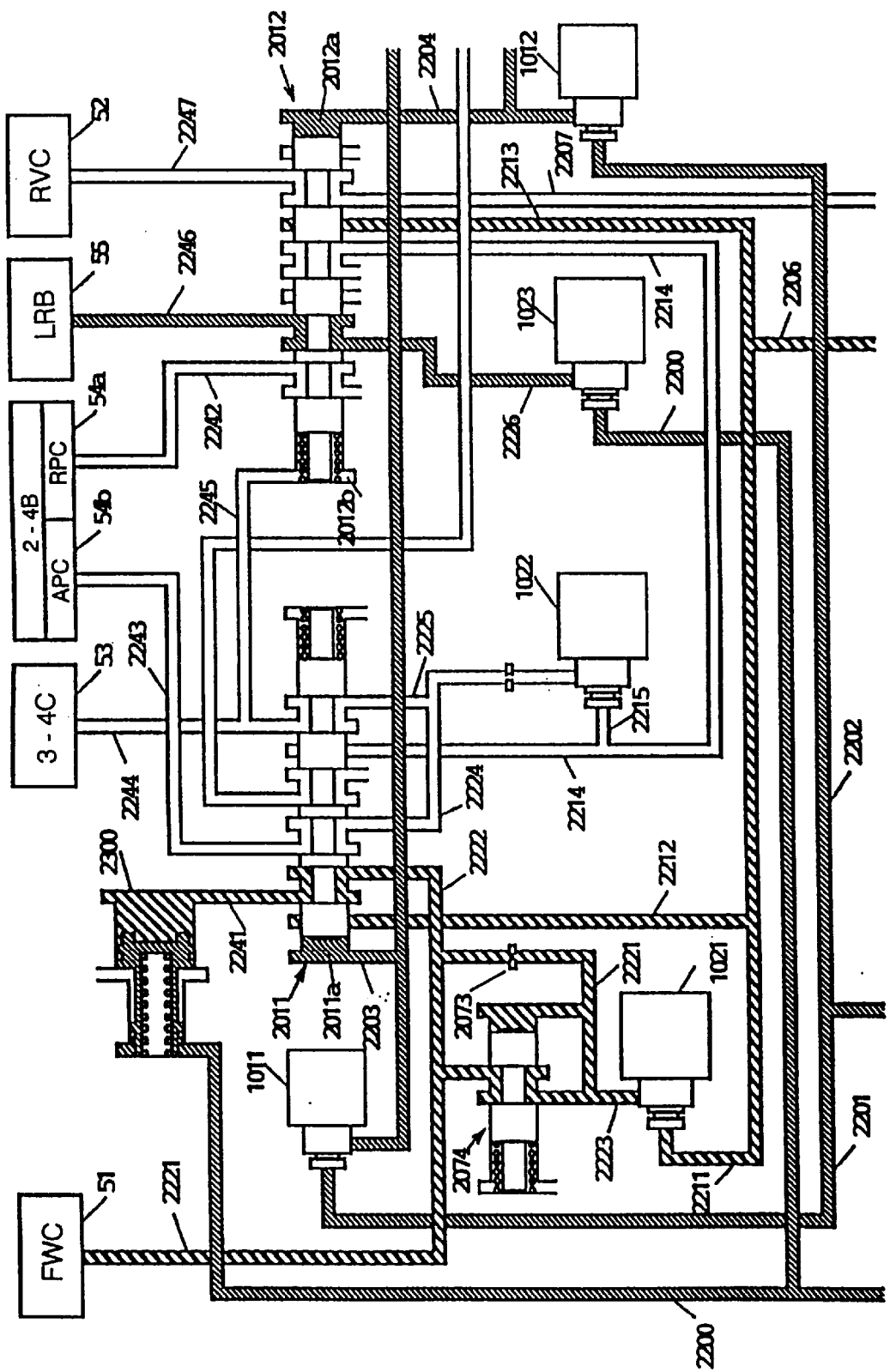
Figure 198:
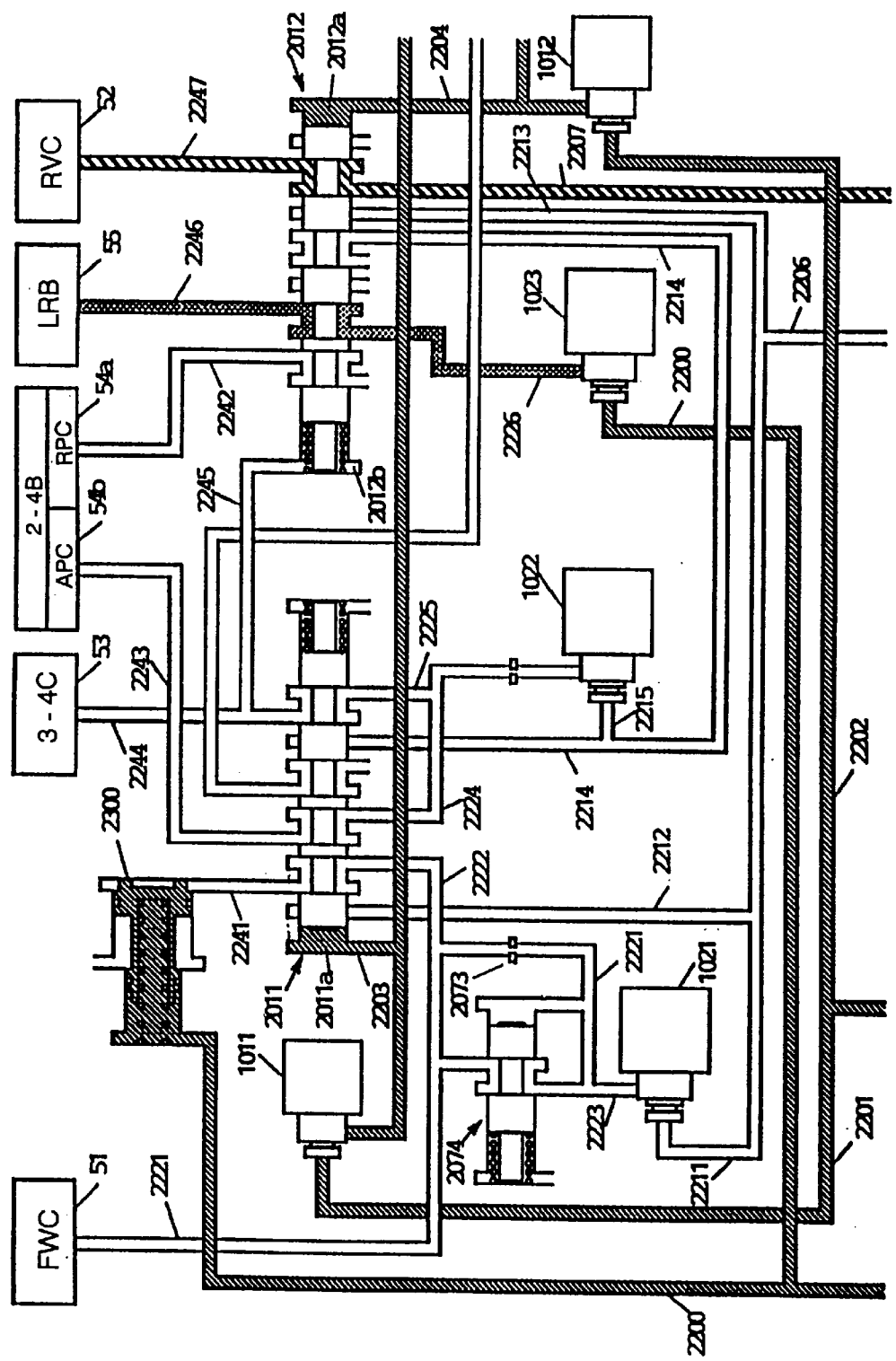
Figure 199:
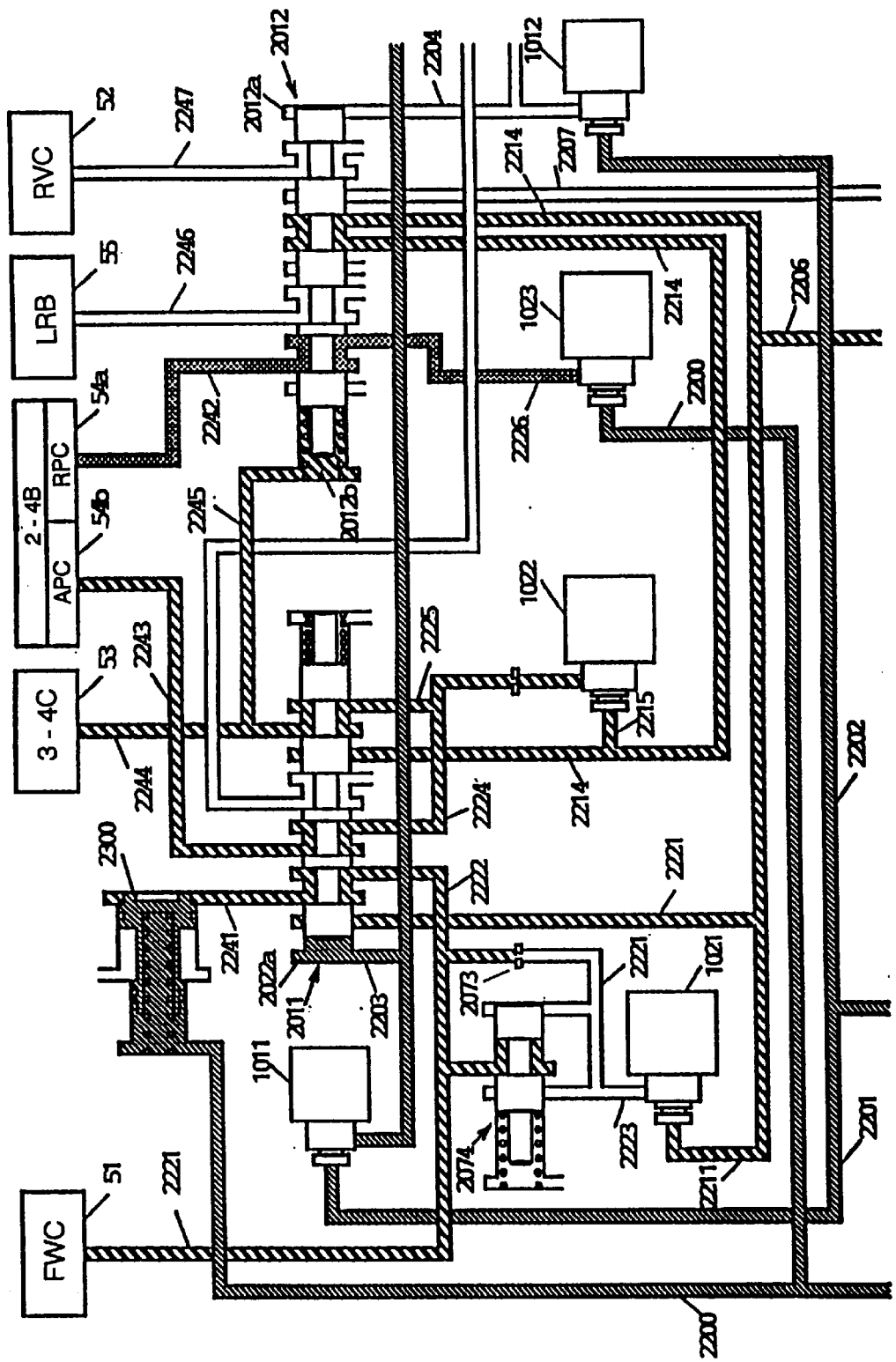
Figure 200:
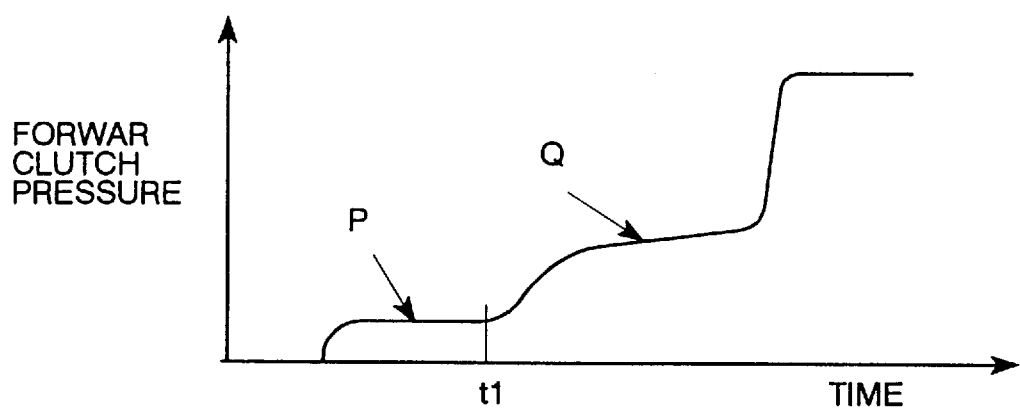
Figure 201:
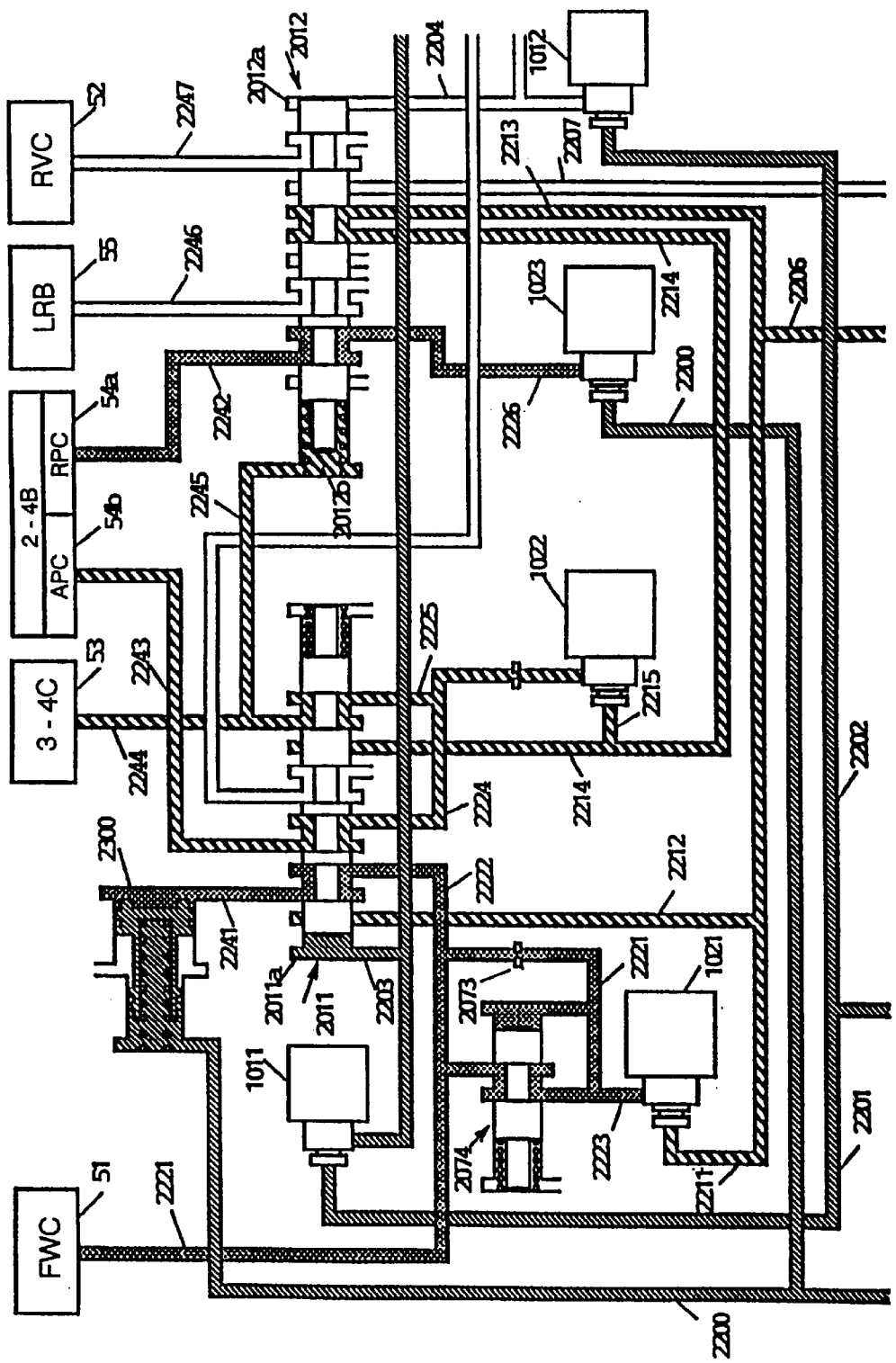
Figure 202:
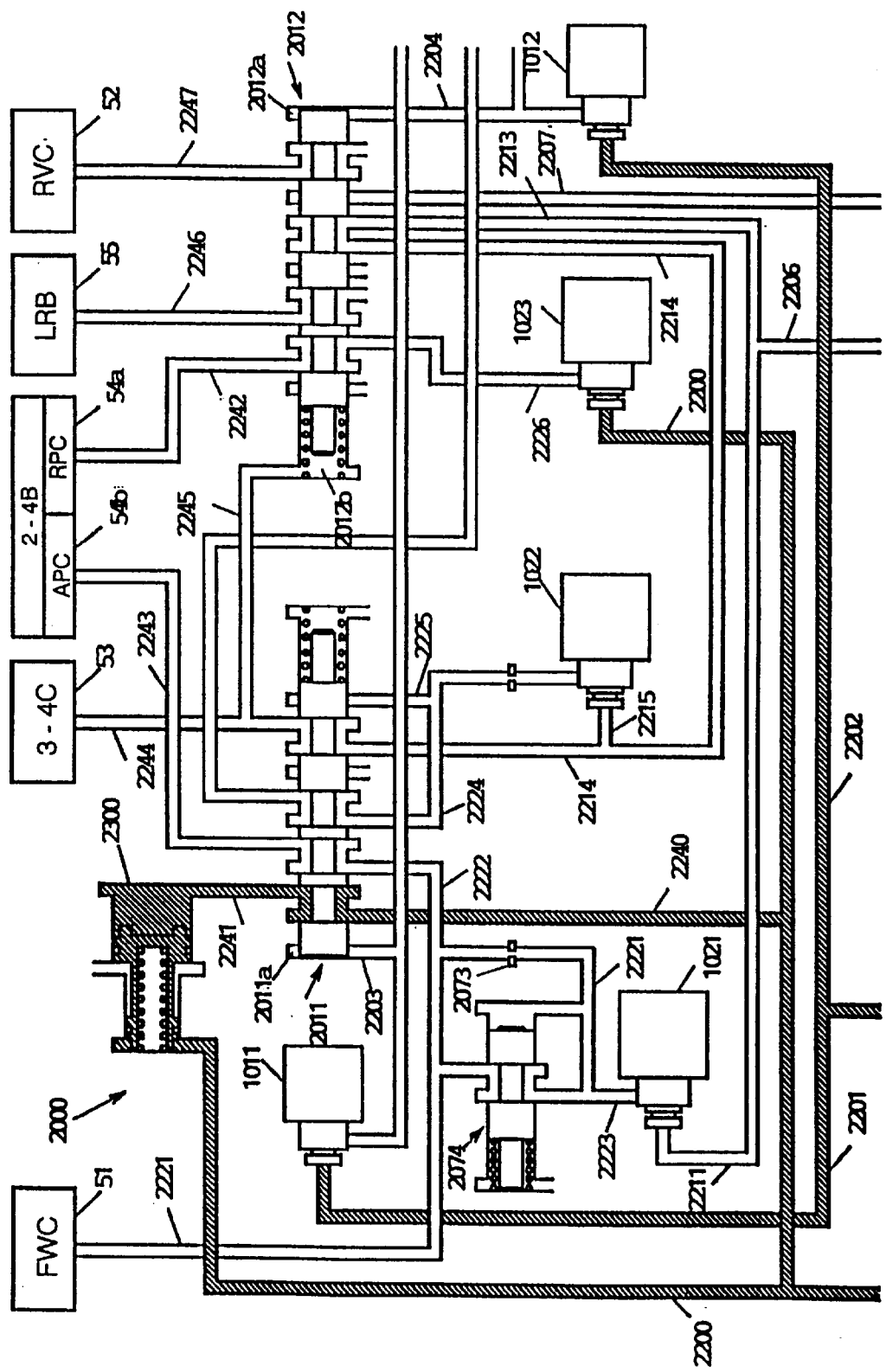
Figure 203:
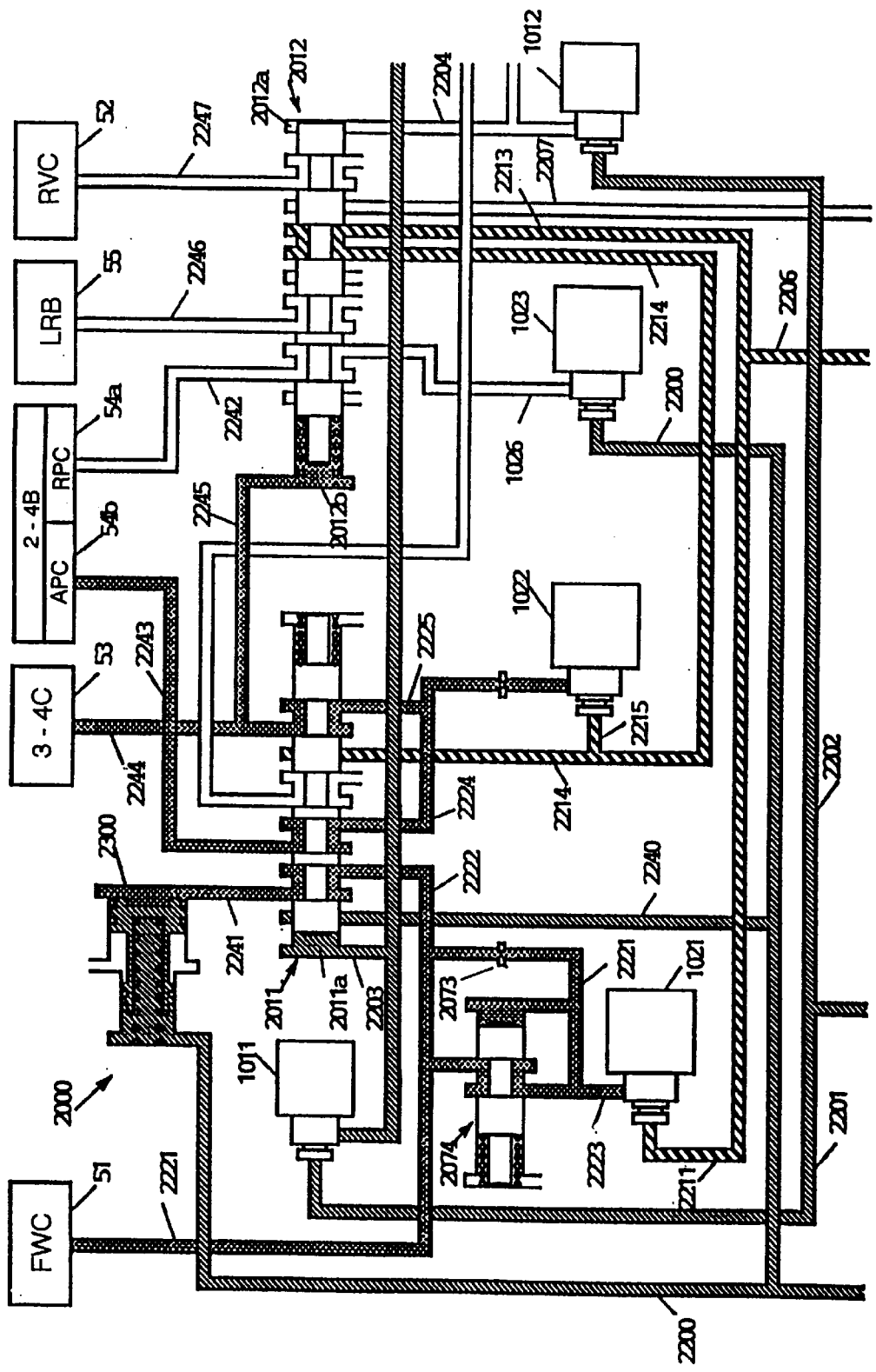
Figure 204:
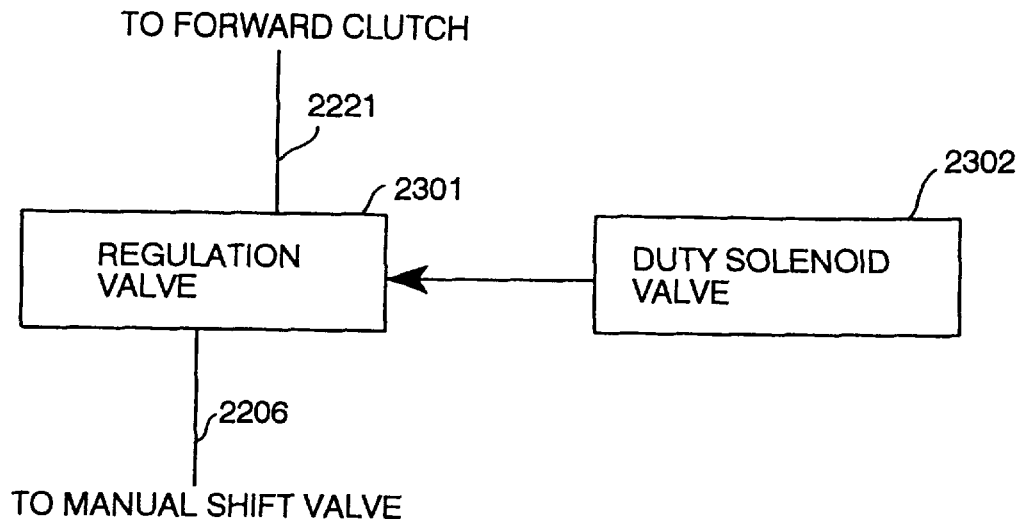
Figure 205:
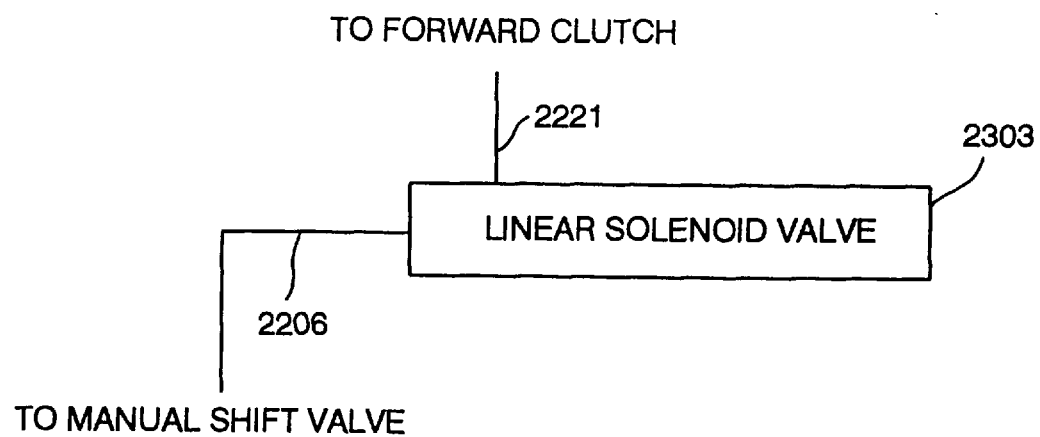
Figure 206:
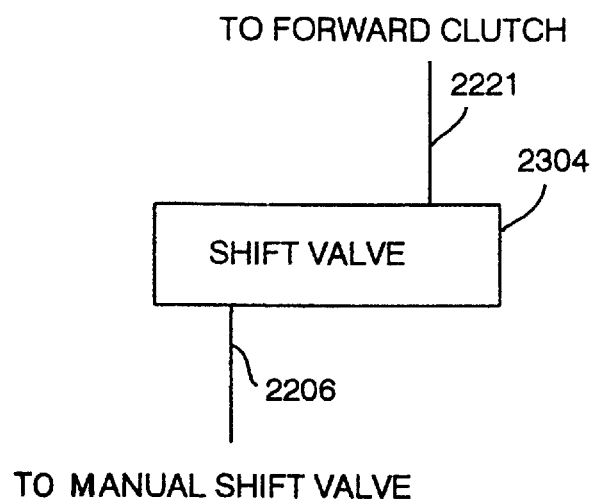

FIG. 131 is a diagram illustrating a map of output pressure during 2-L1 shifting;

FIG. 132 is a time chart showing changes in various factors during 2-L1 shifting;

FIG. 133 is a flowchart illustrating a control sequence for the first duty solenoid valve (DSV) during 3-L1 shifting;

FIG. 134 a flowchart illustrating a control sequence for the second duty solenoid valve (DSV) during 3-L1 shifting;

FIG. 135 is a flowchart illustrating a switching control sequence for a relay valve during 3-L1 shifting;

FIG. 136 is a time chart showing changes in various factors during 3-L1 shifting;

FIG. 137 is a flowchart illustrating a control sequence for the first duty solenoid valve (DSV) during 4-L1 shifting;

FIG. 138 is a flowchart illustrating a control sequence for the second duty solenoid valve (DSV) during 4-L1 shifting;

FIG. 139 is a flowchart illustrating a control sequence for the third duty solenoid valve (DSV) during 4-L1 shifting;

FIG. 140 is a time chart showing changes in various factors during 4-L1 shifting;

FIG. 141 is a diagram illustrating a map of output pressure with regard to duty rate;

FIG. 142 is a flowchart illustrating a control sequence for the third duty solenoid valve (DSV) during 4-3 shifting;

FIG. 143 is a time chart showing changes in various factors during 4-3 shifting;

FIG. 144 is a flowchart illustrating a control sequence for the first duty solenoid valve (DSV) during N or R-D shifting;

FIG. 145 is a flowchart illustrating a control sequence for the third duty solenoid valve (DSV) during N or R-D shifting;

FIG. 146 is a flowchart illustrating a sequence for a calculation of hydraulic pressure during N or R-D shifting;

FIG. 147 is a diagram illustrating a map of hydraulic pressure with regard to engine speed used in the calculation of hydraulic pressure;

FIG. 148 is a diagram illustrating a map of hydraulic pressure with regard to throttle opening used in the calculation of hydraulic pressure;

FIG. 149 is a flowchart illustrating a control sequence for the second duty solenoid valve (DSV) during N or R-D shifting;

FIG. 150 is a time chart showing changes in various factors during N or R-D shifting;

FIG. 151 is a flowchart illustrating a control sequence for the third duty solenoid valve (DSV) during R-L shifting;

FIG. 152 is a flowchart illustrating a control sequence for the second duty solenoid valve (DSV) during R-L shifting;

FIG. 153 is a flowchart illustrating a control sequence for the first duty solenoid valve (DSV) during R-L shifting;

FIG. 154 is a time chart showing changes in various factors during R-L shifting;

FIG. 155 is a flowchart illustrating a control sequence for the first duty solenoid valve (DSV) during L-R shifting;

FIG. 156 is a flowchart illustrating a sequence for a calculation of hydraulic pressure during L-R shifting;

FIG. 157 is a flowchart illustrating a sequence for an L-timer during L-R shifting;

FIG. 158 is a time chart showing changes in various factors during L-R shifting;

FIG. 159 is a flowchart illustrating a control sequence for the second solenoid valve (SV) during R-N shifting;

FIG. 160 is a flowchart illustrating a control sequence for the first duty solenoid valve (DSV) during R-N shifting;

FIG. 161 is a time chart showing changes in various factors during R-N shifting;

FIG. 162 is a time chart showing operation of failure control prevention during R-N shifting;

FIG. 163 is a flowchart illustrating a control sequence for the first duty solenoid valve (DSV) during lock-up control in a slippage reducing mode;

FIG. 164 is a time chart showing changes in various factors during lock-up control;

FIG. 165 is a calculation of a feedback control value in the lock-up control;

FIG. 166 is a flowchart illustrating a coefficient map used in the calculation of a feedback control value in the lock-up control;

FIG. 167 is a flowchart illustrating a control sequence for determining a gear upon providing a shift instruction during a 1-3 or 1-4 jump shift;

FIG. 168 is a time chart showing changes in various factors during a 1-3 or 1-4 jump shift;

FIG. 169 is a flowchart illustrating a control sequence for determining a gear upon providing a shift instruction during a 2-4 jump shift;

FIG. 170 is a time chart showing changes in various factors during a 2-4 jump shift;

FIG. 171 is a flowchart illustrating a control sequence for determining a gear upon providing a shift instruction during a 4-2 or 4-1 jump shift;

FIG. 172 is a time chart showing changes in various factors during a 2-4 jump shift;

FIG. 173 is a flowchart illustrating a control sequence for determining a gear upon providing a shift instruction during a 3-1 jump shift;

FIG. 174 is a time chart showing changes in various factors during a 3-1 jump shift;

FIG. 175 is a flowchart illustrating a control sequence for a shift upon re-shifting;

FIG. 176 is a time chart showing changes in various factors during a re-shift;

FIG. 177 is a flowchart illustrating a control sequence for an N-D range shift during running;

FIG. 178 is a time chart showing changes in various factors during an N-D range shifting;

FIG. 179 is a flowchart illustrating a control sequence for lock-up prohibition;

FIG. 180 is a flowchart illustrating a control sequence for line pressure during ordinary driving;

FIG. 181 is a diagram illustrating a map of hydraulic pressure with respect to turbine torque used in the line pressure control;

FIG. 182 is a diagram illustrating a map of hydraulic pressure with respect to throttle opening used in the line pressure control;

FIG. 183 is a diagram illustrating a map of hydraulic pressure with respect to vehicle speed used in the line pressure control;

FIG. 184 is a flowchart illustrating a control sequence for line pressure during N-D range shifting;

FIG. 185 is a diagram illustrating a map of hydraulic pressure with respect to engine speed used in the line pressure control;

FIG. 186 is a diagram illustrating a map of hydraulic pressure with respect to throttle opening used in the line pressure control;

FIG. 187 is a flowchart illustrating a torque down control sequence during up-shifting;

FIG. 188 is a time chart showing changes in various factors during up-shifting;

FIG. 189 is a flowchart illustrating a torque down control sequence during down-shifting;

FIG. 190 is a time chart showing changes in various factors during down-shifting;

FIG. 191 is a hydraulic control circuit incorporated in the automatic transmission according to another preferred embodiment of the present invention;

FIG. 192 is an enlarged view of an essential part of the hydraulic control circuit of FIG. 191, which provides a first gear;

FIG. 193 is an enlarged view of an essential part of the hydraulic control circuit of FIG. 191, which provides a second gear;

FIG. 194 is an enlarged view of an essential part of the hydraulic control circuit of FIG. 191, which causes a gear shift from the second gear to a third gear;

FIG. 195 is an enlarged view of an essential part of the hydraulic control circuit of FIG. 191, which provides the third gear;

FIG. 196 is an enlarged view of an essential part of the hydraulic control circuit of FIG. 191, which provides a fourth gear;

FIG. 197 is an enlarged view of an essential part of the hydraulic control circuit of FIG. 191, which provides the first gear in a low speed (L) range;

FIG. 198 is an enlarged view of an essential part of the hydraulic control circuit of FIG. 191, which provides a reverse gear;

FIG. 199 is an enlarged view of an essential part of the hydraulic control circuit of FIG. 191, which causes a gear shift from the fourth gear to the third gear;

FIG. 200 is a time chart illustrating a change in a forward clutch locking pressure during the fourth to third gear shift;

FIG. 201 is an enlarged view of an essential part of the hydraulic control circuit of FIG. 191, which causes the fourth to third gear shift in an engine power-off mode;

FIG. 202 is a hydraulic control circuit incorporated in the automatic transmission according to another preferred embodiment of the present invention, which provides a neutral (N) range;

FIG. 203 is an enlarged view of an essential part of the hydraulic control circuit of FIG. 203, which causes a neutral (N) to drive (D) range shift;

FIG. 204 is a block diagram schematically illustrating an essential part of a hydraulic control circuit incorporated in the automatic transmission according to another preferred embodiment of the present invention;

FIG. 205 is a block diagram schematically illustrating an essential part of a hydraulic control circuit incorporated in the automatic transmission according to still another preferred embodiment of the present invention; and FIG. 206 is a block diagram schematically illustrating an essential part of a hydraulic control circuit incorporated in the automatic transmission according to still another preferred embodiment of the present invention.

DETAILED DESCRIPTION OF THE PREFERRED EMBODIMENTS

It is to be noted that the term "front" used in the following description shall means and refer to a side close to and engine and the term "rear" used in the following description shall mean and refers to a side remote from the engine.

Mechanical Structure (1) Overall Structure of Automatic Transmission

Figure 1:
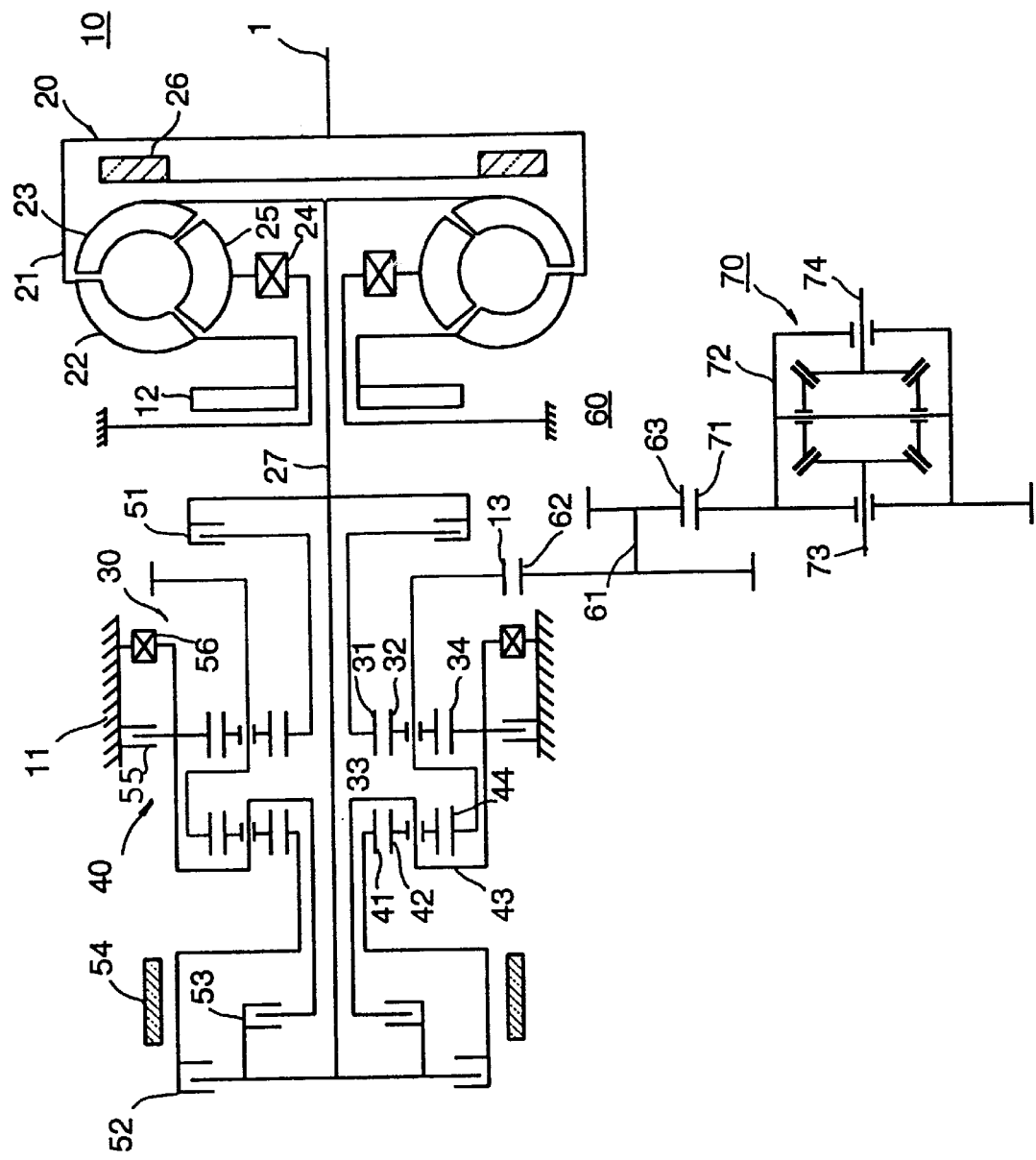
FIG. 1 is a schematic illustration of an automatic transmission with which a control system of the present invention cooperates.

Referring now to the drawings in detail, and in particular, to FIG. 1, an automatic transmission 10 equipped with a control system in accordance with a preferred embodiment of the present invention has a mechanical configuration including a torque converter 20 and a transmission gear mechanism which consists of first or front planetary gearset 30 and second or rear planetary gearsets 40 arranged coaxially with each other. In this instance, These first planetary gearset 30 and second planetary gearset 40 change power transmission paths by selectively coupling and uncoupling various friction coupling elements 51–55, such as clutches and brakes, and a one-way clutch 56 so as to place the automatic transmission into desired gears, namely first planetary gearset (1st) gear to fourth (4th) gear in a drive (D) range, the first (1st) gear to the third (3rd) gear in a second speed (S) range, the first (1st) gear and the second (2nd) gear in a low speed (L) range, and a reverse gear in a reverse (R) range.

The torque converter 20, which multiplies engine torque, has a pump 22 and a turbine 23, respectively, and a stator 25. The pump 22 is placed within and secured to a housing 21 secured to an engine output shaft 1. The turbine 23 is placed within the housing 21 so as to face the pump 22 and driven by the pump 22 by means of a special lightweight oil. The stator 25 is inserted between the pump 22 and the turbine 23 and mounted on a transmission housing 11 through a one-way clutch 24 so as to multiply engine torque. The torque converter 20 thus structured performs transmission of turbine rotation to the first planetary gearset 30 and second planetary gearset 40 through a turbine shaft 27. The torque converter 20 further has a lock-up clutch 26 placed between the housing 21 and the turbine 23 for mechanically locking the pump 22, and hence the pump shaft 12, and the turbine 23 together when it is activated. Behind the torque converter 20 there is provided an oil pump 13 driven by the engine output shaft 1 through the housing 21 of the torque converter 20.

The first planetary gearset is comprised of a sun gear 31, a plurality of pinion gears 32 in mesh with the sun gear 31, a pinion carrier 33 for carrying the pinion gears 32, and a ring gear 34 in mesh with the pinion gears 32. Similarly, the second planetary gearset 40 is comprised of a sun gear 41, a plurality of cylindrical pinion gears 42 in mesh with the sun gear 41, a pinion carrier 43 for carrying the pinion gears 42, and a ring gear 44 in mesh with the pinion gears 32. The automatic transmission further includes a forward clutch (FWC) 51 disposed between the turbine shaft 27 and the sun gear 31 of the first planetary gearset, a reverse clutch (RVC) 52 disposed between the turbine shaft 27 and the sun gear 41 of the second planetary gearset 40, a 3-4 clutch (3-4C) 53 disposed between the turbine shaft 27 and the sun gear 41 of the second planetary gearset 40, and a 2-4 brake (2-4B) 54 for locking the sun gear 41 of the second planetary gearset 40. Further, a low-reverse brake (LRB) 55 and a one-way clutch (OWC) 56 are disposed in parallel with each other between the transmission housing 11 and the ring gear 34 of the first planetary gearset first planetary gearset and the pinion carrier 43 of the second planetary gearset 40 which are connected to each other. An transmission output shaft 12 is connected to the pinion carrier 33 of the first planetary gearset first planetary gearset connected to the ring gear 44 of the second planetary gearset 40.

An intermediate transmission mechanism 60 includes an idle shaft 61 on which first and second intermediate gears 62 and 63 are mounted. The first intermediate gear 62 is in mesh with the transmission output gear 13, and the second intermediate gear 63 is in mesh with an input gear 71 of a transfer 70. The differential 70 to which rotation of the transmission output gear 13 is transmitted through a differential casing 72 drives right and left axles 73 and 74.

These frictional coupling elements 51–45, such as brakes and clutches, and the one-way clutch 56 are selectively activated so as to place the automatic transmission 10 into available gears as shown in the following Table I.

TABLE I

| Gear | FWC (51) | 2-4C (54) | 3-4C (53) | LRB (55) | RVC (52) | OWC (56) |
|---|---|---|---|---|---|---|
| 1ST | o | | | | | o |
| 2ND | o | o | | | | |
| 3RD | o | | o | | | |
| 4TH | | o | o | | | |
| REVERSE | | | | o | o | |

(O): Activated only in low speed range

Figure 2:
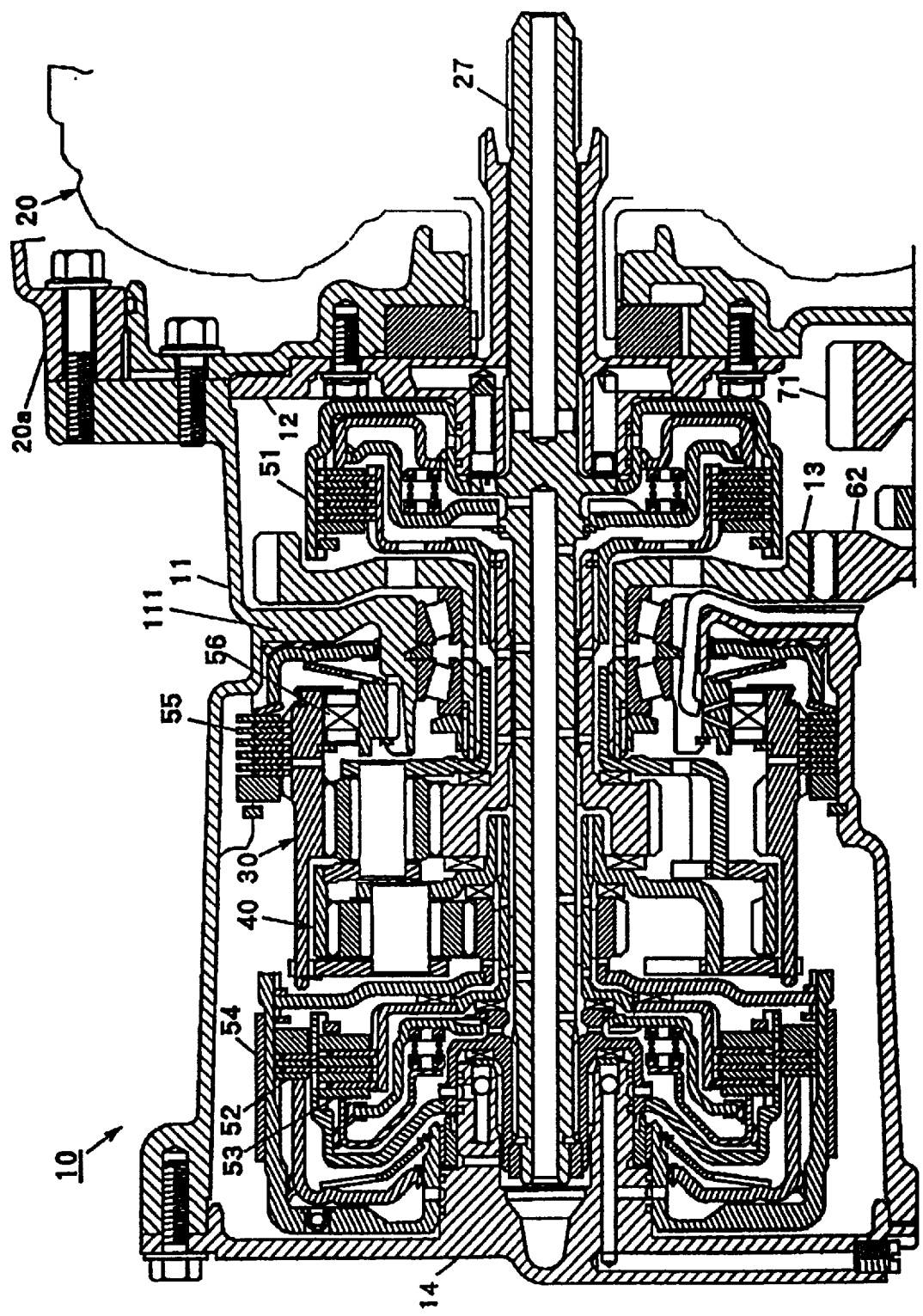
FIG. 2 is a cross-sectional view of the automatic transmission shown of FIG. 1.
Figure 3:
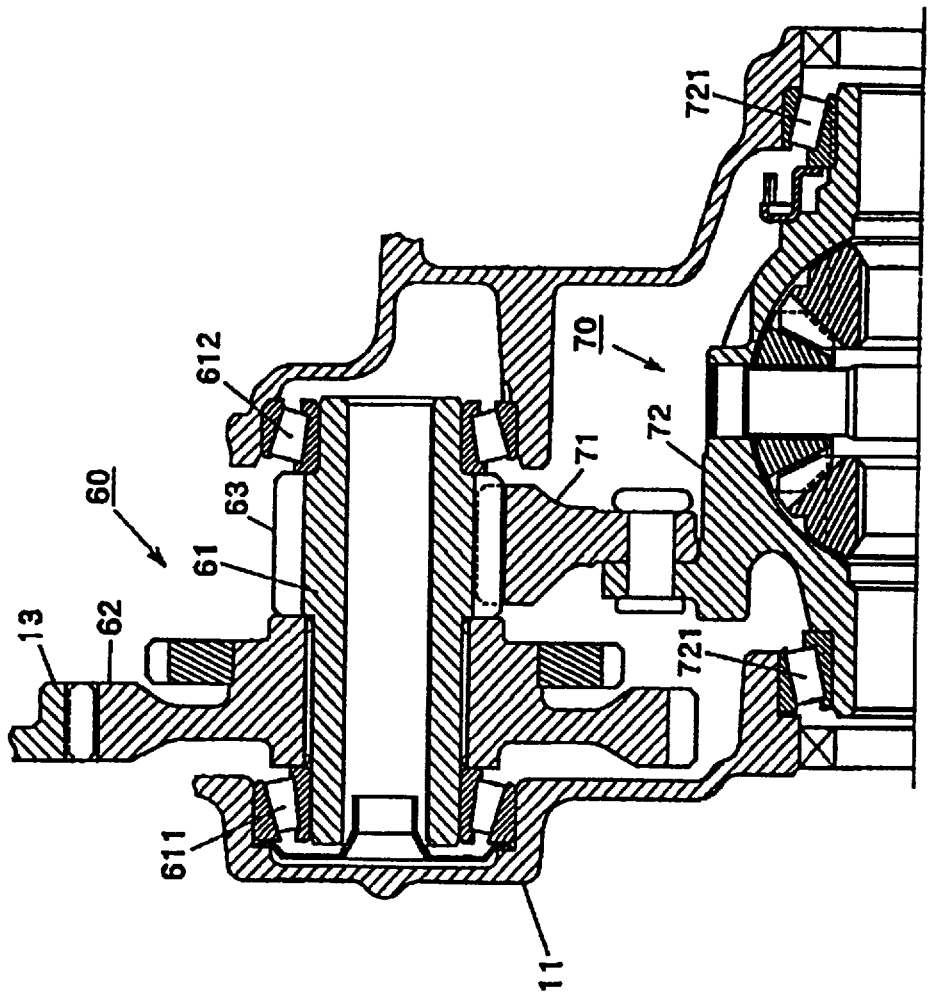
FIG. 3 is a cross-sectional view of an output mechanism of the automatic transmission shown of FIG. 1.

Details of the automatic transmission 10 is structured as shown in FIGS. 2 and 3. The following description is directed to distinctive parts of the transmission gear mechanism and the friction coupling elements of the automatic transmission 10.

(2) Transmission Mechanism and Friction Coupling Elements

Clutch Balancing oil Chamber—(I)

Figure 4:
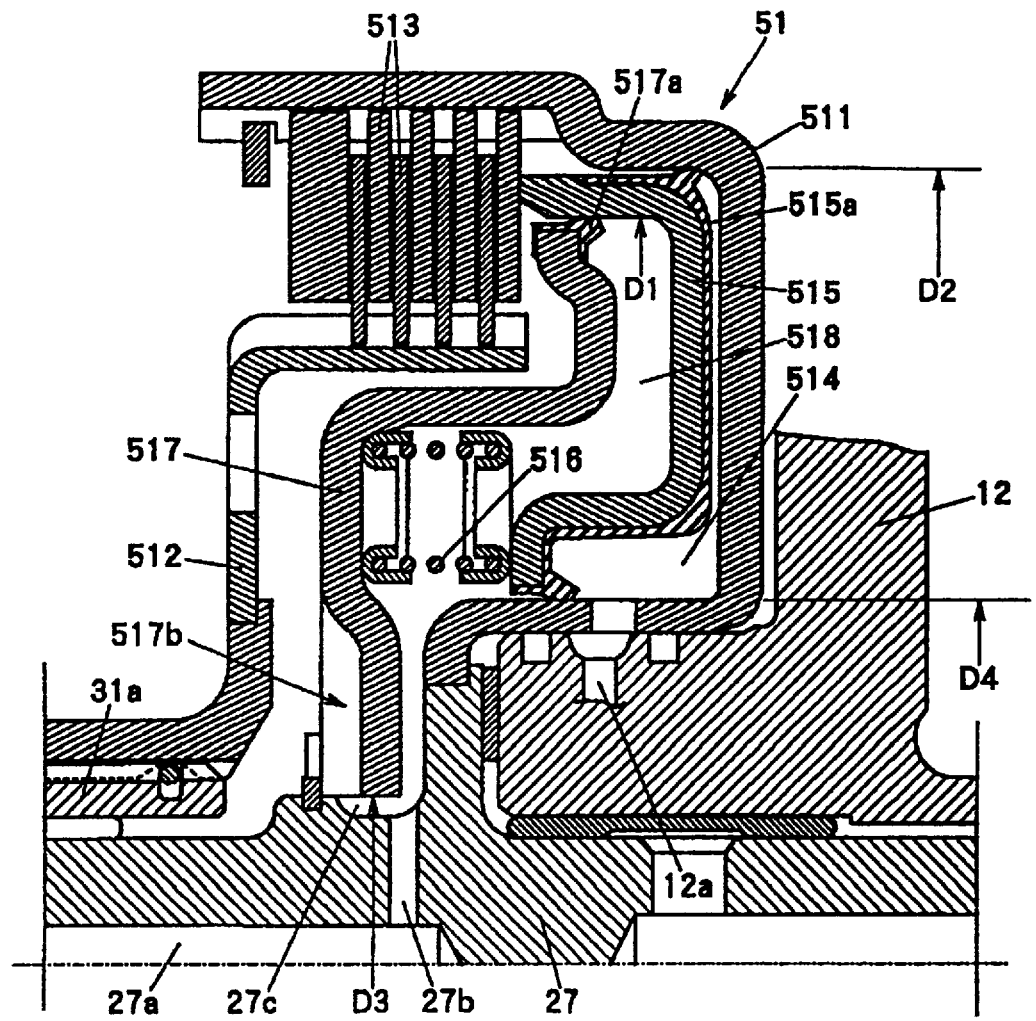
FIG. 4 is an enlarged cross-sectional view of a forward clutch and its associated part of FIG. 2.

As shown in FIG. 4, the forward clutch 51 has a clutch drum 511 secured to the turbine shaft 27, a clutch hub 512 spline-coupled to a front extension 31a of the sun gear 31 of the first planetary gearset first planetary gearset, a plurality of friction disks 513 spline-coupled alternately to the clutch drum 511 and the clutch hub 512, and a piston 515 housed for axial movement in the clutch drum 511 and forming an oil chamber 514 in the clutch drum 511. When an operating pressure is delivered into the oil chamber 514 through an orifice 12a of the oil pump 12, the piston 515, which takes the form of a drum and urged by a return spring 516, moves against the return spring 516 so as to lock the respective friction disks 513, thereby coupling these clutch drum 511 and clutch hub 512. The forward clutch 51 forms a balancing oil chamber 518 divided by a sealing plate 517 secured to the turbine shaft 27 on a side of the drum shaped piston 515 opposite to the oil chamber 514. The operating oil is introduced into the balancing oil chamber 518 through a lubrication oil passage 27a formed in the turbine shaft 27.

The piston 515 is provided with a sealing member 515a fitted for slide movement in the clutch drum 511 so as to keep the oil chamber 514 sealed. The sealing plate 517 is provided with a sealing member 517a mounted for slide movement in the drum shaped piston 515 on the outer periphery of the sealing plate 517a. The inside and outside of the balancing oil chamber 518 is in communication with each other through an annular groove 27c which is formed so as to surround an outlet of a radial outlet port 27b of the turbine shaft 27 and be placed adjacent to a wavy inside wall portion 517b of the sealing plate 517. The piston 515 receives reaction force of the return spring 516 by means of the sealing plate 517.

Figure 5:
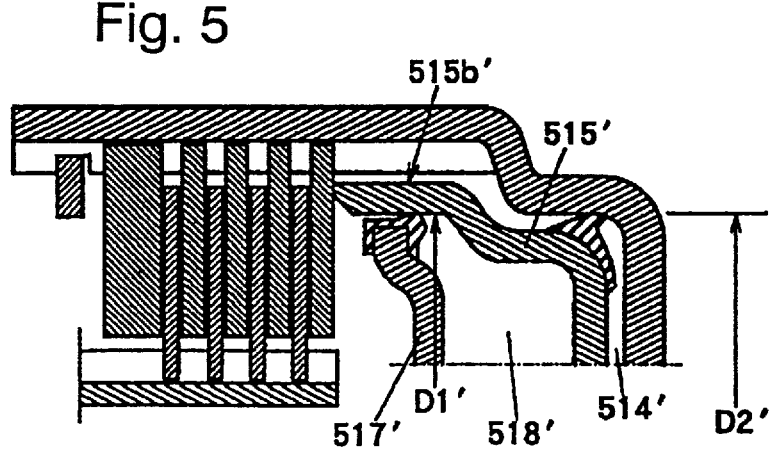
FIG. 5 is a cross-sectional view of a comparative structure of FIG. 4.

The balancing oil chamber 518 functions to prevent the piston 515 from being forced in a direction of coupling the forward clutch 51 by centrifugal force imparted to the residual oil in the oil chamber 514 while the forward clutch 51 is uncoupled. Specifically, when the operating oil is introduced into the balancing oil chamber 518, centrifugal force of the operating oil cancels centrifugal force of the operating oil in the oil chamber 514. In this instance, as shown in FIG. 5, in order to cause effective cancellation of the centrifugal force of the operating oil in the oil chamber 514, while it is preferred to make an outer diameter D1' of the balancing oil chamber 518' equal to an outer diameter D2' of the oil chamber 514', nevertheless, constraints must be imposed upon the mechanical dimensions of the piston 515'. For instance, the piston 515' must have an enlarged diameter of an end 515b' to which the sealing plate 517' is fitted. Enlarging the tip end 515b' in diameter increases an axial length of the piston 515' or the forward clutch itself.

In view of the above restraint, in order for the forward clutch 51 to retain its compactness and avoid an increase in axial length, the balancing oil chamber 518 is configured so as to have its outer diameter D1 smaller than an outer diameter D2 of the oil chamber 514 so as not to enlarge the end of the piston 515 to which the sealing plate 517 is fitted. Further, in order to put centrifugal force of the operating oil in the oil chambers 514 and 518 against each other so as to cancel the centrifugal force, an inner diameter of the balancing oil chamber 518, i.e. a diameter D3 of the annular groove 27c is made smaller than an inner diameter D4 of the oil chamber 514. The forward clutch 51 thus configured ensures the balancing oil chamber 518 to contain in the inside thereof the operating oil larger in quantity than the oil chamber 514. With the structure, while the forward clutch 51 retains its compactness, it avoids an adverse effect of centrifugal force of the residual oil in the oil chamber 514.

Clutch Balancing oil Chamber—(II)

The clutch structure of the forward clutch 51 is similarly applied to the 3-4 clutch 53.

Figure 6:
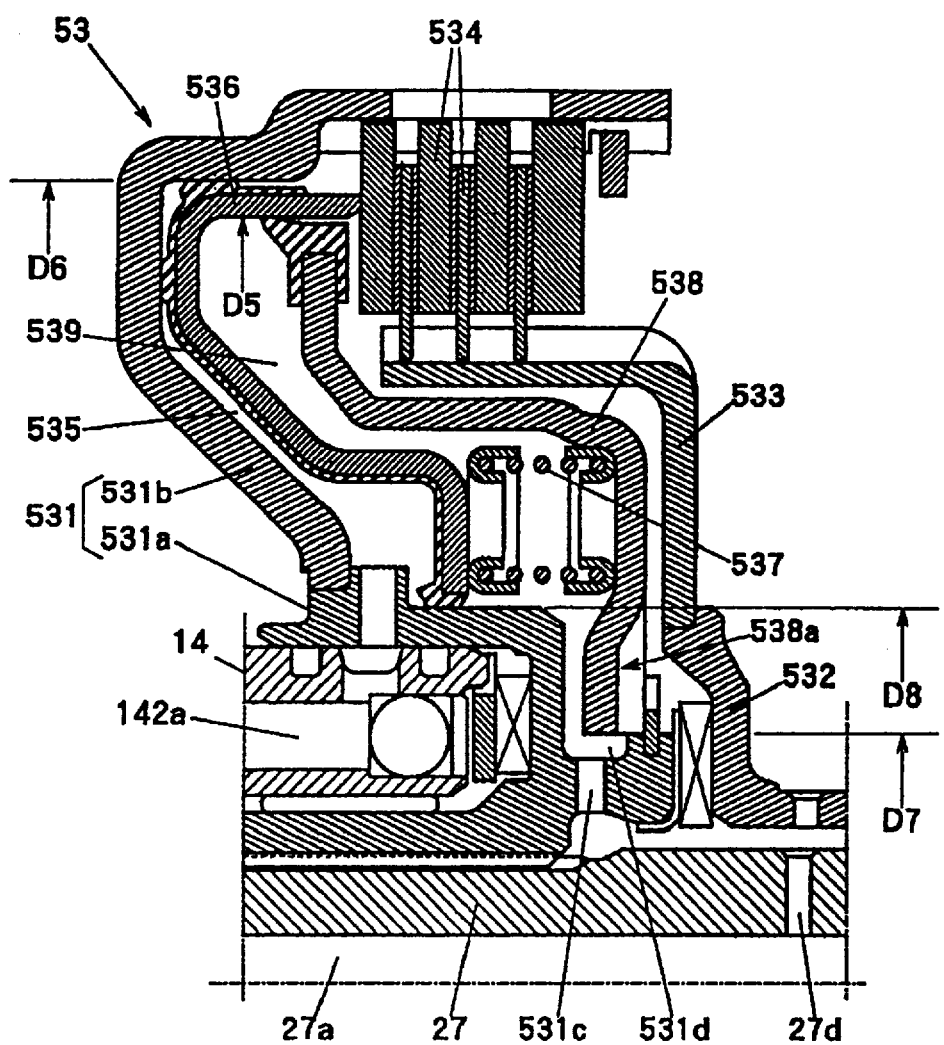
FIG. 6 is an enlarged cross-sectional view of a 3-4 clutch and its associated part of FIG. 2.

As shown in FIG. 6, the 3-4 clutch 53 has a clutch drum 531, which is comprises of a drum base 531a spline-coupled to the turbine shaft 27 and a drum body 531b secured to the drum base 531a, a clutch hub 533 coupled to a pinion carrier 43 of the second planetary gearset 40 by means of connecting member 532, a plurality of friction disks 534 spline-coupled alternately to the clutch drum 531 and the clutch hub 533, a piston 536 housed in the clutch drum 531 and forming a pressure chamber 535 in the clutch drum 531, and a return spring 537 urging the piston 536 against the operating oil introduced into the pressure chamber 535 through an oil passage 142a formed in a rear cover 14 of the transmission 10. The 3-4 clutch 53 forms a balancing oil chamber 539 divided by a sealing plate 538 secured to the drum base 531a. The operating oil is introduced into the balancing oil chamber 539 through the lubrication oil passage 27a and the radial outlet 27b of the turbine shaft 27 and then through a radial outlet 531c and an annular groove 531d formed in the drum base 531a.

The inside and outside of the balancing oil chamber 539 is in communication with each other through the annular groove 27a of the drum base 531a adjacent to a wavy inside wall portion 538a of the sealing plate 538 so that centrifugal force imparted to the pressure outside the pressure chamber 535 cancels centrifugal force of the residual operating oil in the pressure chamber 535.

In order for the 2-4 clutch 53 to retain its compactness and avoid an increase in axial length, the balancing oil chamber 539 is configured so as to have its outer diameter D5 smaller than an outer diameter D6 of the pressure chamber 535 so as not to enlarge the end of the piston 536 to which the sealing plate 538 is fitted. Further, in order to put centrifugal force of the operating oil in the chambers 535 and 539 against each other so as to cancel the centrifugal force, an inner diameter D7 of the balancing oil chamber 535 is made smaller than an inner diameter D8 of the pressure chamber 535 so that the forward clutch 51 ensures the balancing oil chamber 539 to contain in the inside thereof the operating oil larger in quantity than the pressure chamber 535. With the structure, while the 3-4 clutch 51 retains its compactness, it avoids an adverse effect of centrifugal force of the residual oil in the pressure chamber 535. Clutch Balancing oil Chamber—(III)

The forward clutch 51, which is adapted to receive the operating oil introduced into the balancing oil chamber 518 through the lubrication pressure passage 27a of the turbine shaft 27 via the radial outlet 27b as shown in FIG. 5, causes accidental incomplete cancellation of centrifugal force of the operating oil in the oil chamber 514 with centrifugal force of the operating oil in the balancing oil chamber 518 due to an insufficiency of the operating oil in the balancing oil chamber 518. Such insufficient delivery of the pressure occurs an increase in viscosity of the operating oil due to low pressure temperatures.

Figure 7:
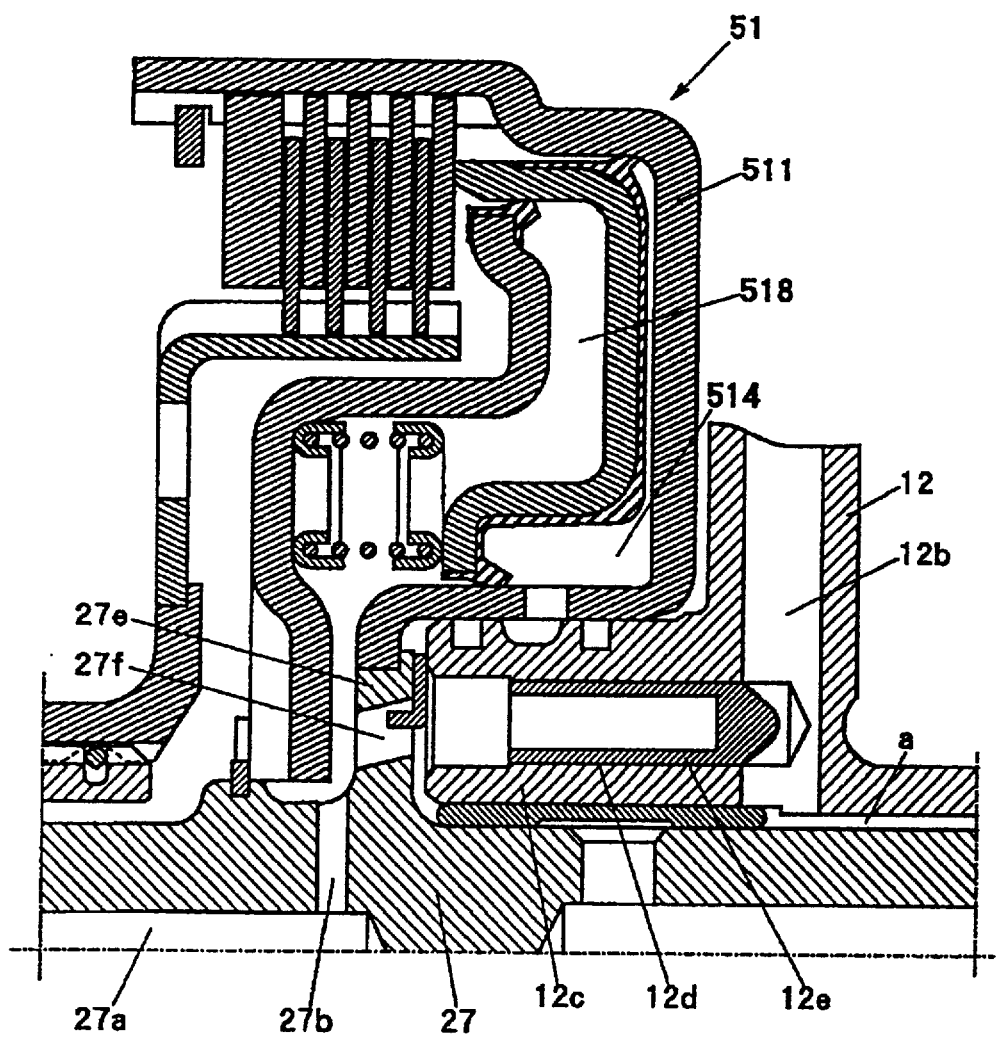
FIG. 7 is an enlarged cross-sectional view of an oil pump and its associated part of FIG. 2.

As shown in FIG. 7, the oil pump 12 (see FIG. 2) placed immediately before the forward clutch 51 and secured to the transmission housing 11 is formed with an oil passage 12b in communication with the torque converter 20 through a space a formed between the oil pump 12 and the turbine shaft 24. The operating oil discharged from the torque converter 20, which is ordinary at a high temperature, is delivered to a cooling device (not shown) provided separately and independently from the automatic transmission 10.

In view of the peripheral structure, the oil pump 12 is formed with a boss 12c extending backward for holding the clutch drum 511 and with an oil passage 12d in the boss 12c so as to extend from the oil passage 12b to the rear end of the boss 12c. Further, the turbine shaft 27 is formed with a flange 27e which is positioned behind the rear end of the boss 12c of the oil pump 12 and on which the clutch drum 511 is fixedly mounted and with an oil passage 27f in the flange 27e so as to communicate the oil passage 12d with the balancing oil chamber 518. A bi-metal operated valve 12e is disposed in the oil passage 12d so as to open or close the oil passage 12d according to oil temperatures. With this structure, when the operating oil is at low temperatures, the discharged pressure from the torque converter 20 is partly introduced into the balancing oil chamber 518 through the oil passages 12d and 27f from the oil passage 12b, so as to make up an insufficiency of the operating oil in the balancing oil chamber 518, thereby causing effective, mutual cancellation of centrifugal force of the operating oil in the balancing oil chamber 518 and the pressure chamber 514. The bi-metal operated valve 12e may be replaced with a valve made of a shape memory alloy.

Peripheral Structure of Output Gear

Engine torque delivered by the transmission mechanism consisting of the first and second planetary gearsets 30 and 40 is transmitted to the differential 70 through an intermediate transmission mechanism 60. In order to transmit desired torque, the output gear 13 is required to have a sufficient number of teeth which is a primary factor for determining the overall axial compactness of the automatic transmission 10.

Figure 8:
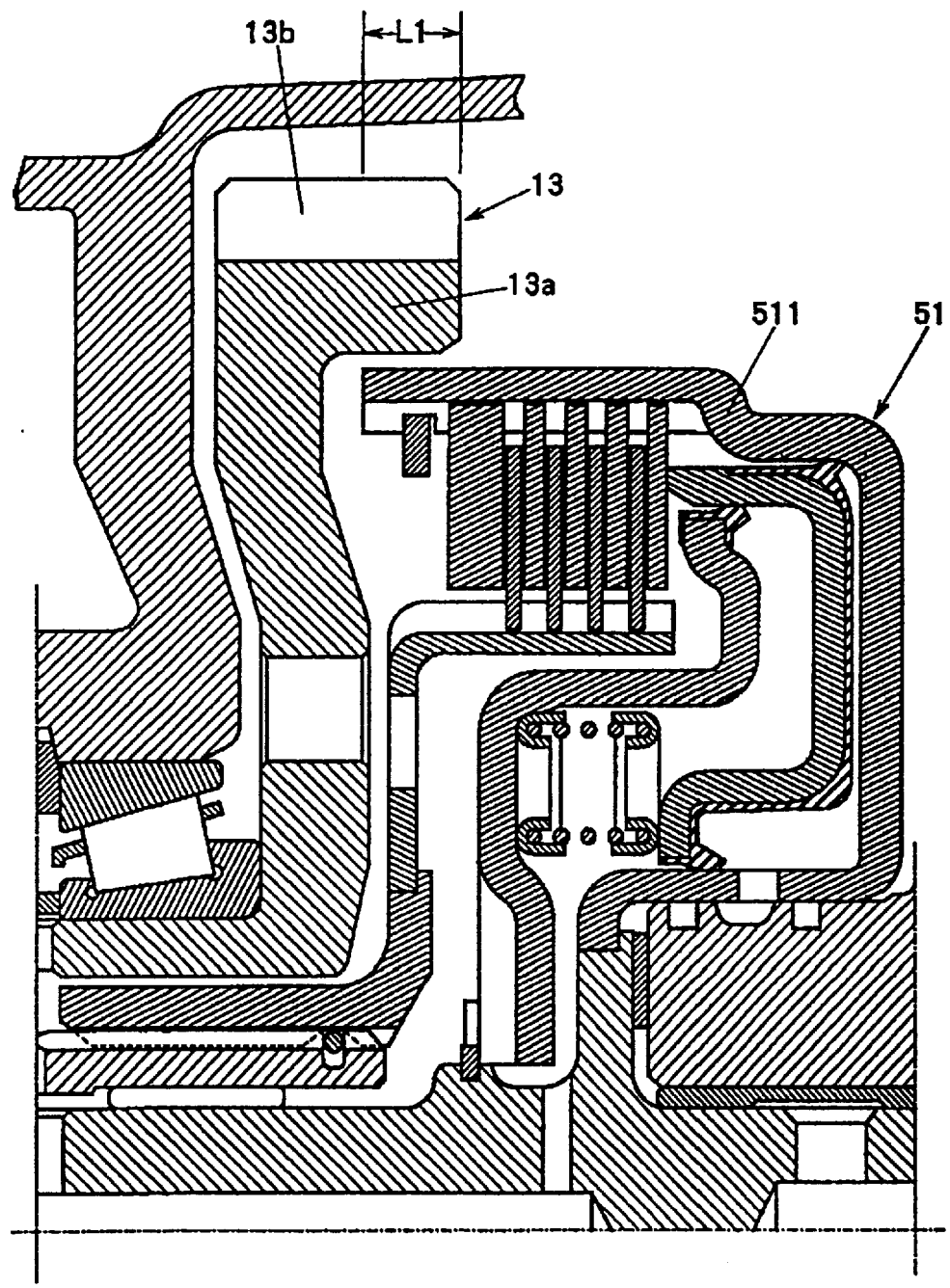
FIG. 8 is an enlarged cross-sectional view of an output mechanism and its associated part of FIG. 2.

On that account, as shown in FIG. 8, the output gear 13 is comprised of a cylindrical peripheral flange 13a extending forward and formed with a number of external teeth 13b. The output gear 13 accommodates a rear portion of the clutch drum 511 of the forward gear 51 within the cylindrical peripheral flange 13a so as to place the clutch drum 511 axially overlap with the cylindrical peripheral flange 13a by an axial distance L. This structure enables the output gear to have a sufficient number of teeth and is placed in close proximity to the forward clutch 51, so as to make the overall axial length of the automatic transmission 10 shorter by the length L.

Coupling Structure Between Clutch Hub and Sun Gear

Figure 9:
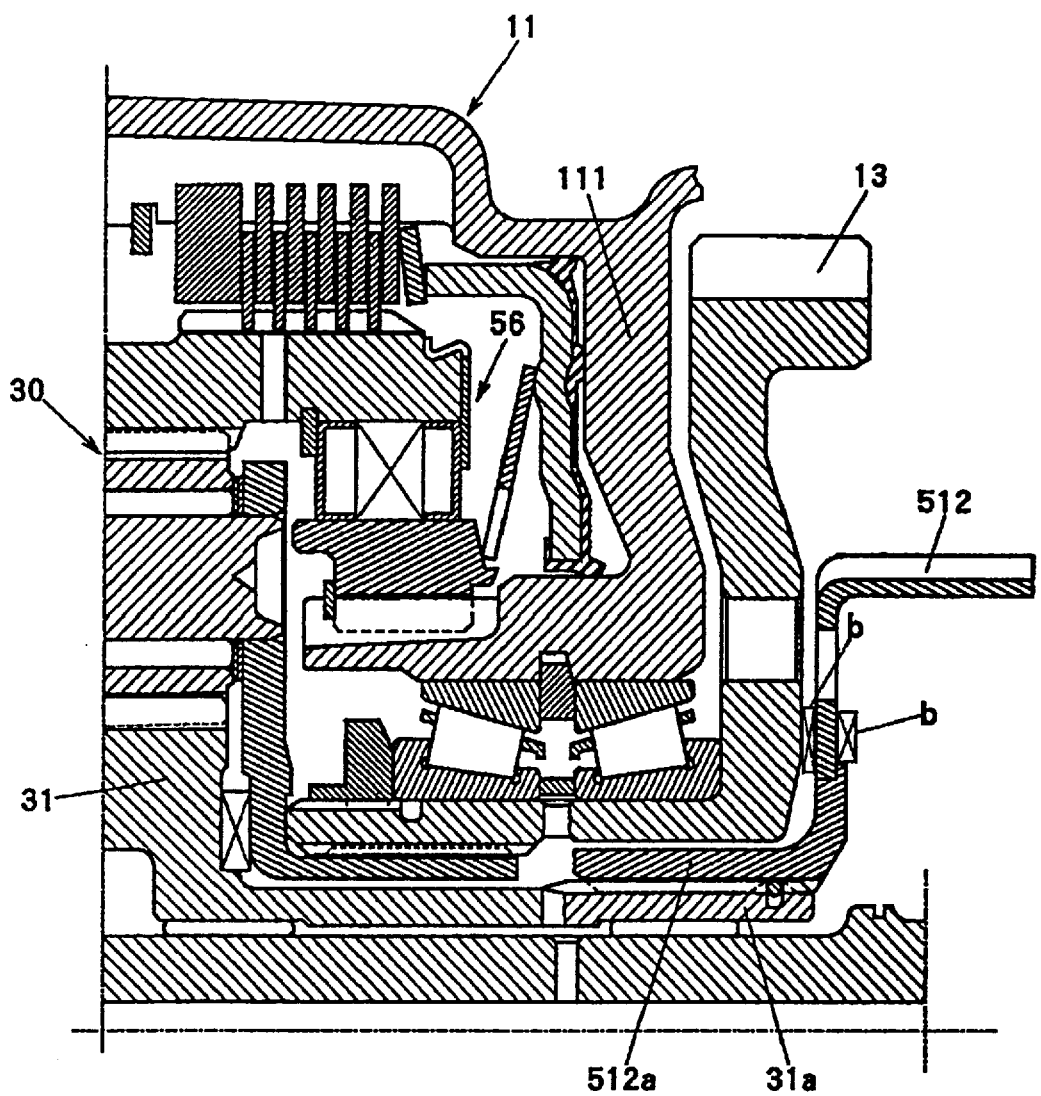
FIG. 9 is an enlarged cross-sectional view of a clutch hub of the forward clutch and its associated part of FIG. 2.

As shown in FIGS. 2 and 9, the forward clutch 51 and the first planetary gearset 30 are coupled by means of engagement between the clutch hub 512 and the sun gear 31. Between these forward clutch 51 and first planetary gearset planetary gearset first planetary gearset there is placed a partition 111 of the transmission housing 11 and, in addition, the output gear 13 and the one-way clutch 56 on opposite sides of the partition 111. Accordingly, the clutch hub 512 and the sun gear 31 are formed integrally with a rear extension 512a formed with a chamfered edge 512 and a front extension 31a, respectively, so as to be coupled through engagement between these extensions. In assembling these forward clutch 51 and first planetary gearset 30, the one-way clutch 56 and their associated elements are assembled from the back of the partition 111. After assembling the output gear 13 from the front of the partition 111, the clutch hub 512 is assembled from the front of the output gear 13 so as to bring the rear extension 512a into spline-engagement with the front extension 31a of the sun gear 31. In order to position properly the clutch hub 512, it was conventionally popular to arrange a pair of thrust bearings b, or otherwise a pair of thrust washers, at opposite sides of the clutch hub 512 as shown in FIG. 9. The utilization of these two bearings or two spacers increases the number of parts necessary for a transmission and the number of steps of assembling work of the transmission.

Figure 10:
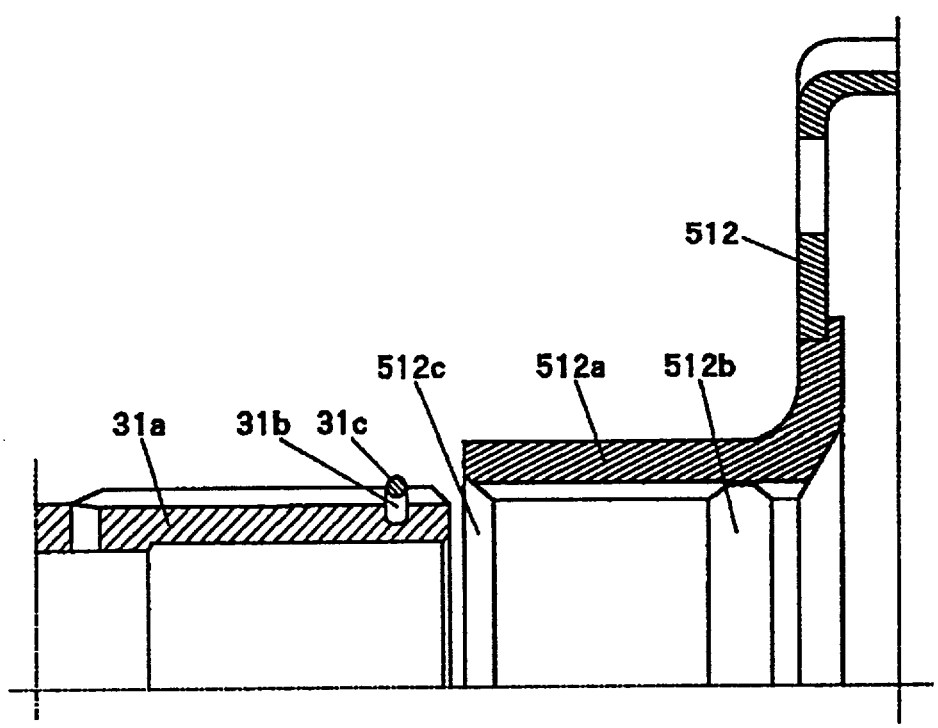
FIG. 10 is an illustration showing assembling of the clutch hub.

In the automatic transmission 10, as shown in FIG. 10, the sun gear 31 is formed with an external annular groove 31b in the front extension 31a perpendicularly intersecting splines, and the clutch hub 512 is formed with an internal annular groove 512b in the rear extension 512a perpendicularly intersecting splines so as to meet the external annular groove 31b of the sun gear 31 when the clutch hub 512 and the sun gear 31 are spline-coupled to each other. Before assembling, an expansive ring clip 31c is fitted in the external annular groove 31b of the sun gear 31. When the clutch hub 512 is installed into the transmission mechanism from the front so as to bring its rear extension 512a into spline-engagement with the front extension 31a of the sun gear 31, the rear end of the clutch hub 512 is brought into abutment against the ring clip 31c. At this time, the ring clip 31c is contracted by means of the chamfered edge 512c, so that the rear extension 512a of the clutch hub 512 gets over the ring clip 31c, allowing the clutch hub 512 to be forced in a thrust direction until complete spline engagement is created between the rear extension 512a and the front extension 31a. When the clutch hub 512 is further forced as deep as the internal annular groove 512b in the rear extension 512a is placed at the expansive ring clip 31c, the expansive ring clip 31c expanses so as to enter the internal annular groove 512b, thereby properly positioning the clutch hub 512 relative to the sun gear 31 and achieving the engagement between the clutch hub 512 and the sun gear 31. With this structure, a single part, such as an expansive ring clip 31c, is necessary to secure an axial position of the clutch hub 512 relative to the sun gear 31.

Positioning Mechanism of Bearing

Figure 11:
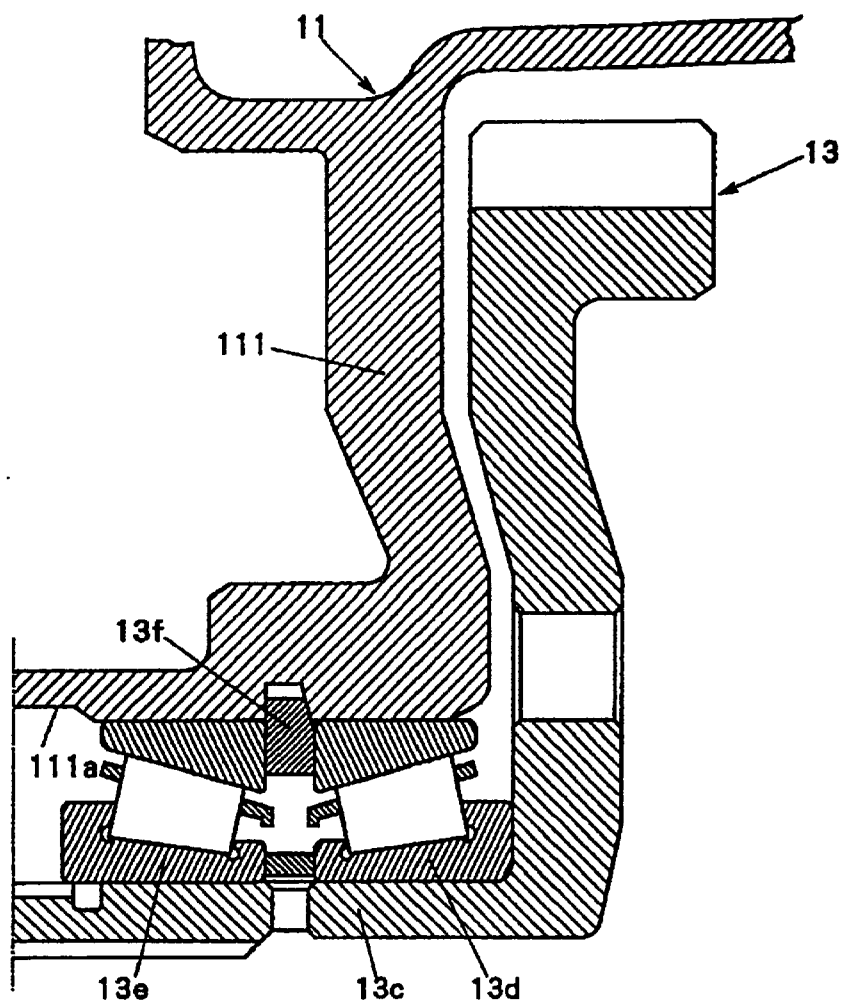
FIG. 11 is an enlarged cross-sectional view of bearings for an output gear and its associated part of FIG. 2.

As was previously described in connection with FIG. 2, the automatic transmission 10 includes the output gear 13 and the pinion carrier 33 of the first planetary gearset 30 disposed immediately before and after the partition 111, respectively and engaged with each other. As shown in FIG. 11, for this engagement, the output gear 13 is formed integrally with a rear extension 13c extending through a through bore 11a formed in the partition 111. The partition 111 is provided with a pair of bearings 13d and 13e arranged side by side in the axial direction in the through bore 111a. The output gear 13 is supported in the transmission case 11 by the bearings 13d and 13e.

Figure 12:
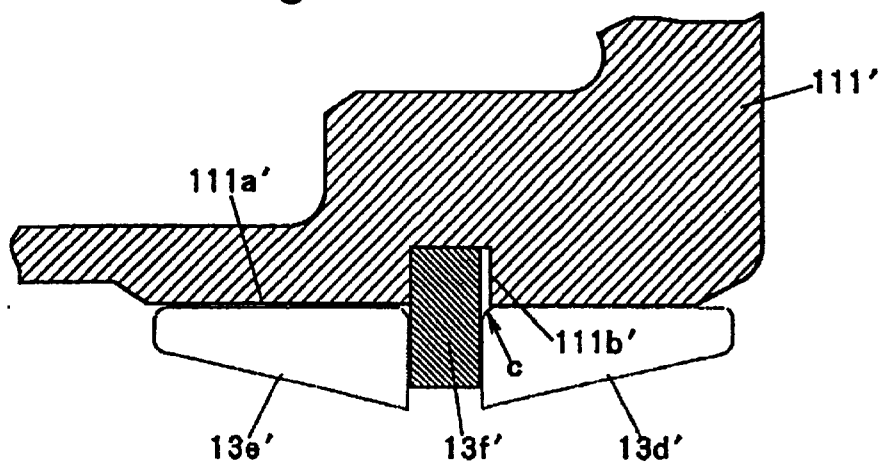
FIG. 12 is a cross-sectional view of a comparative structure of FIG. 11.

In such an instance, as shown in FIG. 12, a pair of bearings 13d' and 13e' must be press-fitted into and placed properly in a relative position within a through bore 111a' of the partition 111'. In order to positioning these bearings 13d' and 13e', it was conventionally popular to dispose a snap ring 13f' having a rectangular cross section in a peripheral groove 111b' formed in the partition 111' where the bearings 13d' and 13e' are placed in a relative position. However, such a snap ring 13f' in the annular groove 111b' provides a small gap c between side surfaces of the snap ring 13f' and the annular groove 111b' which always leads to aggravation of accuracy of positioning the bearings 13d' and 13e' with respect to the transmission housing 11.

Figure 13:
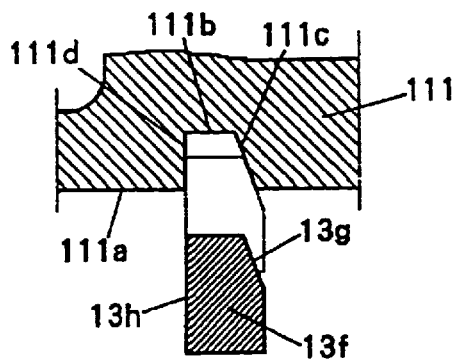
FIG. 13 is an enlarged cross-sectional view showing an essential part around the bearing of FIG. 11.

The snap ring 13f used in the automatic transmission 10 is shaped pentagonal in cross section by chamfering an upper edge 13g as shown in FIG. 13. Similarly, the annular groove 111b of the partition 111 is shaped pentagonal in cross section by forming a slanting bottom 111c so as to conform to the snap ring 13f. When the snap ring 13f is fitted in the annular groove 111b, there is created a wedge-shaped engagement therebetween, enabling the chamfered edge 13g and slanting bottom 111c, and vertical sides 13h and 111d thereof to contact closely to each other, respectively. When the snap ring 13f is fitted in the annular groove 111b, the snap ring 13f is placed in a proper relative position with respect to the transmission housing 11 by means of the close contact between the adjacent vertical sides 13h and 111d. Consequently, another side of the snap ring 13f where the chamfered edge 13g is formed is positioned properly. By bringing the bearings 13d and 13e into abutment against the snap ring 13f at the opposite sides, the bearings 13d and 13e are placed in a proper relative position within and with respect to the through bore 111a of the partition 111.

Return Spring Retaining Structure of Low-Reverse Brake

Figure 14:
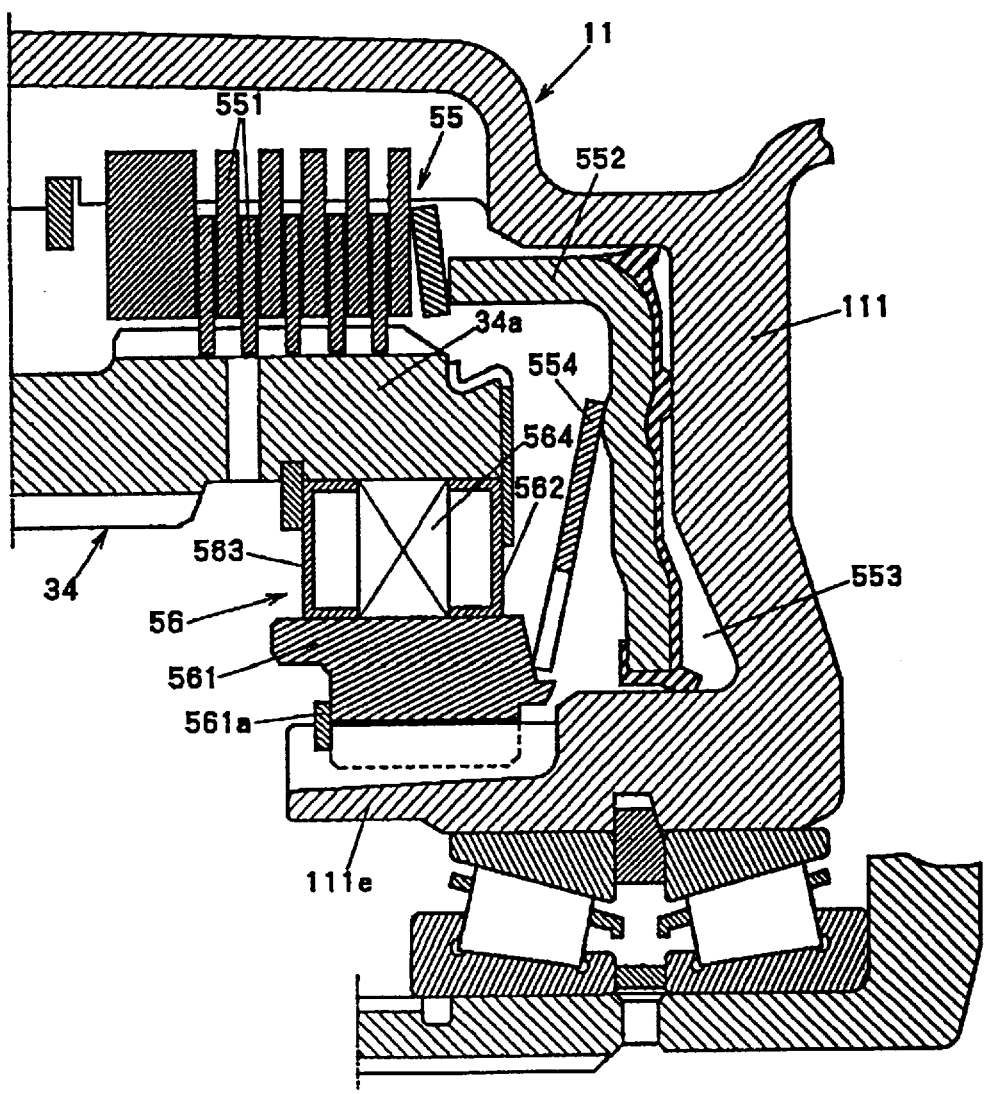
FIG. 14 is an enlarged cross-sectional view showing part around an one-way clutch of FIG. 2.

FIG. 14 shows an arrangement of the low reverse brake 55 and the one-way clutch 56 disposed behind the partition 111 in the transmission housing 111. The low reverse brake 55 is positioned radially outside, and the one-way clutch 56 is positioned radially inside. The low reverse brake 551 has a plurality of friction disks 551 alternately spline-coupled to the transmission housing 11 and a front extension 34a of the ring gear 34 of the first planetary gearset 30 and a piston 552 mounted for slide movement behind the partition 111 so as to form a pressure chamber 553 between the piston 552 and the partition 111.

The one-way clutch 56 has an inner race 561 which is spline-coupled to a boss 111e integral with the partition 111 extending rearward and secured by a snap ring 561a. Between the inner race 561 and the front extension 34a of the ring gear 34 there are provided a plurality of sprag 564 held on opposite sides by retainers 562 and 563. A countersunk return spring 554 is disposed so as to abut the piston 552 of the low-reverse brake 55 at its outer periphery and the inner race 561 of the one-way clutch 56 at its inner periphery.

According to the structure, reaction force of the return spring 554 is stopped the boss 111e of the transmission housing 11 through the inner race 561 of the one-way clutch 56 and the snap ring 561a. It is apparent that the automatic transmission 10 has no necessity of a special member for stopping the reaction force of the return spring 554, so as to reduce the number of parts. Further, since the return spring 554 always pushes the inner race 561 of the one-way clutch 56 backward so as to hold it against the snap ring 561, there is less play between the boss 111e of the transmission housing 11 and the inner race 561 of the one-way clutch 56 at their spline engagement. Accordingly, there is less rattling noise generated at the spline engagement even when rotary motion is imparted to the inner race 561 during locking or unlocking the one-way clutch 56.

One-way Clutch Supporting Structure

The one-way clutch 56 has the structure in which the sprag 564 are disposed between the inner race 561 spline-coupled to the transmission housing 11 and the front extension 34a of the ring gear 34 of the first planetary gearset 30 and held by retainers 562 and 563 on the opposite sides. For preventing the sprag 564 and/or the retainers 562 and 563 from axially slipping out, it is usual, as shown in FIG. 15, to provide snap rings 562a' and 563a' on a front side of the front retainer 562' and on a rear side of the rear retainer 563', respectively, in a front extension 34a' of the ring gear 34 so as to hold the front and rear retainers 562' and 563' in the axial direction.

Figure 15:
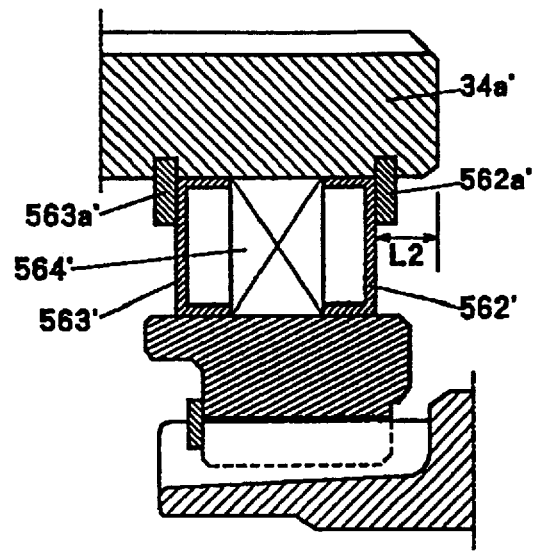
FIG. 15 is a cross-sectional view of a comparative structure of FIG. 14.

In the supporting structure, since a groove for, in particular, the front snap ring 562a' must be formed in an inner wall of the front extension 34a' of the ring gear 34, the front extension 34a' is needed to extend forward by a length L2 as shown in FIG. 15, so as to increase the axial length of the ring gear 34.

Figure 16:
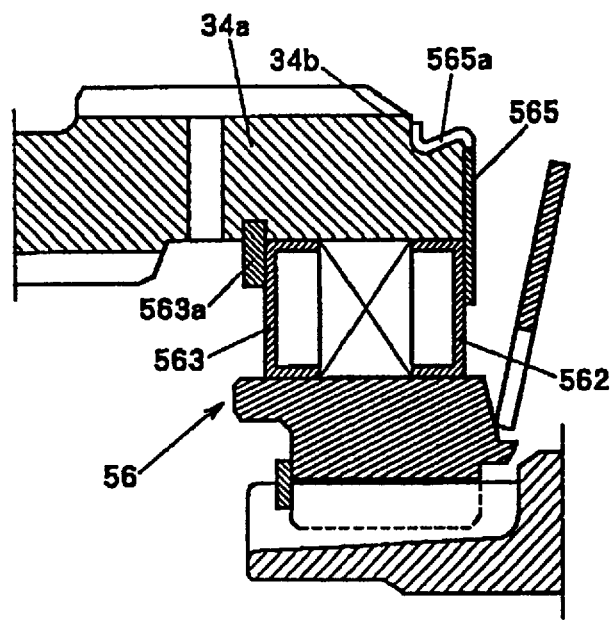
FIG. 16 is an enlarged cross-sectional view showing an essential part of the one-way clutch.

In view of the above, in the automatic transmission 10, as shown in FIG. 16, the rear retainer 563 is held by a snap ring 563a attached to the front extension 34a of the ring gear 34, and the front retainer 562 is held by an annular stopper plate 565 attached to the front end of the front extension 34a' of the ring gear 34. The stopper plate 565 is formed on its outer periphery with a plurality of claws 565a, each of which is directed inward and bent backward. On the other hand, the front extension 34a of the ring gear 34 is formed on its outer periphery with a continuous groove 34b. Each claw 565a is elastically engaged with the peripheral groove 34b so as to overlap the front end portion of the front extension 34a of the ring gear 34 and, thereby mount the stopper plate 565 on the front extension 34a of the ring gear 34. In this instance, the annular stopper plate 565 is configured so as to have an inner diameter smaller than an inner diameter of the front extension 34a of the ring gear 34, thereby preventing the front retainer 562 from slipping out forwardly by the stopper plate 565.

Clutch Arrangement

The automatic transmission 10 includes the reverse clutch 52 and the 3-4 clutch 53 which are placed between the turbine shaft 27, the sun gear 41 and the pinion carrier 43 of the first planetary gearset 30 and behind the second planetary gearset 40. The great concern is an axial arrangement of these two clutches 52 and 53 in relation to the overall compactness of the automatic transmission 10.

Figure 17:
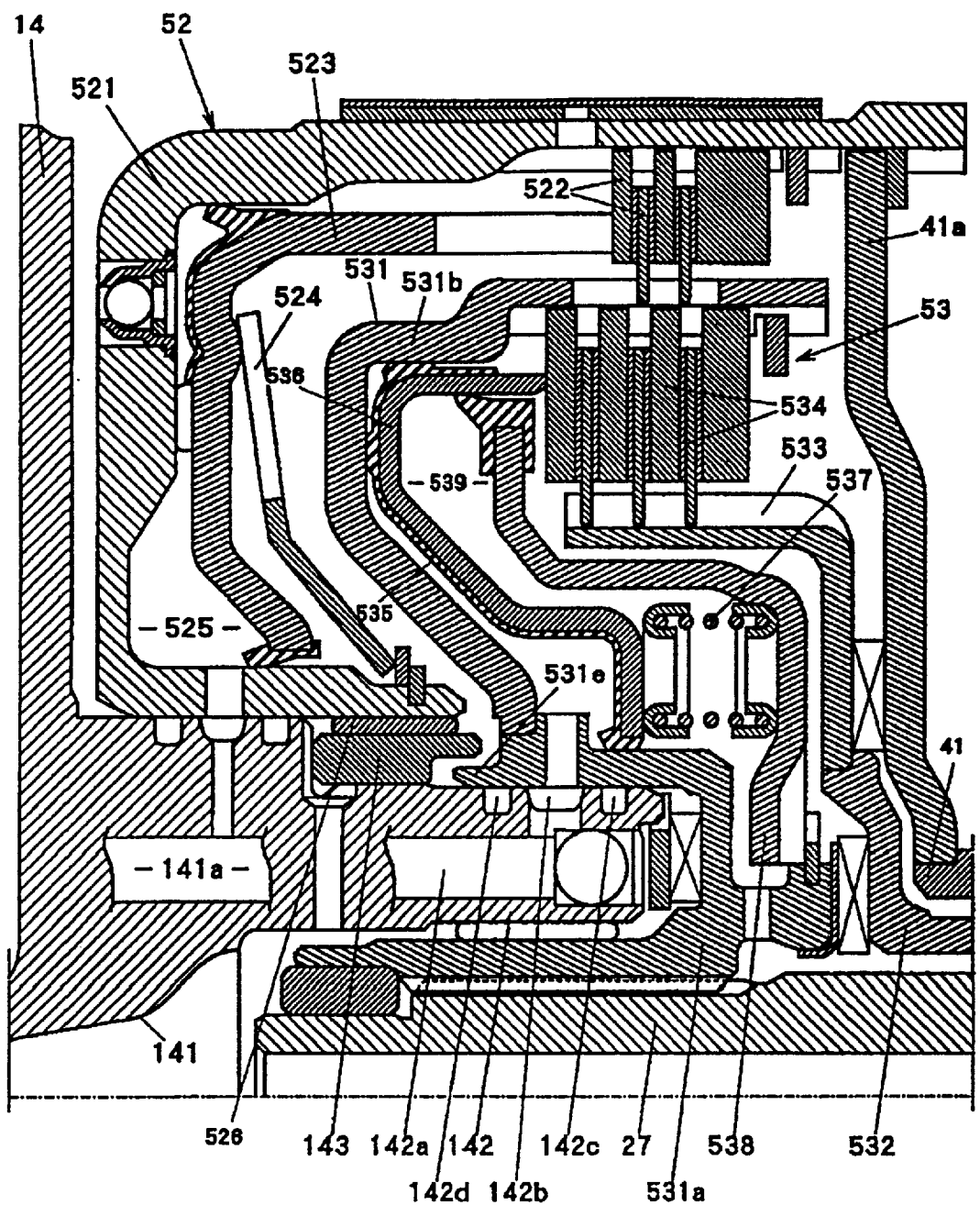
FIG. 17 is an enlarged cross-sectional view showing part around the reverse clutch and the 3-4 clutch of FIG. 2.

As shown in FIG. 17, the transmission housing 11 is formed with generally cylindrical bosses 141 and 142 having differently axial lengths and extending forward from the rear cover 14. The first shorter boss 141 holds the reverse clutch 52, and the second longer boss 142, having a diameter smaller than the first shorter boss 141, holds the 3-4 clutch 53. In this instances, these clutches 52 and 53 overlap each other in the axial direction. Specifically, the clutch drum 521 of the reverse clutch 52 is fitted to the first boss 141, and the clutch drum 531 of the 3-4 clutch 53 is fitted to the second boss 142. Further, the clutch drum 531 of the 3-4 clutch 53 is placed inside the clutch drum 521 of the reverse clutch 52 so as to serve as a clutch hub of the reverse clutch 52. The reverse clutch 52 has a plurality of friction disks 522 connected alternately to the clutch drums 521 and 531. Similarly, the 3-4 clutch 53 has a plurality of friction disks 534 disposed within the clutch drum 531 and connected alternately to the clutch drum 531 and the clutch hub 533. As was previously described, the clutch drum 531 of the 3-4 clutch 53 is comprised of the drum base 531a having a U-shaped cross section and fitted to the second boss 142 and the drum body 531b secured to the drum base 531a. The drum base 531a is spline-coupled to the turbine shaft 27. The clutch hub 533 is connected with an hub extension 532 extending forward which has a front end spline-coupled to the pinion carrier 43 of the second planetary gearset 40. Further, the clutch drum 521 of the reverse clutch 52 is connected at its front end to a connecting plate 41a integral with the sun gear 41 of the second planetary gearset 40.

Within the clutch drum 521 of the reverse clutch 52 there are placed a piston 523 and a return spring 524 consisting of, for instance, a countersunk spring. Between the clutch drum 521 and the piston 523 there is formed a pressure chamber 525 into which the operating oil pressure is introduced through an oil passage 141a formed and extending axially in the first boss 141. Similarly, within the clutch drum 531 of the 3-4 clutch there are placed a piston 536, a return spring 537 and a sealing plate 538 for forming a balancing oil chamber 539 in the 3-4 clutch 53. The operating pressure is introduced into the pressure chamber 535 between the clutch drum 531 and the piston 536 through an oil passage 142a formed in the second boss 142. The common use of the clutch drum 531 of the 3-4 clutch 53 as a hub of the reverse clutch 52 enables these clutches to overlap each other in the axial direction.

A sleeve 143 is fitted to the rear end of the second boss 142 extending from the rear cover 14, and a bearing bush 526 is fitted into the clutch drum 521 of the reverse clutch 52. The clutch drum 521 of the reverse clutch 52 is carried by the sleeve 143. This is because it is undesirable to slide the bush 526 directly on the boss 142 of the rear cover 14 which is made of an aluminum alloy or the like. The second boss 142, on which the clutch drum 531 is fitted immediately before the sleeve 143, is formed with an annular groove 142b for communicating the oil passage 142a with the pressure chamber 535 of the 3-4 clutch 53 and annular grooves 142c and 142d for receiving sealing rings (not shown) on the opposite sides of the annular groove 142a. With this structure, the second boss 142 is provided with the sleeve 143 fitted to its rear end and the clutch drum 531 of the 3-4 clutch fitted to the front end formed with the annular groove 142d. In this instance, the sleeve 143 is necessary of a certain axial length in order to hold the bush 526 and the clutch drum 531 of the 3-4 clutch 53 is essential to overlie the annular groove 142d so as to cover it up sufficiently. For these reason, the second boss 142 tends to be long in axial length.

Figure 18:
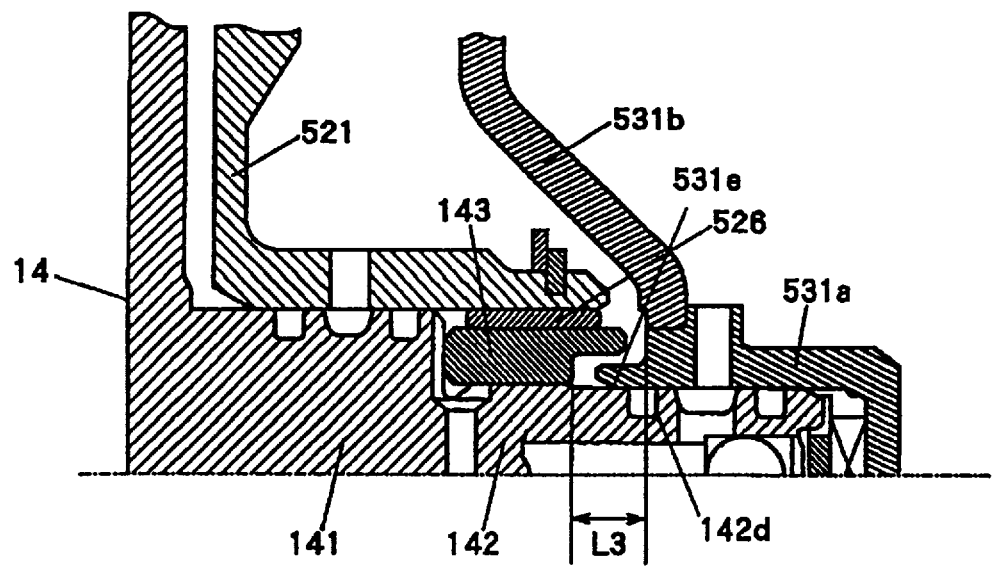
FIG. 18 is an enlarged cross-sectional view showing part around bearings for a reverse clutch drum and its associated part of FIG. 2.

As shown in FIG. 18, in order for the second boss 142 to have a necessary axial length while retaining its compactness, the sleeve 143 and the drum base 531a of the 3-4 clutch 53 are formed with stepped ends, respectively, so as to overlap each other by an axial length L3. The overlapped structure of these sleeve 143 and the drum base 531a yields an increase in overlapping length between the reverse clutch 52 and the 3-4 clutch 53, so as to enhance the overall axial compactness of the automatic transmission 10.

Lubrication Mechanism of Bearing Bush

Figure 19:
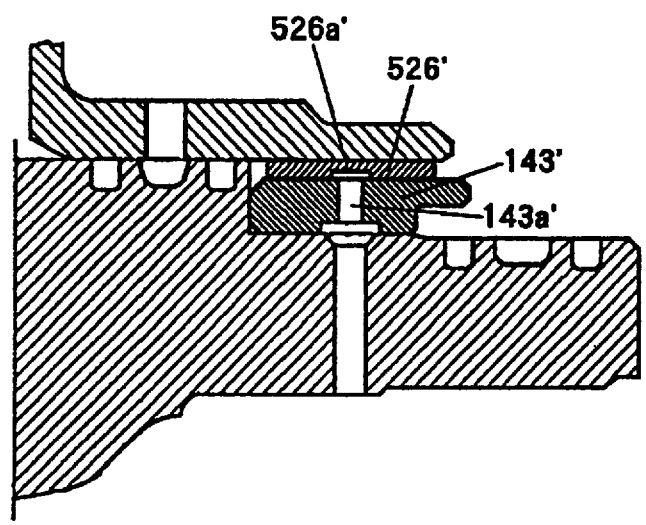
FIG. 19 is a cross-sectional view of a comparative structure of FIG. 18.

In the case where the second boss 142 secures the sleeve 143 mounted on its rear end portion and the first boss 141 bears the front end portion of the clutch drum 521 of the reverse clutch 52 mounted thereon through the bush 526, it is essential to lubricate the interface surfaces between the sleeve 143 and the bush 526. It is popular to form a radial oil passage 143a' in the bearing surface of the sleeve 143' and an annular oil groove 526a' in the inner wall of the bush 526' so as to lie on the radial oil passage 143a', as shown in FIG. 19. Lubrication oil is introduced into the annular oil groove 526a' and then spread over the interface surfaces. In this instance, however, since the annular oil groove 526' does not serve as a load sustaining bearing, it brings about an increase in axial length of the bush 526' at least equal to the axial width of the groove 526a'.

Figure 20:
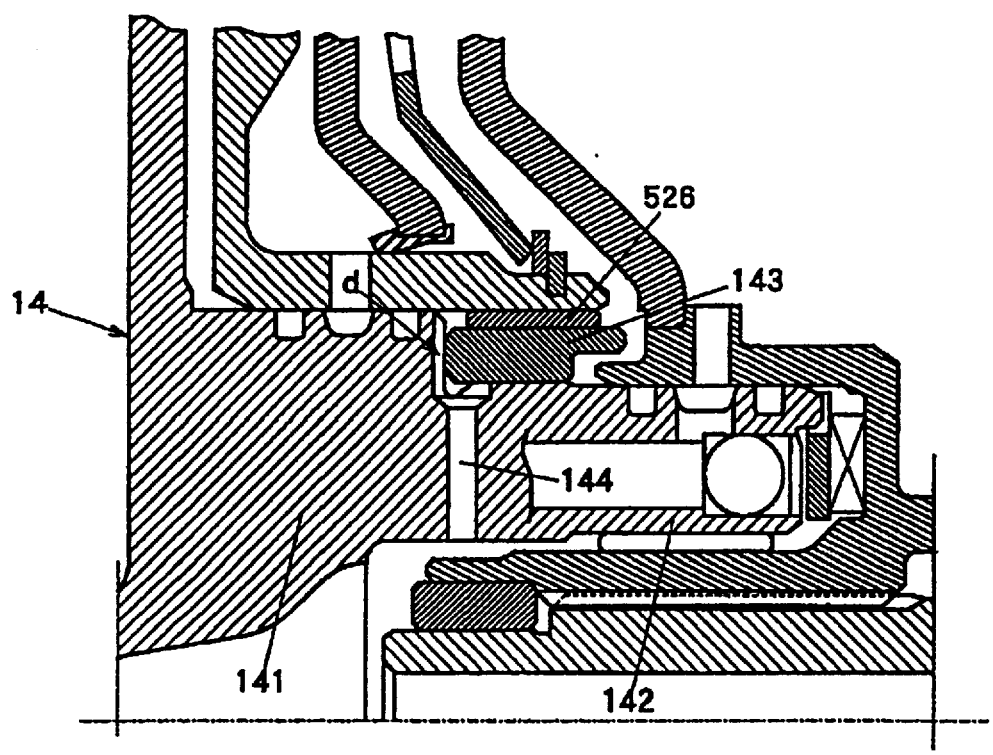
FIG. 20 is a cross-sectional view of a lubrication mechanism for the bearings of FIG. 19.
Figure 21:
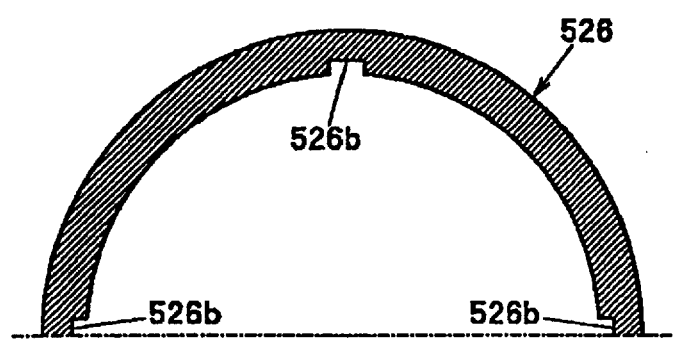
FIG. 21 is a cross-sectional view of a bush for the bearings of FIG. 19.

As shown in FIG. 20, in the automatic transmission 10 in which where one of the first and second bosses 141 and 142 extending forward differently in axial length from the rear cover 14, i.e. the second boss 142, secures the sleeve 143 mounted on its rear end portion, the sleeve 143 is fitted at a certain axial separation gap d between the stepped end of the first and second bosses 141 and 142, and the rear cover 14 is formed with a radial bore 144 oriented to the separation gap d. According to the structure, the separation gap d can face the rear portion of the interface surfaces of the sleeve 143 and the bush 526 and, consequently, the lubrication oil is introduced into the separation gap d through the radial bore 144 and then spread to the rear portion of the interface surfaces. Since the automatic transmission 10 is not necessary to have such an annular oil groove 526' in the bush 526 as shown in FIG. 19, the bush 526 is shortened in axial length, which is always desirable for the axial overall compactness of the automatic transmission 10. In order to supply lubrication oil between the sleeve 143 and the bush 526 more positively, the bush 526 is formed with one or two axial grooves 526b as shown in FIG. 21. These axial grooves 526 have no effect to the axial length of the bush 526 necessary to provide a sufficient bearing load.

Drift-On Ball Structure

Figure 22:
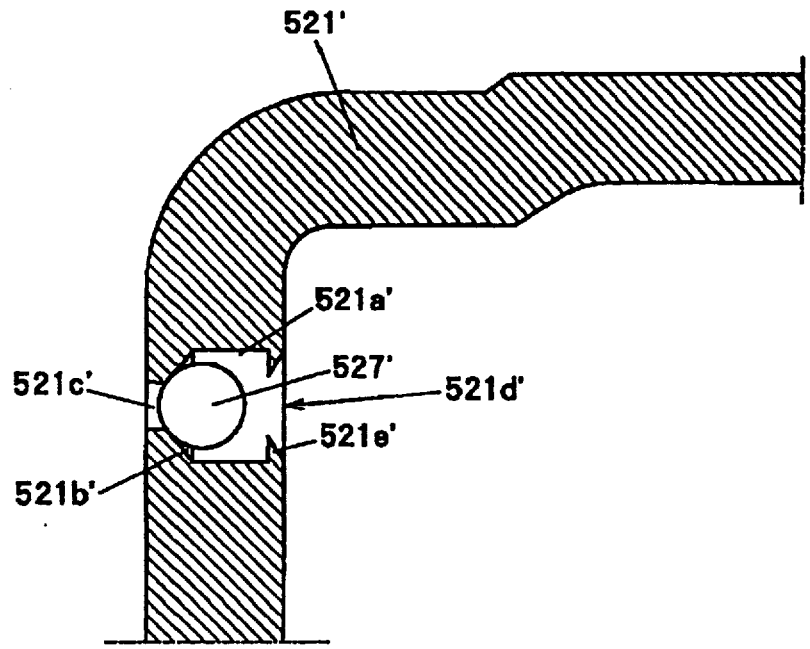
FIG. 22 is a cross-sectional view showing a conventional structure of a drift-on ball.

The clutch drum 521 of the reverse clutch 52 is provided with what is called a drift-on ball which functions to cause an expeditious pressure reduction in the pressure chamber of the reverse clutch 52 upon uncoupling. Conventionally, as shown in FIG. 22, a drift-on ball structure is incorporated within a wall of the clutch drum 521' and includes an axial bore 521d' consisting of, in order from a pressure chamber, a large diameter of axial bore 521a' in which a drift ball 527' is received and capable of rolling, a chamfered ball seat 527b' on which the drift ball seats, and a small diameter of axial outlet bore 521c' through which the operating oil is discharged. After installing the drift ball 527' in the axial bore 521a', an annular detente 521e' is formed around the opening so as to prevent the drift ball 527' from rolling out of the axial bore 521a'. In incorporating such a drift-on ball mechanism, if there occur errors such as in installing the drift ball 527' or in forming the annular detente 521e', it is difficult to re-form an annular detente 521e'. In these instances, the drum 521' must be scrapped.

Figure 23:
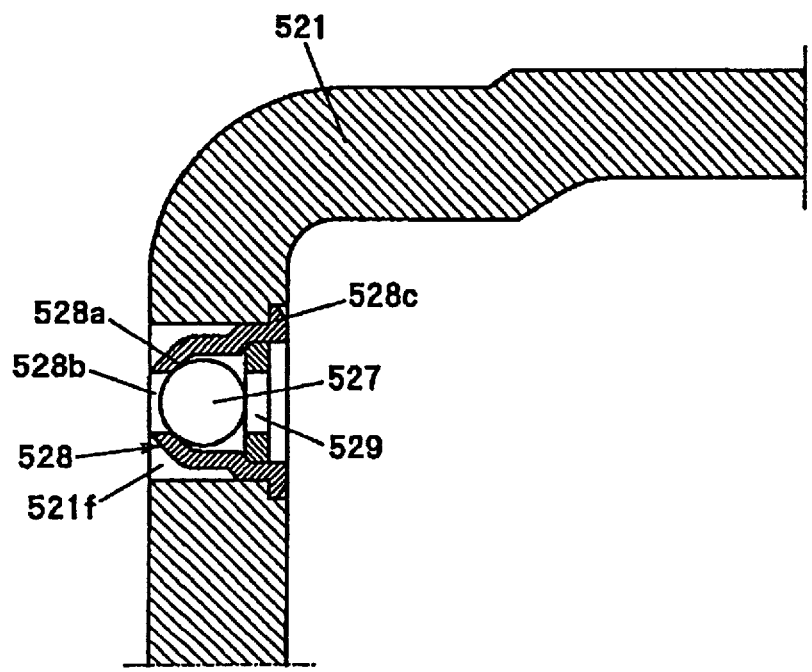
FIG. 23 is an enlarged cross-sectional view showing part around a drift-on ball for the reverse clutch of FIG. 2.

As shown in FIG. 23, the drift-on ball mechanism of the automatic transmission 10 is comprised of a drift ball 527, a generally cylindrical-shaped casing 528 for housing the drift ball 527 therein and a cylindrical bore 521f formed in the clutch drum 521 of the reverse clutch 52 in which the casing 528 is fitted. An annular ring 529 secured to the casing 528 so as to prevent the drift ball 527 from slipping off out of the casing 528. The casing 528 is formed at its one end with a ball seat 528a and an oil discharge port 528b through which the operating oil is discharged from the pressure chamber when the drift ball 527 leaves the ball seat 528a. Further, the casing 528 is formed at its another end with a flange 528c. After fitting the casing 528 with the drift ball 527 into the cylindrical bore 521f, a ring 529 is press-fitted between the casing 528 and the clutch drum 521 so as to prevent the casing from slipping off out of the bore 521f. With this structure of the drift-on ball mechanism, since, even though an assembly of the casing 528 with the drift ball 527 installed is improperly fitted to the bore 521f, the assembly can be easily removed and can be fitted again, there is no fear that the clutch drum 521 comes to nothing.

Reverse Clutch and Connecting Plate Connection

Figure 24:
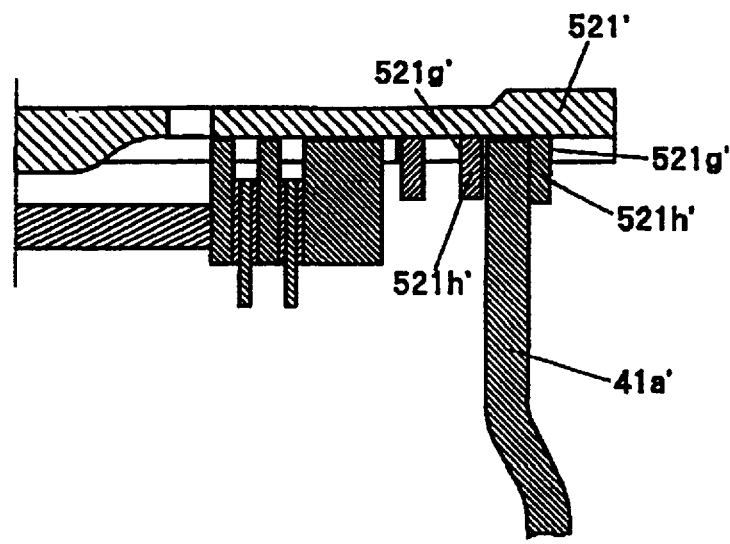
FIG. 24 is a cross-sectional view showing a conventional connecting structure between the reverse clutch drum and a connecting member.

As was previously described, the clutch drum 521 of the reverse clutch 52 is connected at its front end to the sun gear 41 of the second planetary gearset 40 by means of the connecting plate 41a integral with the sun gear 41. The clutch drum 521 and the connecting plate 41a are spline-coupled so as to rotate together. In this instance, as shown in FIG. 24, in order for these clutch drum 521 and connecting plate 41a to restrict relative axial movement, snap rings 521h' are fitted into circumferential annular grooves 521g' formed in the clutch drum 521 on both sides of the connecting plate 41a so as to hold the connecting plate 41a therebetween. The utilization of these two snap rings 521h' increases the number of parts necessary for an automatic transmission and the number of steps for assembling the automatic transmission 10.

Figure 25:
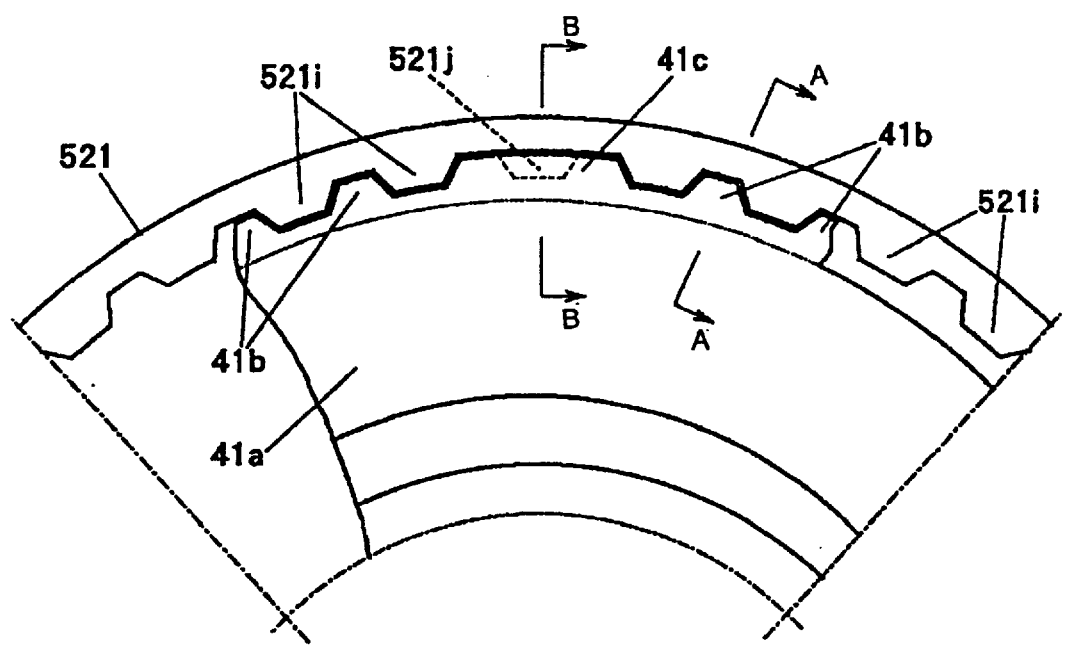
FIG. 25 is a cross-sectional view showing a connecting structure between the reverse clutch drum and a connecting member of FIG. 2.
Figure 26:
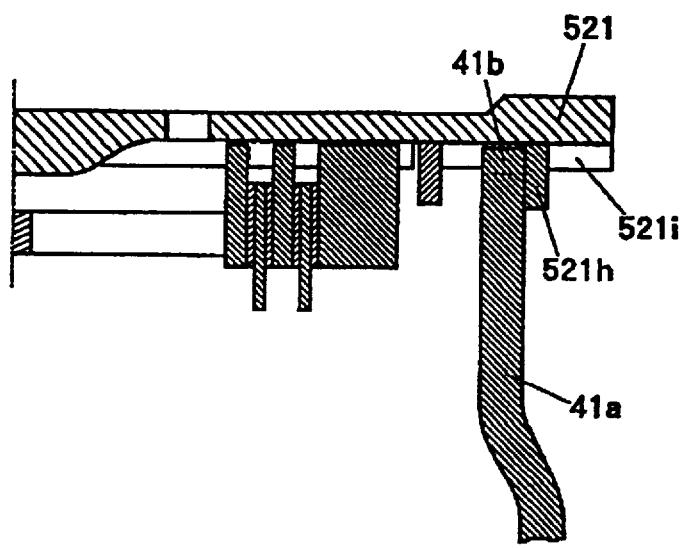
FIG. 26 is a cross-sectional view of FIG. 25 taken along a line A—A.
Figure 27:
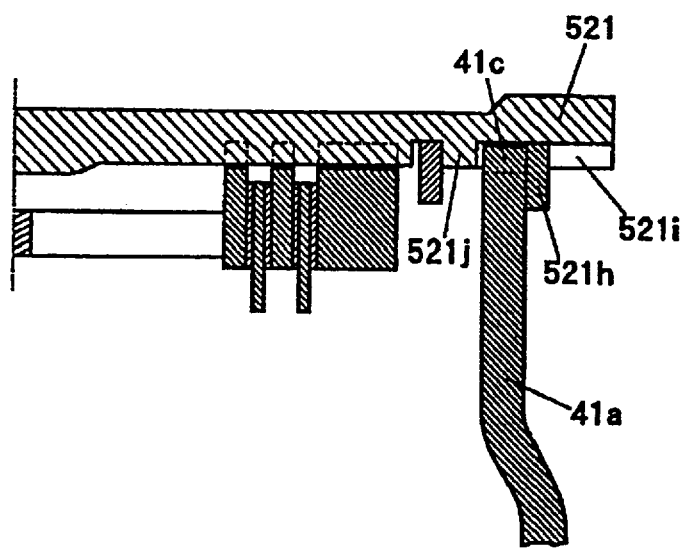
FIG. 27 is a cross-sectional view of FIG. 25 taken along a line B—B.

In the automatic transmission 10, as shown in FIGS. 25–27, four of a plurality of spline-teeth 521i, 521j of the clutch drum 521, namely the spline teeth 521j arranged, for instance, at regular angular separations of 90°, are formed so as to have an axial length shorter than those of the remaining spline teeth 521i. Corresponding spline teeth 41c of the connecting plate 41a, arranged at regular angular separations of 90°, are formed so as to have a width twice as large as those of the remaining spline teeth 41b. By placing the short length spline teeth 521j correspondingly in circumferential position to the wide teeth 41c, respectively, during connecting the connecting plate 41a to the clutch drum 521, these teeth 521j and 41c engage in an axial direction, and the remaining teeth 521i and 41b engage in a circumferential direction. Consequently, the clutch drum 521 and connecting plate 41a are prevented from causing relative movement in both axial and circumferential directions. In other words, the axial engagement of the teeth 521j and 41c serves as a substitution for one of the two snap rings 521h'. According to the structure, the number of parts of the automatic transmission 10 is reduced by one.

3-4 Clutch Drum Structure

Figure 28:
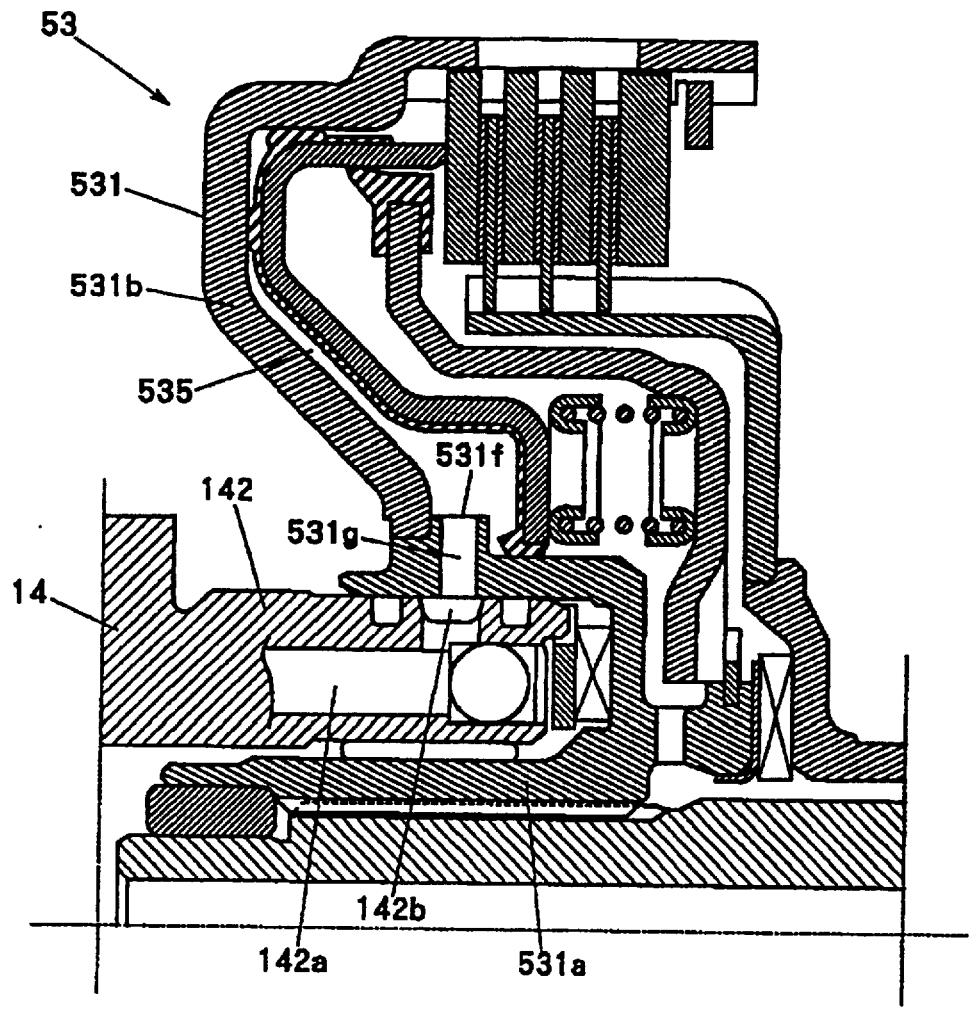
FIG. 28 is an enlarged cross-sectional view showing part around oil passages for the 3-4 clutch of FIG. 2.

As shown in FIG. 28, the clutch drum 531 of the 3-4 clutch 53 is comprised of the drum base 531a and the drum base 531b. The drum base 531a has a generally U-shaped cross section and is fitted to the second boss 142 extending from the rear cover 14. The drum body 531b is welded, or otherwise secured, to the outer surface of the drum base 531a. The drum base 531a is formed integrally with an annular rim 531f for axially positioning the drum body 531b. Further, the drum base 531a is formed with an oil passage 531g in the annular rim 531a for introducing the operating oil into the pressure chamber 535 from the oil passage 142a in the second boss 142.

Figure 29:
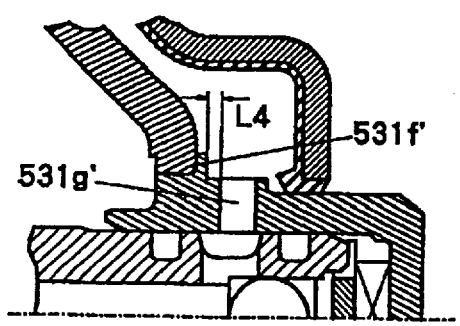
FIG. 29 is a cross-sectional view of a comparative structure of FIG. 28.
Figure 30:
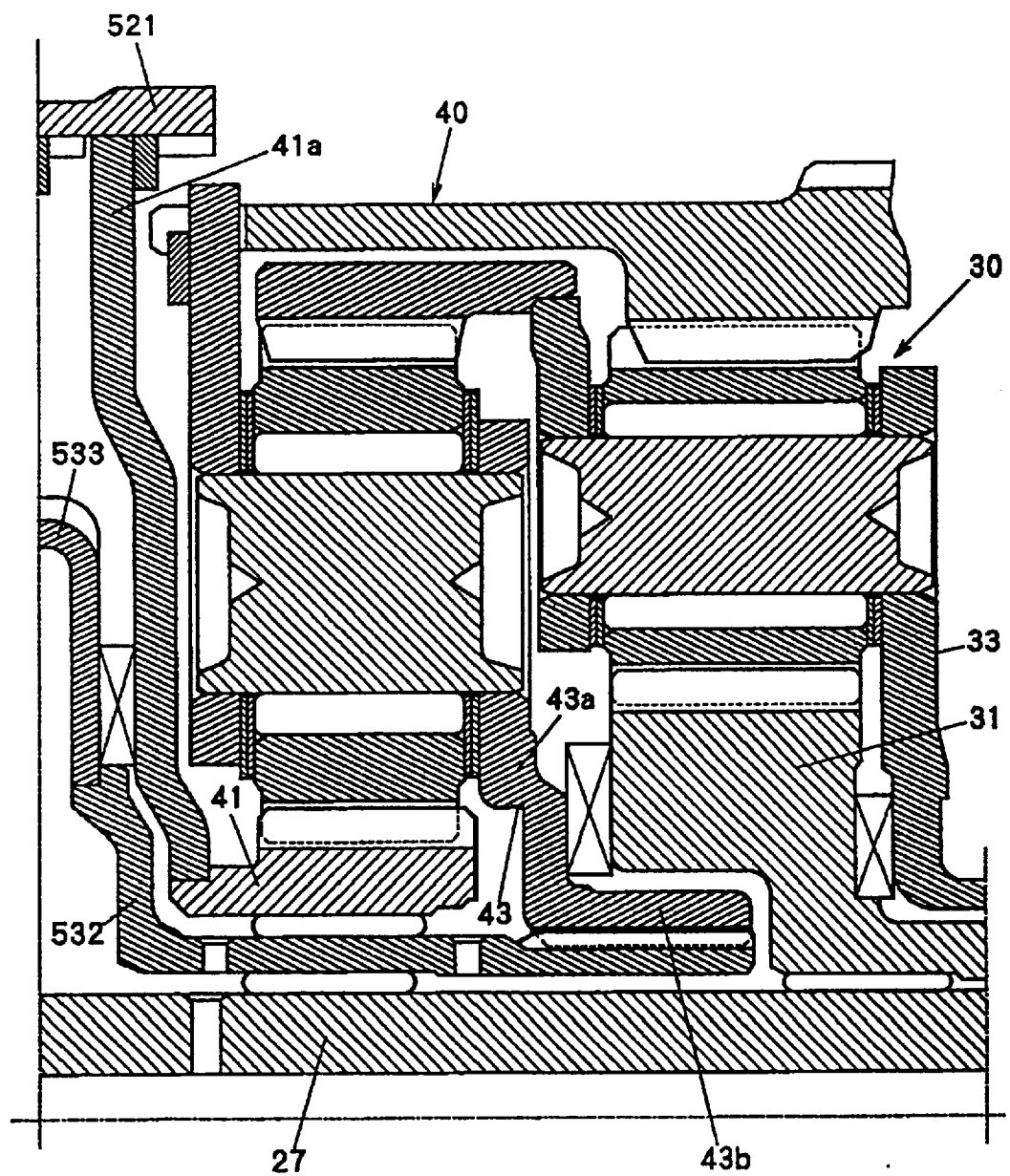
FIG. 30 is an enlarged cross-sectional view showing part around a planetary gearset of FIG. 2.

As shown in FIG. 29, in the case where a passage 531g' is formed in close proximity to a rim 531f', it is typical to provide an axial space or distance L4 from the annular rim 531f' which is necessary to bore the passage 531g'.

In the structure of the 3-4 clutch drum 531, since the oil passage 531g is formed in the annular rim 531f, the drum base 531a, and hence the clutch drum 531, is shortened in axial length by a distance L4.

Arrangement of planetary gearsets

As shown in FIG. 2, the first and second planetary gearsets 30 and 40 are coaxially arranged in front and behind. The first, i.e. front, planetary gearset 30 includes the sun gear 31 and the carrier 33 extending forward so as to be in engagement with the clutch hub 512 of the forward clutch 51 in front of the partition 111 of the transmission housing 11 and the output gear 13, respectively. The second, i.e. rear, planetary gearset 40 includes the sun gear 41 and the carrier 43 engage with the clutch drum 521 of the reverse clutch 52 and the clutch hub 533 of the 3-4 clutch 53, both disposed after the second planetary gearset 40, respectively. In this instance, since the connecting plate 41a for connecting the sun gear 41 to the clutch drum 521 of the reverse clutch 52 is disposed immediately after the second planetary gearset 40 and the clutch hub 533 of the 3-4 clutch immediately before the second planetary gearset 40, it is difficult to provide a space around the clutch hub 533 necessary to connect the clutch hub 533 to the carrier 43 of the second planetary gearset 40. If providing such a space around the clutch hub 533, the automatic transmission 10 must be increased in overall axial length.

In the automatic transmission 10, as shown in Figure first planetary gearset, the first planetary gearset 30 is formed with an annular groove in the sun gear 31 so as to receive therein a hub extension 532 extending rearward from the nub 533 of the 2-4 clutch 53 and a carrier plate extension 43b of a carrier plate 43a in front of the carrier 43 of the second planetary gearset 40. These extensions 532 and 43b are spline-coupled to each other within the annular groove. This connection between the carrier 43 of the second planetary gearset 40 and the nub 533 of the 2-4 clutch 53 makes it unnecessary to provide an axial space around the nub 533, enabling the automatic transmission 10 to have a reduced overall axial length.

Figure 31:
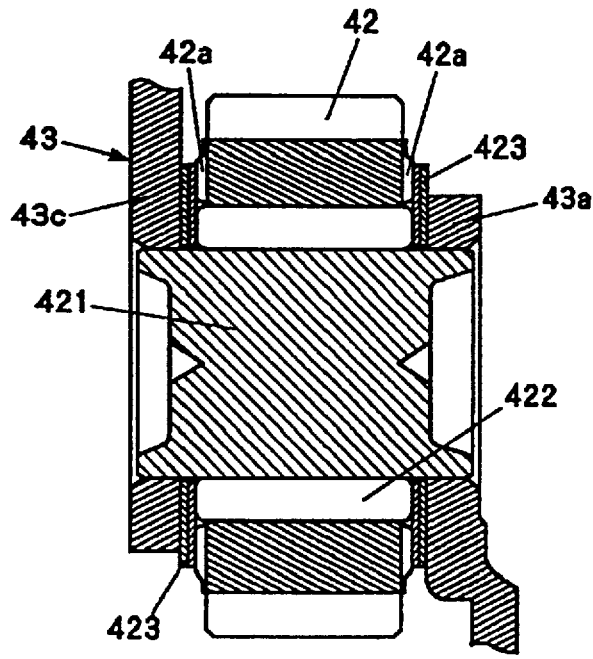
FIG. 31 is a cross-sectional view of a pinion of the planetary gearset.
Figure 32:
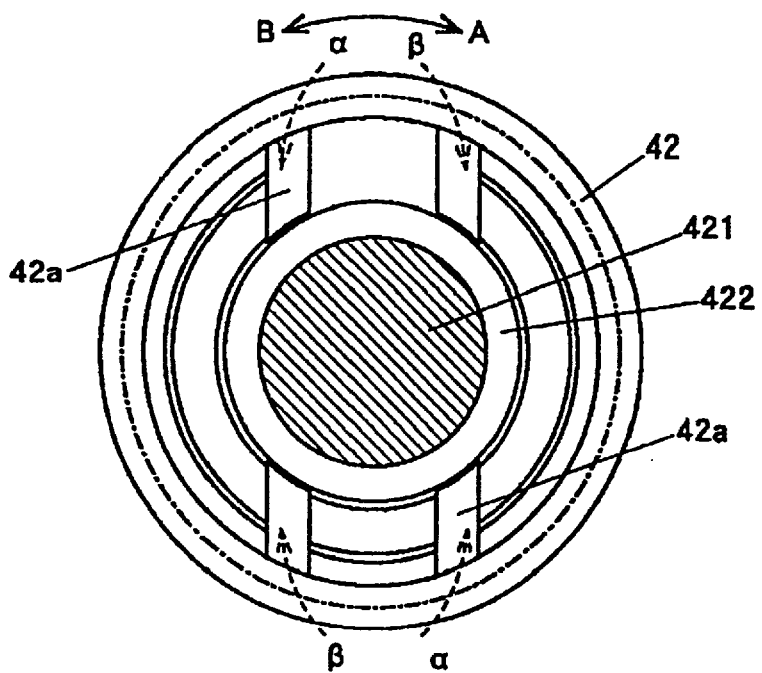
FIG. 32 is a front view of the pinion.

Pinion Structure of Planetary gearset The first and second planetary gearsets 30 and 40 include a plurality of the pinions 32, 34 carried for rotation by the carriers 33, 34, respectively. For example, as seen in FIG. 31 showing the second planetary gearset 40, a pinion shaft 421 is supported between front and rear carrier plates 43a and 43c forming the carrier 43. The pinion 42 is mounted on the pinion shaft 421 for rotation by means of a needle bearing 422. There are disposed thrust washers 423 between the pinion and the front and rear carrier plates 43a and 43c, respectively. It is necessary to lubricate these needle bearing 422 and thrust washers 423. As shown in FIGS. 31 and 32, in order to supply a desired amount of lubrication oil to the needle bearing 422 and thrust washers 423, the cylindrical pinion 42 is formed with oil passages 42a at both ends which extend approximately radially from the inner surface to the outer surface so as to introduce the lubrication oil around the pinion 42 between axial ends of the pinion 42 and the thrust washers 423 and also the needle bearing 422. The structure of the pinion thus configured has an effect of seizing and/or extraordinary wear of the needle bearing 422 and thrust washers 423 due to insufficient lubrication. In this instance, the oil passages 42a are off the center of the pinion 42 on both sides but in parallel with each other. The oil passages 42a pick up and introduce the lubrication oil to the thrust washers 423 and the needle bearing 422 through inlet ports α which are leading ports when the pinion 42 rotates in a direction shown by a reference character A or through inlet ports β which are leading ports when the pinion 42 rotates in a direction shown by a reference character B. Consequently, the oil passages 42a supply effectively the lubrication oil to the thrust washers 423 and the needle bearing 422. The first planetary gearset 30 has the same structure of oil passages relating to the its pinion 32.

Oil Leakage Prevention

Figure 33:
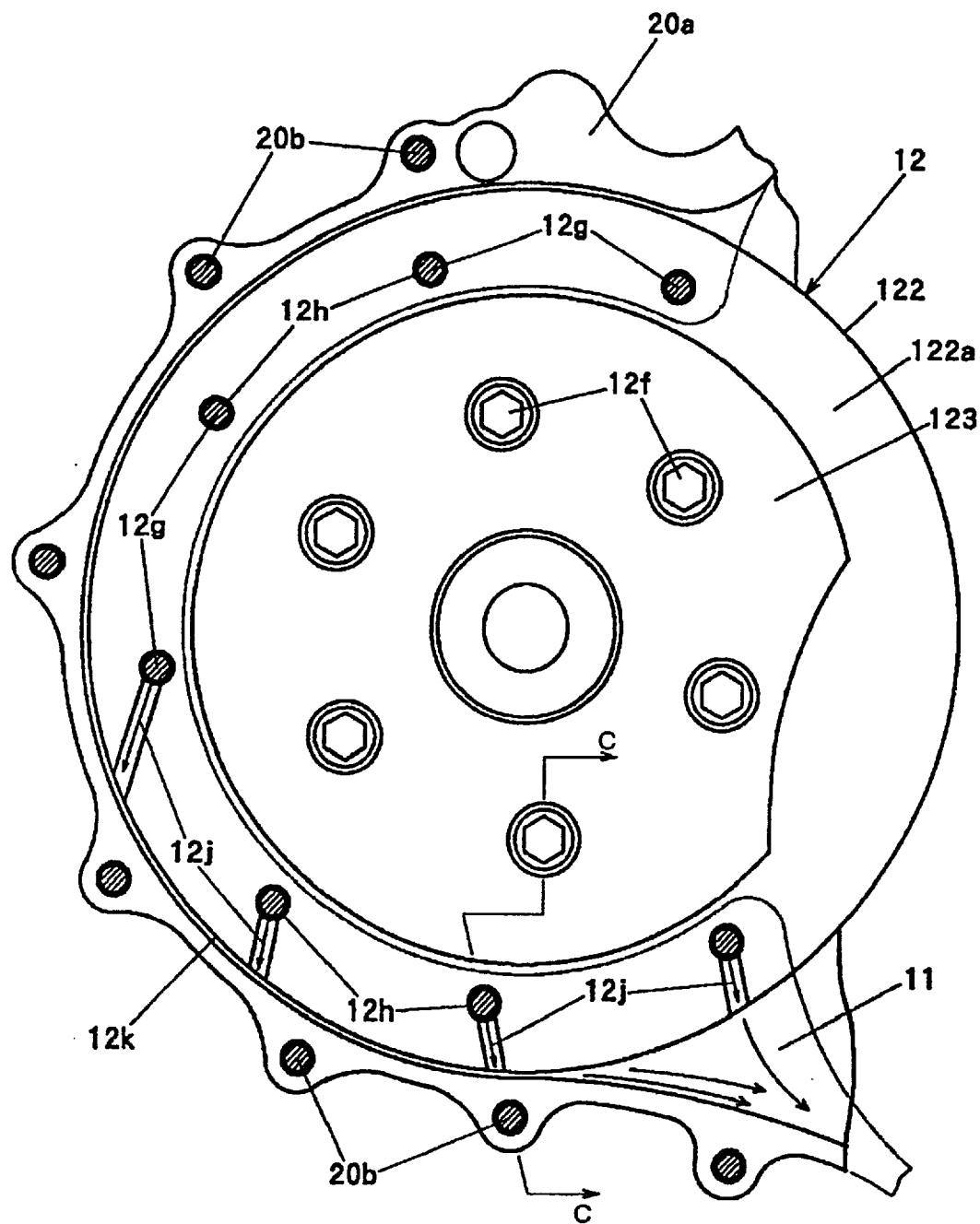
FIG. 33 is a enlarged rear view of the oil pump of FIG. 2.
Figure 34:
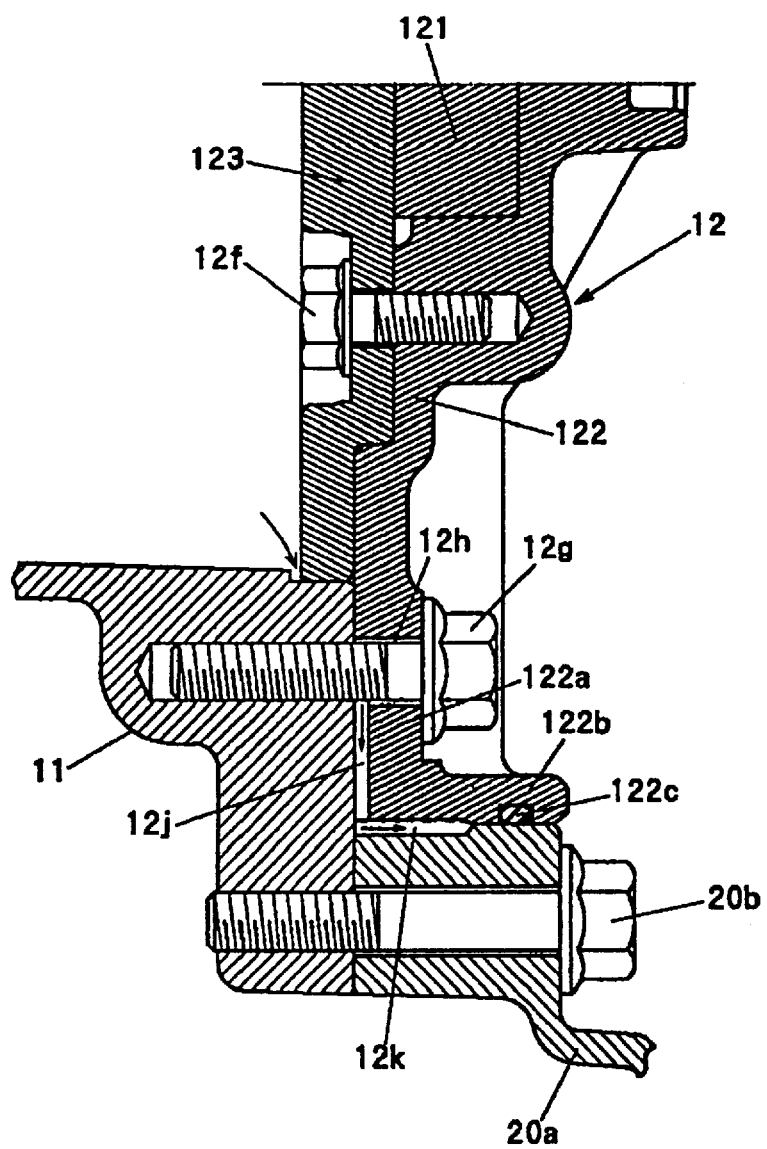
FIG. 34 is an enlarged cross-sectional view showing part around a fitting for the oil pump of FIG. 33 taken along line C—C.

As shown in FIG. 2, the oil pump 12 cooperating with the automatic transmission 10 is fitted to the transmission housing 11 in a position where the torque converter housing 20a (or housing 21 in FIG. 1). The oil pump 12 is of an internal gear type. Specifically, as shown in FIGS. 33 and 34, a pair of gears 121 (only one of which is shown) are housed for rotation in a pump housing 122 closed by a rear cover 123 secured to the housing 122 by bolts 12f. The pump housing 122 is formed with a flange 122a having a diameter larger than an outer diameter of the rear cover 123 through which the oil pump 12 is secured to the transmission housing 11 by bolts 12g. The pump housing 122 is further formed with a front cylindrical extension 122b extending from the flange 122a to which the converter housing 20a is fitted through an O-ring 122c and centered with respect to the axis of the automatic transmission 10. The converter housing 20a thus centered is secured to the transmission housing 11 by bolts 20b.

Figure 35:
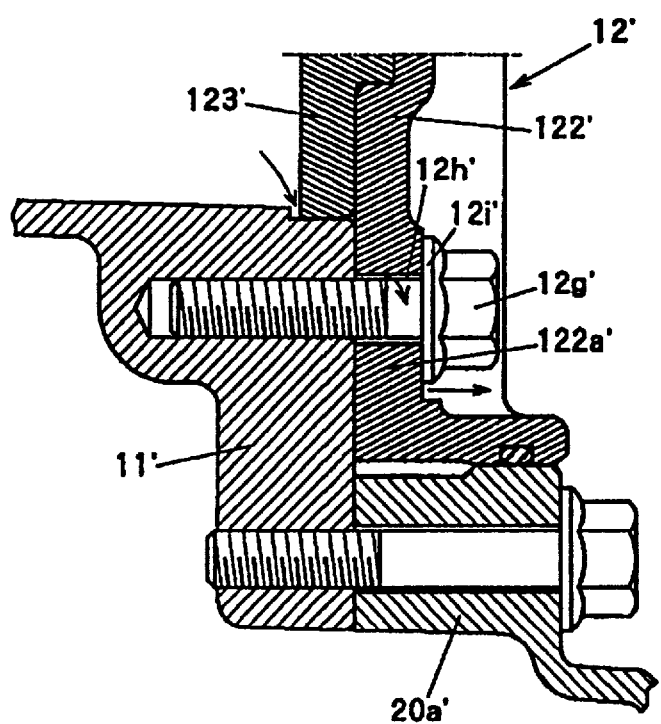
FIG. 35 is a cross-sectional view showing a comparative structure showing an oil pump fitting structure of FIG. 34.

As shown in FIG. 35, if lubrication oil in a transmission housing 11 closed by the oil pump housing 12' enters into bolt holes 12h' formed in the pump housing 122' passing through an interface between a flange 122a' of the pump housing 122' and the transmission housing 11', it possibly leaks into the converter housing 20a', i.e. out of the transmission housing 11', passing through gaps between bolt shoulders 12i' of the bolts 12g' and the pump housing 122'.

As shown in FIGS. 33 and 34, in order to prevent such leakage of the lubrication oil, the flange 122a of the pump housing 122 is formed at its back with oil grooves 12j extending between some of bolt holes 12h formed in a lower part of the flange 122a and the outer periphery of the flange 122a. The flange 122a is further provided with a circumferential space 12k between a cylindrical flange extension 122b and the converter housing 20a behind the O-ring 122c so as to adjacent to the oil grooves 12j. This space 12k is in communication with the inside of a front cover 70a of the differential 70 adjacent to the converter housing 20a. Consequently, as indicated by an arrow in FIG. 33, even if the lubrication oil in the transmission housing 11 enters the bolt holes 12h of the pump housing 122 through the interface between the flange 122a of the pump housing 122 and the transmission housing 11, it enters the inside of the differential 70 through the space 12k between the pump housing 122 and the converter housing 20a via the oil grooves 12j extending to the bolt holes 12h.

Rotary Element Positioning

Figure 36:
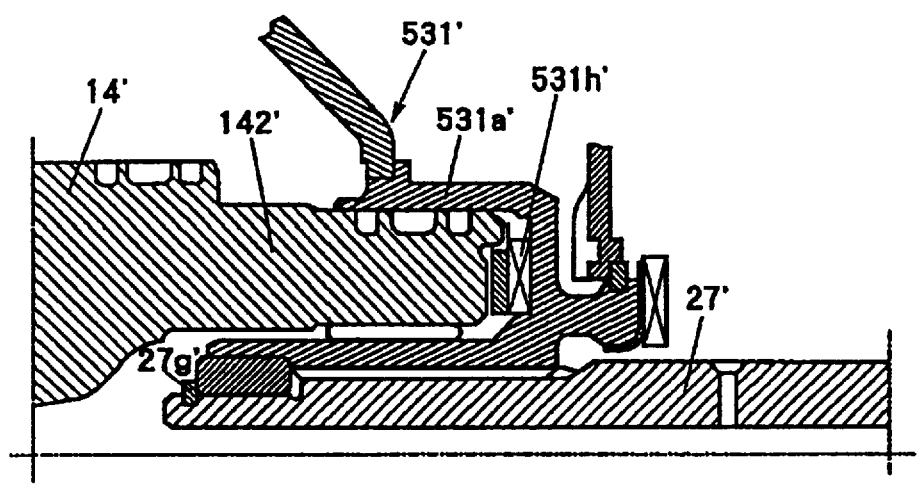
FIG. 36 is a cross-sectional view showing a conventional turbine shaft positioning structure.

The automatic transmission 10 includes various rotary elements on the turbine shaft 27. In order to position the turbine shaft 27 itself and the rotary elements with respect to the transmission housing 11, thrust bearings and snap rings may be used. For instance, as shown in FIG. 36, it is typical to fit to the turbine shaft 27' a snap ring 27g' behind the clutch drum 531' of the 3-4 clutch, which is a rearmost rotary element, and a thrust bearing 531h' between the drum base 531a' of the clutch drum 531' and a front end of the second boss 142' extending from the rear cover 14'. With these snap spring and bearing, since the first and second planetary gearsets 30 and 40 place their rotary elements between these positioning elements and the partition 111 of the transmission housing 11 (not shown), the turbine shaft 27' is positioned in its forward position by the partition 111 with the assistance of the snap ring 27g', the clutch drum 531' of the 3-4 clutch and the related elements before the clutch drum 531' and in its rear position by the second boss 142' with the assistance of the clutch drum 531' and the thrust bearing 531h'.

Figure 37:
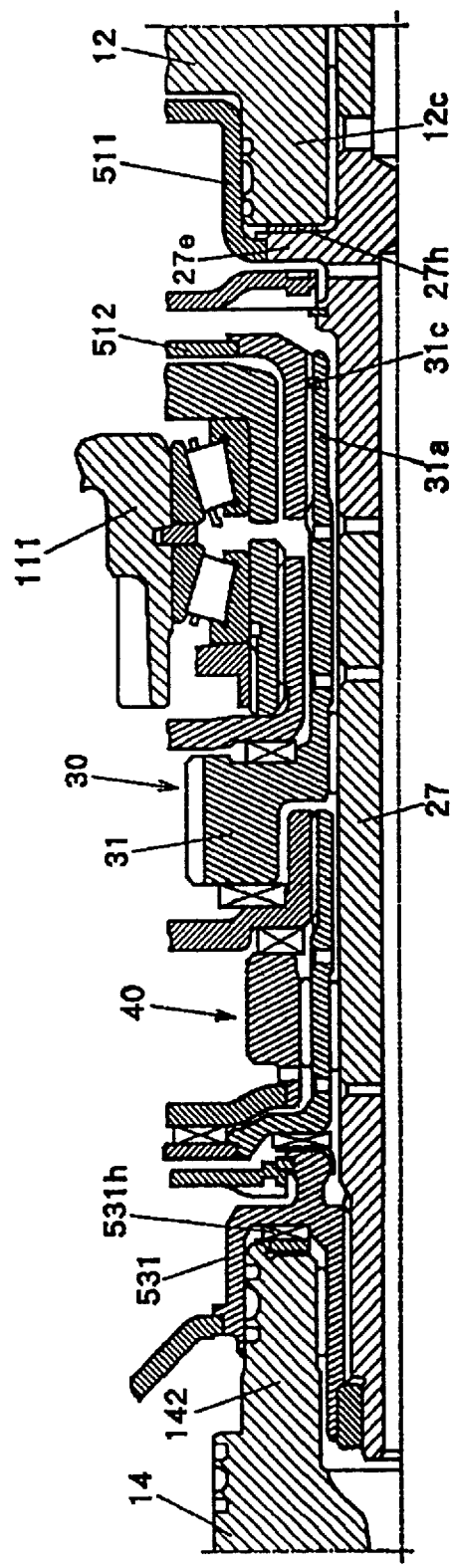
FIG. 37 is an enlarged cross-sectional view showing part around the turbine shaft of FIG. 2.

As shown in FIG. 37, in such a way of positioning rotary elements on the turbine shaft, the hub 521 of the forward clutch 51 is connected to the front extension 31a of the sun gear 31 of the first planetary gearset 30 by the ring clip 31c in a position forward from the partition 111. If there is a demand for ascertaining the condition of connection, it is necessary, on one hand, to create, on one hand, a condition in which the sun gear 31 is prevented from moving backward by attaching the rear cover 14 to the transmission housing 11 after having installed all parts to be installed behind the partition 111 and, on the other hand, a condition in which only the hub 512 of the forward clutch 51 is installed in front the partition 111. At this time that these conditions, which enable to ascertain the condition of connection, are created, the turbine shaft has not yet been installed.

When it is intended to install the turbine shaft after the completion of installation of all of the parts behind the partition 111 and attaching the rear cover 14 to the transmission housing 11, the installation of the turbine shaft 27 makes it impossible to install the snap ring 27g' behind the clutch drum 531 of the 2-3 clutch 53. That is, it is impossible to position the turbine shaft 27 in its desired forward position by means of the snap ring 27g'.

The turbine shaft 27 is positioned in its backward position by the rear end of the second boss 142 of the rear cover 14 through the clutch drum 531 of the 3-4 clutch 53 and the thrust bearing 531h in the same manner as the conventional structure shown in FIG. 36 and, however, positioned in its forward position by the rear end of the boss 12c through a washer 27h disposed between the flange 27e to which the clutch drum 511 of the forward clutch 51 immediately behind the oil pump 12 is secured and the rear end of the boss 12c disposed forward from the oil pump 12. According to the positioning structure, while it is enabled to ascertain the condition of connection between the front extension 31a of the sun gear 31 of the first planetary gearset 30 and the hub 512 of the forward clutch 51 by the 31c by the ring clip 31c, the snap ring 27g', which is necessary for the conventional transmissions to dispose rotary elements in position on the turbine shaft 27, may be eliminated.

Oil Passage Structure in Rear Cover

Figure 38:
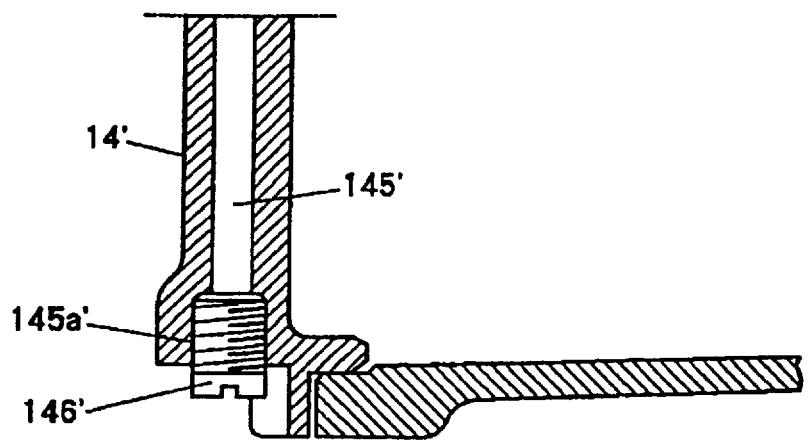
FIG. 38 is a cross-sectional view showing a conventional oil passage structure for a rear cover.
Figure 39:
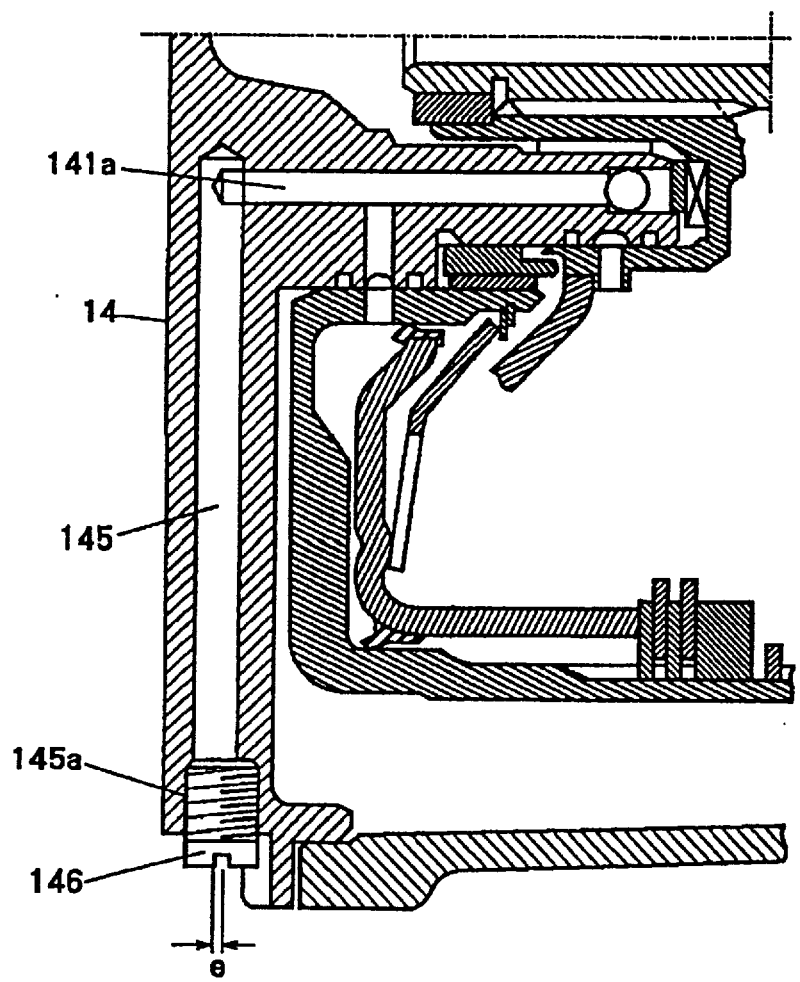
FIG. 39 is an enlarged cross-sectional view showing part around the oil passage and its associated parts of FIG. 2.

Because the bosses 141 and 142 of the rear cover 14 of the transmission housing 14 support the reverse clutch 52 and the 3-4 clutch 53, it is appreciated to form passages for an operating oil for these clutches 52 and 53 in the rear cover 14. As shown in FIG. 39, a passage 145 is formed as one of these oil passages so as to extend radially from the outer periphery of the cover 14 and join the axially extending oil passage 141a formed in the first boss 141. An opening 145a on the outer periphery of the cover 14 is closed by a screw plug 146. In such an oil passage arrangement, as shown in FIG. 38, a part of the rear cover 14' where an oil passage 145' is formed is generally made by a thick wall. A part of the rear cover 14' where a screw plug 146' is fitted into an opening 145a' must be formed so that the opening 145a' has a diameter larger than that of the oil passage 145' and surround the opening 145a' by a wall thicker than the remaining part. Accordingly, the thick wall part of the rear cover 14 projects backward, leading to an increase in overall axial length of the automatic transmission 10. Then, as shown in FIG. 39, in the automatic transmission 10 of the present invention, the oil passage 145 is bored in the rear cover 14 so as to extend from radially from the outer periphery of the rear cover 14 and is closed at its end opening 145a by a screw plug 146. A screw bore to which the screw plug 146 is engaged is off positioned forward from the center line by a distance e so as to place the entire circumference of female threads outside the inner wall of the oil passage 145. With the oil passage 145 thus formed, while the part of the rear cover 14 surrounding the screw bore, in particular behind the screw bore, has a sufficient thickness of wall, it does not project backward, providing a shortened overall length of the automatic transmission 10.

One-Way Clutch Lubrication

Immediately behind the partition 111 in the transmission housing 11 there is disposed the one-way clutch 56. This one-way clutch 56 is supported by the sprag 564, disposed between the inner race 561 spline-coupled to a boss 111e extending backward from the partition 111 and a hub (the front extension 34a of the ring gear 34) of the low-reverse brake 55 positioned outside the inner race 561, which are retained by front and rear retainers 562 and 563. These sprag 564 and retainers 562 and 563 must be supplied with lubrication oil. In this instance, while the transmission housing 11 may be formed for lubrication with an oil passage extending from the partition 111 to the spline-coupling of the inner race 561 via the inside of the boss 111e as well as an oil passage formed in the inner race 561 and extending from its inner surface to its outer surface, nevertheless, since the partition 111 is inside the transmission housing 11, it is very difficult to form a curved oil passage extending from the partition 111 to the boss 111e extending from the partition 111.

Figure 40:
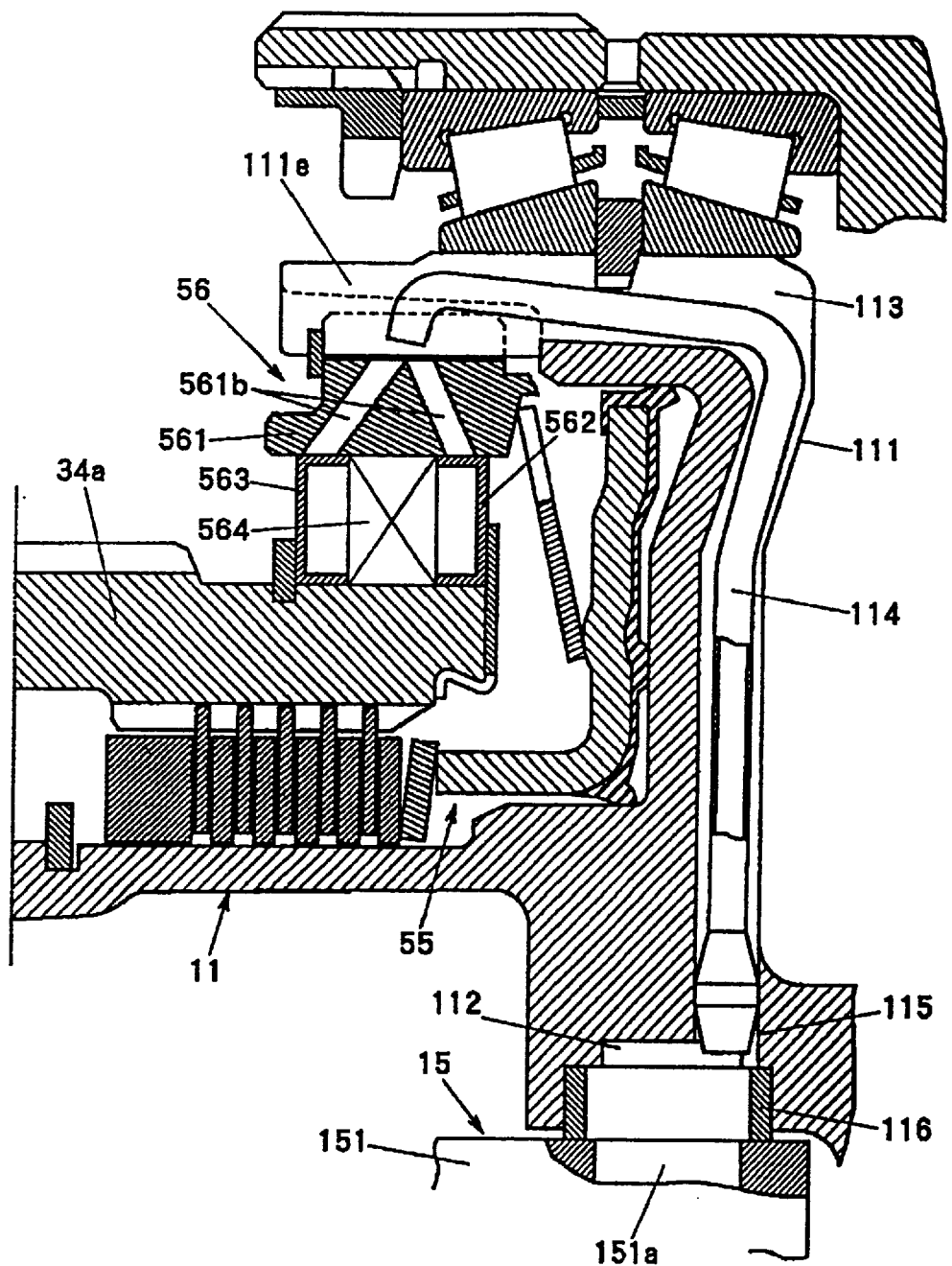
FIG. 40 is an enlarged cross-sectional view of an oil passage for the one-way clutch of FIG. 2.

Therefore, as shown in FIG. 40, in the automatic transmission 10, the transmission housing 11 is formed with a groove 113 extending radially upward from an oil entry port 112 formed in a fitting to which the valve body 151 including the control valves 15 is attached and curving backward to the bottom land of the external spline of the boss 111e. An oil pipe 114, which is curved like the groove 113, is press-fitted into an entry port 115 of the oil entry port 112 at its lower end so as to be directed to the valve body 151 and faces the inner race 561 coupled to the spline via the bottom land of spline at its upper end. The inner race 561 is formed with oil guide bores 561b extending from the inside to which the sprag 564 and the retainers 562 and 563 contact to the outside at a location where the fore end of the oil pipe 114 faces. A lubrication oil discharge port 151a of the valve body 151 is connected to the oil entry port 112 by a connecting and sealing ring 116.

With the structure for lubrication, when the lubrication oil is discharged from the valve body 151 through the oil discharge port 151a, it is introduced into the oil pipe 114 via the oil entry port 112 at the bottom of the transmission housing 11 and, then, to the outer surface of the inner race 561 of the one-way clutch 56 through the oil pipe 114. Further, the lubrication oil is directed toward the interface between the inner race 561 and the sprag 564 and the retainers 562 and 563, as well as between the inner race 561 and the clutch drum of the low-reverse brake 55, through the oil guide bores 561b. Accordingly, it is unnecessary for the lubrication of the one-way clutch 56 to provide a curved oil passage in the partition 111 and the boss 111e extending backward from the partition.

2-4 Brake Servo Mechanism (I)

Figure 41:
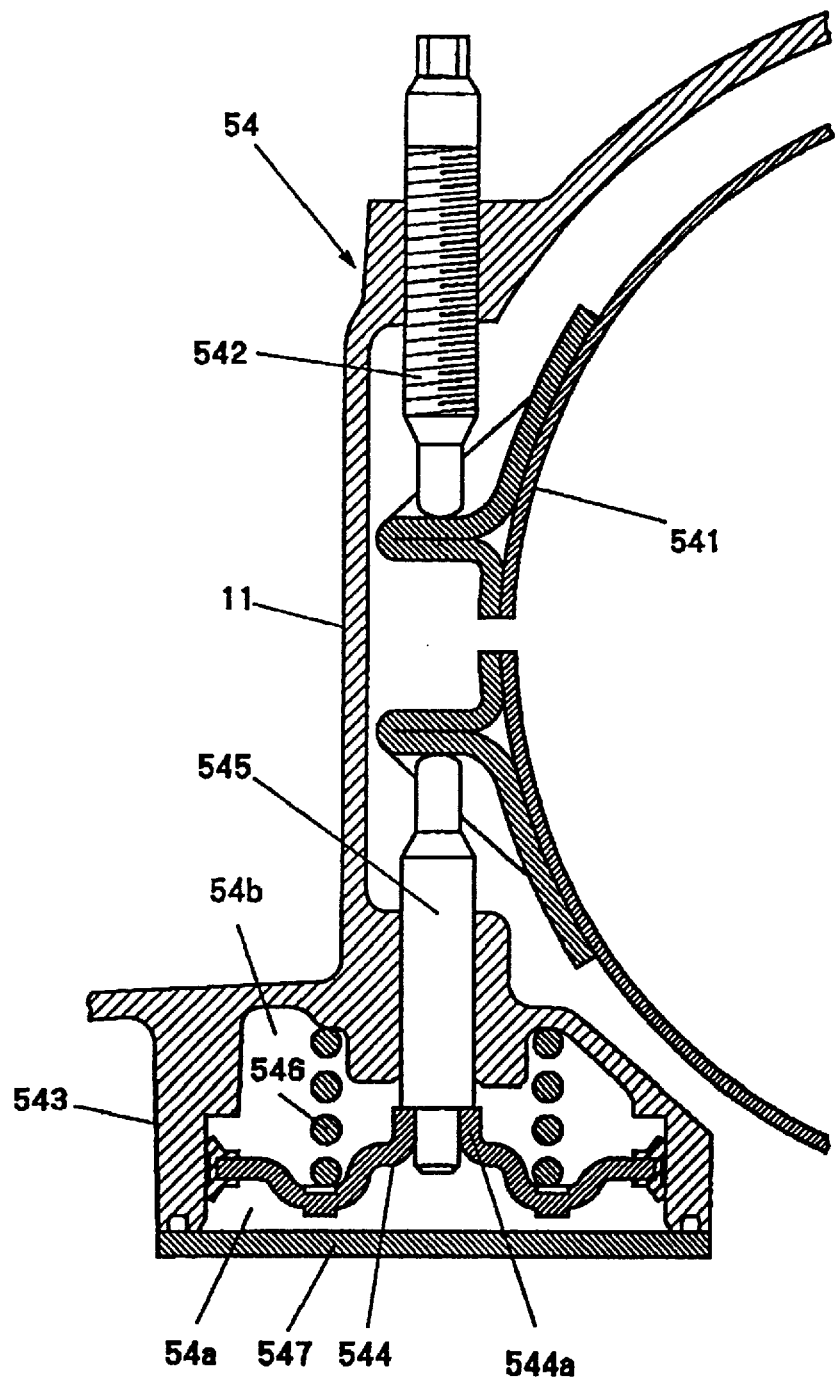
FIG. 41 is an enlarged cross-sectional view of an servo cylinder of FIG. 2.

As shown in FIG. 41, the 2-4 brake 54 has an hydraulically operated actuator comprising a band brake 541 surrounding a drum (not shown), a fixing stem 542 for fixing one end of the band brake 541, a servo piston 544 received in a hydraulic servo cylinder 543, a brake band tightening stem 545 connected to the servo piston 544, and a return spring 546 urging the servo piston 544 so as to loose the brake band 541. The hydraulic servo cylinder 543 has pressure chambers, namely a brake apply pressure chamber (APC) 54a un one side of the servo piston 544 and a brake release pressure chamber (RPC) 54b on another side of the servo piston 54b. The band brake 541 is tightened to couple the 2-4 brake 54 when a hydraulic operating pressure is supplied only to the brake apply pressure chamber (APC) 54a. On the other hand, the band brake 541 is loosen to uncouple the 2-4 brake 54 when an operating pressure is not in both the servo pressure chambers (APC and RPC) 54a and 54b, when an operating pressure is in both these servo pressure chambers (APC and RPC) 54a and 54b, or when an operating pressure is supplied only to the brake release pressure chamber (RPC) 54a.

Whereas, it id typical for the servo piston for this type of band brake to have pressure receiving areas different between these servo pressure chambers (APC and RPC) 54a and 54b. In such the case, the servo piston is casted of an aluminum alloy and configured in the form of a double-deck plate comprising small and large diameters of walls. Further, a stem is firmly secured to the double-deck piston plate by a lock nut. This piston configuration boosts manufacturing costs of the piston and its related cylinder and increases the number of necessary parts.

As shown in FIG. 41, the automatic transmission 10 has the 2-4 brake 54 which includes the hydraulic servo cylinder 543 having a uniform diameter of cylindrical bore and a servo piston 544 made by pressing a plate. The servo piston 544 is formed with a cylindrical bore 544a into which a stem 545 is firmly press fitted. A bottom cover 547 for closing a bottom opening of the servo cylinder 543 is made of a pressed plate. The servo piston structure renders the elements, such as the piston 544, the servo cylinder 543 and the bottom cover 547 easy to be made and avoid the use of a lock nut, yielding a cost reduction and a reduction of the number of parts.

2-4 Brake Servo Mechanism (II)

It is essential for the 2-4 brake to have oil passages for oil supply to the brake apply pressure chamber (APC) 54a and the brake release pressure chamber (RPC) 54b, respectively. Each oil passage opens into the pressure chamber at a side of the cylinder. This makes the cylinder large which always leads to an elongated overall length of the automatic transmission 10.

Figure 42:
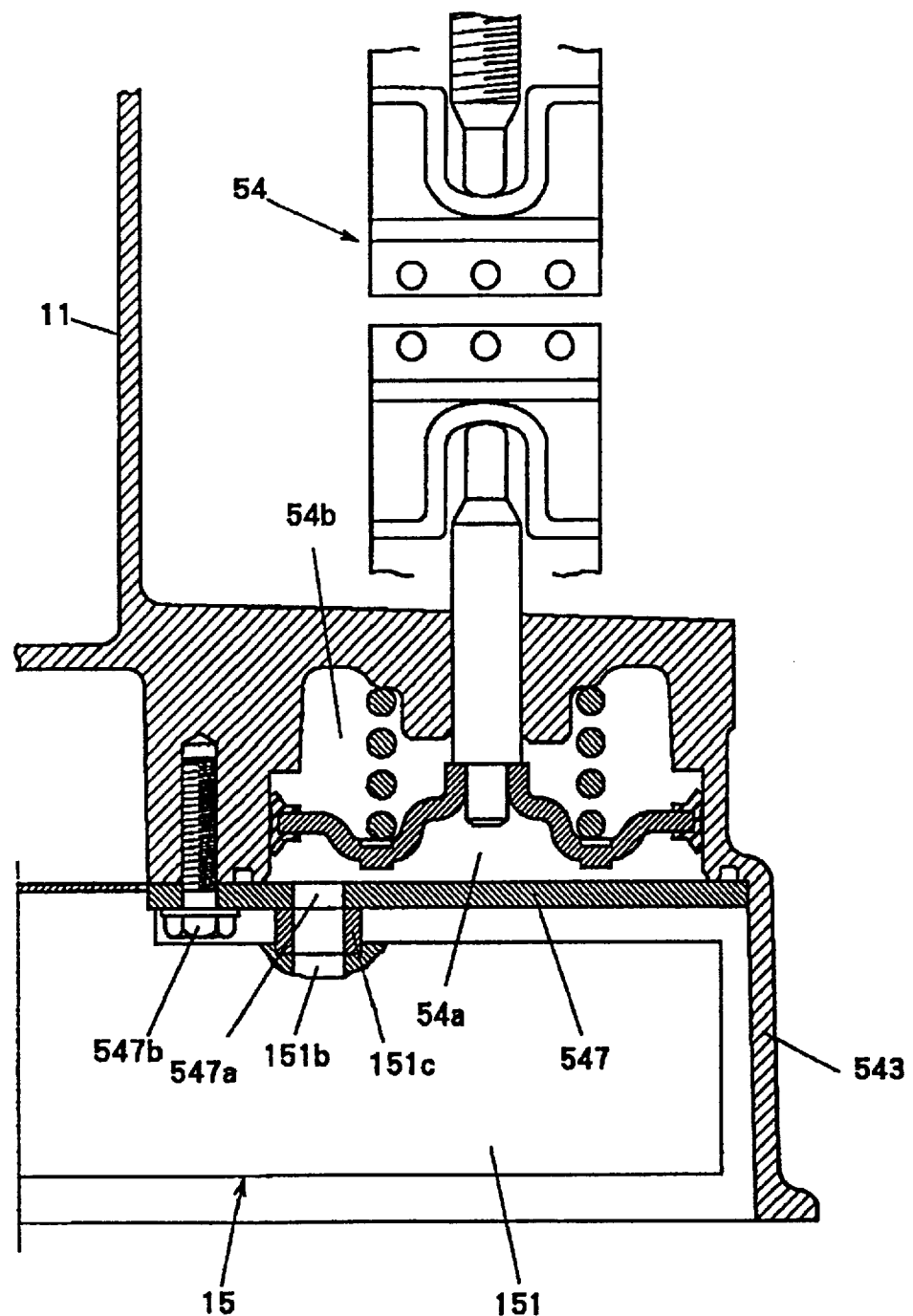
FIG. 42 is an enlarged cross-sectional view showing a connecting structure between the servo cylinder and a valve body of FIG. 2.

As shown in FIG. 42, the 2-4 brake in the automatic transmission 10 of the present invention is formed with an oil entry port 547a in the bottom cover 547 closing the servo cylinder 543 so as to communicate the valve body 151 attached to the under side of the transmission housing 11 and the brake apply pressure chamber (APC) 54a of the servo cylinder 543 and, correspondingly, a discharge port 151b in the valve body 151 so as to supply the operating pressure into the brake apply pressure chamber 54a of the servo cylinder 543 directly from the valve body 151. These discharge passage 151b and oil entry port 547a are connected by a connecting and sealing ring 151c. Accordingly, the 2-4 brake avoids one of oil passages opening into the servo cylinder 543 at one side, which is contributory to an overall compactness of the automatic transmission 10.

The valve body 151 is attached directly to the under side of the transmission housing 13 through a gasket. However, in this instance, the bottom cover 547 and the head of a fixing bolt 547b project downward from the under side of the transmission housing 11. Since, in order to accommodate these projected parts, the valve body 151 is formed with a top recess, a connecting and sealing ring 151c is disposed in the top recess so as to communicate the oil entry port 547a of the servo cylinder 543 and the oil discharge port 151b of the valve body 15. In consideration of dimensional errors, the connecting and sealing ring 151c is preferred to be made as an elastic member.

(3) Differential Structure

Idle Shaft Bearing Lubrication

The output from the automatic transmission 10 is transmitted to the differential 70 through the idle shaft 61. Specifically, as was described previously in connection with FIG. 3, the output gear 13 of the automatic transmission 10 is in mesh with the first intermediate gear 62 spline-coupled to the idle shaft 61, and the input gear 71 is in mesh with the second intermediate gear 63 formed integrally with the idle shaft 61. The transmission of rotation of the automatic transmission 10 is connected to the differential casing 72 of the differential 70 by means of these gears 13, 62, 63 and 71. The idle shaft 61, which is a hollow shaft, is supported at both ends by the transmission housing 11 through bearings 611 and 612. Similarly, the differential 70 is supported at both ends of the differential casing 72 by the transmission housing 11 through bearings 721. These bearings 611, 612 and 721 and their associated parts must be lubricated as well as the differential. Because a dispersed arrangement of these bearings, it is difficult to lubricate these bearings and parts as a part of the lubrication for the automatic transmission 10 and, together, a sufficient amount of lubrication oil is necessary for these bearings.

Figure 43:
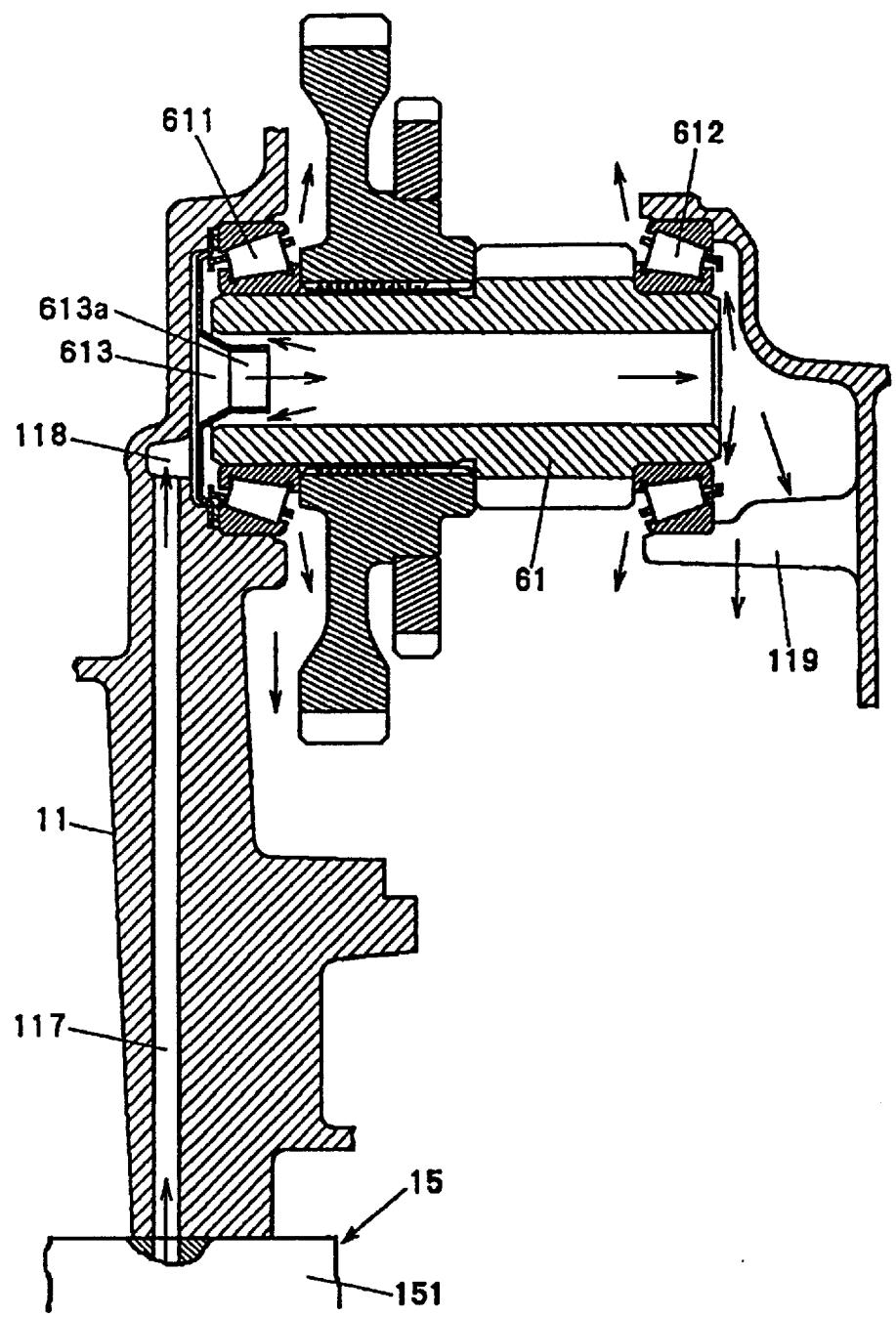
FIG. 43 is an enlarged cross-sectional view showing part around an idle shaft of FIG. 3.

In view of the above, as shown in FIG. 43, in order to force lubrication of the bearings and their associated parts with the valve body 151, the transmission housing 11 is formed with an oil passage 117 extending in close proximity to an oil well 118 formed adjacent to one end of the idle shaft 161 for delivering the lubrication oil to the oil well 118 from the valve body 151. The transmission housing 11 is provided with a guide plate 613 adjacent to one end of the hollow idle shaft 61. The guide plate 613 has a flange inserted between the bearing 611 and the transmission housing 11 and a cylindrical oil entry port 613a inserted into the hollow idle shaft 61 with a circumferential space.

The lubrication oil discharged from the valve body 151 flows up to the oil well 118 through the oil passage 117 of the transmission housing 11 and, then, into the hollow idle shaft 61 through the oil entry port 613a. At this time, as shown by arrows in FIG. 43, the lubrication oil entering through the oil entry port 613a is delivered partly toward the bearing 611 through the space between the guide palate 613 and the idle shaft 61 and partly to another end of the idle shaft 61. At the other end of the idle shaft 61, the lubrication oil is partly directed to the bearing 612 at the other end of the idle shaft 61. The remaining part of the lubrication oil drops toward the bearings 721 of the differential 70 through a space 119 formed in the transmission housing 11 in close proximity to the other end of the idle shaft 61. After the lubrication of the bearings 611 and 612, the remaining lubrication oil drops toward the bearings 721 of the differential 70.

With the forced lubrication, the bearings 611, 612 and 721, as well as the differential itself, are sufficiently lubricated.

Intermediate Gear Fitting Structure

The idle shaft 61 is provided with first and second intermediate gears 62 and 63 which are prepared as helical gears. The intermediate helical gears 62 and 63 are designed so as to have face advances or helix angles which cause a thrust force in a direction in which the thrust force forces the gears 62 and 63 to move toward each other when rotation in the normal direction is transmitted from the automatic transmission 10 to the differential 70. In this case, when rotation in the reversed direction is transmitted from the automatic transmission 10 to the differential 70 or when rotation in the normal direction is transmitted from the differential 70 to the automatic transmission 10, a thrust force occurs in a direction in which the thrust force forces these intermediate helical gears 62 and 63 to move apart from each other. In other words, the thrust force tends to force the intermediate helical gear 62 to come off from the idle shaft 61. In this instance, These intermediate gears 62 and 63 push inner races 611a and 612a of the bearing 611c and 612c, respectively, in the direction in which the inner races 611a and 612a come off from the idle shaft 61. If taper roller bearings are used, the thrust force causes an increase in roller gripping or retaining force in excess of an allowable increase between the inner and outer races 611a and 611b of the bearing 611 and between the inner and outer races 612a and 612b of the bearing 612. Such an increase in roller gripping force is always undesirable in terms of durability of the intermediate bearings 611 and 612 and resistance of the idle shaft 61 relating to rotation.

While it is conventionally typical to prevent the inner race of the bearing from coming off from the idle shaft by a nut or a snap ring fitted to the idle shaft on the outer side of the inner race, nevertheless, an increased number of parts are required.

Figure 44:
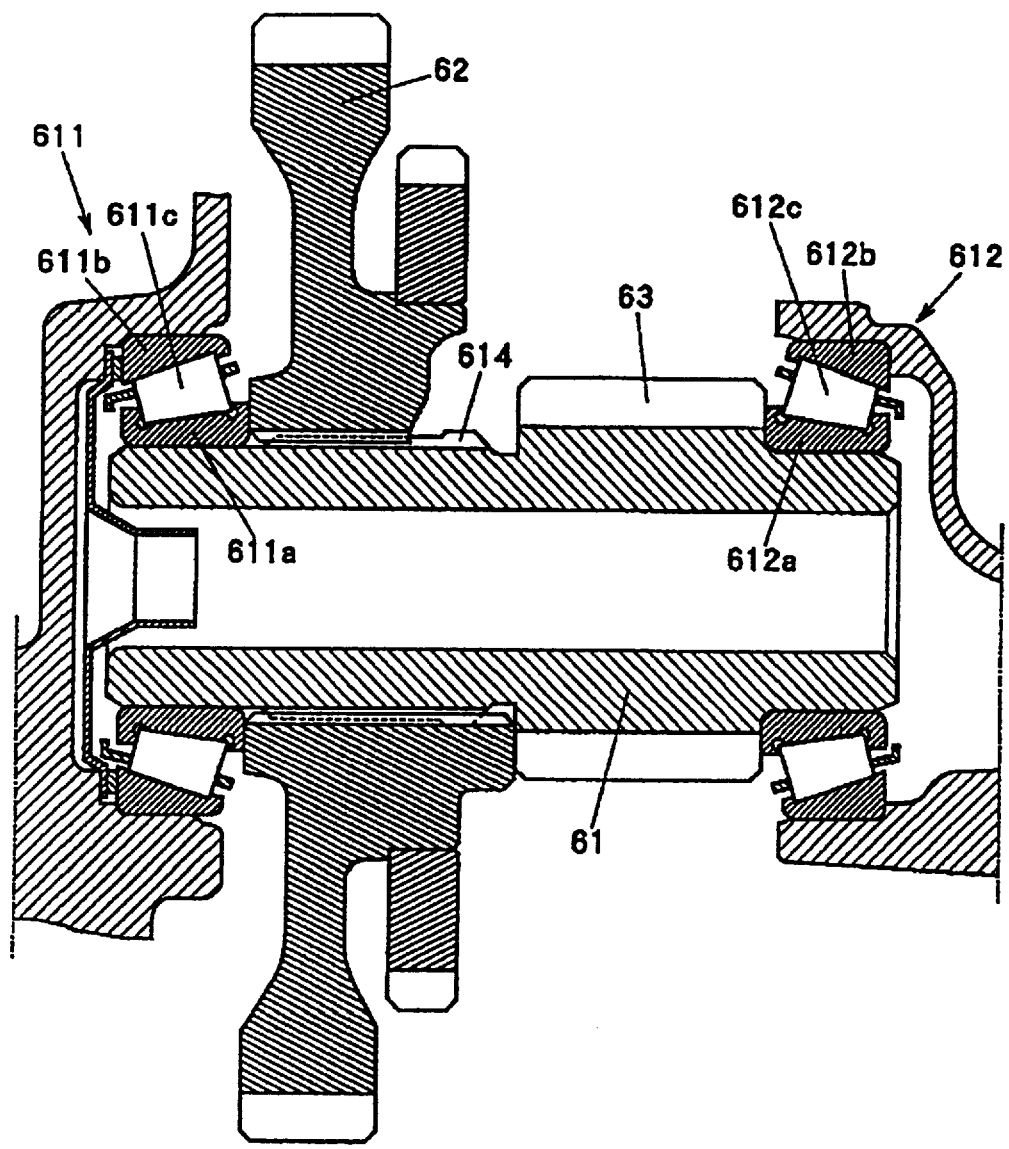
FIG. 44 is an enlarged cross-sectional view showing essential part of the idle shaft of FIG. 3.

As shown in FIG. 44, the spline shaft end of the idle shaft to which the first intermediate gear 61 is spline-coupled is formed with spline teeth each of which is formed with an end stop projection 614. When the first intermediate gear 61 is forced to fit to idle shaft 61, the end stop projections 614 are press-fitted into the counter spline groove. In such a way, the first intermediate gear 62 is press-fitted to the idle shaft 61 without difficulties even though the idle shaft 61 has spline teeth formed with end stop projections 614 and, consequently, even if a thrust force is produced so as to force the first and second intermediate gears 62 and 63 to move apart from each other during the transmission of rotation in the normal direction, or even in the reversed direction, made from the automatic transmission 10 to the differential 70 or vice versa, the thrust force is insufficient or incompetent to force the inner races 611a and 612a of the bearings 611 and 612 off from the idle shaft 61. Accordingly, the intermediate gear fitting structure prevents an excessive increase in gripping or retaining force without using retainer snap rings or nuts.

Speed Sensor Structure

Typically, at least either one of the output shaft of the automatic transmission 10 and any one of rotary members associated to the differential 70, which rotate at a rotational speed almost proportional to a vehicle speed, is provided with a speed sensor for detecting a speed of rotations. One of this kind of speed sensors is a dynamo type sensor which includes a generator driven by a rotary member through a gear and providing an electric output representative the speed of the rotary member. Another one is an electromagnetic pickup sensor of the type which monitors a change in electric field caused according to the speed of rotation of a gear by which the sensor is operationally coupled to a rotary member. Each of these speed sensors needs a gear rotating at a speed corresponding to a vehicle speed which is formed integrally with, or otherwise prepared separately from, the rotary member, leading to an increase in machining costs.

Figure 45:
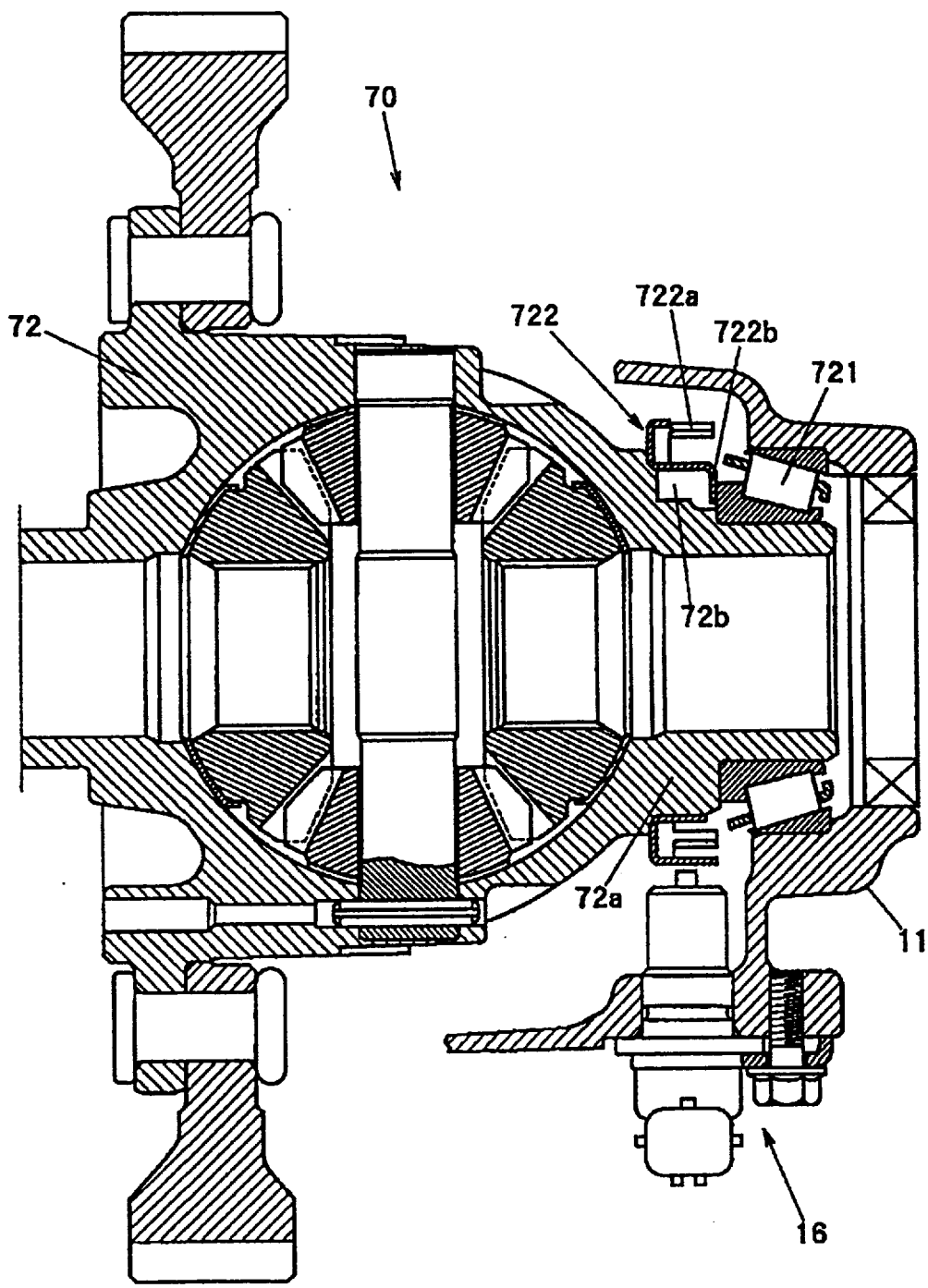
FIG. 45 is a cross-sectional view of a differential cooperating with the automatic transmission.

As shown in FIG. 45, the automatic transmission 10 has the electromagnetic type of a speed sensor which includes a gear member 722 secured to the differential casing 72 of the differential 70. The gear member 722 is press-formed like a ring from a metal plate so as to have a generally U-shaped cross section defined by inner, outer and bottom walls. The ring-shaped gear member 722 is formed with a number of external teeth 722a which extend in an axial direction of the differential 70 and arranged at regular circumferential angular separations on the outer wall. Further, the ring-shaped gear member 722 is formed with at least one radial claw extending inward from the inner wall. On the other hand, the differential casing 72 is integrally formed with a cylindrical wall 72a having a diameter larger than that of a boss to which the bearing 721 is fitted and a notch 72b engageable with the claw 72a. The gear member 722 is press-fitted to the cylindrical wall 72a with the claw 72a engaged with the notch 72b. When the bearing 721 is press-fitted to the boss of the differential casing 72, the gear member 722 is prevented from turning on and slipping off from the cylindrical wall 72a. On the other hand, the transmission housing 11 is provided with an electromagnetic pickup 16 in close proximity the external teeth 722a of the ring-shaped gear member 722. The electromagnetic pickup 16 detects fluctuations in magnetic field caused by the external teeth 722a of the ring-shaped gear member 722 rotating together with the differential casing 72. As is well known in the art, the speed of rotation of the gear member 722, and hence the differential casing 72, is found on the basis of the detected fluctuations. Only the press-formed ring gear member 722 is needed as a rotation mediating member between the differential 70 and the rotary member, i.e. the differential casing 72 in this embodiment, and is simply press-fitted to the rotary member. Accordingly, the speed sensor of the automatic transmission 10 is provided at low costs as compared to those necessitating forming a gear integrally with the rotary member or preparing an extra gear member.

(4) Manual Shift Mechanism

The automatic transmission 10 is manually shifted to various gear ranges through a manual range shift mechanism including a manually operated shift lever, a shift lever positioning mechanism, various control valves in a hydraulic control circuit, a manual valve drive mechanism and a mechanism for interdicting operation of the automatic transmission 10 in a parking range. The following description will be directed to various distinctive mechanism or parts of the manual range shift mechanism.

Parking Rod Shift Mechanism

Figure 46:
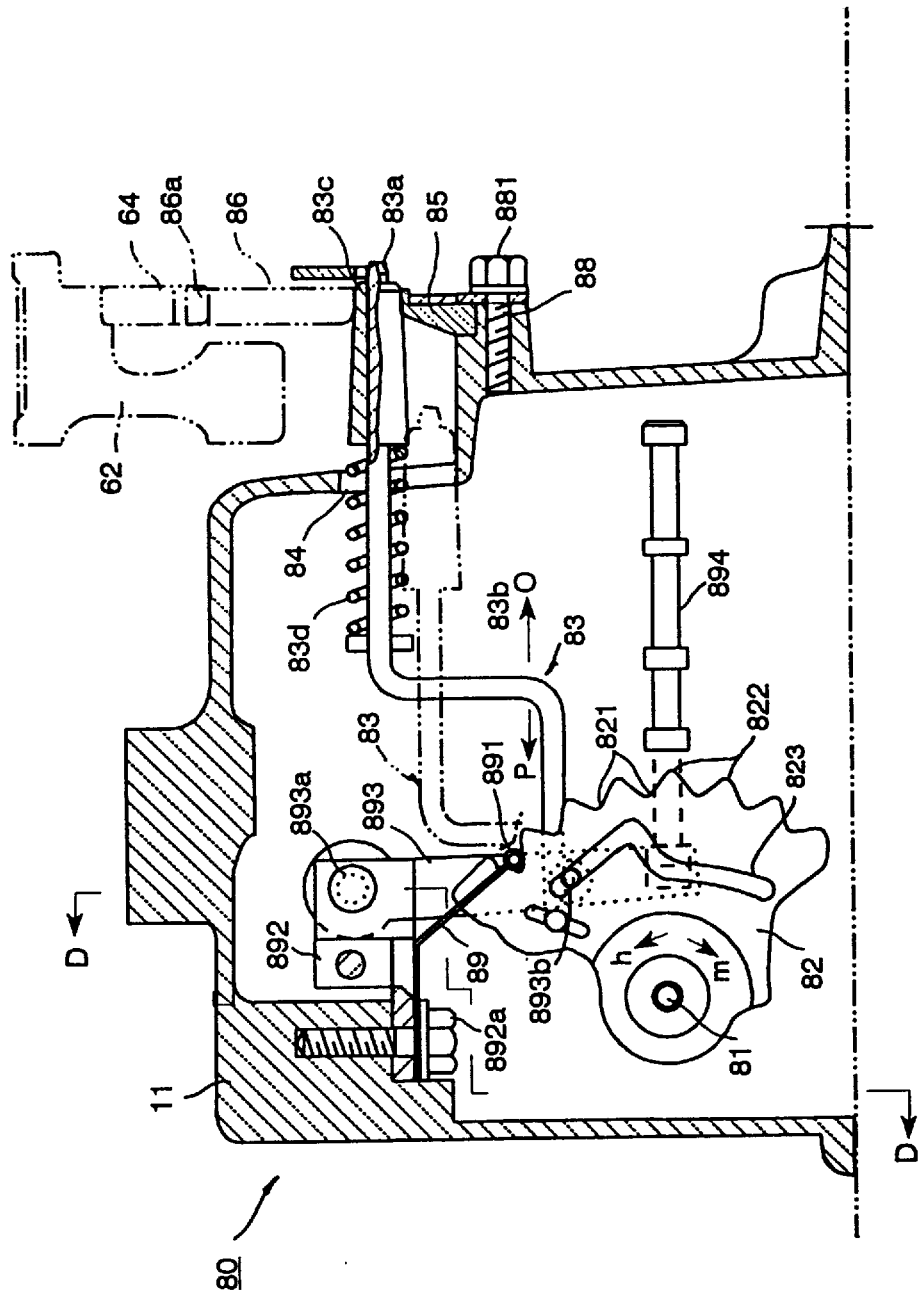
FIG. 46 is a front view showing an manual shift mechanism of the automatic transmission.
Figure 47:
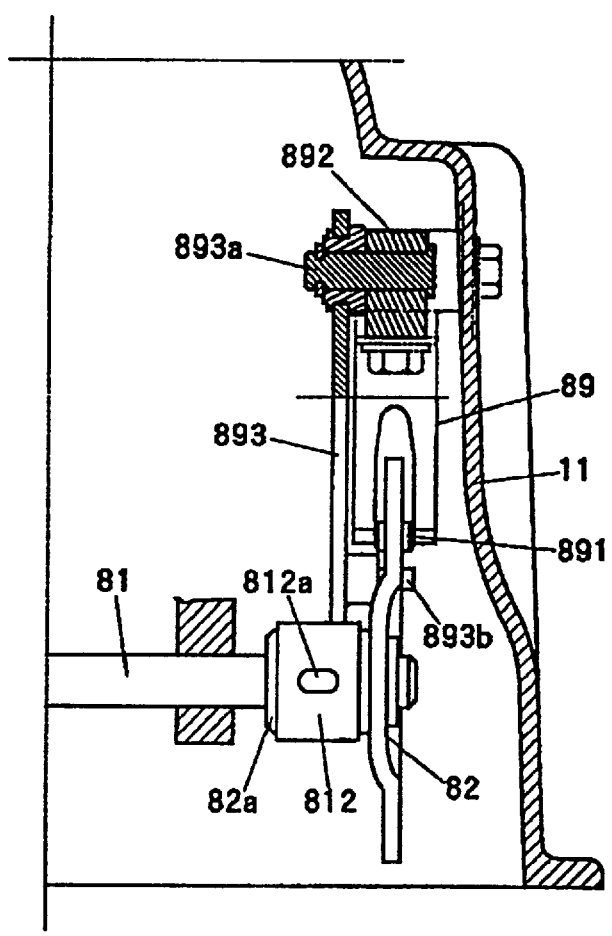
FIG. 47 is a cross-sectional view of FIG. 46 taken along line D—D.

As shown in FIGS. 46 and 47, the manual range shift mechanism 80 is operated by a manually operated shift lever (not shown) linked to a shaft 81 which is capable of rotating in opposite directions indicated by arrows m and h in FIG. 46. The shaft 81 is provided with a manual shift plate 82 integrally attached to one end of the shaft 81. Specifically, when the shift lever selects a parking (P) position, the manual shift plate 82 turns to its extreme position in the direction m, i.e. the clockwise direction as viewed in FIG. 46. On the other hand, when the manual shift plate 82 turns from the parking position in the direction A, i.e. the counter clockwise direction as viewed in FIG. 46, following operation of the shift lever, it takes a reverse (R) range position, a neutral (N) range position, a drive (D) range positions and various forward gear range positions in order from the parking position. The manual shift plate 82 is linked to a crank-shaped parking rod 83 pivotally supported at one end by the manual shift lever so as to move it horizontally back and forth as indicated by arrows 0 and p in FIG. 46 when turning. The parking rod 83 is positioned at its one end remote from the manual shift plate 82 within the transmission housing 11 through an opening 84. The parking rod 83 is comprised of two portions, namely a head portion 83a and a body portion 83b smaller in diameter than the head portion 83a. A frust-conically-shaped push ring 83c is mounted for slide movement on the body portion 83b of the parking rod 83 and urged by an expansion coil spring 83d mounted on the parking rod 83 so as to abut against the rod head 83a.

With the manual shift mechanism thus structured, when the shift lever selects the parking (P) range and forces the manual shift plate 82 to turn in the clockwise direction m, the parking rod 83 is forced in the direction o so as to abuts a support actuator 85 at the push ring 83c. As the parking rod 83 is further advanced, the push ring 83c, and hence the parking rod 83 itself, is pushed up through slide movement of the push ring 83c at its tapered side relative to the support actuator 85 as shown by a solid line in FIG. 46. As a result, a locking arm 86 pivotally mounted on a shaft (not shown) is pushed up by the push ring 83c so as to bring a locking click 86a thereof into engagement with a toothed wheel 64 integral with the first intermediate gear 62 mounted on the idle shaft 61, thereby locking the idle gear 61. Through the engagement between the locking arm 86 and the toothed wheel 64, the idle shaft 61, and hence the axles 73 and 74, are disabled to rotate when the shift lever selects the parking (P) position. In this way, the vehicle is prevented from running in any way during parking.

In this instance, the push ring 83c is pushed up when the parking rod 83 is forced to its front end position, i.e. the parking position, by the shift lever through the parking plate and, when the shift lever selects any one of the possible range positions other than the parking position, it is moved back to a range select position away from the parking position where it is free from the support actuator 85. The transmission housing 11 is formed with an opening 84 for allowing the parking rod 83 to move back and force therethrough and, however, preventing the push ring 83c from passing therethrough into the inside of the transmission housing 11. The parking rod shift mechanism thus structured places the parking rod 83 always in the opening 84 even though the transmission housing 11 has a path length for the parking rod 83, enabling it unnecessary to form transmission housing 11 with a thick wall for the opening 84. In addition, there is provided by the parking rod shift mechanism an improved degree of freedom of laying out various elements necessary for the parking rod shaft mechanism.

Linking Mechanism Between Manual Parking Shaft and Plate

Figure 48:
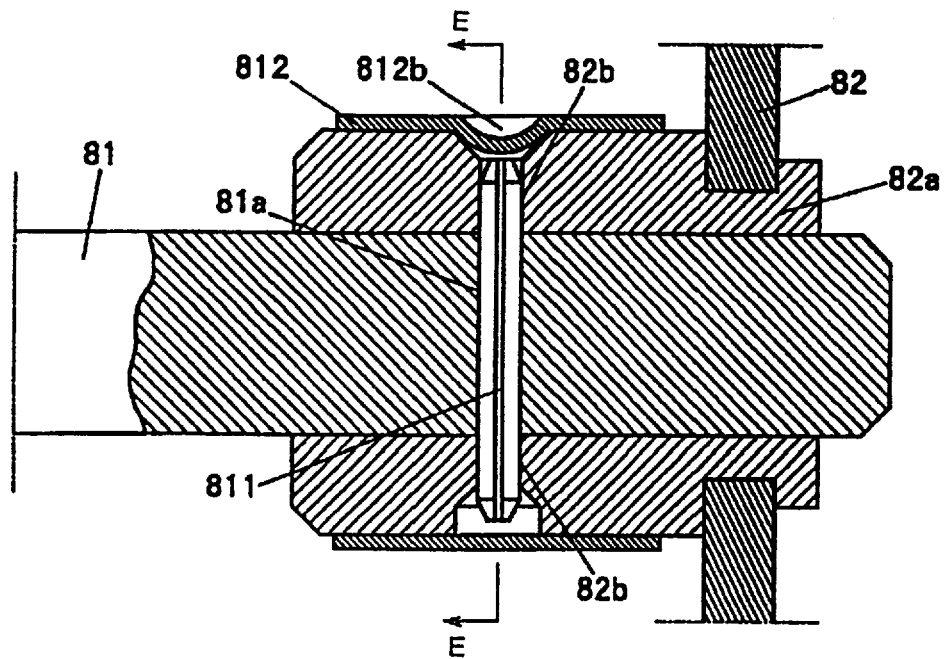
FIG. 48 an enlarged cross-sectional view showing a manual shift plate fitting mechanism of the manual shift mechanism.
Figure 49:
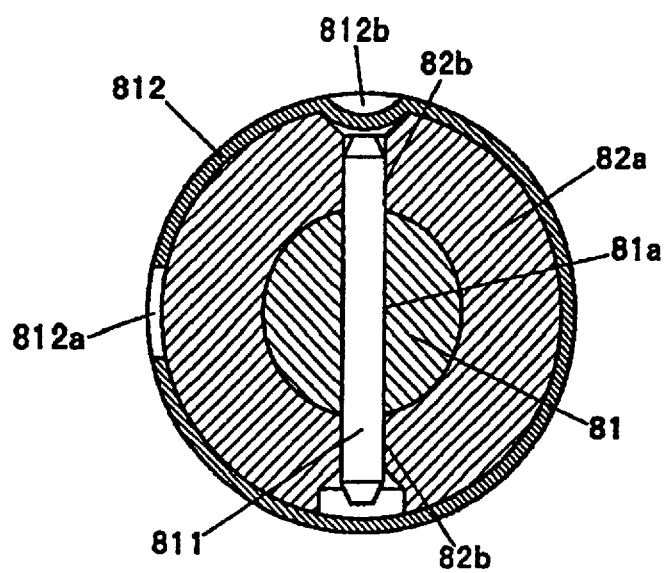
FIG. 49 is a cross-sectional view of FIG. 48 taken along line E—E.

As shown in FIGS. 48 and 49, a cylindrical sleeve 82a is mounted on the shaft 81 and holds the manual shift plate 82 firmly at its one end. A spring pin 811 is press-fitted in pin holes 81a and 82b formed in the shaft 81 and the sleeve 82a, respectively, so as to couple the shaft 81 and manual shift plate 82 together. In order to prevent the spring pin 811 from slipping off from the pin holes 81a and 82b, a cylindrical retainer 812 formed with an opening 812a covers the cylindrical sleeve 82a. After having turned the retainer 812 and the sleeve 811 relative to the shaft 81 so as to bring the opening 812a and pin holes 81a and 82b in alignment with one another, the spring pin 81a is press-fitted in the sleeve 82a and the shaft 81 through the opening 812a. Thereafter, the retainer 812 is turned through less than 180 degrees so as to cover up the spring pin 811. Further, by making a dent 812b in the retainer 812 above the spring pin 811, the retainer 812 is disabled to turn, preventing certainly the spring pin 811 from coming out of the shaft 81 and sleeve 82a.

Support Actuator and Locking Rod

Figure 50:
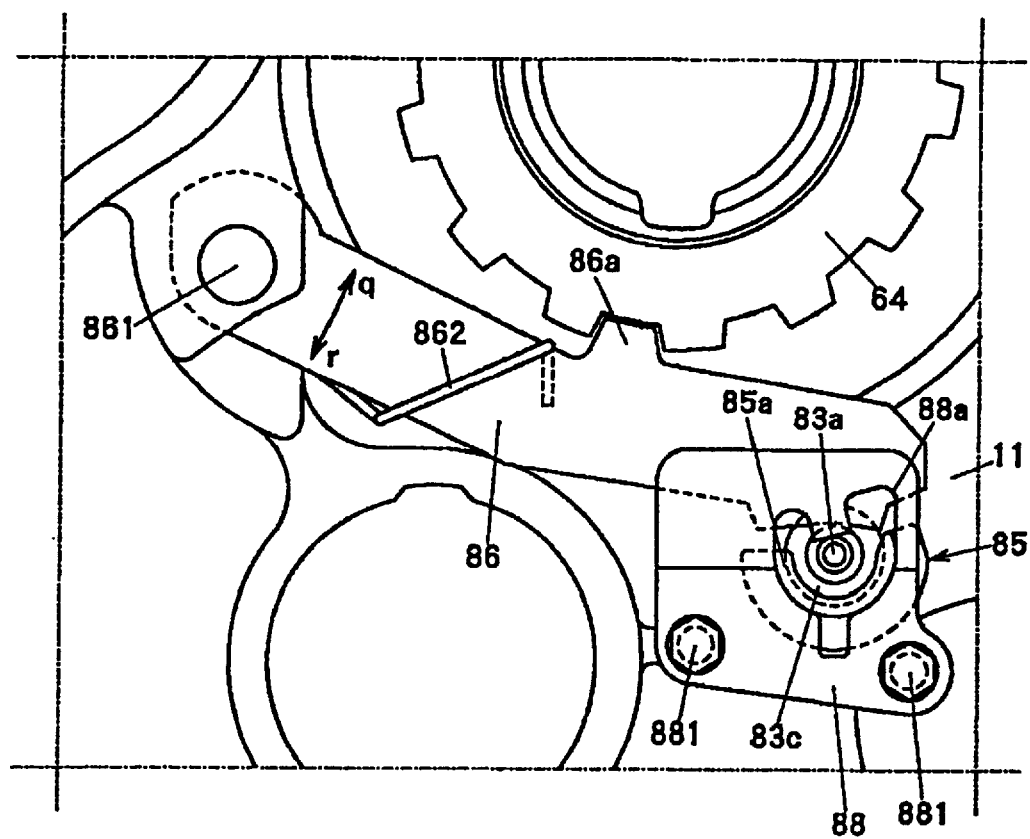
FIG. 50 is a front view showing a parking position locking mechanism of the automatic transmission.
Figure 51:
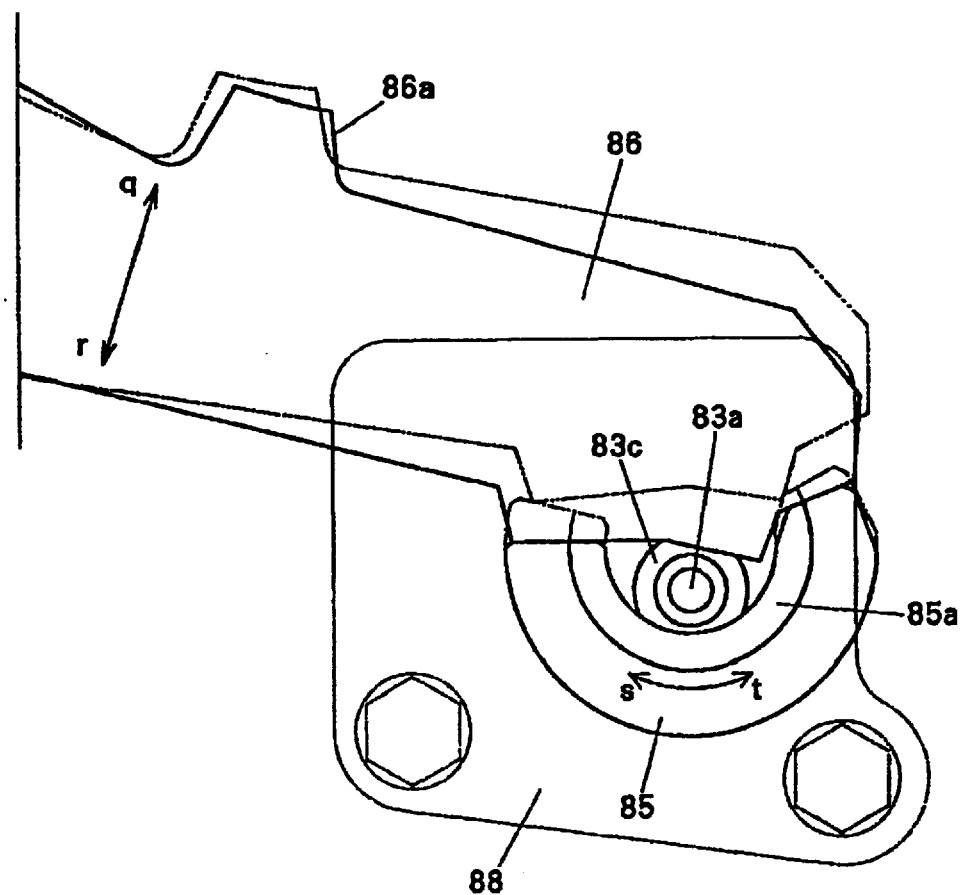
FIG. 51 is an enlarged front view showing essential part around a locking arm of the parking position locking mechanism.

As shown in FIGS. 50 and 51, the support actuator 85, which pushes up the locking arm 86 so as to bring it into engagement with the toothed wheel 64, has a generally C-shaped appearance and is formed with a semicircular inner flange 85a extending forward. An actuator cover 88 is formed with a U-shaped opening 88a partly in conformity with the semi-circular inner flange 85a. This actuator cover 88 is positioned outside of the opening in the side wall of the transmission housing 11 and secured to the transmission housing 11 by bolts with the opening 88a engaged with the semi-circular inner flange 85a of the support actuator 85.

When the parking arm 83 moves toward the center of the support actuator 85, the push ring 83c is brought into abutment against the support actuator 85 and forced upward by the support actuator 85. As a result, the locking arm 86, which is pivotally mounted on a pivot shaft 861 so as to swing in opposite directions q and r, is forced to swing in the direction q, i.e. in the counterclockwise direction as viewed in FIG. 50, bringing the locking click 86a into engagement with the toothed wheel 64 integral with the first intermediate gear 62 on the idle shaft 61. In this instance, the support actuator 85 is pivotal at the semi-circular inner flange 85a in slide engagement with the opening 88a of the actuator cover 88, so as to be able of turning in the directions as shown by arrows s and t in FIG. 51 inside of the actuator cover 88. With the structure, if the shift lever is operated accidentally to select the parking position during running, the locking click 86a of the locking arm 86 is flicked downward by the toothed wheel 64 rotating at a high speed. Even when the C-shaped support actuator 85 receives the bounce of locking arm 86 at either one of its ends first as shown by broken line in FIG. 51, the support actuator 85 turns in either one of the directions s and t and, consequently, automatically centers itself, so as to eventually receive the bounce of locking arm 86 at its both ends. In this sense, the support actuator 85 is not always necessary to have high structural rigidity. The push ring 83c pushing up the locking arm 86 moves back on the body portion 83b of the parking arm 83 against the coil spring 83d.

Spring Fitting Mechanism

During backward movement of the parking arm 83, the locking arm 86 moves downward so as to avoid contact of the locking click 86a with the toothed wheel 64 and is placed in a position where it abuts against both ends of the C-shaped support actuator 85 as shown by solid line in FIG. 51. At this time, the locking arm 83 moves forward toward a space formed between the locking arm 83 and the support actuator 85, producing upward movement of the push ring 83c which forces the locking arm 86 upward.

Figure 52:
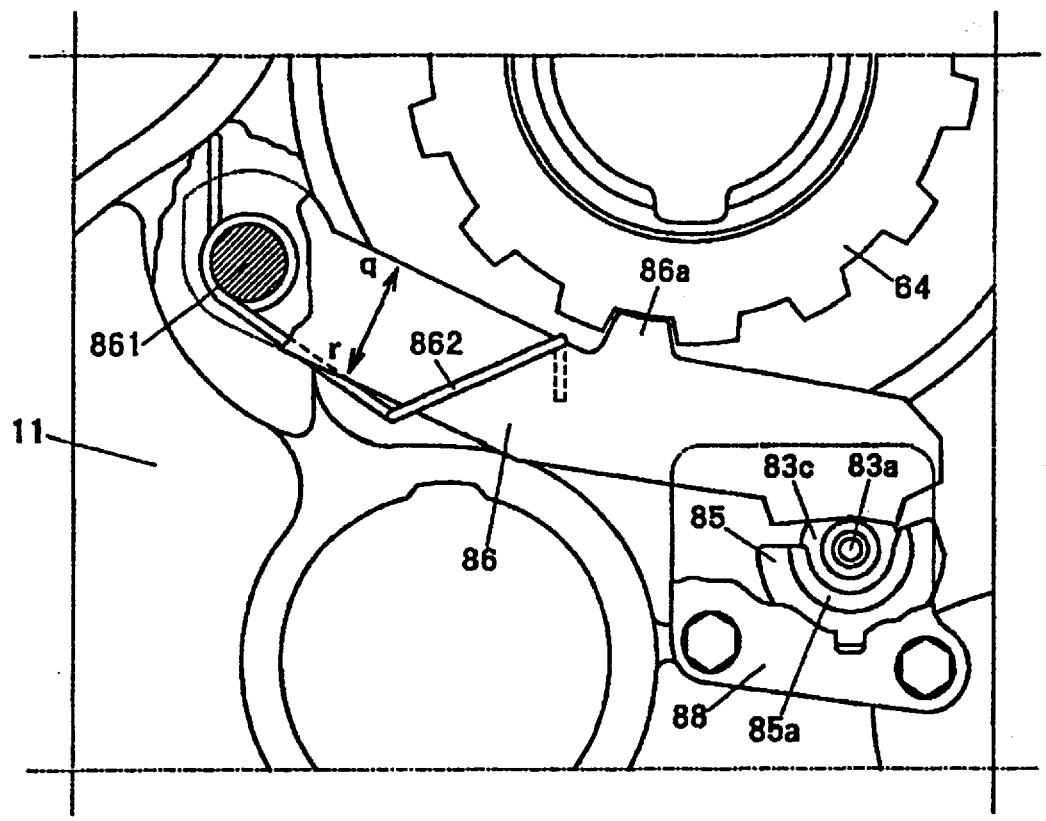
FIG. 52 is a front view showing essential part around a return spring for the locking arm.
Figure 53:
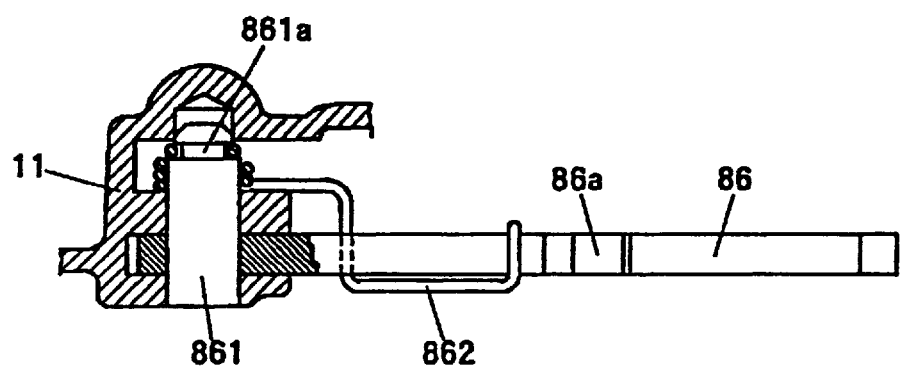
FIG. 53 is a plane view showing essential part around the return spring for the locking arm.

As shown in FIGS. 52 and 53, the locking arm 86 is loaded with a return spring 862 so as to be urged downward. This return spring 862 is mounted around a pivot shaft 861 of the locking arm 86 and is engaged with the locking arm 86 at its one end and with a rim of the transmission housing 11 at its another end. In this instance, the pivot shaft 861 is formed with a peripheral groove 861a for receiving a convolution of the return spring 862. The utilization of such a peripheral groove 861a eliminate use of a retainer, such as a snap ring, for preventing the return spring 862 slipping off from the pivot shaft 861, reducing the number of parts.

Manual Shift Plate Positioning

Figure 54:
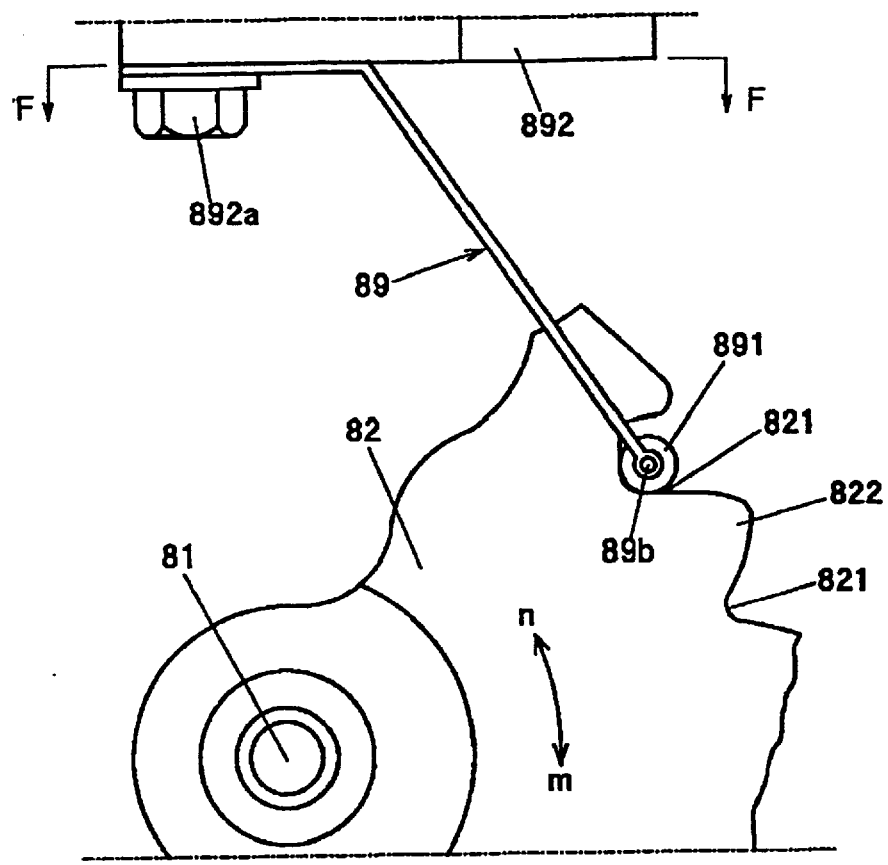
FIG. 54 is an enlarged cross-sectional view showing essential part around a detente spring arm of FIG. 46.
Figure 55:
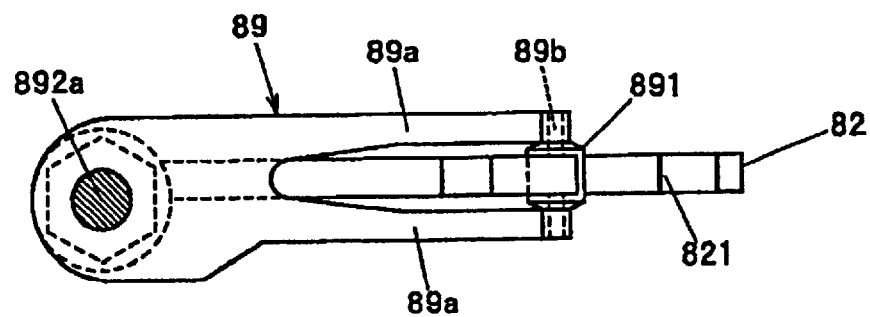
FIG. 55 a plane view showing part around the detente spring arm.

As shown in FIGS. 46 and 54, the manual shift plate 82, which is operated by the shift lever, is formed with a plurality of positioning notches 821 for the possible ranges. A detente spring arm 89 is secured at its one end to the transmission housing 11 by means of a support block 892 and supports a positioning roller 891 for rotation at its distal end. The positioning roller 891 comes in any one of the positioning notches 821 so as to position the manual shift plate 82 in position according to selected ranges. As shown in Detail in FIG. 55, the detente spring arm 89 has two forked arms 89a between which the positioning roller 891 is supported for rotation by means of a support pin 89b. The detente spring arm 89 thus formed supports certainly the positioning roller 891 and places the manual shift plate 82 in position between the forked arms 89a, eliminating mechanical interference between the detente spring arm 89 and the manual shift plate 82 while the positioning roller 891 is in the positioning notches 821. According to the positioning structure, an improvement is made for the degree of freedom of designing the depth of the positioning notches 821, or otherwise the height of slopes 822 defining the positioning notches 821 which the positioning roller 891 rides over during a turn of the manual shift plate 82.

Parking Range Positioning Mechanism

Figure 56:
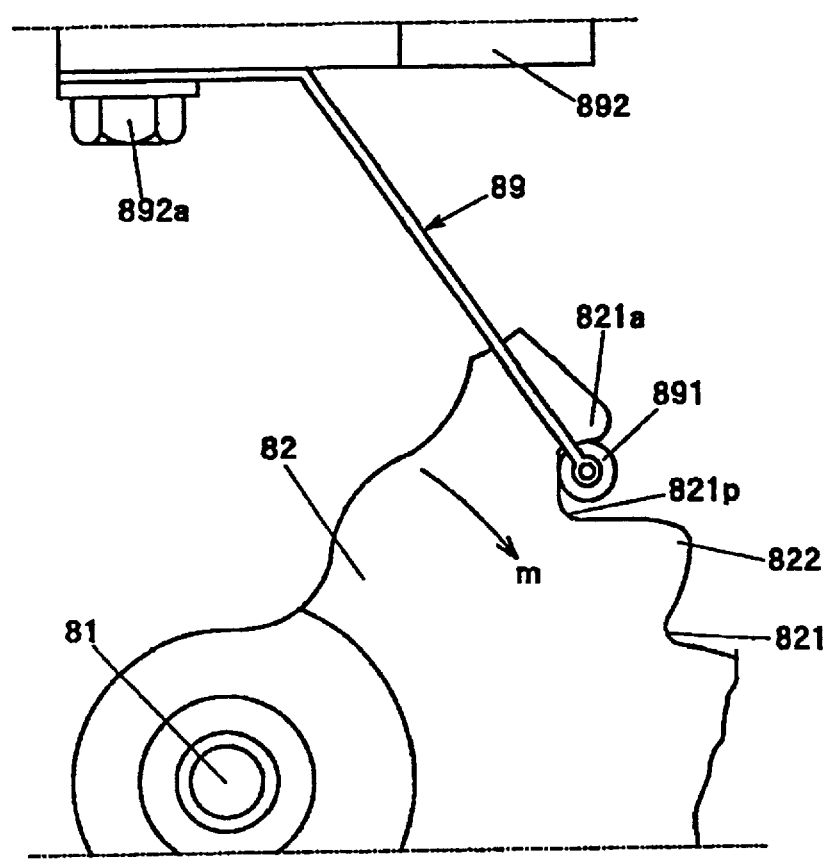
FIG. 56 is an enlarged view showing essential part around a detente spring arm of FIG. 46.

As shown in FIG. 56, a positioning notch 821p for parking positioning is formed with an overhang 821a at one bank thereof remote from an adjacent positioning notch 821 for reverse range positioning so as to catch the positioning roller 891, preventing the positioning roller 891 from ridding over the bank when the manual shift plate 82 is intended to turn even further in the clockwise direction shown by an arrow m. The parking range positioning mechanism prevents the shaft 81 from turning in the clockwise direction m during fastening a nut to the shaft 81 for securing the manual shift plate 82 after having installed the manual shift plate 82 and the detente spring arm 89, enabling to keep the relative position between the manual shift plate 82 and the shaft 81, and hence the shift lever, without holding the shaft 81 during assembling.

As shown in FIG. 46, the manual shift plate 82 is formed with an arcuate cam slot 823 in which a cam follower pin 893b of a swing arm 893 slides. The swing arm 893, pivotally mounted on a pivotal shaft 893a secured to the support block 892, holding for pivotal movement a manual shift valve 894 so as to turn pivotally the manual shift valve 894 following the movement of the swing arm 893 caused by a turn of the manual shift plate 82 in the clockwise direction or the counterclockwise direction.

Hydraulic Control Circuit

The following description will be directed to a hydraulic control circuit for supplying operating pressure to and drawing operating pressure from pressure chambers of the respective friction coupling elements 51–55.

One of the friction coupling elements 51–55, namely the 2-4 brake (2-4B) 54 including a band brake, has a brake apply pressure chamber (APC) 54a and a brake release pressure chamber (RPC) 54b to which operating pressure is supplied. The 2-4 brake (2-4B) 54 is coupled when the operating pressure is supplied only to the brake apply pressure chamber (APC) 54a or uncoupled when the operating pressure is not in both the operating pressure chambers (APC and RPC) 54a and 54b, when the operating pressure is in both these pressure chambers (APC and RPC) 54a and 54b, or when the operating pressure is supplied only to the brake release pressure chamber (RPC) 54a. The remaining friction coupling elements have single hydraulic pressure chambers and are coupled only when operating pressure is supplied to the related hydraulic pressure chambers.

(1) Overall Structure

Figure 57:
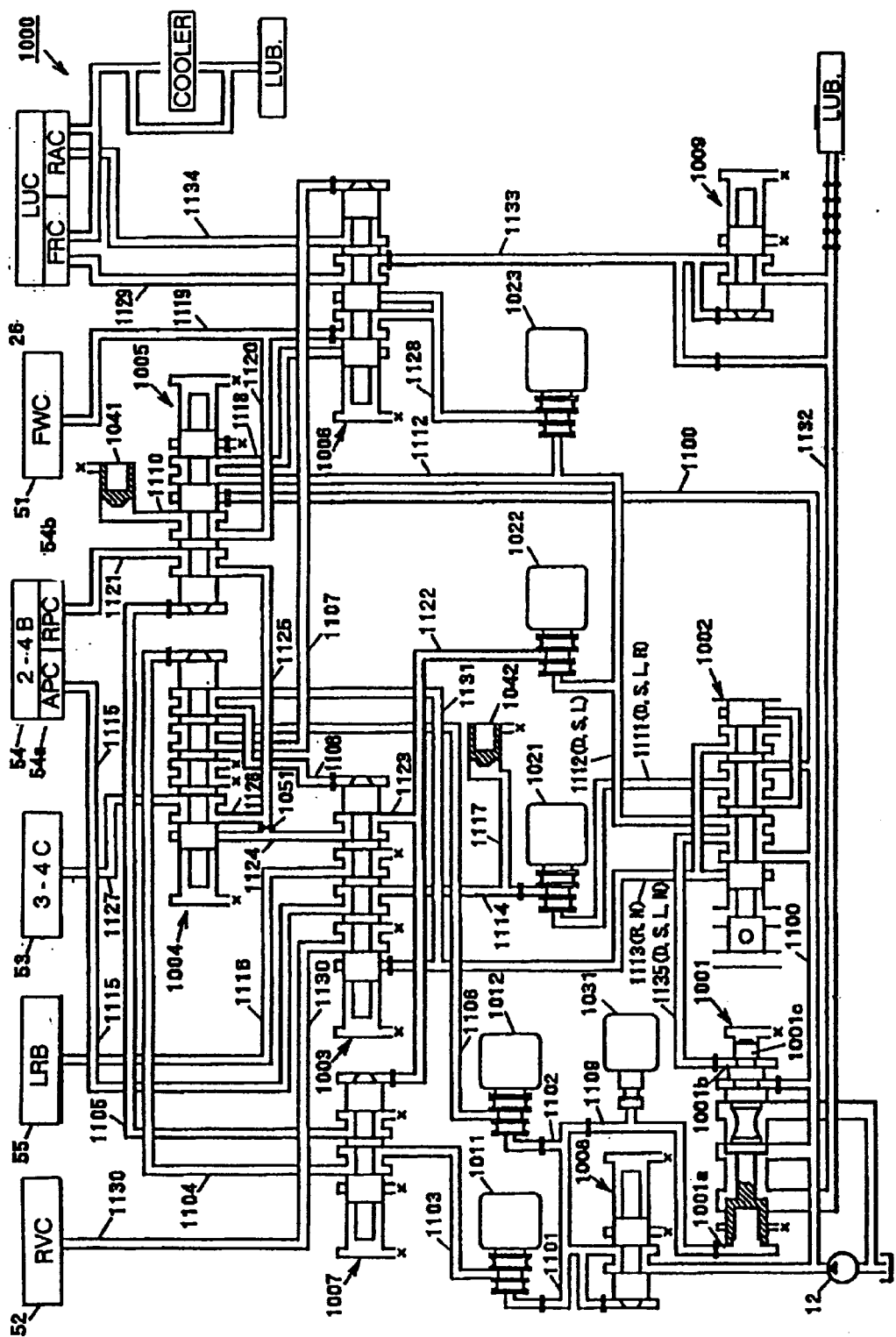
FIG. 57 is a hydraulic control circuit incorporated in the automatic transmission.

As shown in FIG. 57, a hydraulic pressure control circuit 1000 includes as essential elements a regulator valve 1001 for generating a line pressure, a manual shift valve 1002 for changing ranges of the automatic transmission 10 according to range selections by the shift lever, a low-reverse valve 1003 for selectively opening and closing oil paths leading to the friction coupling elements 51–55 according to gear shifts, a bypass valve 1004, a 3-4 shift valve 1005 and a lock-up control valve 1006. The control circuit 1000 further includes first and second ON-OFF solenoid valves 1011 and 1012 (which are hereafter referred to as first and second solenoid valves and indicated as SVs in the drawings simplicity) for actuating these valves 1003–1006, a solenoid relay valve 1007 (which is hereafter referred to as a relay valve and indicated as an SRV in the drawings) for changing destinations to which an operating pressure is delivered from the first solenoid valve 1011, and first to third duty solenoid valves 1021–1023 (which are indicated as DSVs in the drawings) for controlling operating pressure supply or discharge for the first to third duty solenoid valves 1021–1023. These solenoid valves 1011 and 1012 and duty solenoid valves 1021–1023 are of a three-way type which provides communication oil passages upstream and downstream therefrom or drains oil from the downstream oil passage. Since the valves shut the upstream oil passages during draining oil from the downstream oil passage, there is no drainage of oil from the upstream oil passage, decreasing driving loss of the oil pump 12. Specifically, each of the solenoid valves 1011 and 1012 opens the downstream oil passage when it is ON. Each of the duty solenoid valves 1021–1023 provides full communication between the upstream and downstream oil passages when it operates at a duty rate of 0% (which is a ratio of a time for which the valve keeps opened relative to a time of one ON-OFF period) but shuts down the upstream oil passage at a duty rate of 100% so as to drain oil from the downstream oil passage. At duty rates between 0% and 100%, the duty solenoid valves 1021–1023 develops an operating pressure on the downstream side according to the duty rate taking an operating pressure on the upstream side as an initial pressure.

The regulator valve 1001 regulates the pressure of operating oil discharged by the oil pump 12 so as to develop a predetermined level of line pressure which is delivered to the manual shift valve 1002 through a main pressure line 1100 and also to a solenoid reducing valve (which is hereafter referred simply to as a reducing valve) and the 3-4 shift valve 1005. The line pressure is reduced by the reducing valve to a predetermined pressure level and then, delivered to the first and second solenoid valves 1011 and 1012 through pressure lines 1101 and 1102, respectively.

When the first solenoid valve 1011 is ON, the predetermined level of operating pressure is further delivered to the relay valve 1007 through a pressure line 1103. If the relay valve 1007 has placed its spool in the right end position as viewed in the figure, the predetermined level of operating pressure is supplied to the bypass valve 1004 at its control port as a pilot pressure through a pressure line 1104, forcing the spool to the left end position. On the other hand, if the relay valve 1007 has placed its spool in the left end position as viewed in the figure, the predetermined level of operating pressure is supplied to the 3-4 shift valve 1005 at its control port as a pilot pressure through a pressure line 1105, forcing the spool to the right end position. When the second solenoid valve 1012 is ON, the predetermined level of operating pressure from the reducing valve 1008 is delivered to the bypass valve 1004 through a pressure line 1106. At this time, if the bypass valve 1004 has placed its spool in the right end position as viewed in the figure, the predetermined level of operating pressure is supplied to the lock-up control valve 1006 at its control port as a pilot pressure through a pressure line 1107, forcing the spool to the left end position. On the other hand, if the relay valve 1007 has placed its spool in the left end position as viewed in the figure, the predetermined level of operating pressure is supplied to the 3-4 shift valve 1005 at its control port as a pilot pressure through a pressure line 1105, forcing the spool to the right end position.

Further, the predetermined level of operating pressure from the reducing valve 1008 is also delivered to the regulator valve 1001 at its regulation port 1001a through a pressure line 1109. In the pressure line 1109 there is a linear solenoid valve 1031 which regulate the predetermined level of operating pressure according, for instance, to engine loads. In this way, the line pressure is regulated by the regulator valve 1001 according to engine loads. In this instance, the 3-4 shift valve 1005 brings the main pressure line 1100 into communication with a first accumulator 1041 through a pressure line 1110 when having placed its spool to the right end position as viewed in the figure.

The line pressure delivered to the manual shift valve 1002 through the main pressure line 1100 is directed to first and second output pressure lines 1111 and 1112 in a forward range, such as the drive (D) range, the slow speed (S) range and the low speed (L) range, to the first and third output pressure lines 1111 and 1113 in a reverse (R) range, or to the third output pressure line 1113 in the neutral (N) range. The first output pressure line 1111 leads to the first duty solenoid valve 1021 so as to supply the line pressure as an initial control pressure. The first duty solenoid valve 1021 leads at its downstream to the low-reverse valve 1003 through a pressure line 1114 and further, if the low-reverse valve 1003 has placed its spool in the right end position, to the brake apply pressure chamber 54a of the 2-4 brake (2-4B) 54 through a pressure line or brake apply pressure line 1115. On the other hand, if the low-reverse valve 1003 has placed its spool in the left end position, the first duty solenoid valve 1021 leads to the low-reverse brake (LRB) 55 through a pressure line or brake pressure line 1116. A pressure line 1117 branches off from the pressure line 1114 and leads to a second accumulator 1042.

The second output pressure line 1112 leads to the second duty solenoid valve 1022 and the third duty solenoid valve 1023 so as to deliver for them the line pressure as an initial control pressure. The second output pressure line 1112 also leads to the 3-4 shift valve 1005. The second output pressure line 1112 is connected to the lock-up control valve 1006 through a pressure line 1118 if the 3-4 shift valve 1005 has placed its spool in the left end position or to the forward clutch (FWC) 51 through a pressure line or forward clutch pressure line 1119 if the 3-4 shift valve 1005 has placed its spool in the right end position.

A pressure line 1120 branching off from the forward clutch pressure line 1119 leads to the 3-4 shift valve 1005 and is connected to the first accumulator 1041 through the pressure line 1110 if the 3-4 shift valve 1005 has placed its spool in the left end position or to the brake release pressure chamber 54b of the 2-4 brake (2-4B) 54 through a pressure line or brake release pressure line 1121 if the 3-4 shift valve 1005 has placed its spool in the right end position.

The second duty solenoid valve 1022, which receives the initial control pressure through the pressure line 1112, is connected at its downstream end to the relay valve 1007 through a pressure line 1122 and delivers a pilot pressure to the relay valve 1007 at a control port so as to force the spool toward the left end position. A pressure line 1123 branching off from the pressure line 1122 leads to the low-reverse valve 1003 and further to a pressure line 1124 if the low-reverse valve 1003 has placed its spool in the right end position. A pressure line 1125, which branches off from the pressure line 1124 and is provided with an orifice 1051 in close proximity to the pressure line 1124, leads to the 3-4 shift valve 1005. If the 3-4 shift valve 105 has placed its spool in the left end position, the line pressure 1125 is connected to the 2-4 brake (2-4B) 54 through the brake release pressure line 1121. A pressure line 1126, which branches off from the pressure line 1125 leads to the bypass valve 1004. If the bypass valve 1004 has placed its spool in the right end position, the line pressure 1126 is connected to the 3-4 clutch (3-4C) 53 through a pressure line or 3-4 clutch pressure line 1127. The pressure line 1124 further leads directly to the bypass valve 1004 so as to be connected to the pressure line 1125 through the pressure line 1126 if the bypass valve 1004 has placed its spool in the left end position. That is, the pressure lines 1124 and 1125 are brought into communication with each other so as to bypass the orifice 1051.

The third duty solenoid valve 1023, to which the initial control pressure is delivered through the second output pressure line 1112, is connected at its downstream end to the lock-up control valve 1006 through a pressure line 1128. If the lock-up control valve 1006 has placed its spool in the right end position, the third duty solenoid valve 1023 is connected to the forward clutch pressure line 1119. On the other hand, if the lock-up control valve 1006 has placed its spool in the left end position, the third duty solenoid valve 1023 is connected to the lock-up clutch (LUC) 26 through the forward clutch pressure line 1119. The third output pressure line 1113 extending from the manual shift valve 1002 leads to the low-reverse valve 1003 so as to deliver the line pressure. If the low-reverse valve 1003 has placed its spool in the left end position, the third output pressure line 1113 is connected to the reverse clutch (RVC) 52 through a pressure line or reverse clutch pressure line 1130. A pressure line 1131 branching off from the third output pressure line 1113 is connected to the bypass valve 1004. This pressure line 1131 delivers the line pressure as a pilot pressure to the low-reverse valve 1003 through the pressure line 1108 if the bypass valve 1004 has placed its spool in the right end position so as to cause the low-reverse valve 1003 to force its spool to the left end position.

In addition, the hydraulic control circuit 1000 is provided with a converter relief valve 1009 which regulates operating pressure delivered by the regulator valve 1001 through a pressure line 1132 to a predetermined level and further supplied the predetermined level of operating pressure to the lock-up control valve 1006 through the pressure line 1133. If the lock-up control valve 1006 has placed its spool in the right end position, it directs the predetermined level of operating pressure to a front pressure chamber (FPC) of the lock-up clutch (LUC) 26 through a pressure line 1129. On the other hand, If the lock-up control valve 1006 has placed its spool in the left end position, it directs the predetermined level of operating pressure to a rear pressure chamber (RPC) of the lock-up clutch (LUC) 26 through a pressure line 1134. The lock-up clutch (LUC) 26 is released when it receives the predetermined level of operating pressure in the front pressure chamber (FPC) and locks when receiving in the rear pressure chamber (RPC). In this instance, during locking, i.e. when the lock-up control valve 1006 has placed its spool in the left end position, operating pressure regulated by the third duty solenoid valve 1023 is delivered to the front pressure chamber (FPC) as well, so as to control the predetermined level of operating pressure in the rear pressure chamber (RPC) according to the operating pressure in the front pressure chamber (FPC).

(2) Regulator Valve Structure

Figure 58:
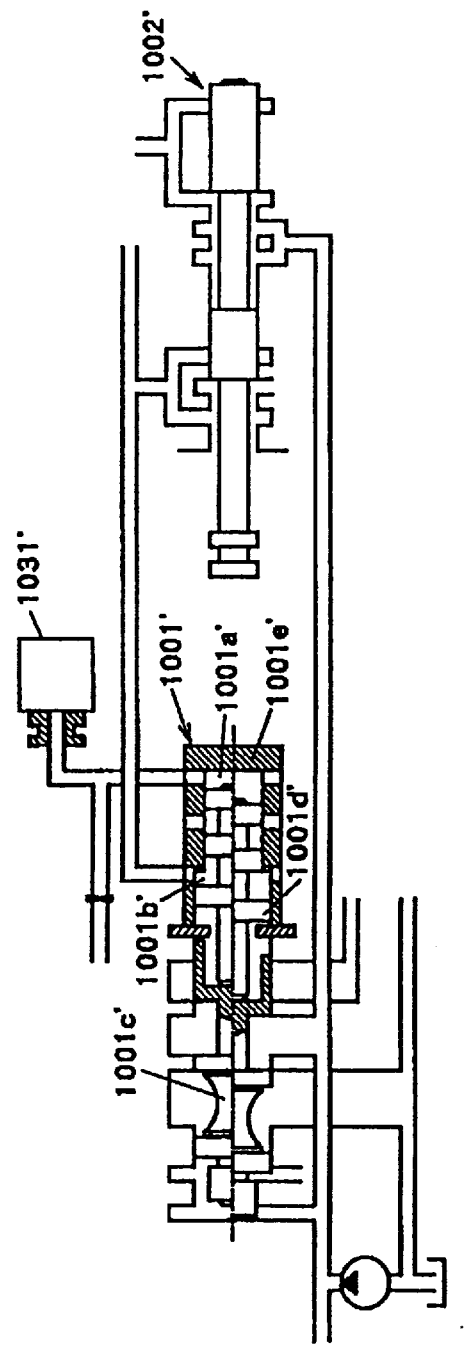
FIG. 58 is a comparative hydraulic control circuit showing a regulator valve.

In the hydraulic control circuit 1000, the line pressure is controlled according, for instance, to engine throttle opening by the control pressure developed by the linear solenoid valve 1031. In addition, the line pressure is kept low in the forward ranges, such as the drive (D) range, the second speed (S) range and the slow speed (L) range and in the neutral (N) range and, however, intensified or boosted up in the reverse (R) range. In order for the regulator valve 1001' to achieve the intensification of pressure, as shown in FIG. 58, it is typical to provide for the regulating valve 1001' an intensifying port 1001b' at one end for receiving the line pressure from the manual sift valve 1002' in the reverse (R) range in addition to a regulation port 1001a' at the same end for receiving pilot pressure from the linear solenoid valve 1031'. In such a structure of the regulator valve 1001', elements or parts such as an extra assisting spool 1001d' and a guide sleeve 1001e' must be provided, leading to an elongated overall length of the regulator valve 1001' and an increased number of parts.

As understood in the FIG. 57, the regulator valve 1001 in the hydraulic control circuit 1000 has a regulation port 1001a on one end of its spool 1001c for receiving pilot pressure from the linear solenoid valve 1031 and a reducing port 1001b on another end of the spool 1001c for receiving the line pressure through a pressure line 1135 in the drive (D) range, the second (S) speed range, the low speed (L) range or the neutral (N) range. In other words, the regulator valve 1001 does not intensify or boost up the line pressure in the reverse range but reduce it in the forward ranges, such as the drive (D) range, the second speed (S) range and the slow speed (L) range and in the neutral (N) range. This concept of operating pressure regulation enables the port arrangement in which these regulation port 1001a and reducing port 1001b are disposed on opposite ends of the spool 1001c, avoiding valve parts or elements, such as an extra assisting spool 1001d' and a guide sleeve 1001e', which are always undesirable in terms of the overall length and manufacturing costs.

(3) Hydraulic Circuit Operation

Figure 59:
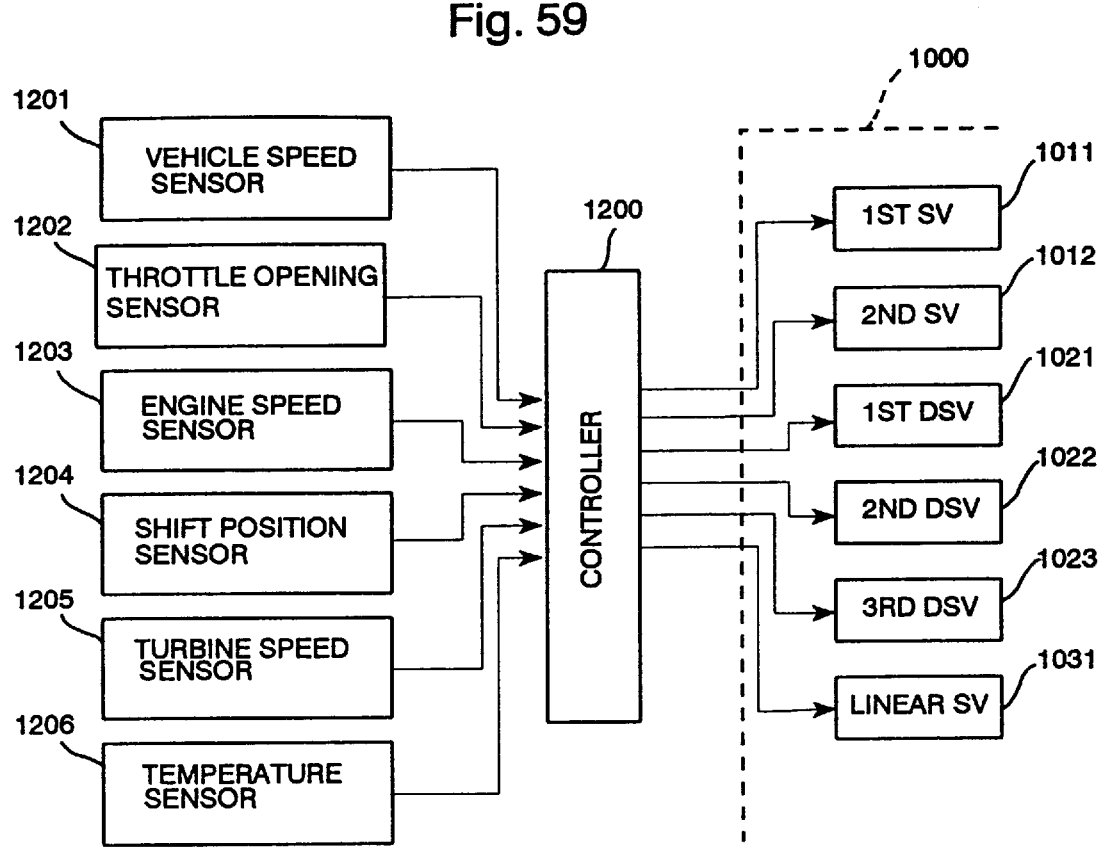
FIG. 59 is a block diagram of a control system for the hydraulic control circuit of FIG. 57.

As shown in FIG. 59, the hydraulic control circuit 1000 cooperates with a controller 1200 for controlling operation of the solenoid valves 1011 and 1012, the duty solenoid valves 1021–1023, and the linear solenoid valve 1031. The controller 1200 receives various control signals, such as a signal representative of a vehicle speed from a speed sensor 1201, a signal representative of an engine speed of rotation from a speed sensor 1202, a signal representative of engine throttle opening as an engine load from a throttle opening sensor 1203, a signal representative of a shift positions or range selected by the shift lever from a position sensor 1204, a signal representative of a speed of rotation of turbine 23 of the torque converter 20 from a speed sensor 1205, and a signal representative of a temperature of the pressure in the hydraulic control circuit 1000 from a temperature sensor 1206. The controller 1200 controls the various solenoid valves 1011, 1012, 1021–1023 and 1031 according to engine operating conditions represented by these control signals.

The following description will be directed to operation of the solenoid valves 1011, 1012 and 1021–1023 in connection with operating pressure application to the friction coupling elements 51–55 in each gear.

The solenoid valves 1011, 1012 and 1021–1023 operate in various patterns for the respective gears as shown in the following Table II. In the Table II, a circle in parentheses indicates a state, such as the ON or activated state of a solenoid valve 1011, 1012 and the OFF or deactivated state of a duty solenoid valve, where pressure lines upstream and downstream from the related valve are in communication with each other so as to allow an operating pressure to pass there through; a cross or X in parentheses indicates a state, such as the OFF or deactivated state of a solenoid valve 1011, 1012 and the ON or activated state of a duty solenoid valve, where an upstream pressure line from the related valve is shut off and a downstream pressure line is drained.

TABLE II

| Range | D(S) | | | | (L) | R |
| --- | --- | --- | --- | --- | --- | --- |
| Gear | 1st | 2nd | 3rd | 4th | 1st | Reverse |
| 1st SV (1011) | X | X | X | O | O | O |
| 2nd SV (1012) | X | X | X | X | O | O |
| 1st DSV (1021) | X | O | O | O | O | O |
| 2nd DSV (1022) | X | X | Q | O | X | O |
| 3rd DSV (1023) | O | O | O | X | O | O |

1st Gear

Figure 60:
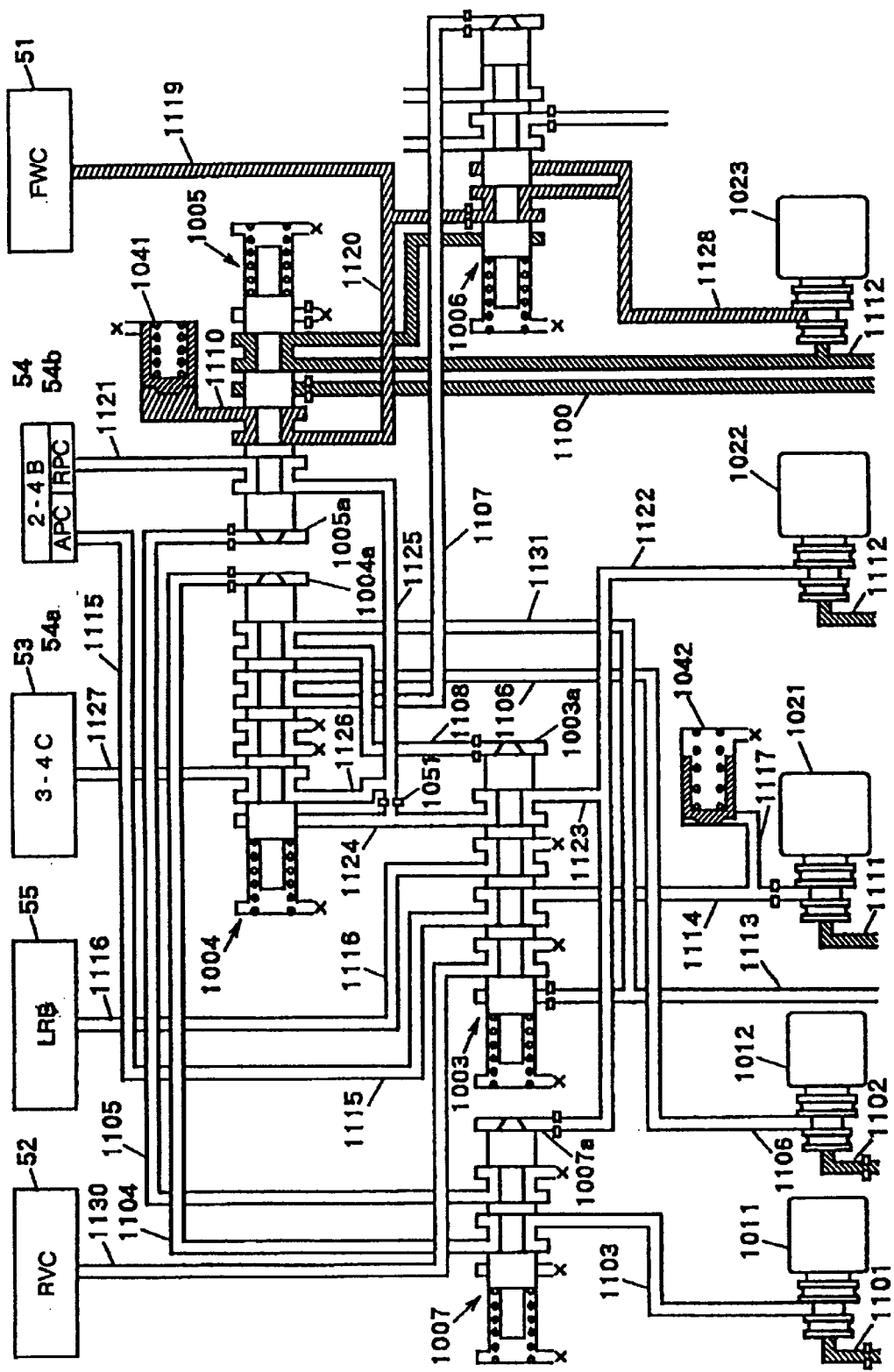
FIG. 60 is an enlarged view of essential part of the hydraulic control circuit of FIG. 57 which develops a first gear.

As shown in Table II and FIG. 60, in the first (1st) gear in the forward range excepting the low-speed range, only the third duty solenoid valve 1023 is activated or takes its ON state, making the line pressure in the second output pressure line 1112 available and delivering it to the lock-up control valve 1006 through the pressure line 1128. When the lock-up control valve 1006 has placed its spool in the right end position as viewed in the figure, it directs the operating pressure as a coupling pressure to the forward clutch (FWC) 51 through the forward clutch PL 1119 so as to bring the forward clutch (FWC) 51 into coupling. At this time, the first accumulator 1041, in communication with the 3-4 shift valve 1005 to which a pressure line 1120 branching off from the pressure line 1119 and the pressure line 1110 lead, causes the coupling pressure to be delivered gradually to the forward clutch (FWC) 51.

2nd Gear

Figure 61:
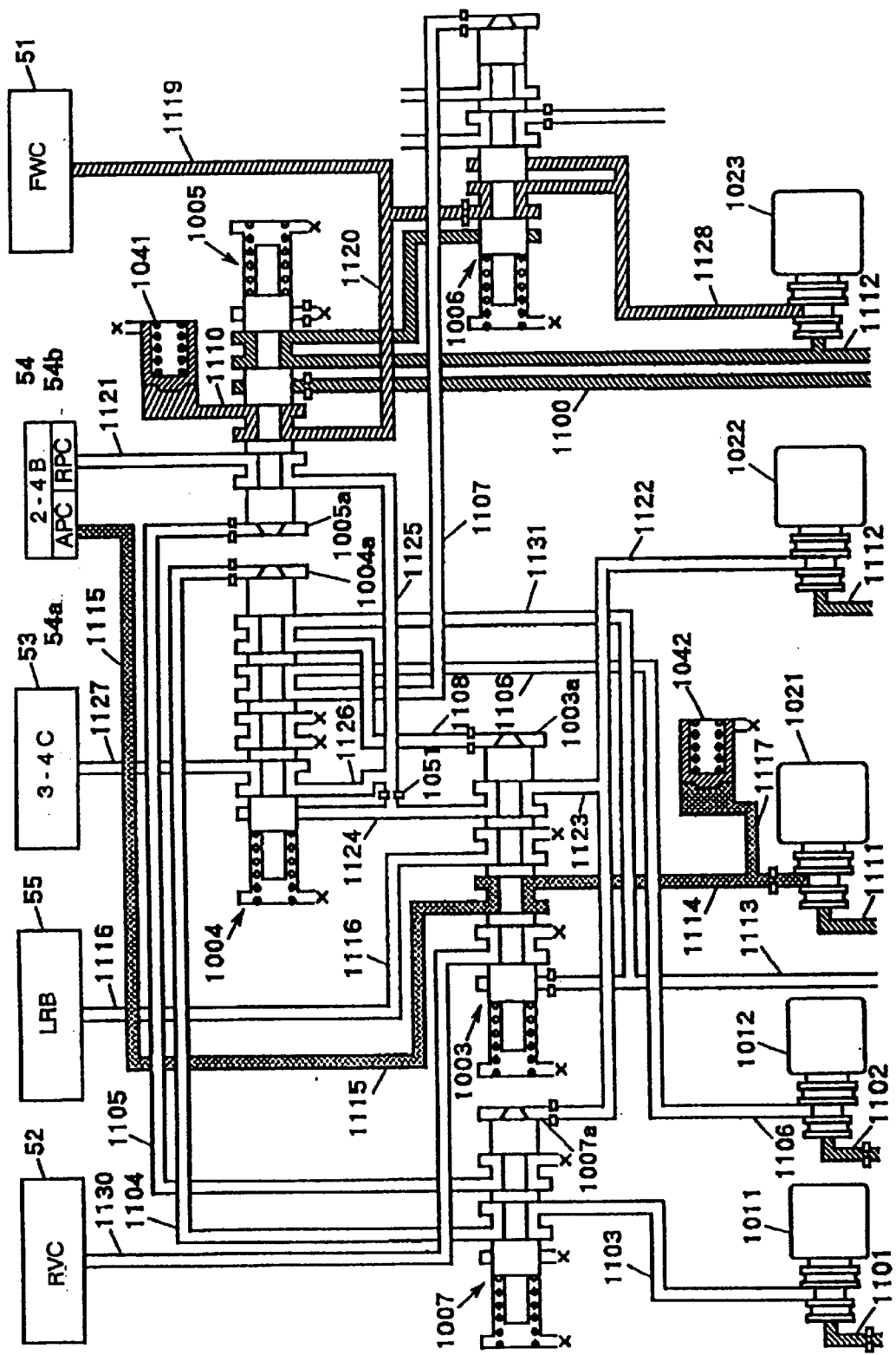
FIG. 61 is an enlarged view of essential part of the hydraulic control circuit of FIG. 57 which develops a second gear.

As shown in Table II and FIG. 61, in the second (2nd) gear, the first duty solenoid valve 1021, in addition to the third duty solenoid valve 1023, is activated or takes its ON state in the forward range excepting the lowspeed range, making the line pressure in the first output pressure line 1111 available and delivering it to the low-reverse valve 1003 through the pressure line 1114. Since the row-reverse valve 1003 has placed its spool in the right end position as viewed in the figure, it directs the operating pressure as a brake applying pressure to the brake apply pressure chamber (APC) 54a of the 2-4 brake (2-4B) 54 through the brake apply pressure line 1115. As a result, the 2-4 brake (2-4B) 54, in addition to the forward clutch (FWC) 51, is brought into coupling. The second accumulator 1042 causes coupling of the 2-4 brake (2-4B) 54 gently. An operating pressure accumulated temporarily in the second accumulator 1042 is delivered to and pre-charged in the low-reverse brake (LRB) 55 when the low-reverse valve 1002 shifts its spool to the left end position upon a shift to the 1st gear in the low-speed (L) range as will be described later.

3rd Gear

Figure 62:
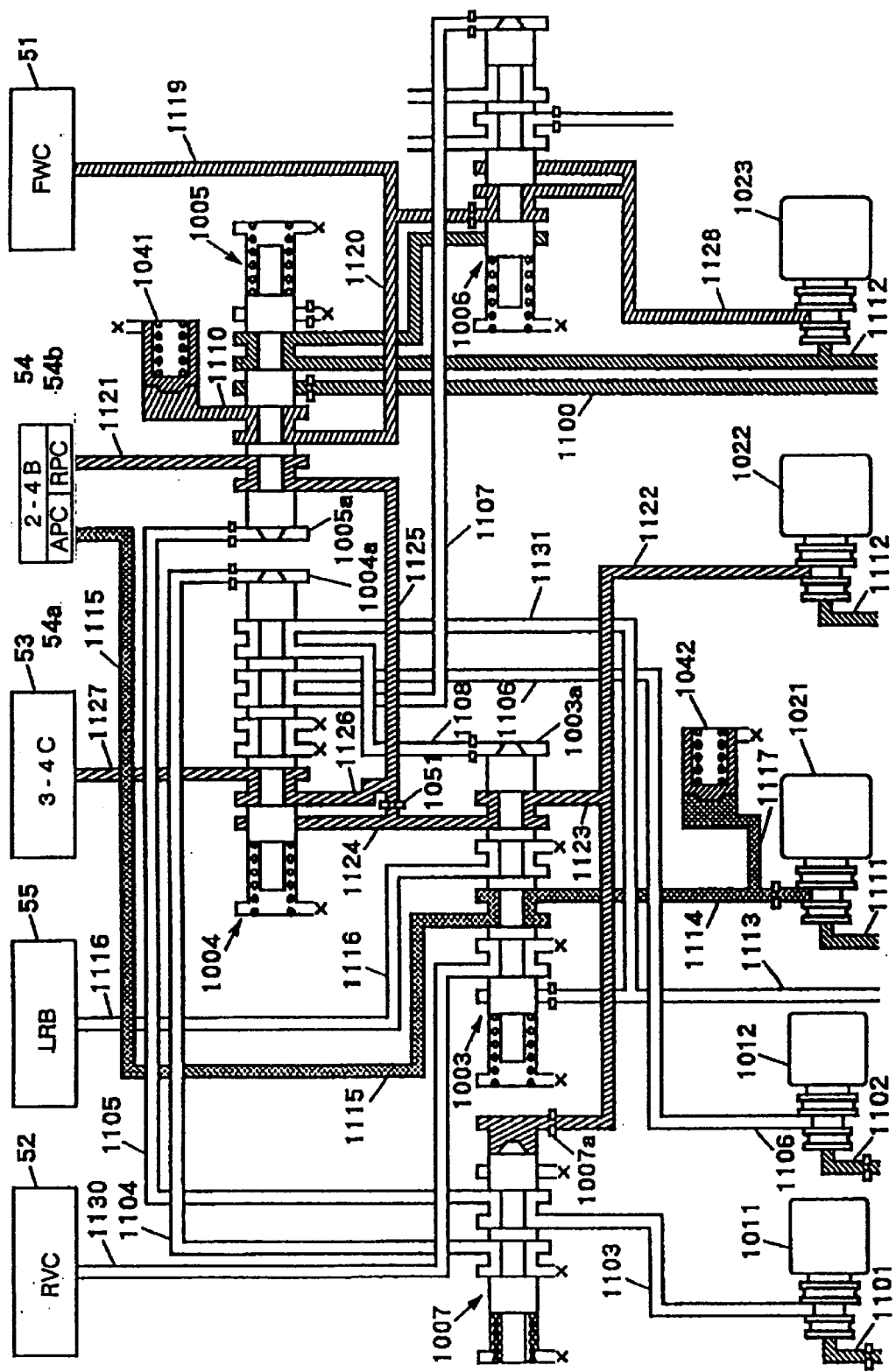
FIG. 62 is an enlarged view of essential part of the hydraulic control circuit of FIG. 57 which develops a third gear.

As shown in Table II and FIG. 62, in the third (3rd) gear, the second duty solenoid valve 1022, in addition to the first and third duty solenoid valves 10121 and 1023, is activated or takes its ON state, making the line pressure in the second output pressure line 1112 available and delivering it to the low-reverse valve 1003 through the pressure line 1122 via the pressure line 1123. AT this time, the row-reverse valve 1003 has placed its spool in the right end position as viewed in the figure, it directs the operating pressure to the pressure line 1124. On the other hand, the operating pressure from the second duty solenoid valve 1022 is directed to the pressure line 1125 through the pressure lines 1122 and 1124 via the orifice 1051. Since, at this time, the 3-4 shift valve 1005 has placed its spool in the left end position, the operating pressure is supplied as a brake releasing pressure to the brake release pressure chamber 54b of the 2-4 brake (2-4B) 54 through the brake release pressure line 1121, releasing or uncoupling the 2-4 brake (2-4B) 54. The pressure line 1126, branching off from the pressure line 1125 after the orifice 1051, direct the operating pressure to the bypass valve 1004 which allows the operating pressure to pass through and reach the 3-4 clutch (3-4C) 53 through the 3-4 clutch pressure line 1127. In such a way, selecting the 3rd gear causes, on one hand, the forward clutch (FWC) 51 and the 3-4 clutch (3-4C) 53 to be coupled and, on the other hand, the 2-4 brake (2-4B) 54 to be uncoupled. In the 3rd gear, the second duty solenoid valve 1022 delivers the operating pressure to the relay valve 1007 at the control port 1007a, forcing the spool of the relay valve 1007 to the left end position.

4th Gear

Figure 63:
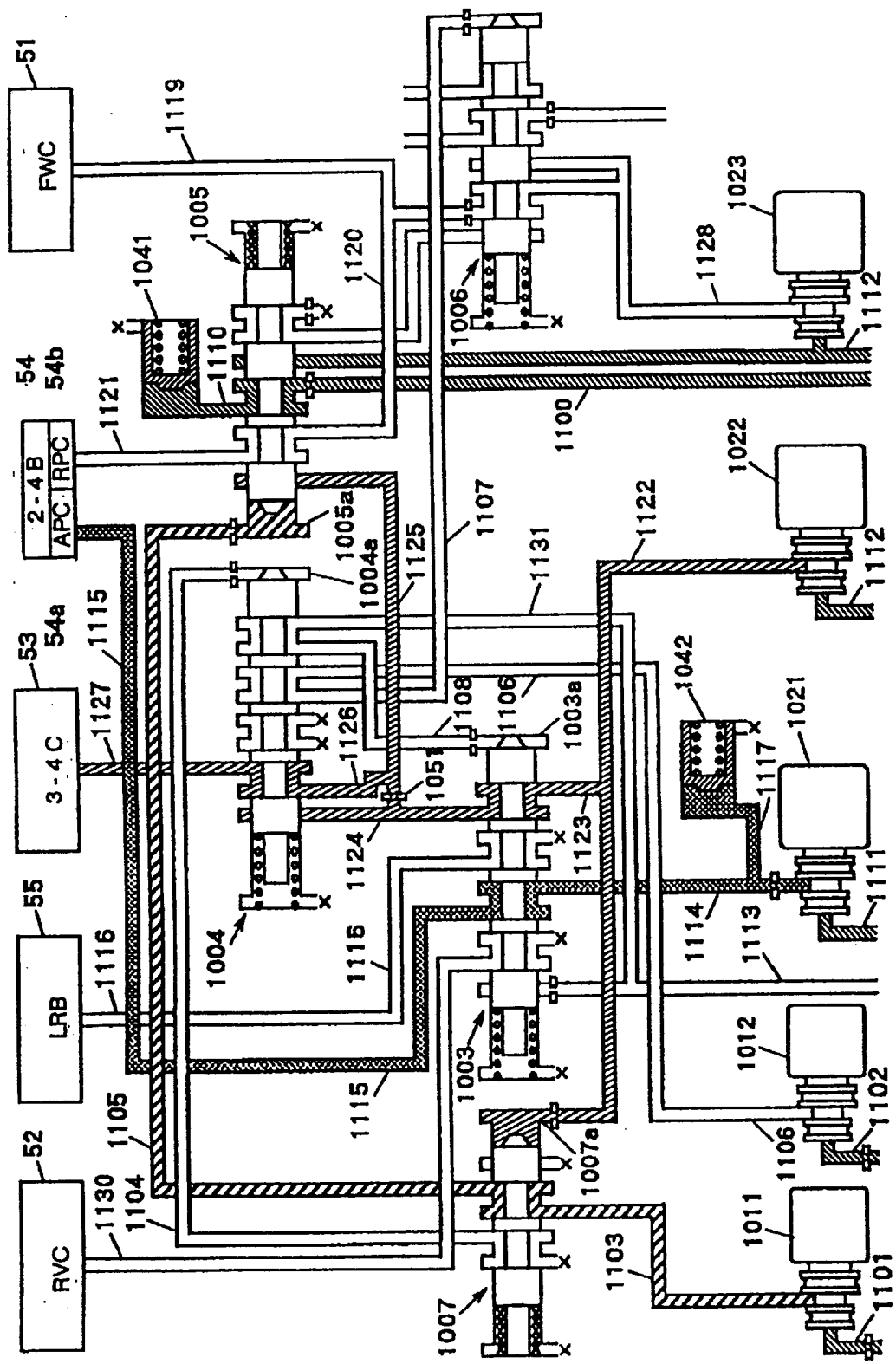
FIG. 63 is an enlarged view of essential part of the hydraulic control circuit of FIG. 57 which develops a forth gear.

As shown in Table II and FIG. 63, while the first and second duty solenoid valves 1021 and 1022 take their ON states, the third duty solenoid valve 1023 is deactivated and the first solenoid valve 1011 is activated or takes its ON state. When the first solenoid valve 1011 is activated, the predetermined level of operating pressure in the pressure line 1101 is directed to the relay valve 1007 through the pressure line 1103. Since the relay valve 1007 has placed its spool in the left end position upon a shift to the 3rd gear, the predetermined level of operating pressure passes therethrough and is directed to the control port 1005a of the 3-4 shift valve 1005 through the pressure line 1105 so as to force it to shift its spool to the right end position. Then, the 3-4 shift valve 1005 brings the pressure line 1120 branching off from the forward clutch pressure line 1119 into communication with the brake release pressure line 1121, providing communication between the forward clutch (FWC) 51 with the brake release pressure chamber (RPC) 54b of the 2-4 brake (2-4B) 54. By means of deactivating the third duty solenoid valve 1023 to shut down the operating pressure and drain the pressure line downstream therefrom, the forward clutch (FWC) 51 and the brake release pressure chamber (RPC) 54b of the 2-4 brake (2-4B) 54. are drained through the lock-up control valve 1006 and the pressure line 1128. In the way, while the forward clutch (FWC) 54 is uncoupled, the 2-4 brake (2-4B) 54 is coupled again.

1st Gear In Low-Speed Range

Figure 64:
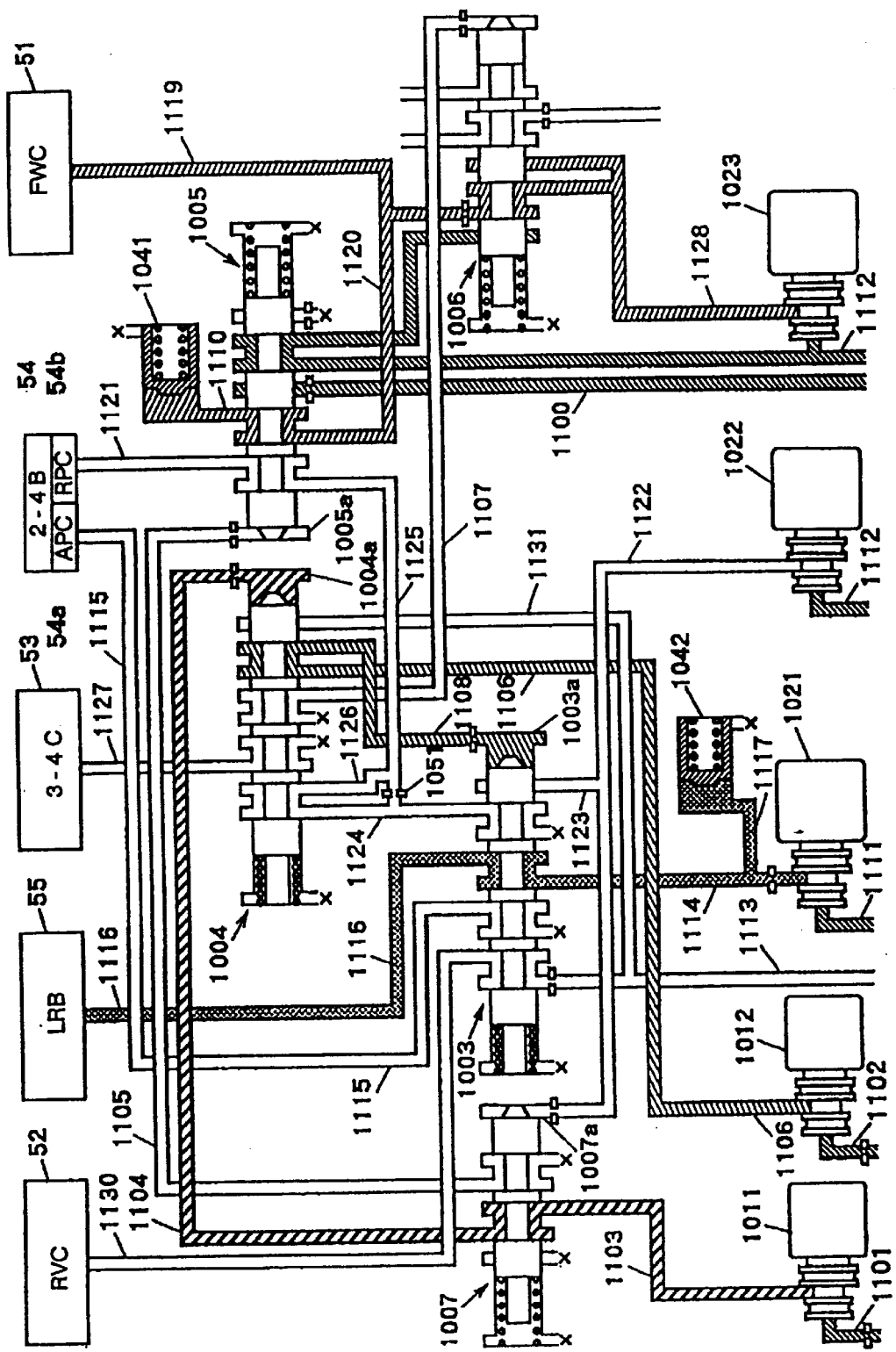
FIG. 64 is an enlarged view of essential part of the hydraulic control circuit of FIG. 57 which develops the first gear in a low speed range.

As shown in Table II and FIG. 64, when the 1st gear is selected in the low speed (L) range, the first and second solenoid valves 1011 and 1012 and the first and third duty solenoid valves 1021 and 1023 are activated or take their ON states. The operating pressure regulated by the third duty solenoid valve 1023 is delivered as a forward clutch pressure to the forward clutch (FWC) 51 through pressure lines 1128 and 1119 via the lock-up control valve 1006 in the same way as selecting the first gear in the drive (D) range, coupling the forward clutch (FWC) 51. At this time, the operating pressure is introduced into the first accumulator 1041 through the pressure lines 1110 and 1120 via the 3-4 shift valve 1005, making coupling of the forward clutch (FWC) 51 gently as like as in the drive (D) range.

When the first solenoid valve 1011 is activated, a pilot pressure is delivered to the control port 1004a of the bypass valve 1004 through the pressure lines 1103 and 1104, forcing the bypass valve 1004 to shift the spool to the left end position. The bypass valve 1004 allows the operating pressure from the second solenoid valve 1012 to pass therethrough and is delivered to the low-reverse valve 1003 through the pressure line 1108, so as to cause the low-reverse valve 1003 to shift its spool to the left end position. Eventually, the operating pressure from the first duty solenoid valve 1021 is delivered as a low-reverse braking pressure to the low-reverse brake (LRB) 55 through the pressure line 1116 via the low-reverse valve 1003, coupling the low-reverse brake (LRB) 55 as well as the forward clutch (FWC) 51. This provides the first gear with an effect of engine braking.

Reverse Gear

Figure 65:
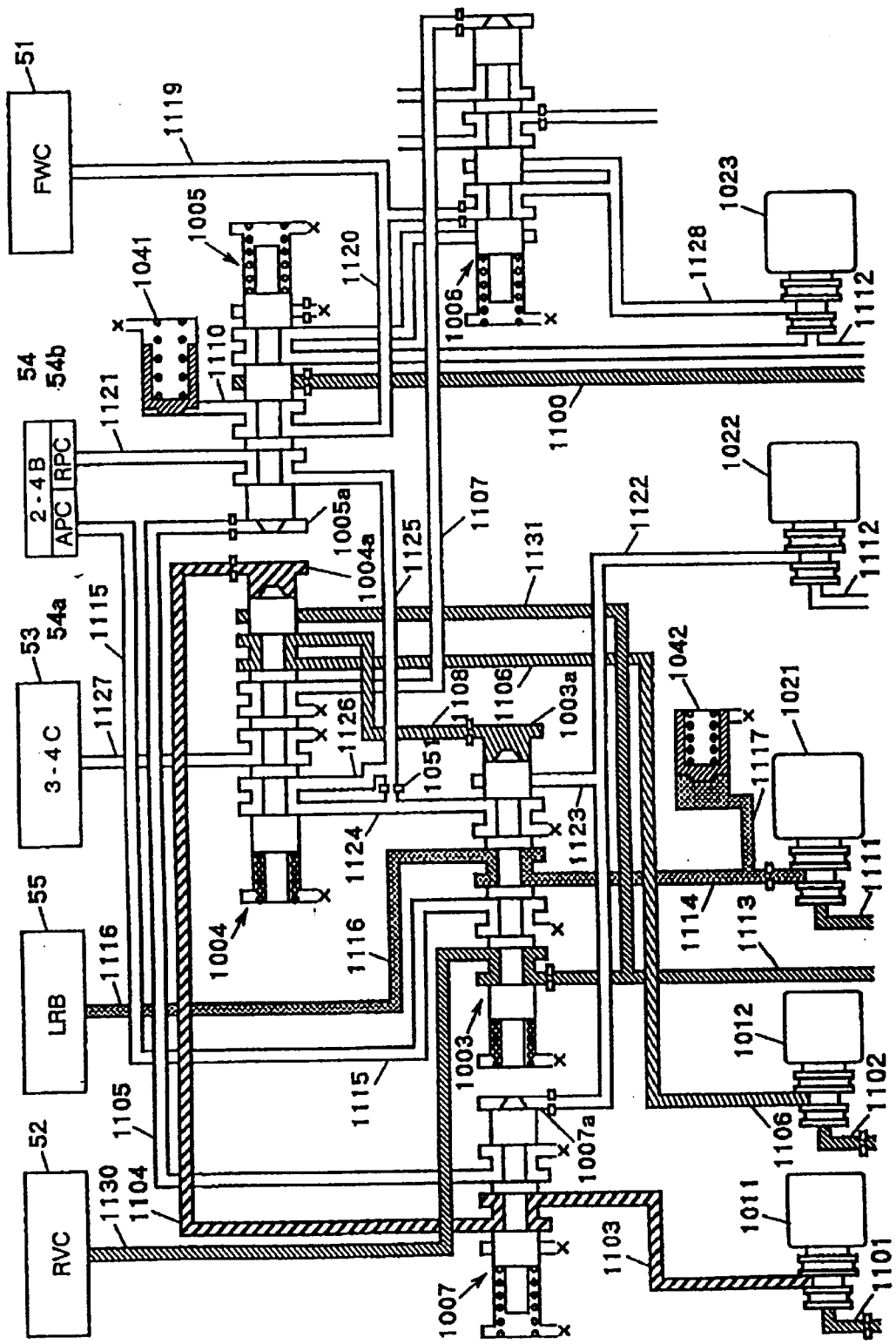
FIG. 65 is an enlarged view of essential part of the hydraulic control circuit of FIG. 57 which develops a reverse gear.

As shown in Table II and FIG. 65, when the reverse gear is selected, all of the solenoid valves 1011 and 1012 and 1021–1023 are activated. However, there is no line pressure from the second output pressure line 1112 in the reverse (R) range, the second and third duty solenoid valves 1022 and 1023 do not develop any operating pressure. In the reverse (R) range, the first to third duty solenoid valves 1021–1023 are activated, causing the bypass valve 1004 and the low-reverse valve 1003 to shift their spools to their left end positions as in the first gear in the low-speed (L) range. In such a state, the first duty solenoid valve 1021 develops an operating pressure and delivers it as a braking pressure to the low-reverse brake (LRB) 55. Together, in the reverse (R) range, the manual shift valve 1002 introduces the line pressure into the third output pressure line 1113 and so as to deliver it to the reverse clutch (RVC) 52 through the pressure line 1130 via the low-reverse valve 1003 with the spool placed in the left end position. In this way, the reverse clutch (RVC) 52 and the low-reverse brake (LRB) 55 are simultaneously coupled. In this instance, since the line pressure is introduced into the third output pressure line 1113 via the manual shift valve 1002 even in the neutral (N) range, the reverse clutch (RVC) 52 is coupled even in the neutral (N) range if the low-reverse valve 1003 has placed its spool in the left end position.

Reverse Gear in Fail Safe Mode

The hydraulic control circuit 1000 is typically equipped with a fail-safe feature that, in an event that either one of the solenoid valves 1011 and 1012 falls into inoperative conditions due, for instance, to electrical breakdowns, the hydraulic control circuit 1000 detects the breakdown and deactivates another solenoid valve so as to allow the reverse gear to be available. For example, if the second solenoid valve 1012 has become inoperative, the pilot pressure is not delivered to the low-reverse valve 1103 through the pressure lines 1106 and 1108 via the bypass valve 1004, so as to allow the low-reverse valve 1103 to shift the spool to the right end position, thereby disconnecting communication not only between the third output pressure line 1113 and the reverse clutch pressure line 1130 but between the first duty solenoid valve 1021 and the low reverse pressure line 1116. This makes the reverse gear unavailable. In such an event, the controller 1200 detects the breakage based, for instance, on a fact that a predetermined reduction rate is not provided in the reverse range and provides a signal to the first solenoid valve 1011 for deactivating the first solenoid valve 1011.

Figure 66:
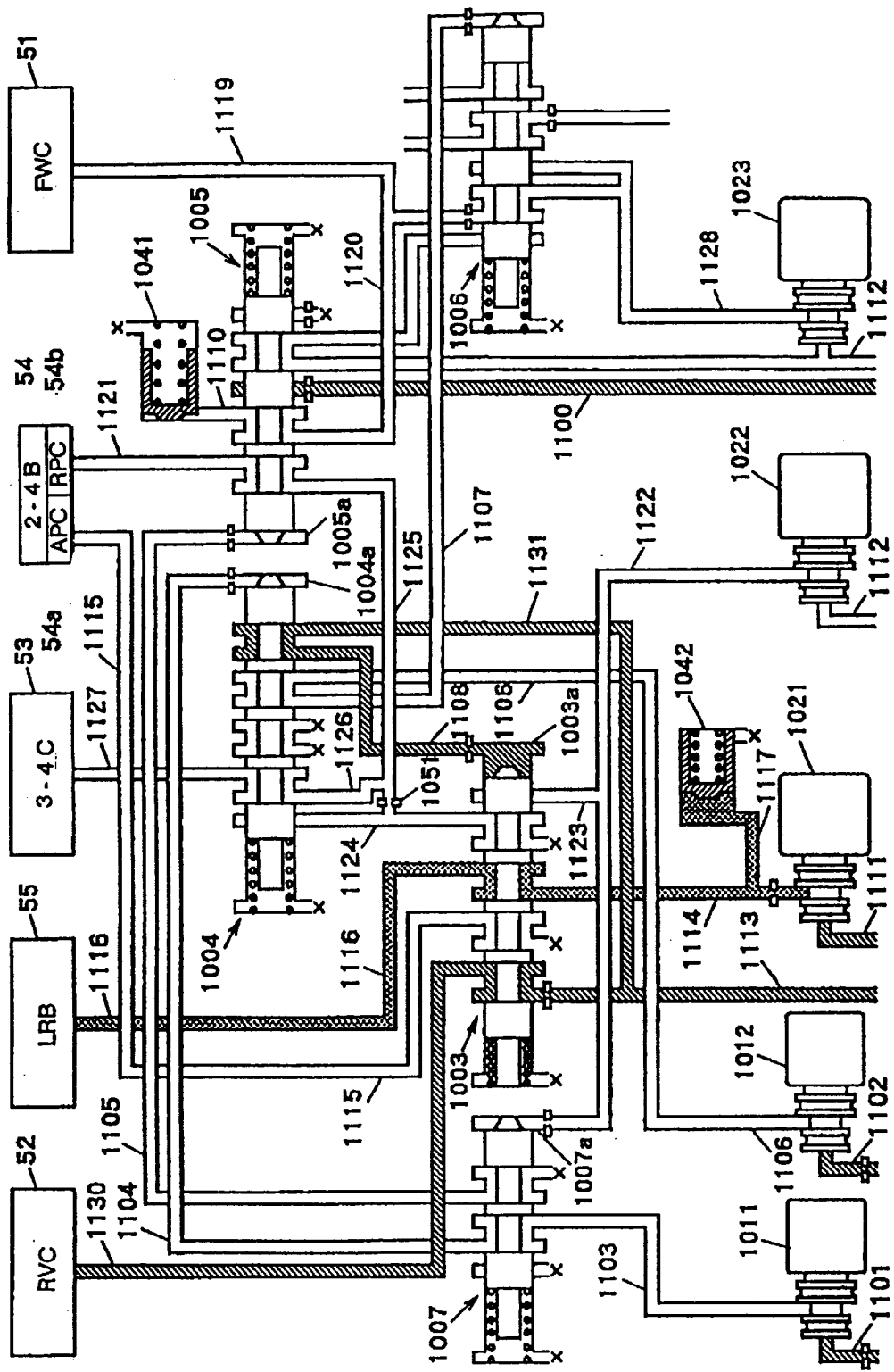
FIG. 66 is an enlarged view of essential part of the hydraulic control circuit of FIG. 57 which develops the reverse gear in a fail-safe mode.

As shown in FIG. 66, when such a signal is provided and deactivates the first solenoid valve 1011, the bypass valve 1004 shifts the spool to the right end position so as to connect communication between the pressure line 1131 branching off from the third output pressure line 1113 and the pressure line 1108 and direct the line pressure as a pilot pressure to the low-reverse valve 1003 at the control port 1003a. Consequently, the low-reverse valve 1003 forces the spool to the left end position, so as to bring the third output pressure line 1113 and the first duty solenoid valve 1021 into communication with the reverse clutch pressure line 1130 and the low-reverse pressure line 11 16, respectively, thereby causing both the reverse clutch (RVC) 52 and the low-reverse brake (LRB) 55 to couple and create the reverse gear.

Similarly, if the first solenoid valve 1011 falls into inoperative conditions due, for instance, to electrical breakdowns, the hydraulic control circuit 1000 detects the breakdown and deactivates the second solenoid valve 1012 so as to maintain the reverse gear available.

Operation Control

The following description will be hereafter directed to the practical application of operational control accomplished by means of the controller 1200.

(1) Up-Shift

Figure 67:
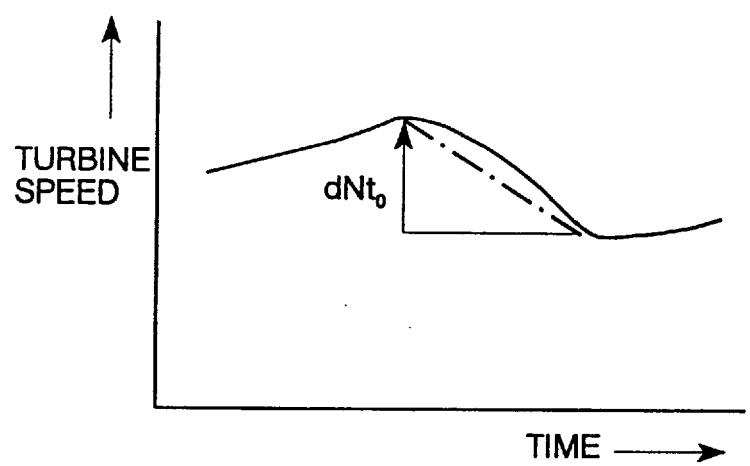
FIG. 67 is an explanatory diagram showing a change in turbine speed of rotation as a control target during up-shifting.

An explanation will be provided first relating to an up-shift. Basically, as shown in FIG. 67, the control is primarily accomplished by means of feedback control exercised over the supply of operational pressure relative to the coupling friction element in which the change ratio dNt at the time of a reduction of the turbine speed Nt is controlled to conform with the target change ratio $dNt_0$.

Figure 68:
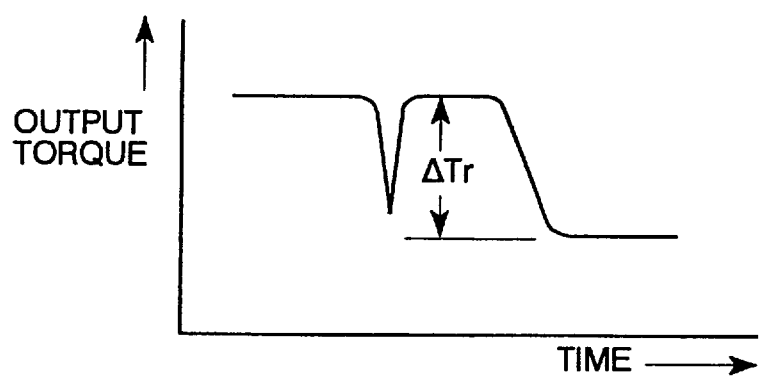
FIG. 68 is an explanatory diagram showing a torque wave as a control target during up-shifting.

As shown in FIG. 68, the turbine speed change ratio dNt, which corresponds to the height ΔTr relative to the transmission output torque following the completion of a gear shift in the inertia phase during the gear shift, will provide an increase in the amount of shift shock if exceeding the torque prior to the gear shift and extend a shifting time if it is too low. Hence, as shown in FIG. 68, the target turbine speed change ratio $dNt_0$ is established so as to correspond with the height ΔTr, in order to roughly correspond with the height existing prior to a gear shift. Specifically, as the engine throttle opening becomes, the target turbine speed change ratio $dNt_0$ is established to be great and, as the turbine speed Nt at the time of commencement of gear shifting is great, it is established to be small. Furthermore, at extremely low temperatures, since there is an increase in the viscosity of hydraulic oil which leads to a marked delay in response of the pressure, the feedback control is prevented.

An explanation is provided of the practical control of each up-shift, chronologically from a 1-2 up-shift.

A: 1-2 Gear Shift Control 1-2 up-shifting is accomplished by supplying servo apply pressure created by means of the first duty solenoid valve 1021 to the coupling pressure chamber 54a of the 2-4 brake 54. In the interim, feedback control is accomplished of the servo apply pressure by means of the first duty solenoid valve 1021.

In this instance, as indicated previously, each of the duty solenoid valve 102–1023 takes at a duty rate of 100% a drain state in which no operating pressure is produced and, at a duty rate of 0% a full open state in which the operating pressure is equal to the source pressure. The control over the operating pressure is accordingly accomplished in the interim duty rate between 0% and 100%

1st DSV Control

Figure 69:
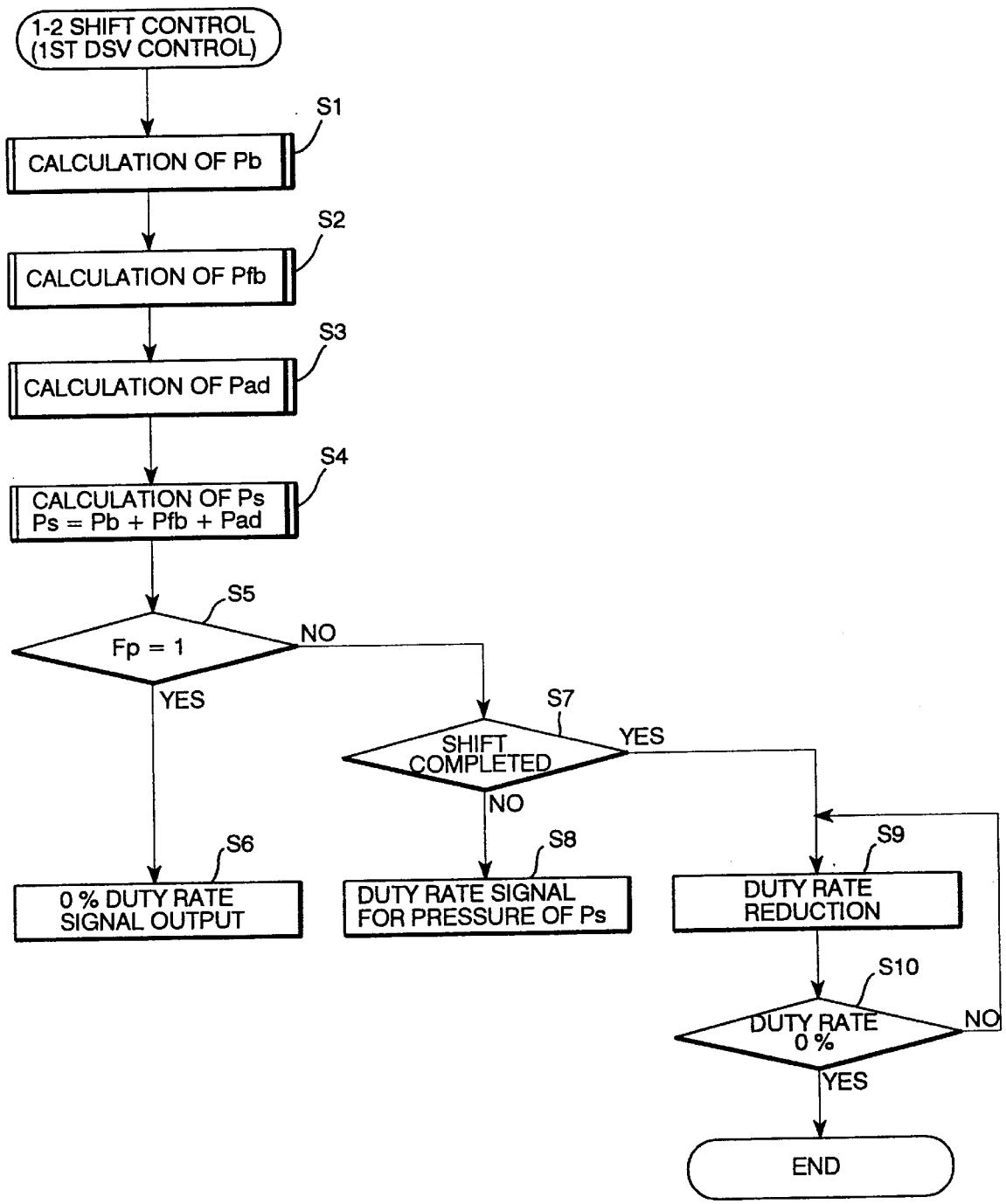
FIG. 69 is a flowchart illustrating a control sequence for a first duty solenoid valve (DSV) during shifting.

Servo apply pressure control by means of the first duty solenoid valve 1021 during 1-2 gear shifting is accomplished in accordance with the program shown in FIG. 69. When the 1-2 gear shift command is provided, initially base pressure Pb, the feedback pressure Pfb, and learned control pressure Pad are calculated at steps S1–S3, respectively. A description of each of these calculations is provided separately.

At step S4, the pressures Pb, Pfb and Pad are added together, thereby computing the pressure Ps. At the same time, at step S5, a determination is made as to whether or not the pre-charge control period of the servo apply pressure, conducted upon the gear shift command, is in progress through the ascertainment of a pre-charge flag Fp. The pre-charge control is quickly accomplished through the complete supply of hydraulic oil in the oil passage reaching the chamber 54a of the 2-4 brake 54 at the commencement of gear shifting in order to improve the responsiveness of gear shift operation. When the pre-charge flag Fp is up or set to a state of 1, in other words when it is determined that the period exists in which pre-charging should be accomplished, then, at step S6, a 0% duty rate signal is provided for the first duty solenoid valve 1021. Furthermore, the pre-charge period determination control is accomplished by means of the program described later. On the other hand, when the pre-charge flag Fp is down or reset to a state of 0, ie when the pre-charge period is over, another decision is made at step S7 as to whether or not the 1-2 gear shifting has been completed. The determination of the completion of gear shifting is accomplished through the achievement of one of a transition of the turbine speed change ratio dNt from minus to plus, a reduction in the turbine speed change ratio dNt to less than half during gear shifting, and a reduction in the turbine speed Nt to a speed at the completion of gear shifting which is calculated based on the turbine speed Nt at the commencement of gear shifting.

Also, prior to the completion of gear shifting, i.e. during the period following the completion of the pre-charge period to the completion of gear shifting, at step S8, in order to obtain the calculated pressure Ps in the manner described above, the duty rate of the first duty solenoid valve 1021 is calculated. A duty ratio signal is output so as to exercise control over the servo apply pressure, namely 2-4 brake coupling pressure. Following the termination of gear shifting, at steps S9 and S10, the duty rate is reduced in fixed decrements until it reaches a duty rate of 0%.

Base Pressure Calculation

Figure 70:
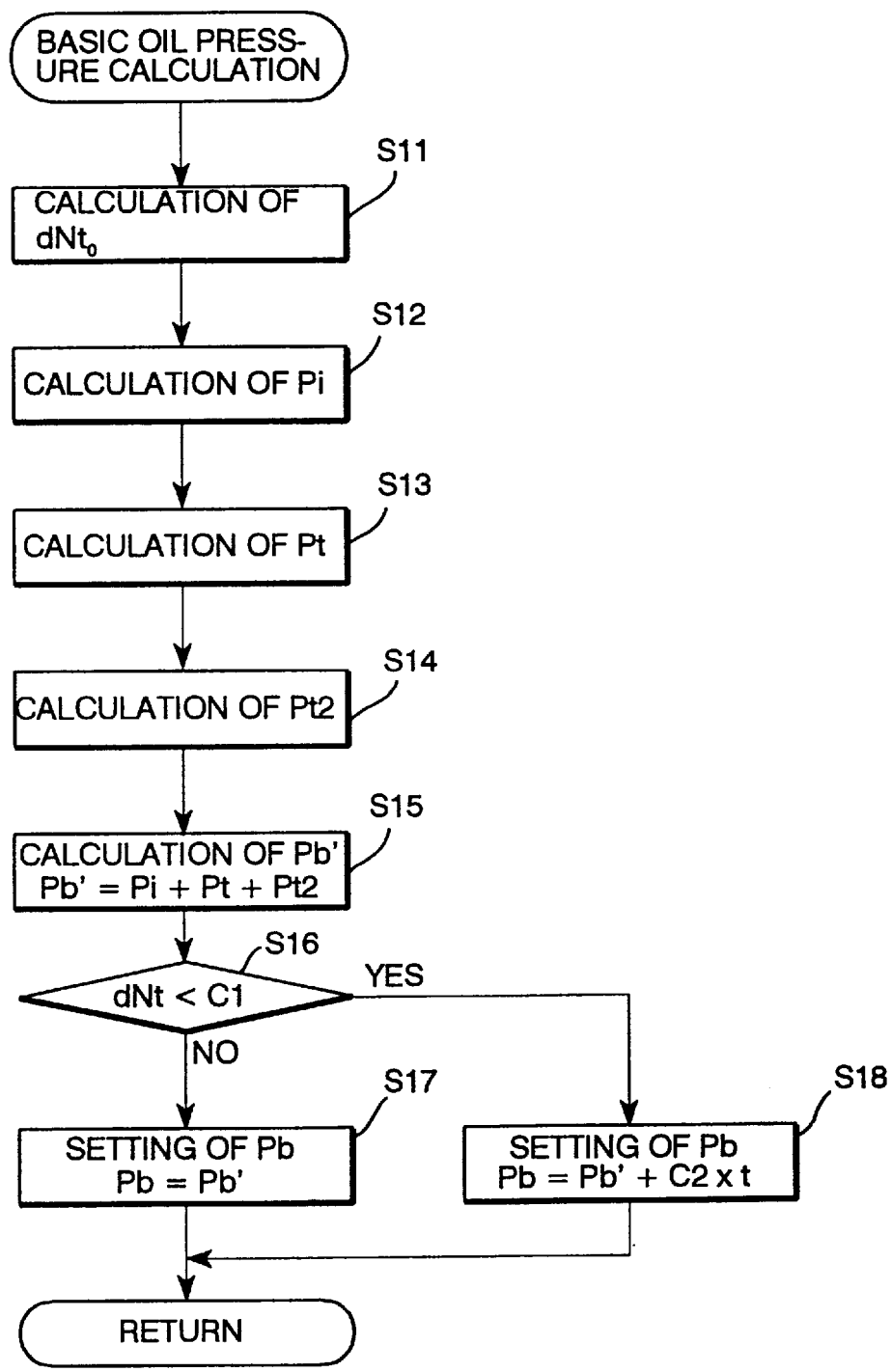
FIG. 70 is a flowchart illustrating a sequence for a calculation of base pressure during shifting.

From among restective pressure composing the calculated pressure Ps, the calculation of the base pressure Pb is accomplished in accordance with the program shown in FIG. 70.

Figure 71:
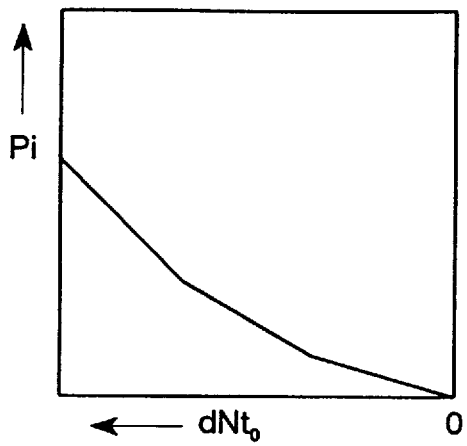
FIG. 71 is a diagram illustrating a map of hydraulic pressure with regard to a change in target turbine speed used in the calculation of base pressure.
Figure 72:
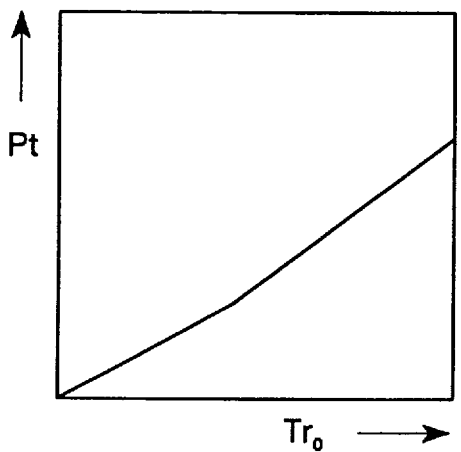
FIG. 72 is a diagram illustrating a map of hydraulic pressure with regard to target turbine torque used in the calculation of base pressure.
Figure 73:
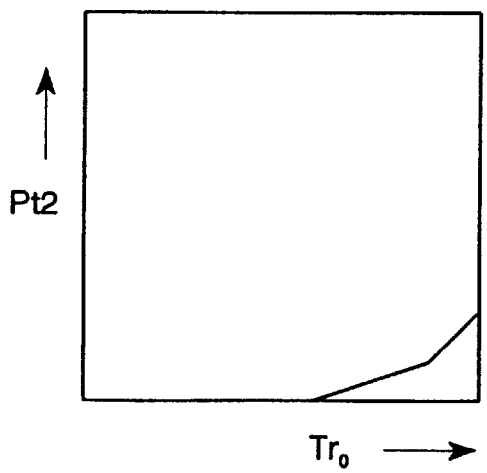
FIG. 73 is a diagram illustrating a map of hydraulic pressure with regard to squared target turbine torque used in the calculation of base pressure.

First of all, at step S11, a calculation is accomplished of the target turbine speed change ratio $dNt_0$ during gear shifting. At step S12, a pressure Pi corresponding to the target turbine speed change ratio $dNt_0$ is calculated on the basis of a map established so that, as shown in FIG. 71, as the target turbine speed change ratio $dNt_0$ in absolute value becomes small, the value becomes large. Subsequently, at steps S13 and S14, a pressure Pt corresponding to the target turbine torque $Tr_0$ and a pressure Pt2 corresponding to the squared target turbine torque $Tr_0$ are calculated, respectively, on the basis of maps as shown respectively in FIGS. 74 and 75. At step S15, by adding these pressures Pt and Pt2 to the pressure Pi corresponding to the target turbine speed change ratio $dNt_0$, an initial value Pb' of the base pressure can be calculated.

In this instance, the target turbine torque $Tr_0$ is one which is obtained by multiplying the turbine torque prior to gear shifting by a torque down ratio of engine output torque during gear shifting. By revising the pressure Pi corresponding to the target turbine speed change ratio $dNt_0$ with the pressures Pt and Pt2 corresponding to the target turbine torque $Tr_0$, changes in the transmission output torque is further controlled during gear shifting.

At step S16, a decision is made as to whether or not an actual turbine speed change ratio dNt is less than a specified ratio C1. This is a decision as to whether or not the turbine has started to reduce its speed due to the commencement of an inertia phase reduce (see the notation "a" in FIG. 81). Until the actual turbine speed change ratio dNt becomes less than the specified ration C1, at step 17, the base pressure Pb is maintained at the initial value Pb' and, however, once it becomes higher than the specified ratio C1, the base pressure Pb is increased constantly in fixed increments of a ratio obtained by multiplying the specified ratio C2 by a time t passed from a time the actual turbine speed change ratio dNt has reached the specified ration C1, thereby obtaining the base pressure Pb as shown in FIG. 82.

Feedback Pressure Calculation

Figure 74:
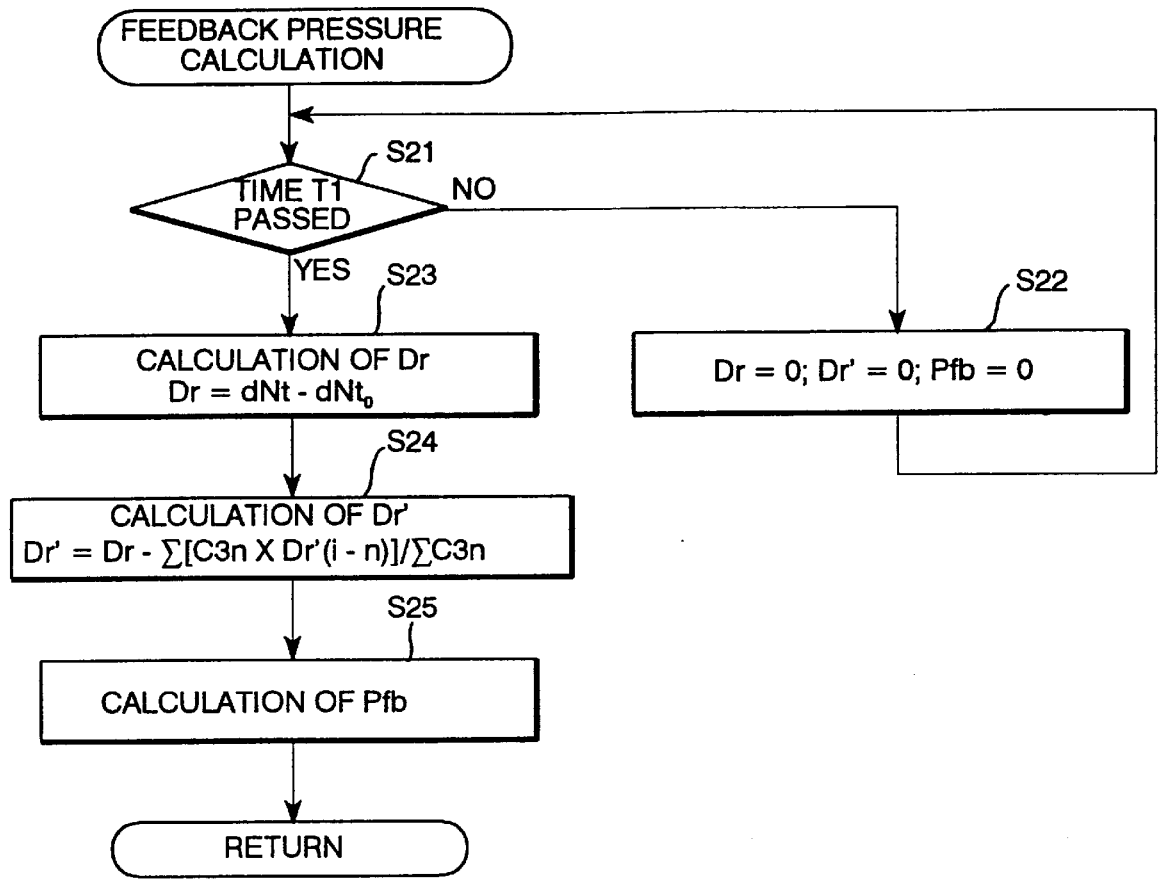
FIG. 74 is a flowchart illustrating a sequence for a calculation of feedback pressure during shifting.

Calculation of a feedback pressure Pfb at step S2 in the programs shown in FIG. 69 is accomplished in accordance with the program shown in FIG. 74. First of all, at step S21, after the turbine speed change ratio dNt has become smaller than the specified ratio C1, a decision is made as to whether or not a specified time T1 has passed. Until the passage of time T1, at step S22, while a deviation Dr relating to the target speed change ratio $dNt_0$ used with the control described hereafter, and a phase correction value Dr' are initialized and, at the same time, the feedback pressure Pfb is reset to a level of 0.

In summary, even when a gear shift commences in the inertia phase, the feedback control is prevented until the specified time T1 has passed. This is because, since the turbine speed change ratio dNt is obtained from the previous and current turbine speeds Nt, the turbine speed change ratio dNt is hardly obtainable accurately at the beginning of an inertia phase during which changes in the turbine speeds Nt is remarkable.

When the turbine speed change ratio dNt is obtainable accurately through the passage of specified time T1 during which the turbine speed change ratio dNt becomes somewhat fixed after the turbine speed change ratio dNt has become smaller than the specified ratio C1, at step S23, the deviation Dr ($=dNt-dNt_0$) of the actual turbine speed change ratio dNt from the target turbine speed change ratio $dNt_0$ is calculated, followed, at step S24, by a calculation of the phase correction value Dr' for the deviation Dr in accordance with the following formula.

$$Dr'=Dr-\Sigma[C3n \times Dr'(i-n)]$$

where C3n is the n-th coefficient C3; and

Dr'(i-n) is the phase correction value n cycles prior to the current cycle.

Letting, for instance, the number n be 4:

$$Dr'=Dr-[C3_1 \times Dr'(i-n)+C3_2 \times Dr'(i-2)+C3_3 \times Dr'(i-3)+C3_4 \times Dr'(i-4)]$$

For example, these coefficient $C3_1$, $C3_2$, $C3_3$ and $C3_4$ are set as values of 1, 1, 0, 5, 0 and 2, respectively.

That is, owing to a delay in response of control, even when an output corresponding to the current deviation Dr is provided, it is not reflected eventually on the control until a subsequent control cycle. If an output corresponding to another current deviation Dr at the commencement of the subsequent control cycle is provided again, it will be an over control, causing dissipation of the pressure or hunting of the turbine speed change ratio dNt.

For this reason, if a certain value of output is provided in the current cycle of control, then, in the subsequent cycle of control in which a value is given by subtracting the previous value from the value corresponding to the present deviation, the previous value is weighted for subtraction greatly as the measurement of the previous valve is close to the present moment. By this means, compensation is made for the pressure resulting from a delay in response or for a delay in the turbine speed change ratio dNt so as to cause the actual turbine speed change ratio dNt to converge at the target turbine speed change ratio $dNt_0$.

Figure 75:
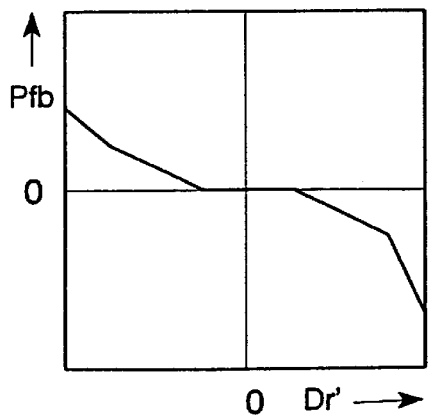
FIG. 75 is a diagram illustrating a map of feedback pressure used in the calculation of base pressure.

At step S25 in FIG. 74, the pressure corresponding to the phase correction value Dr' relating to the deviation Dr obtained in the manner described above, namely, the feedback pressure Pfb, is calculated on the basis of a map established as shown FIG. 75. In this instance, the feedback pressure Pfb has a negative value if the phase correction value Dr' relating to the deviation Dr is positive or a positive value if negative and the feedback pressure Pfb is established in its absolute value so as to correspond with an absolute value of the phase correction value Dr'. In this instance, as a safety measure for failure in the detection of the commencement of an inertia phase, as labeled by "B" in FIG. 81, a back-up timer is activated at a time a gear shift command is provided. If the timer counts up a specified time T2, then, in spite of the turbine speed change ratio dNt, the feedback control is commenced. Even in this instance, the feedback control is prevented until the passage of specified time T1 following the passage of specified time T2. The feedback control described above is fundamentally accomplished in the same manner even where there is control of the operating pressure during gear shifts other than the 1-2 gear shift.

Learned Control Pressure Calculation

Figure 76:
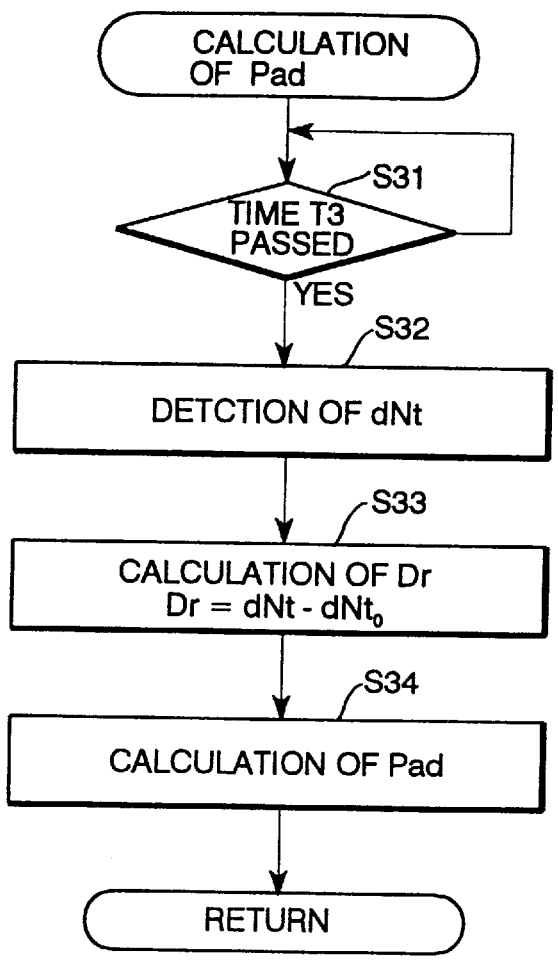
FIG. 76 is a flowchart illustrating a sequence for a calculation of learning control pressure during shifting.
Figure 77:
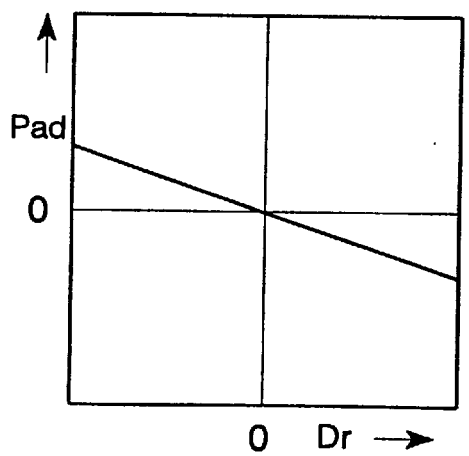
FIG. 77 is a diagram illustrating a map of learning control pressure used in the calculation of learning control pressure.

The calculation of learned control pressure Pad is made at step S3 of the program shown in FIG. 69 in order to correct the pressure Ps for another gear shift depending upon the appropriateness of the initial base pressure Pb' which exerts influence over the turbine speed change ratio dNt at the beginning of a gear shift. This calculation is accomplished in accordance with the program shown in FIG. 76. The first step at step 31 in FIG. 76 is a decision as to whether or not a specified time T3 has passed from the commencement of an inertia phase after the turbine speed change ratio dNt has become smaller than the specified value C1. If the specified time T3 has passed, then, at step S32, detection is made of an actual turbine speed change ratio dNt at a time of the lapse of the specified time T3. Subsequently, at step S33, along with calculating a deviation Dr relative to the target turbine speed change ratio $dNt_0$ at the time, a calculation is made on the basis of a map of learned control pressure Pad corresponding to the deviation Dr such as shown in FIG. 77. In this instance, the learned control pressure Pad, as was the case with the feedback pressure Pfb, is negative when the deviation Dr is positive or positive when the deviation Dr is negative. Together, an absolute value of the learned control pressure Pad is made correspond with an absolute value of the deviation Dr. It is desirable to set the specified time T3 equal to the specified time T1 wherein the feedback control is prevented from the commencement of an inertia phase.

Pre-Charge Period Determination

Figure 78:
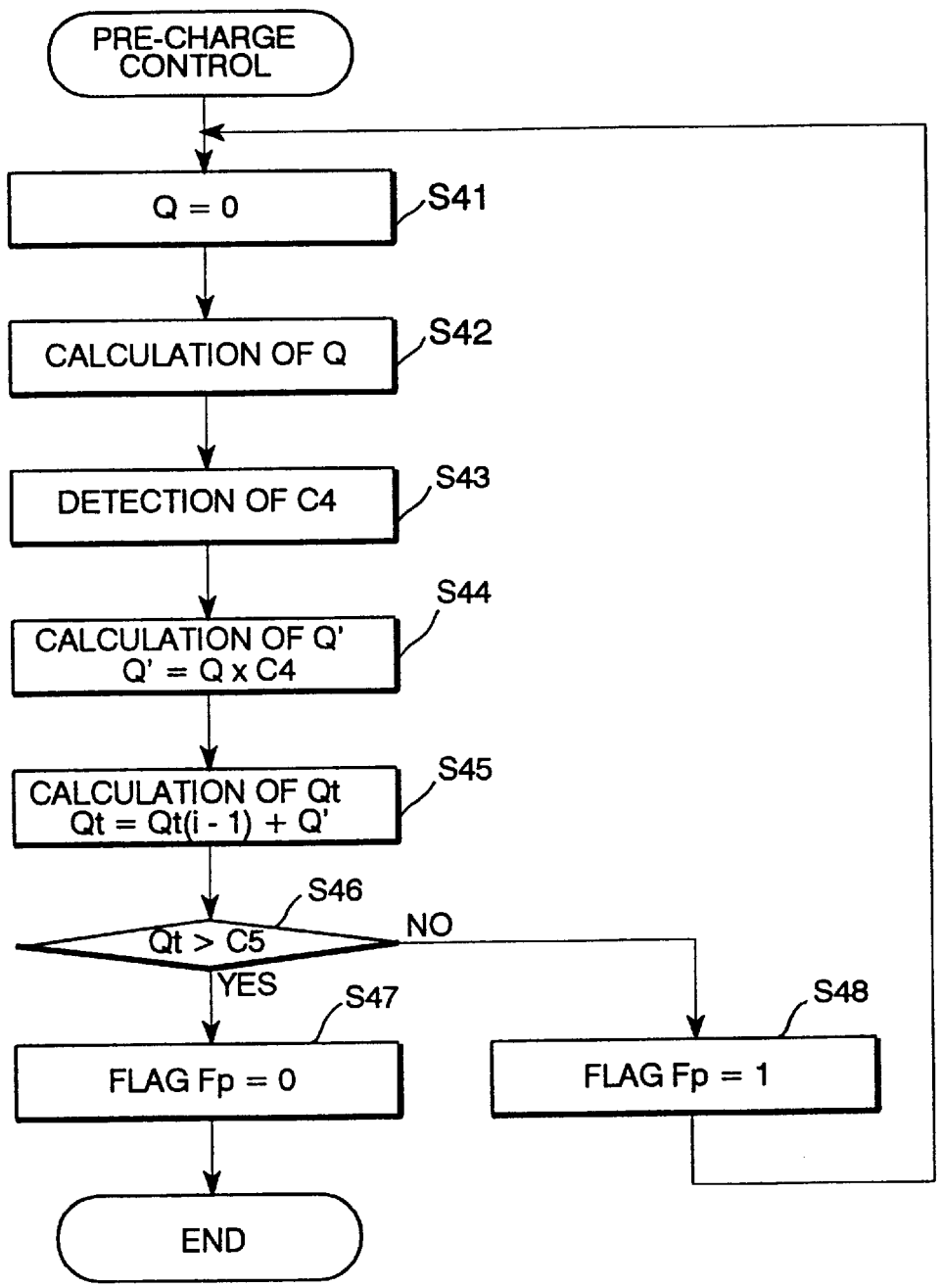
FIG. 78 is a flowchart illustrating a pre-charge control sequence during shifting.
Figure 79:
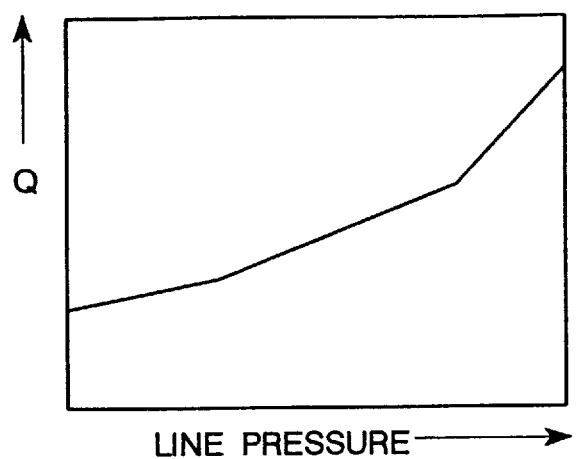
FIG. 79 is a diagram illustrating a map of base flow rate used in the pre-charge control.

Setting or resetting the pre-charge flag Fp, whose state is determined at step 5 of the program shown in FIG. 69, is accomplished to determination a pre-charge period in accordance with the program shown in FIG. 78. This program is executed, in parallel with the program shown in FIG. 69, upon an output of a gear shift command. At step S41, the total quantity Qt of an oil flow is set 0 at a time of initialization. Subsequently, at step S42, on the basis of a map established such as shown in FIG. 79, the base quantity Q of an oil flow passing through the first duty solenoid valve 1021 fully opened or operating at a duty rate of 0% is calculated based on the line pressure. In this case, the map defines the base quantity to become larger with an increase in the line pressure.

In order for the base flow quantity Q to be accurately calculated, utilization may also be made of an predicted line pressure obtained by means of estimation control of the line pressure which will be described in detail later.

Figure 80:
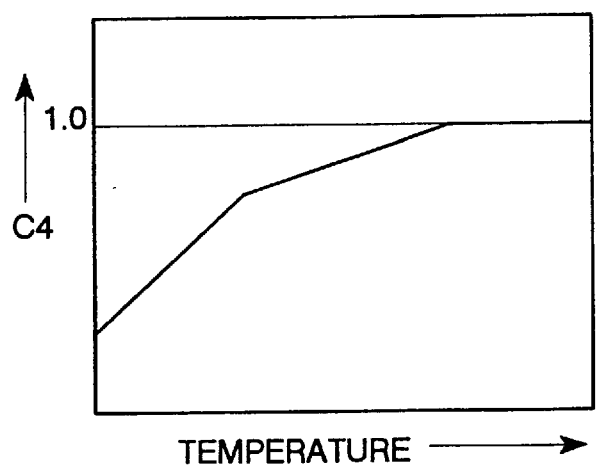
FIG. 80 is a diagram illustrating a map of oil temperature coefficient used in the pre-charge control.

At step S43, the oil temperature correction coefficient C4 is read from a map as shown in FIG. 80. The oil temperature map defines the correction coefficient C4 which becomes smaller than 1 as the temperature of hydraulic oil declines. At step S44, a correction value Q' is be obtained by multiplying the base flow quantity Q by the correction coefficient C4. By this means, if because of low temperature, the amount of hydraulic oil passing through a valve is less than that at standard temperature, it is appropriately corrected.

Thereafter, at step 45, the correction value Q' for the base flow amount Q is added up from the following formula so as to calculate the total quantity Qt of flowing oil from the commencement of the control to the current moment.

$$Qt=Qt(i-1)+Q'$$

At step S46, a decision is made as to whether or not the total oil flow quantity Qt has exceeded a specified quantity C5. Until the specified quantity C5 is exceeded, the pre-charge flag Fp is set to the state of 1 at step S47. On the other hand, when the specified quantity C5 is exceeded, the flag Fp is reset to the state of 0 at step S48. Through this means, during the period wherein the pre-charge flag is up or in the state of 1, at step S6 of the program shown in FIG. 69, control is made so as to make the duty rate of the first duty solenoid valve 1021 be 0, thereby quickly filling the oil passage leading to the pressure chamber 54a of the 2-4 brake 54 with hydraulic oil.

Figure 81:
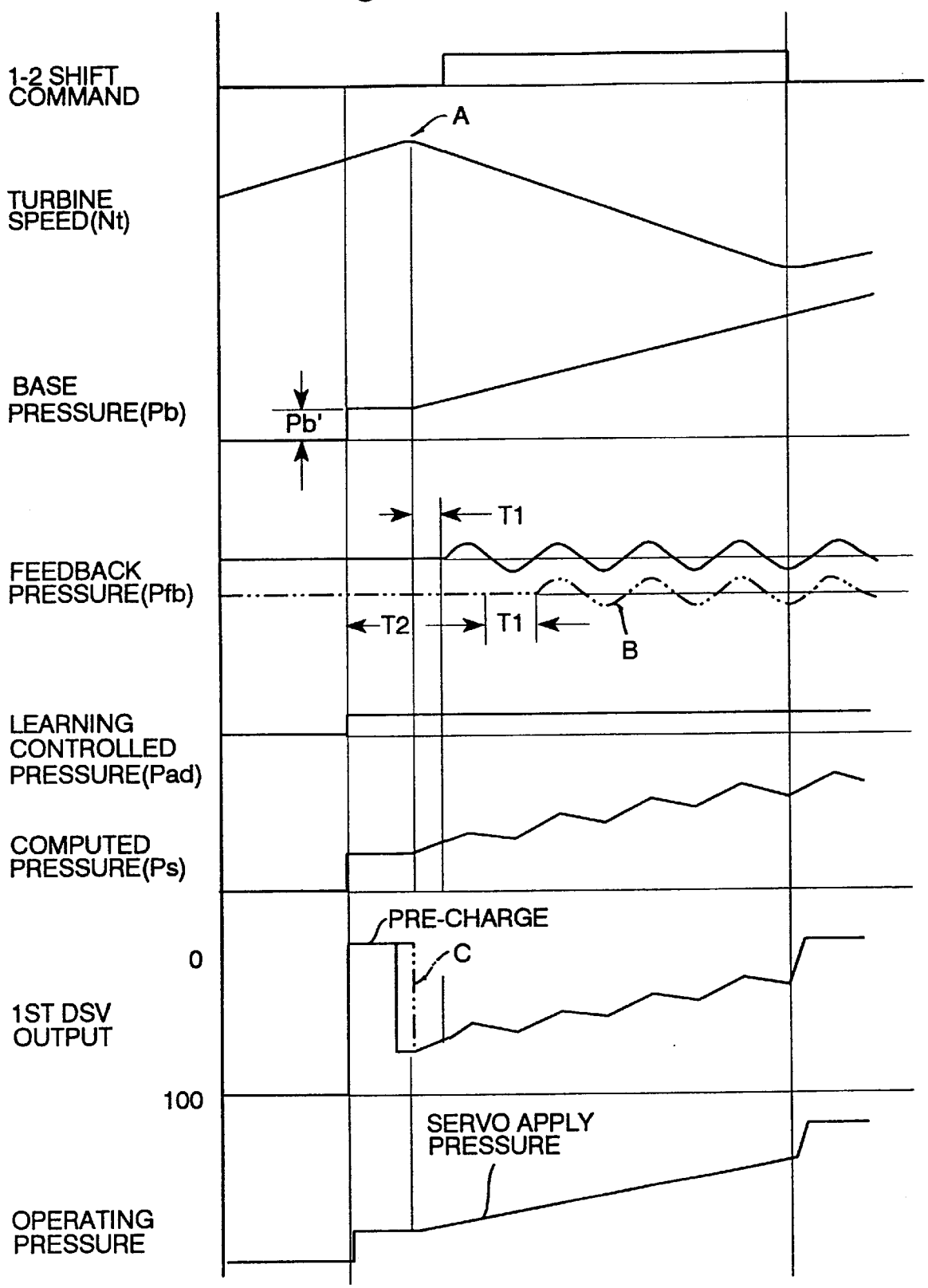
FIG. 81 is a time chart showing changes in various factors during shifting.
Figures 82, 83, 84:
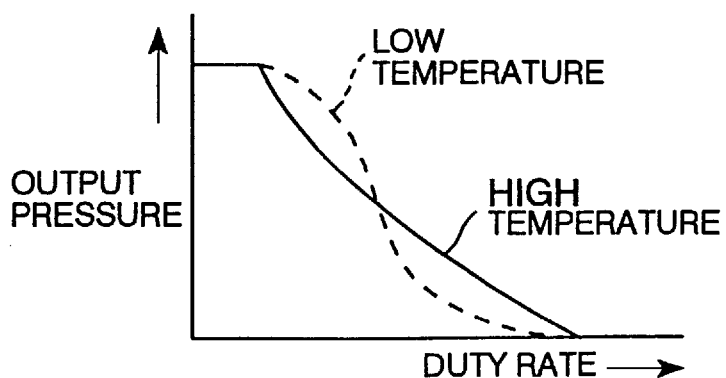
FIG. 82 is a diagram illustrating a conventional map for a calculation of duty rate.
FIG. 83 is a diagram illustrating a map for the calculation of duty rate for the first duty solenoid valve (DSV)
FIG. 84 is a diagram showing temperature characteristics of output pressure used in the calculation of duty rate for the first duty solenoid valve (DSV)

When gear shifting starts in advance of the completion of the pre-charge period determined in this sequence of control and, consequently, the turbine speed change ratio dNt becomes smaller than the specified ratio C1, the pre-charge control is terminated, as labeled with a character "C" in FIG. 81, and the duty control is conducted for servo apply pressure control. That is, an output is controlled to provide a duty rate so as to correspond to the pressure Ps calculated at step S8 of the program shown in FIG. 69.

Alternatively, the determination of such a pre-charge period may be predetermined in terms of time. In such the case, the time period is revised or corrected so as to become shorter with an increase in the temperature of oil. Otherwise, the pre-charge time period may be fixed and, in such a case, the duty rate is controlled during the fixed time period. The pre-charge control is not limited to accomplishing the 1-2 gear shift only, but is also accomplished in the same manner for other gear shifts when it is necessary to lock or coupling the friction coupling elements.

With the control described above, servo apply pressure, which changes in the way as shown in FIG. 81, is provided, based on which the coupling pressure for the 2-4 brake 54 is controlled so that the turbine speed change ratio dNt comes into conformity with the target turbine speed change ratio $dNt_0$ during 1-2 gear shifting.

Predicted Line Pressure Control

As indicated, the line pressure, which is used in the calculation of a base flow quantity Q for the determination of the pre-charge period, is regulated according to throttle opening by the linear solenoid valve 1031 in the hydraulic control circuit 1000 as shown in FIG. 57 and is not always maintained at a fixed level. This makes it essential to calculate the base flow quantity Q, on the basis of the line pressure upon the determination of pre-charge period. However, immediately after a change, the line pressure differs from a desired level of target pressure due to a delay in response and, consequently, the base flow quantity will not be obtained correctly if it is calculated from the target pressure.

Therefore, control is made to predict an actual line pressure P based on the target line pressure $P_0$. This prediction is accomplished in accordance with the following formulas.

$$P=[C6_5 \times P_0(i-5)+C6_4 \times P_0(i-4)+C6_3 \times P_0(i-3)+C6_2 \times P_0(i-2)+C6_1 \times P_0(i-1)]$$

In the above formula, C6n represents the coefficient C6 at an n-th cycle prior to the current cycle and $P_0$ (i–n) represents the target line pressure $P_0$ at an (i–n)-th cycle prior to the current cycle. In this instance, the coefficient C6n is set to be smaller for the latest cycle than for an earlier cycle.

Specifically, in each of the control cycles, since there is a time delay in response until the target line pressure $P_0$ is made manifest in the actual line pressure P, after making the level of manifest of the target line pressure $P_0$ obtained during the latest cycle, a weighted average of target line pressures obtained during the respective control cycles is given as a predicted actual line pressure. By this means, when the line pressure is changed, the prediction is made taking a time delay in response into consideration, the predicted line pressure P is close to the actual line pressure. The predicted line pressure control, which is extremely important during a torque demand gear shift where a particular increase in throttle opening is accompanied, and a pronounced change in the line pressure, enables to develop an operating pressure at a correct level for coupling a specific friction coupling element by determining the duty rate of the duty solenoid valve based on the predicted line pressure.

Duty Rate Calculation

The operating pressure Ps supplied to a specific friction coupling element during a gear shift, which is calculated, for instance, through the program shown in FIG. 69, must be converted into and represented by a duty rate, a signal of which is output to the related duty solenoid valve. Specifically, since the predicted line pressure and the target pressure as the output pressure obtained from the predicted line pressure as the source pressure are already known, the duty rate is fundamentally obtained as a proportional ratio of the output pressure relative to the source pressure. However, in actuality, the output pressure is not always faithful to the proportional ratio and, consequently, rather obtained on the basis of a map for correction. A map conventionally used is shown in FIG. 82, which arranges source pressure and target output pressure in a vertical column and a horizontal line, respectively. This correction map includes useless regions indicated by diagonal lines in the figure in each region of which the target output pressure are greater than the source pressure. In addition, there is the deficiency that, since there is little data concerning the output pressure in regions where the source pressure are low, strict control is hardly exercised.

In terms of strict control, the map has been revised and improved as shown in FIG. 83. In the improved map which defines corrected values corresponding to the duty solenoid valve characteristics for proportional ratios of target output pressure relative to source pressure in a line and source pressure in a column. For example, for the source pressure of 0.6 Kg/cm$^2$ and the target output pressure of 0.3 Kg/cm$^2$, the duty rate is found at an intersection between a line of 0.6 Kg/cm$^2$ and a column of 50% to be 48%. With this map, while the entire region of the map is effectively used, even regions where the source pressure is low are given the same number of data as the high regions, enabling such low source pressure regions having a demand for precise control to satisfy the demand.

As shown in FIG. 84, in order to corp with differences in the output pressure attributable to varying temperatures of the hydraulic oil even for the same source pressure and the same duty ratios, there are provided two correction maps for ordinary oil temperatures and low oil temperatures. These two maps are used together in order to obtain duty rates for interim oil temperatures by an interpolation method.

B: 2-3 Gear Shift Control

For a 2-3 gear shift, fundamentally, in addition to the operated state of various solenoid valves for the 2nd gear, the second duty solenoid valve 1022 is operated so as to provide an operating pressure for coupling the 3-4 clutch 53 and releasing the 2-4 brake 54. During the 2-3 gear shift, control is exercised over the operating pressure in the inertia phase during the coupling of the 3-4 clutch 53 so as to feedback control the magnitude of what is called leveled transitional pressure so as to permit appropriate slippage of the 3-4 clutch 53. In such a way, the turbine speed change ratio dNt is made to conform with the target turbine speed change ratio $dNt_0$. In the specification, the term "leveled transitional pressure" shall mean and refer to an increasing pressure staying at a level for a certain period. Such the leveled transitional pressure control is accomplished not by means of controlling the 3-4 clutch coupling pressure through the second duty solenoid valve 1022 but by means of controlling the servo apply pressure through the first duty solenoid valve 1021. Specifically, as shown in FIG. 57, in the hydraulic control circuit 1000, since the pressure lines 1125, leading to the servo release pressure line 1121 and the pressure line 1126, leading to the 3-4 clutch pressure line 1127, branch off from the pressure line 1124 extending from the second duty solenoid valve 1022 and the orifice 1051 is disposed upstream from the juncture of the pressure line 1124, during supplying or discharging operating pressure, the pressure line 1124 is disconnected in terms of operating pressure from the second duty solenoid valve 1022 upstream therefrom. In addition, while the piston reciprocates within the servo cylinder 543 under the supply of servo release pressure to the servo release chamber 54, it is difficult to control the operating pressure within the pressure chamber of the 3-4 clutch 53.

On the other hand, since the servo apply pressure chamber 54*a* and the servo release pressure chamber 54*b* are separated by the piston 544 (see FIG. 41), the operating pressure within the servo release pressure chamber 54*b* is directly affected by the operating pressure within the servo apply pressure chamber 54*a*. Consequently, controlling the 3-4 clutch pressure is effected through the servo release pressure by means of controlling the servo applied pressure. In addition, the second duty solenoid valve 1022 controls the quantity of flow of the operating oil supplied to the servo release pressure chamber 54*b* of the 2-4 brake 54 and the operating pressure chamber of the 3-4 clutch 53 through the orifice 1051. By this means, the transition time of the leveled transitional pressure in the inertia phase during locking the 3-4 clutch 53 is controlled. Accordingly, for the 2-3 gear shift control, while the height of the leveled transitional pressure during locking the 3-4 clutch 53 is controlled by means of the first duty solenoid valve 1021, the transition time is controlled by means of the second duty solenoid valve 1022.

An explanation is subsequently provided with regard to the practical control of the first and second duty solenoid valves 1021 and 1022.

First DSV Control

Figure 85:
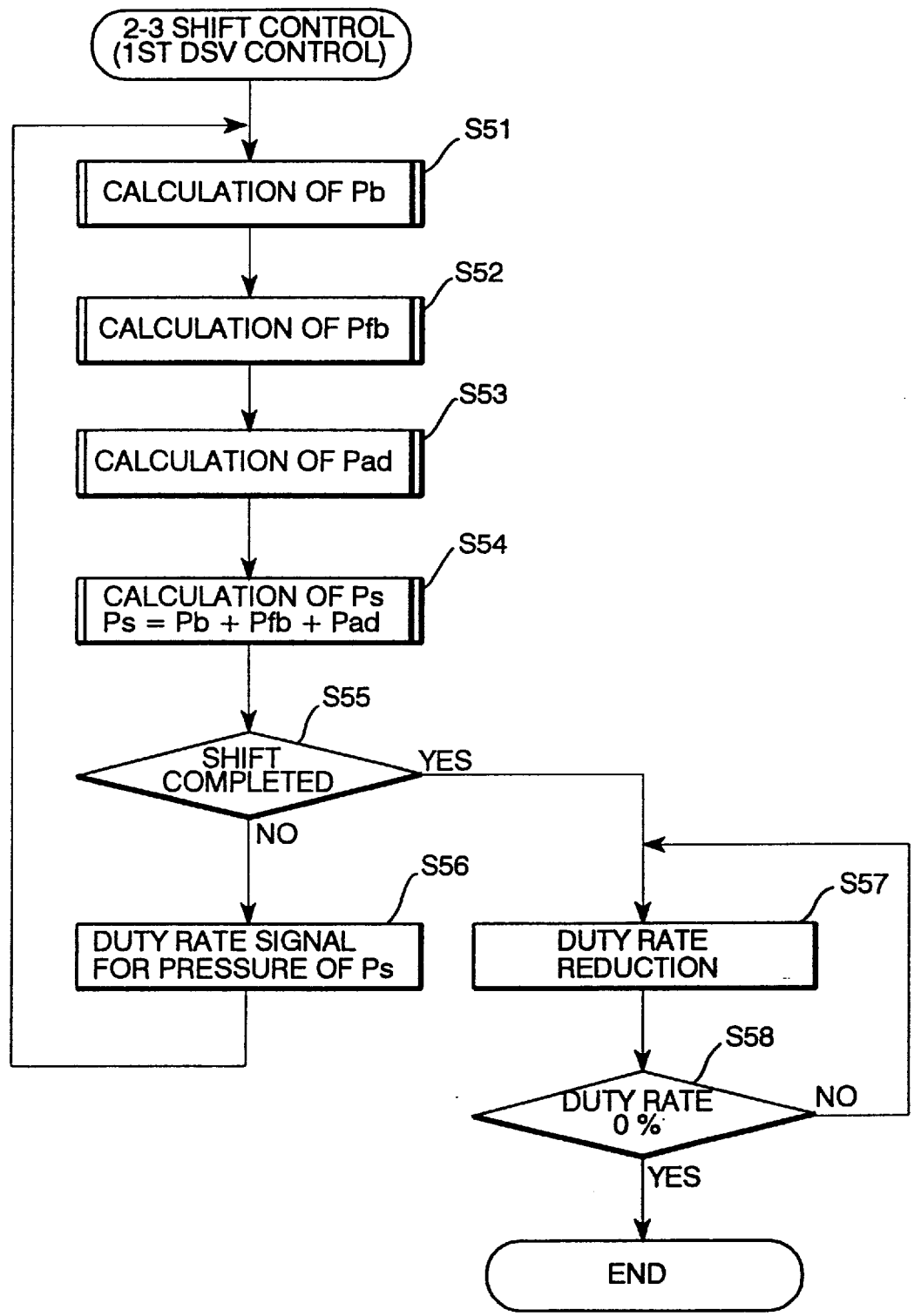
FIG. 85 is a flowchart illustrating a control sequence for the first duty solenoid valve (DSV) during 2-3 shifting.

Control of the servo apply pressure through the first duty solenoid valve 1021 is executed in accordance with the program shown in FIG. 85. In the program, steps S51–S54 operate in the same manner as steps S1–S4 in the program of the 1-2 shift-shown in FIG. 69. The base pressure Pb, the feedback pressure Pfb, and the learned control pressure Pab are calculated, respectively, in accordance with the same program as for each of the related programs described above, and following their addition, the computed operating pressure Ps is obtained. At step 55, a decision is subsequently made as to whether or not the shift operation has been completed. Until the shift operation has been completed, a duty rate corresponding to the computed operating pressure Ps is output at step S56. Since the duty rate of the first duty solenoid valve immediately prior to an occurrence of the 2-3 gear shift is 0%, and consequently, servo apply pressure is supplied, the pre-charge control is not conducted.

Figure 87:
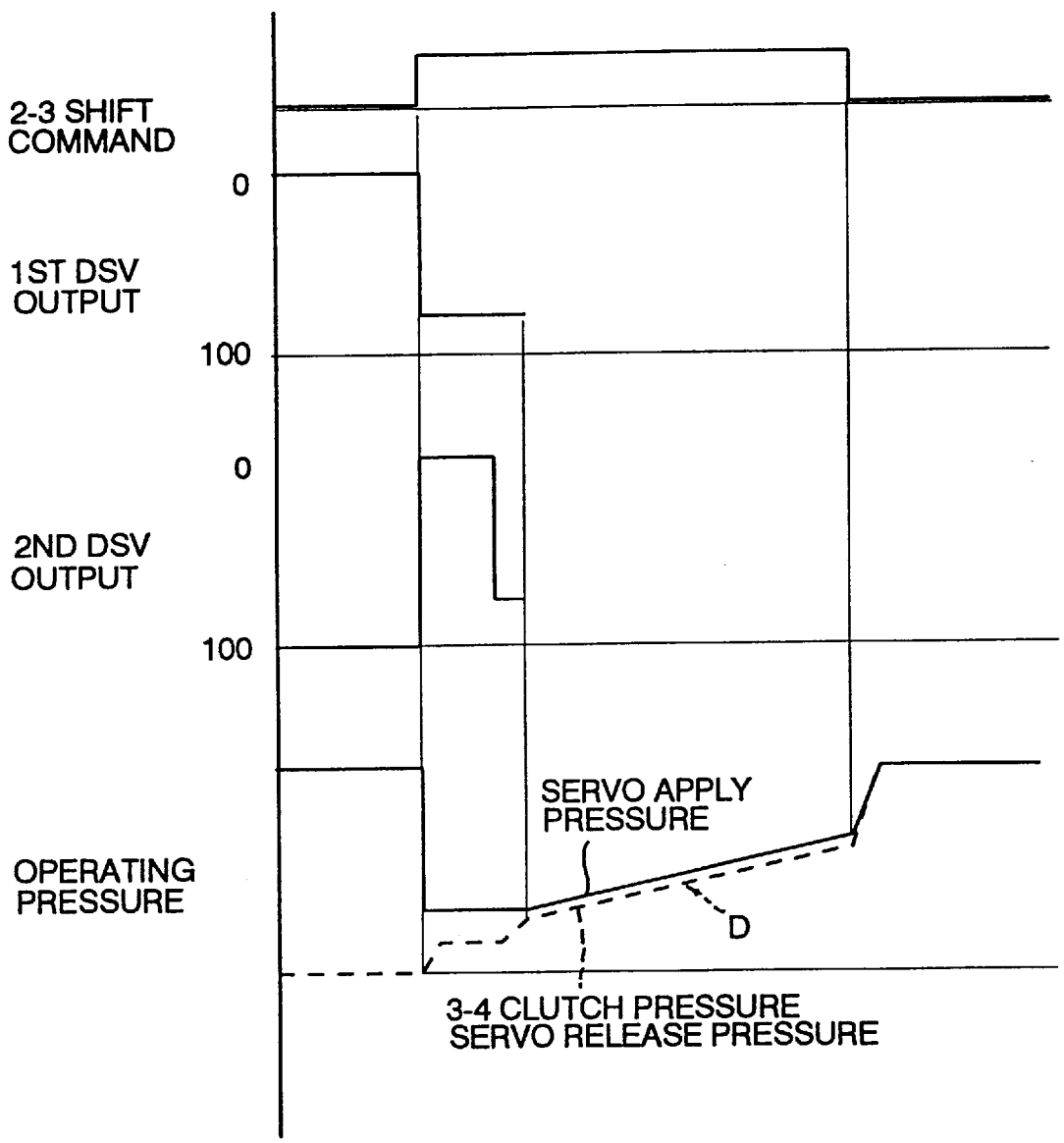
FIG. 87 is a time chart showing changes in various factors during 2-3 shifting.

When the 2-4 gear shift has been concluded, the duty rate is reduced at a fixed rate to 0% through steps S57 and S58. In the way, a duty rate signal, changing as shown in FIG. 85, is output, in accordance with which, as seen in the same diagram, there is developed a servo apply pressure dropping once from a specified level and increasing to another specified level by way of a leveled transitional pressure. A 3-4 clutch pressure and a servo release pressure are correspondingly developed. In particular, as indicated by reference D in the FIG. 87, the levelled transitional pressure in the inertia phase during locking the 3-4 clutch 53 is controlled to a level corresponding to that of the servo apply pressure.

2nd DSV Control

Figure 86:
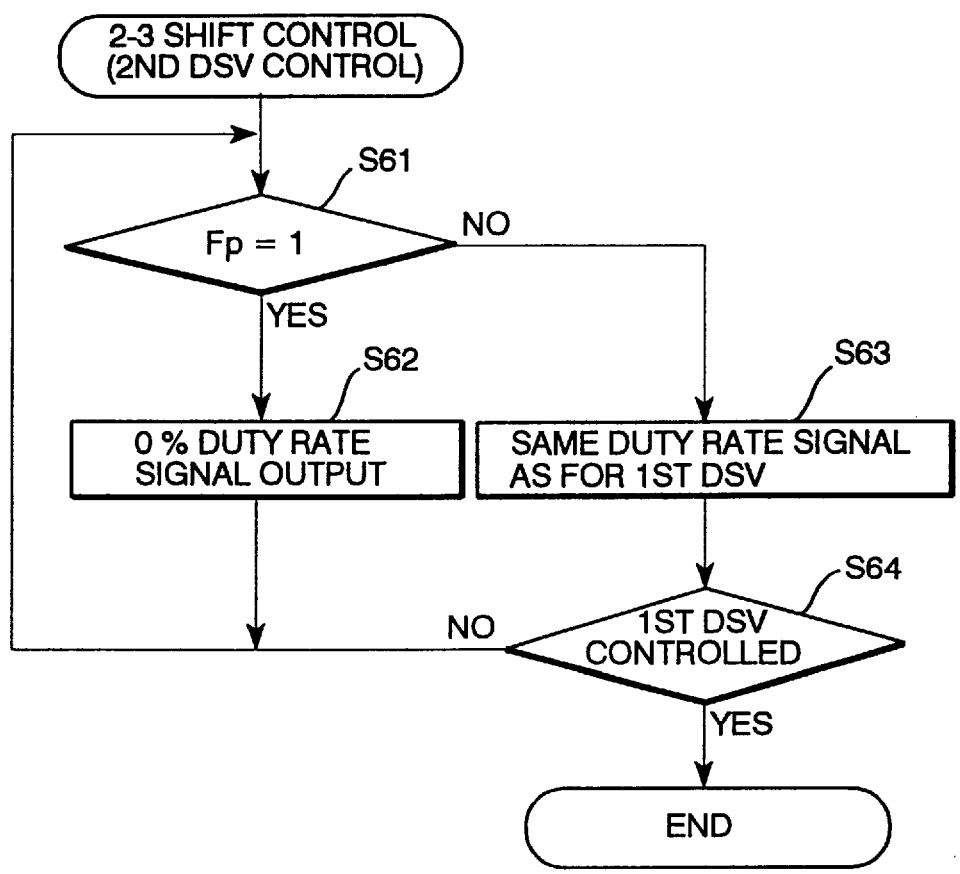
FIG. 86 is a flowchart illustrating a control sequence for a second duty solenoid valve (DSV) during 2-3 shifting.

On the other hand, control of the second duty solenoid valve 1022 is executed in accordance with the program shown in FIG. 86. the first step at step S6 1 in the figure is to make a decision as to whether or not the pre-charge flag Fp has been up or set to the state of 1, namely whether or not there exists the pre-charge period in accordance with the program. When it is in the pre-charge period (Fp=1), then, the duty rate of the second duty solenoid valve 1022 is set 0% at step S62 so as to perform the pre-charge control in which the oil passage leading to the servo release pressure chamber 54*b* of the 2-4 brake 54 and the pressure chamber of the 3-4 clutch 53 are rapidly filled with the operating oil.

Subsequently, when the pre-charge control has been achieved (Fp=0), then, at step S63, a signal representative of the duty rate which is the same as that of the first duty solenoid valve 1021 obtained at step S56 in the program in FIG. 85 is output to the second duty solenoid valve 1022. Ac a result, through the orifice 1051, the quantity of flow of the operating oil supplied to the servo release pressure chamber 54*b* of the 2-4 brake 54 and the pressure chamber of the 3-4 clutch 53 is reduced from during the pre-charge control and suppressed to a specified quantity. In particular, the duty rate of the second duty solenoid valve 1022 made to be the same as that of the first duty solenoid valve 1021 provides for the servo apply and release chambers 54*a* and 54*b* of the 2-4 brake 54 the same level of servo apply and servo release pressures, respectively. In this instance, as shown in FIG. 41, since the pressure receiving area of the piston 544 are substantially the same in both chambers 54*a* and 54*b*, the piston 544 strokes in the releasing direction only through the effort of the return spring 546, this movement being accomplished over a relatively long period of time. Subsequently, at step S64, when a determination is made that the control of the first duty solenoid valve 1021 is over, the control of the second duty solenoid valve 1022 is also terminated.

As described above, a sufficient transition period is assured for the leveled transitional pressure during locking the 3-4 clutch 53 and, consequently, the inertia phase is positively completed in this transition period, so as, for example, to avoid significant shift shocks due to a sudden increase in the operating pressure following the conclusion of a transition period within the inertia phase.

C: 3-4 Shift Control

For a 3-4 gear shift, simultaneously with releasing the forward clutch 51, the 2-4 brake 54 is locked. When a 3-4 shift command is provided, the hydraulic control circuit 1000 changes its operating condition so that the first solenoid valve 1011 switches from the OFF state to the ON state as shown in FIGS. 62 and 63, forcing the 3-4 shift valve 1005 to shift its spool so as to connect communication between the forward clutch pressure line 1119 and the servo release pressure line 1121. On the other hand, the third duty solenoid valve 1023 discharges the forward clutch pressure, as well as the servo release pressure, through the pressure lines 1119 and 1121, so that the forward clutch 51 is unlocked and the 2-4 brake 54 is locked. At this time, although the servo apply pressure chamber 54*a* of the 2-4 brake 54 has been filled with the servo apply pressure, it controls a levelled transitional pressure of the servo apply pressure during locking the 2-4 brake 54 through the first duty solenoid valve 1021.

First DSV Control

Figure 88:
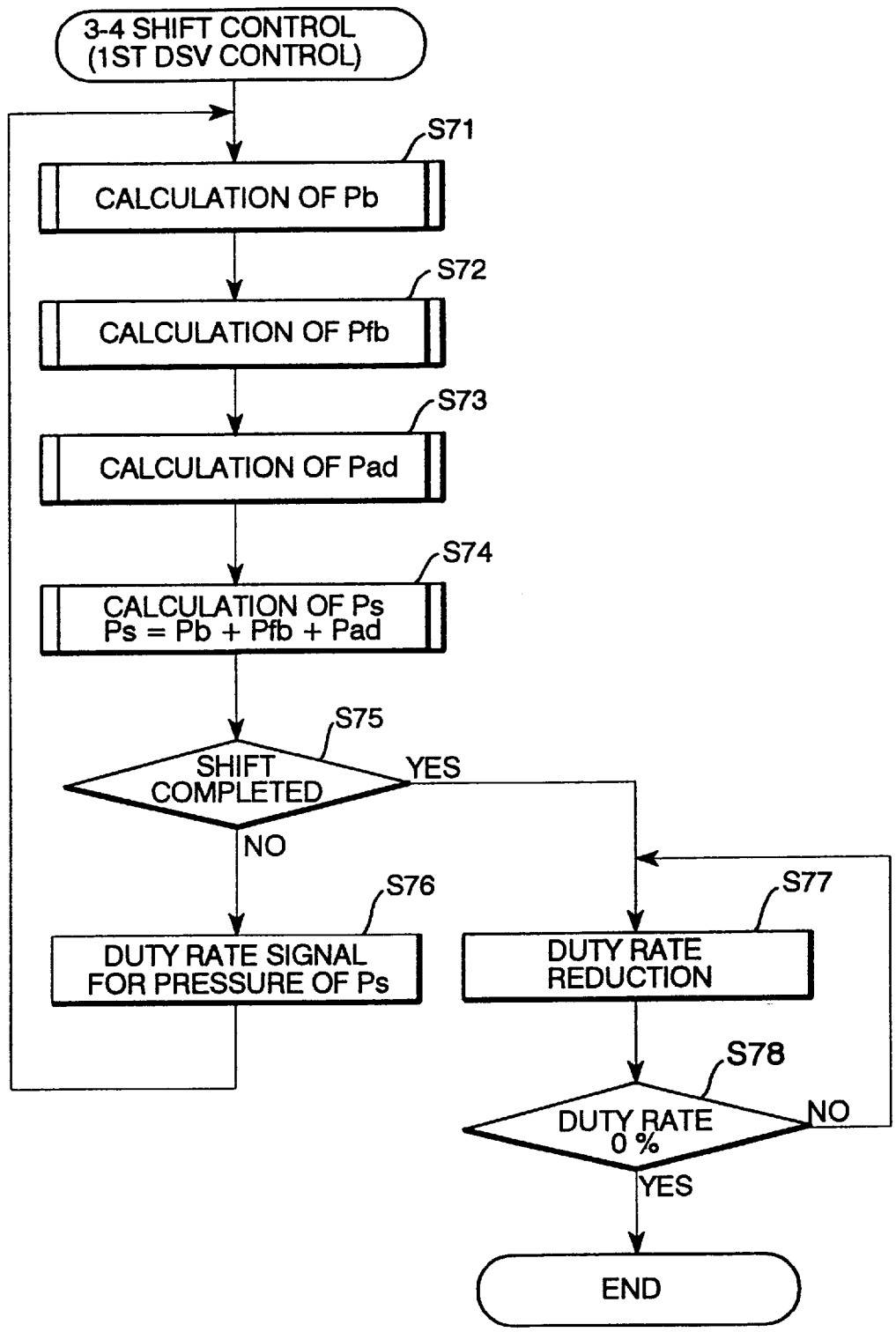
FIG. 88 is a flowchart illustrating a control sequence for the first duty solenoid valve (DSV) during 3-4 shifting.

Control of the servo apply pressure through the first duty solenoid valve 1021 is executed in accordance with the program shown in FIG. 88. This program operates similarly to control of the first duty solenoid valve 1021 during a 2-3 gear shift. Through steps S71–S74, after having obtained the base pressure Pb, the feedback pressure Pfb and the learned control pressure Pad, a computed pressure Ps is obtained.

Figure 90:
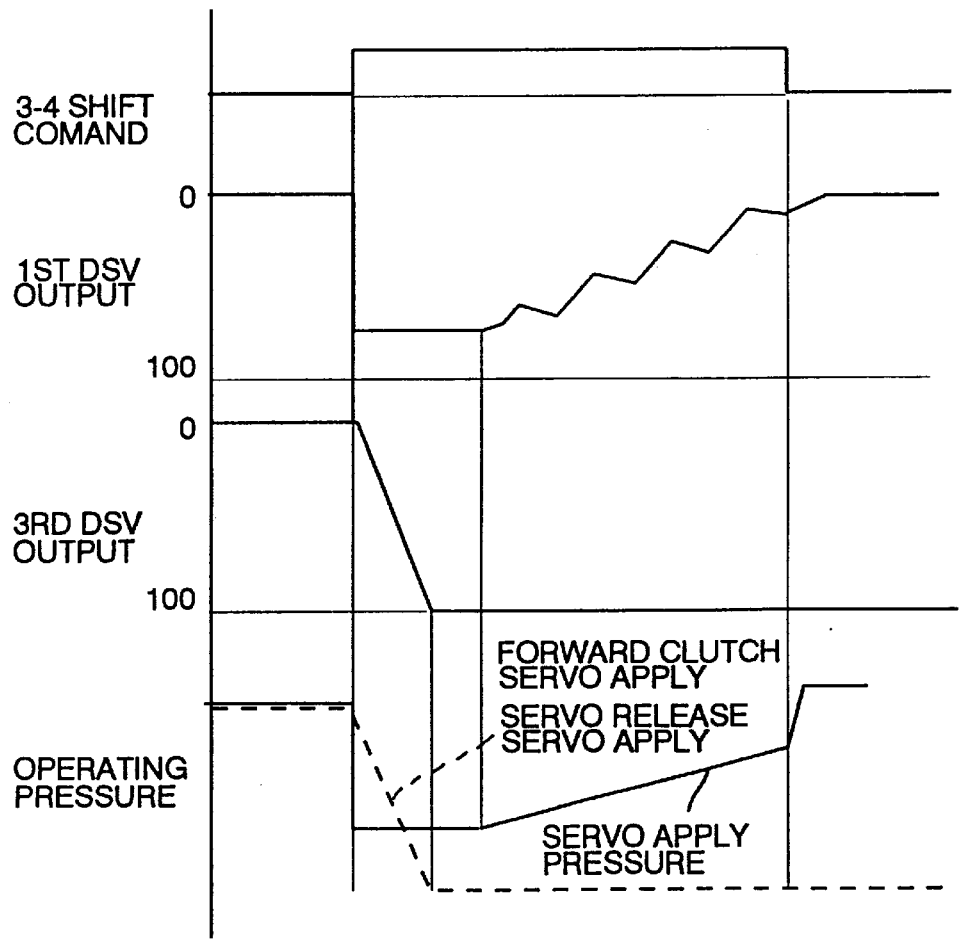
FIG. 90 is a time chart showing changes in various factors during 3-4 shifting.

Thereafter, through steps S75 and S76, a signal representative of a duty rate corresponding to the computed pressure Ps is output to the first duty solenoid valve 1021 continuously from an occurrence of a shift command to the completion of the gear shift so as to control the servo apply pressure. After the completion of the gear shift, the duty rate is reduced by a fixed rate to 0% through steps S77 and S78. In this way, as shown in FIG. 90, the servo apply pressure is developed so as to drop once at the beginning of the gear shift and increase via a specified level and transition time of levelled transitional pressure.

3rd DSV Control

Figure 89:
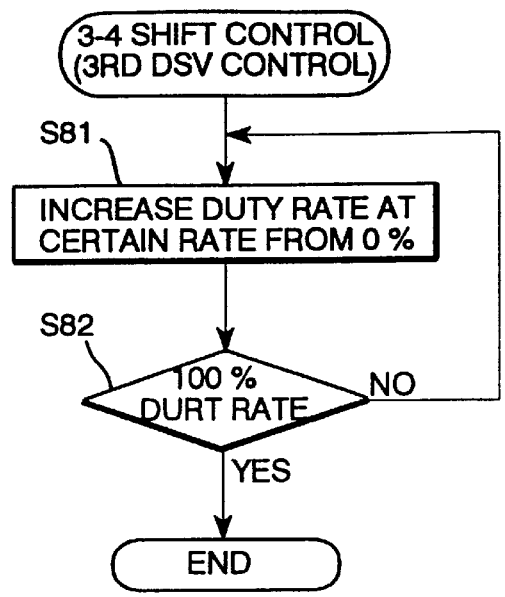
FIG. 89 is a flowchart illustrating a control sequence for a third duty solenoid valve (DSV) during 3-4 shifting.

Discharging forward clutch pressure and the servo release pressure is accomplished by the program shown in FIG. 89 through the third duty solenoid valve 1023. This discharge control increases the duty rate from 0% to 100% at a fixed rate from an occurrence of a shift command through steps S81 and S82. Because of this, as shown in FIG. 90, the forward clutch pressure and the servo release pressure are discharged at a constant rate. As described above, while the forward clutch 51 is released relatively quickly, the 2-4 brake 54 is brought into coupling by the feedback control of the servo apply pressure via an appropriate slipping condition so to make the turbine speed change ratio dNt changes in conformity with the target turbine speed change ratio dNt0.

D: 1-3 Gear Shift Control

A 1-3 gear shift is achieved by locking the 3-4 clutch 53 while holding the 2-4 brake unlocked. During the 1-3 gear shift, while the 3-4 clutch pressure and the servo release pressure are supplied, the servo apply pressure is also supplied providing for a gear shift to the second gear or the forth gear from the third gear immediately after the gear shift from the first gear to the third gear. Therefore, in this 1-3 gear shift, the supply control is accomplished of the servo apply pressure through the first duty solenoid valve 1021 simultaneously with the supply control of the 3-4 clutch pressure and the servo release pressure through the second duty solenoid valve 1022.

2nd DSV Control

Figure 91:
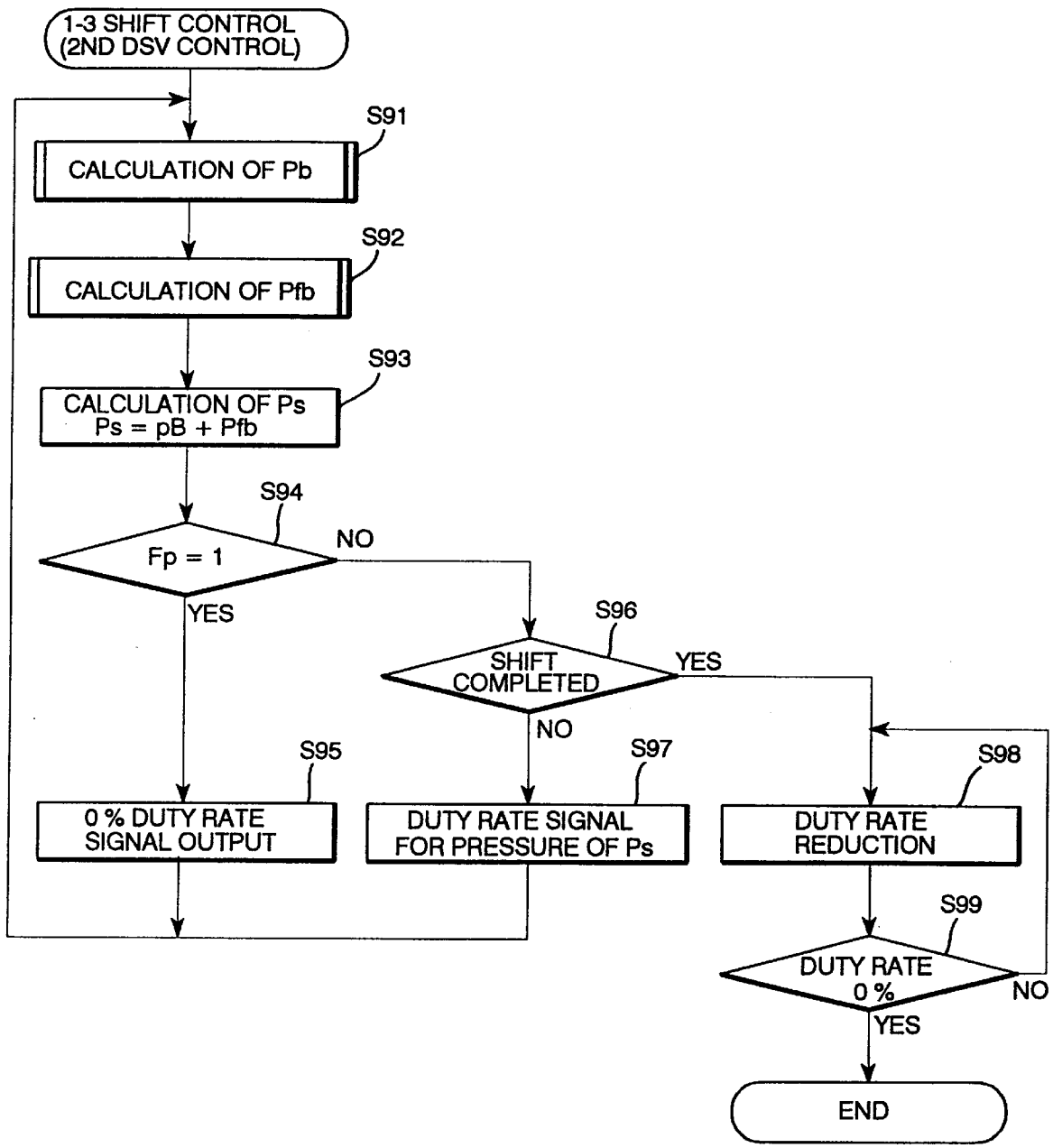
FIG. 91 is a flowchart illustrating a control sequence for the second duty solenoid valve (DSV) during 1-3 shifting.

Control of the second duty solenoid valve 1022 during the 1-3 gear shift is executed in accordance with the program shown in FIG. 91. This program is, on one hand, similar to the servo apply pressure control accomplished through the first duty solenoid valve 1021 during a 1-2 gear shift shown in FIG. 69 and, on the other hand, differs only at a point in which the learning control is not conducted. Specifically, after calculations of the base pressure Pb and the feedback pressure Pfb at steps S91 and S92, the pressure Ps is calculated by adding them together at step S93. When it is in the pre-charge period (Fp=1) which is determined in the pre-charge determination program, the duty rate of the second duty solenoid valve 1022 is changed to 0% so as to perform precharging to fill quickly the oil passage leading to the pressure chamber of the 3-4 clutch 53 with the operating fluid through steps S94 and S95. When the pre-charge control is concluded (Fp=0), through steps S96 and S97, the duty rate corresponding to the computed operating pressure Ps is calculated, and a signal representative of which is continuously output to the second duty solenoid valve 1022 until the completion of the gear shift. After the completion of the gear shift, the duty rate is reduced to 0% at a fixed rate through steps S98 and S99.

Figure 93:
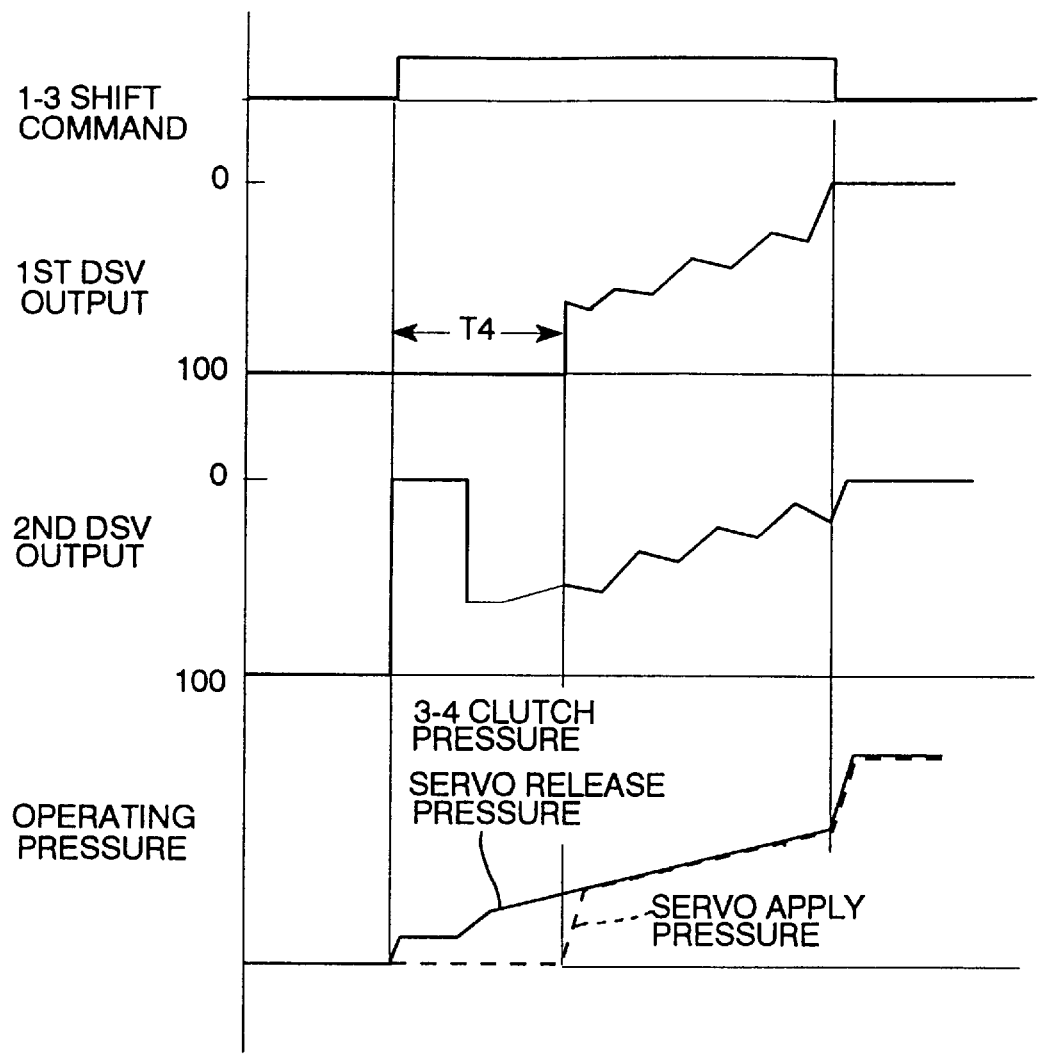
FIG. 93 is a time chart showing changes in various factors during 1-3 shifting.

With the control, as shown in FIG. 93, the 3-4 clutch pressure and the servo release pressure are supplied via the state of the specified constant pressure, and the 3-4 clutch 53 is brought into coupling via an appropriate slipping condition so to make the turbine speed change ratio dNt changes in conformity with the target turbine speed change ratio dNtO.

1st DSV Control

Figure 92:
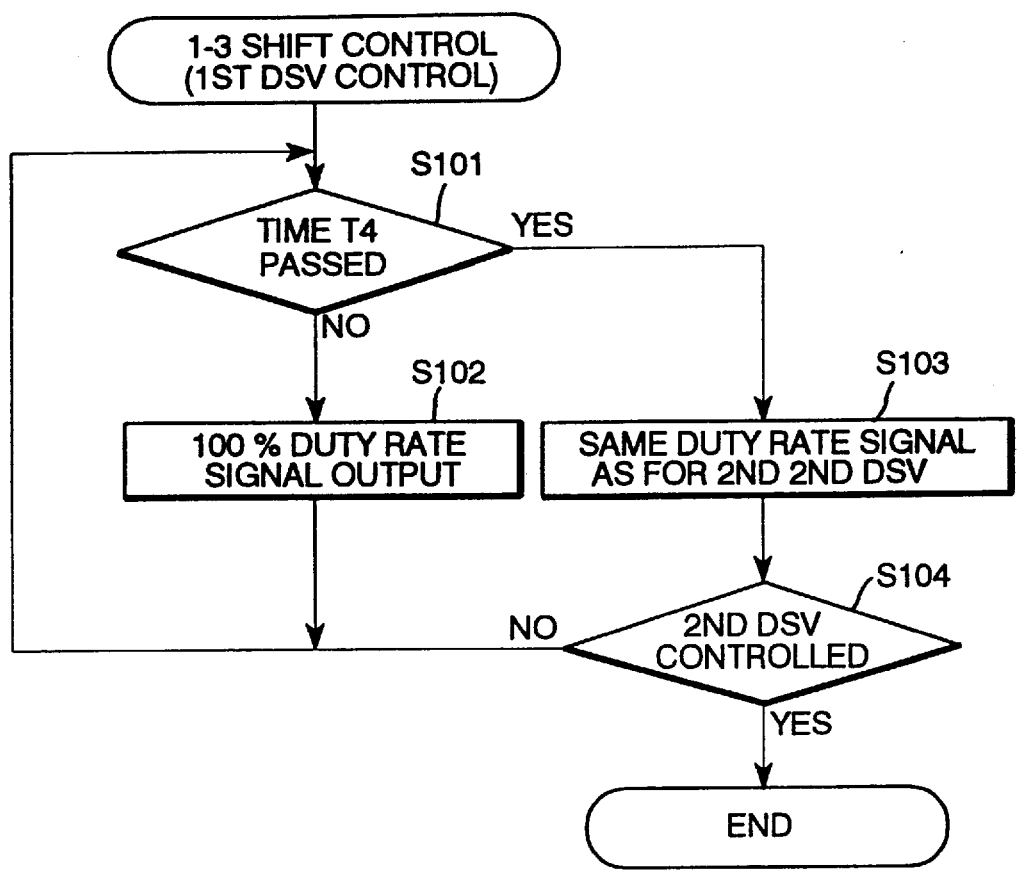
FIG. 92 is a flowchart illustrating a control sequence for the first duty solenoid valve (DSV) during 1-3 shifting.

In order for the first duty solenoid valve 1021 to provide for shifting to the second gear or the forth gear after the 1-3 gear shift, control of the supply of servo apply pressure is executed in accordance with the program shown in FIG. 92. At step S101, after an occurrence of a shift command for the 1-3 gear shift, a decision is made as to whether or not a specified time T4 has passed. Until the specified time T4 has passed, a signal representative of a duty rate of 100% is output to the first duty solenoid valve 1021 at step S102. During this period, the servo apply pressure is not supplied and only the 3-4 clutch pressure and servo release pressure are supplied. This is to avoid that the 2-4 brake 54 is temporally brought into coupling due to the servo apply pressure supplied prior to the servo release pressure. This prevents an occurrence of the second gear during the 1-3 gear shift, or an occurrence of interlock of the transmission gear mechanism caused by a simultaneous lock of the 2-4 brake 54 and the 3-4 clutch 53. While, when the specified time T4 has passed, a signal representative of the duty rate which is the same as that output to the second duty solenoid valve 1022 is output to the first duty solenoid valve 1021 at step S103, when it is determined that the control of the second duty solenoid valve 1022 has been completed, the control of the first duty solenoid valve 1021 is also terminated at the moment at step S104.

As shown in FIG. 93, the operating pressure which is the same as the servo release pressure is supplied as the servo apply pressure from a lapse of the specified time T4 following an occurrence of a shift command, In such a case, as described previously, since the areas for receiving pressure of the piston 544 is substantially equal on the sides of the servo apply pressure chamber 54a and servo release pressure chamber 54b of the 2-4 brake 54, only the return spring 546 acts on the piston 544, preventing the piston 54 from operating in the direction in which it brings the 2-4 brake 54 into locking.

E: 1-4 Gear Shift Control

A 1-4 gear shift is accomplished by, on one hand, unlocking the forward clutch 51 and, on the other hand, locking both 3-4 clutch 53 and 2-4 brake 54 so as to perform control of supplying 3-4 clutch pressure though the second duty solenoid valve 1022, control of supplying servo apply pressure through the first duty solenoid valve 1021, and control of discharging forward clutch pressure through the third duty solenoid valve 1023. As will be obvious through a comparison between FIGS. 60 and 62, during the control, the hydraulic control circuit 1000 causes the first solenoid valve 1011 switches from the OFF state to the ON state, supplying a pilot pressure is supplied to the 3-4 shift valve 1005 through the relay valve 1007. As a result, the 3-4 shift valve 1005 disconnects the communication of the servo release pressure line 1121 with the 3-4 clutch line 1127 and connects the communication of it with he forward clutch line 1119.

2nd DSV Control

Figure 94:
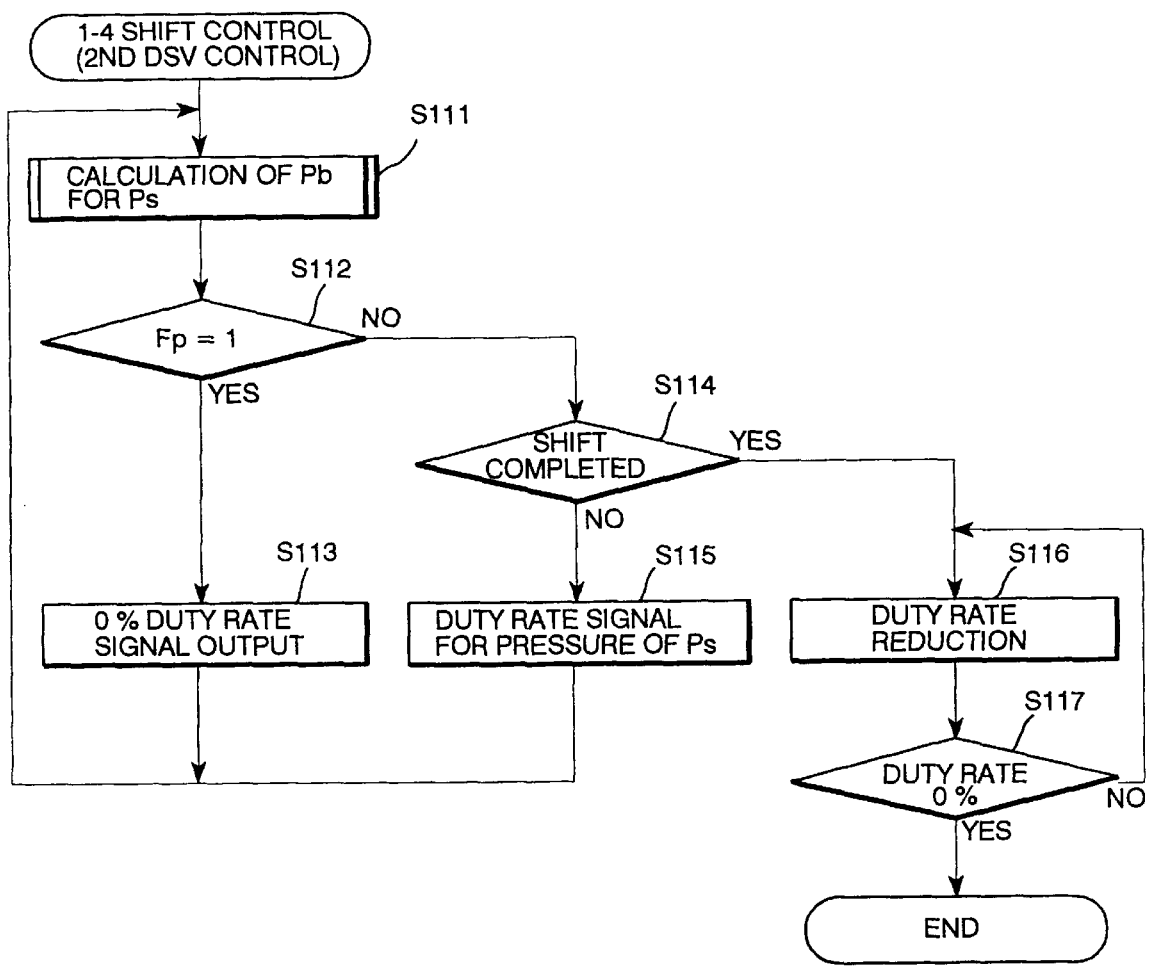
FIG. 94 is a flowchart illustrating a control sequence for the second duty solenoid valve (DSV) during 1-4 shifting.
Figure 95:
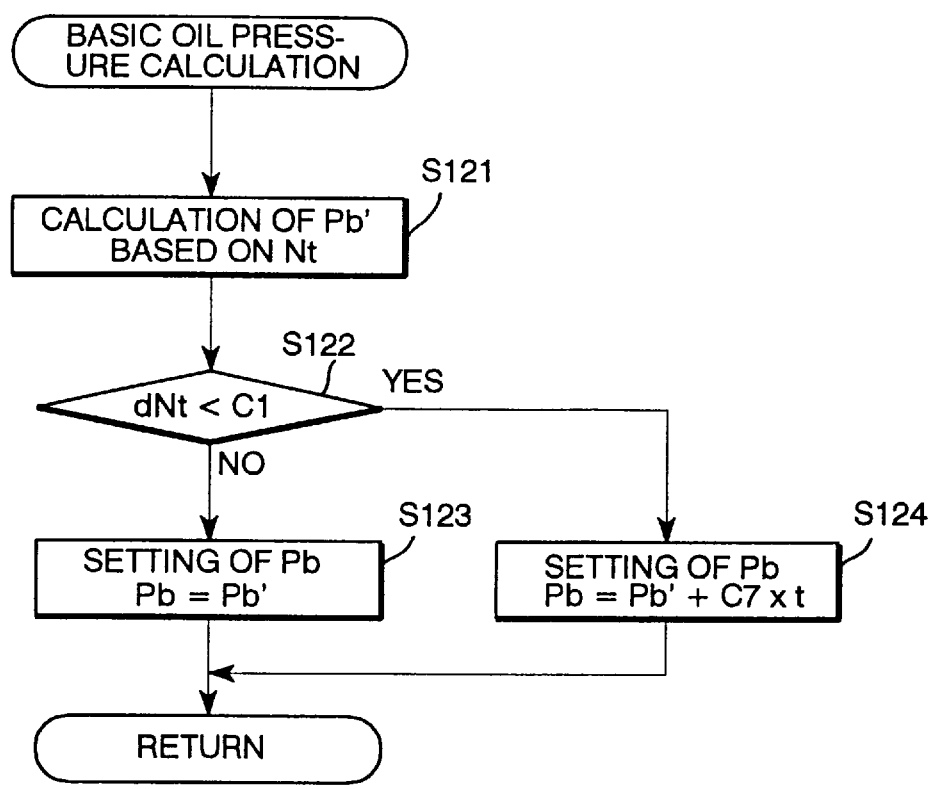
FIG. 95 is a flowchart illustrating a sequence for a calculation of base pressure during 1-4 shifting.

One of the duty solenoid valves operative during the 1-4 gear shift, namely the second duty solenoid valve 1022, controls supply of the 3-4 clutch pressure in accordance with the program shown in FIG. 94. After having calculated the operating pressure Ps at step S111, through steps S112 and S134, the second duty solenoid valve 1022 is operated at a duty rate of 0% for the specified pre-charge period (Fp=1) so as to execute the pre-charge control by which operating oil is quickly filled in the oil passage leading to the pressure chamber of the 3-4 clutch. When the pre-charge control is concluded (Fp=0), a signal representative of the duty rate corresponding to the computed pressure Ps is continuously output to the second duty solenoid valve 1022 until the completion of the gear shift, through steps S114 and S115. In addition, after the completion of the gear shift, the duty ratio is reduced to 0% at a fixed rate through steps S116 and Si 17. In this instance, during the 1-4 gear shift, without calculating the feedback pressure Pf and the leaning control pressure Pad, the base pressure is taken as the calculated pressure Ps. In place of the calculation of this base pressure, as shown in FIG. 95, an initial level of pressure Pb', which is established corresponding to the turbine speed Nt immediately before the gear shift at step S121, is simply substituted for the base pressure Pb until the commencement of the inertia phase in which the turbine speed change ratio dNt becomes smaller than the specified ratio C1 through steps S122 and S123 and Pb and thereafter increased at a fixed rate through steps S124.

This is because the 1-4 gear shift is generally demanded in driving conditions where the engine throttle valve is abruptly closed and needs not any accurate control of pressure, such as the feedback control and the learning control.

1st DSV Control

Figure 96:
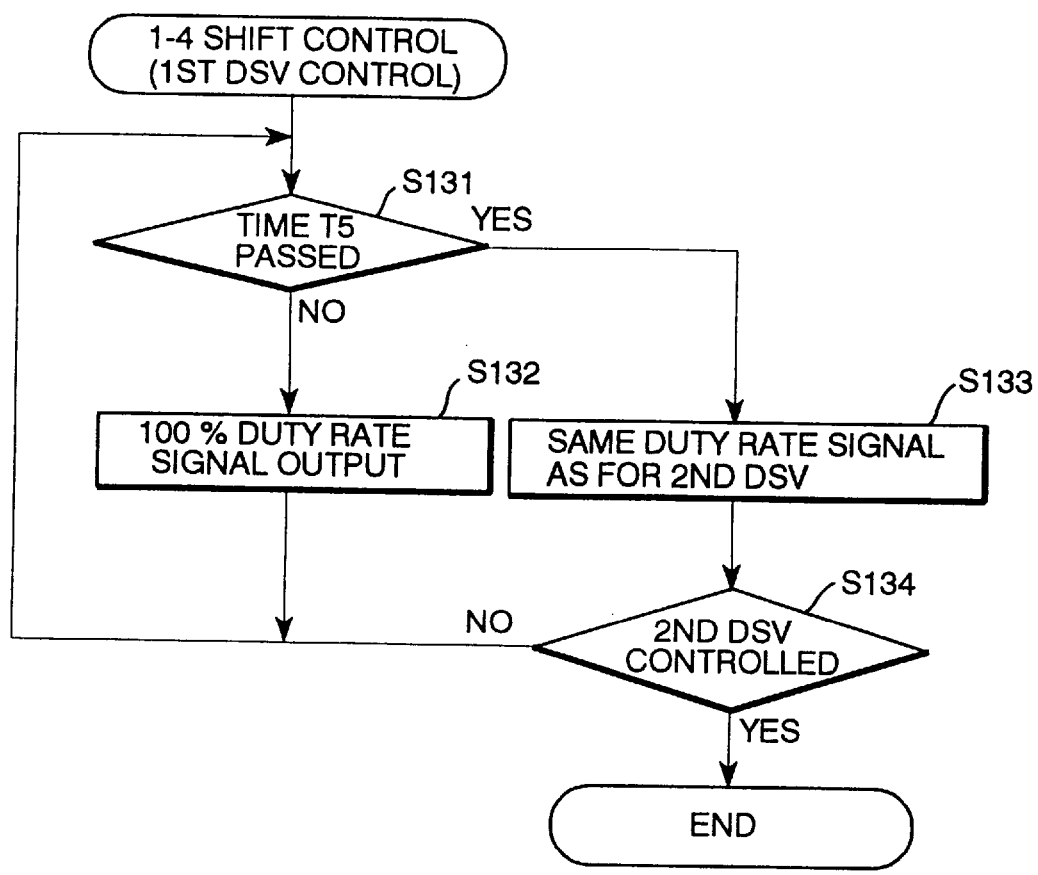
FIG. 96 is a flowchart illustrating a control sequence for the first duty solenoid valve (DSV) during 1-4 shifting.

Control of the servo apply pressure through the first duty solenoid valve 1021 during the 1-4 gear shift is executed in accordance with the program shown in FIG. 96. Similarly to the control for the 1-3 gear shift, after the an occurrence of a shift command for the 1-4 gear shift, a decision is made Bat step S131 as to whether or not a specified time T5 has passed. Until the specified time T5 has passed, a signal representative of a duty rate of 100% is output to the first duty solenoid valve 1021 at step S132. Therefore, provided for the period in which the 100% duty rate signal is output is not servo apply pressure but only the 3-4 clutch pressure and servo release pressure. When the specified time T5 has passed, a signal of the same duty ratio as provided for the second duty solenoid valve 1022 is output to the first duty solenoid valve 1021 at step S133 and when it is determined that the control of the second duty solenoid valve 1022 has terminated, the control of the first duty solenoid valve 1021 is also terminated at that moment at step S134.

Figure 98:
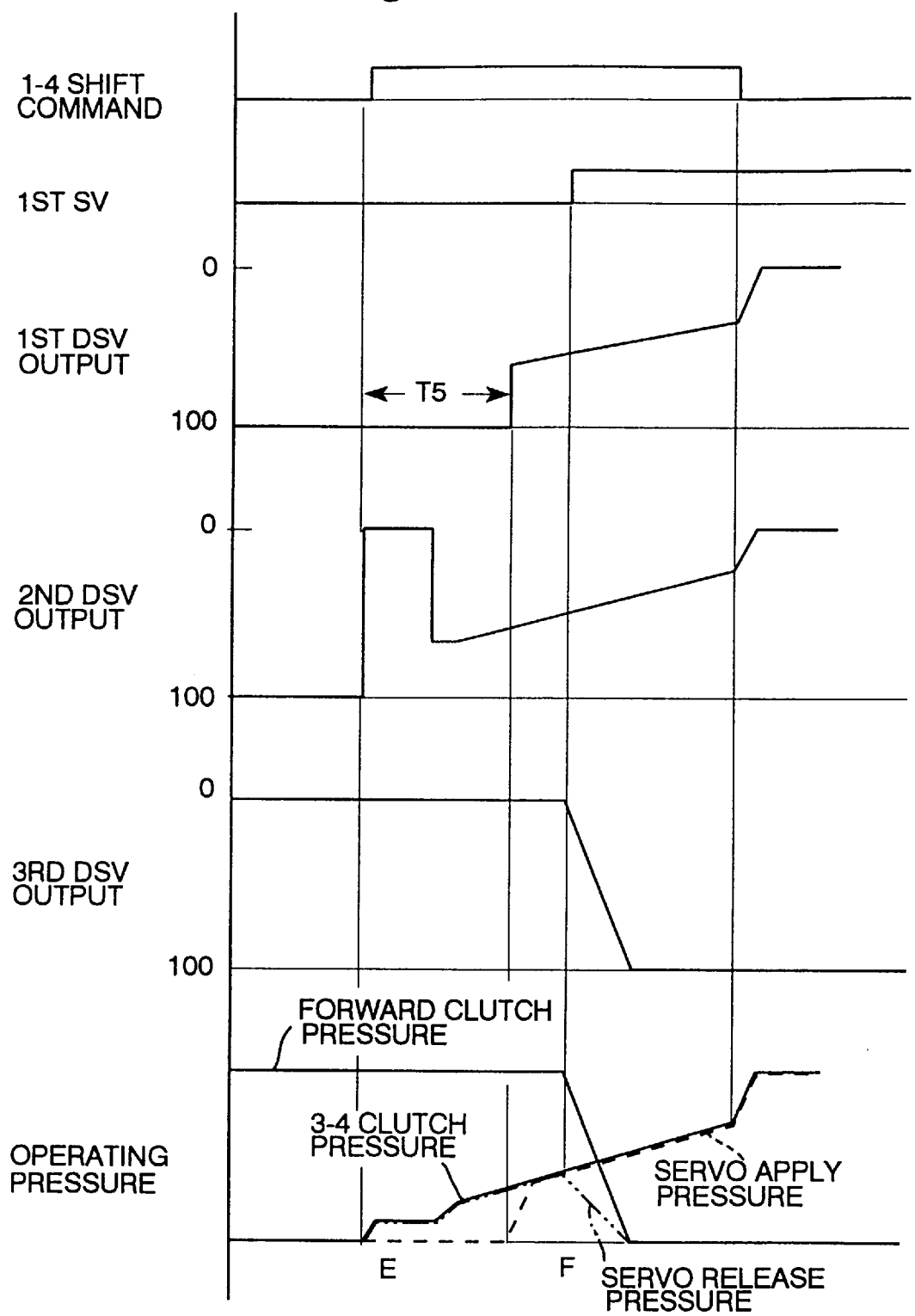
FIG. 98 is a time chart showing changes in various factors during 1-4 shifting.

In this way, as shown in FIG. 98, after the lapse of the specified time T5, the servo apply pressure is supplied at the same level as the 3-4 clutch pressure.

3rd DSV Control

Figure 97:
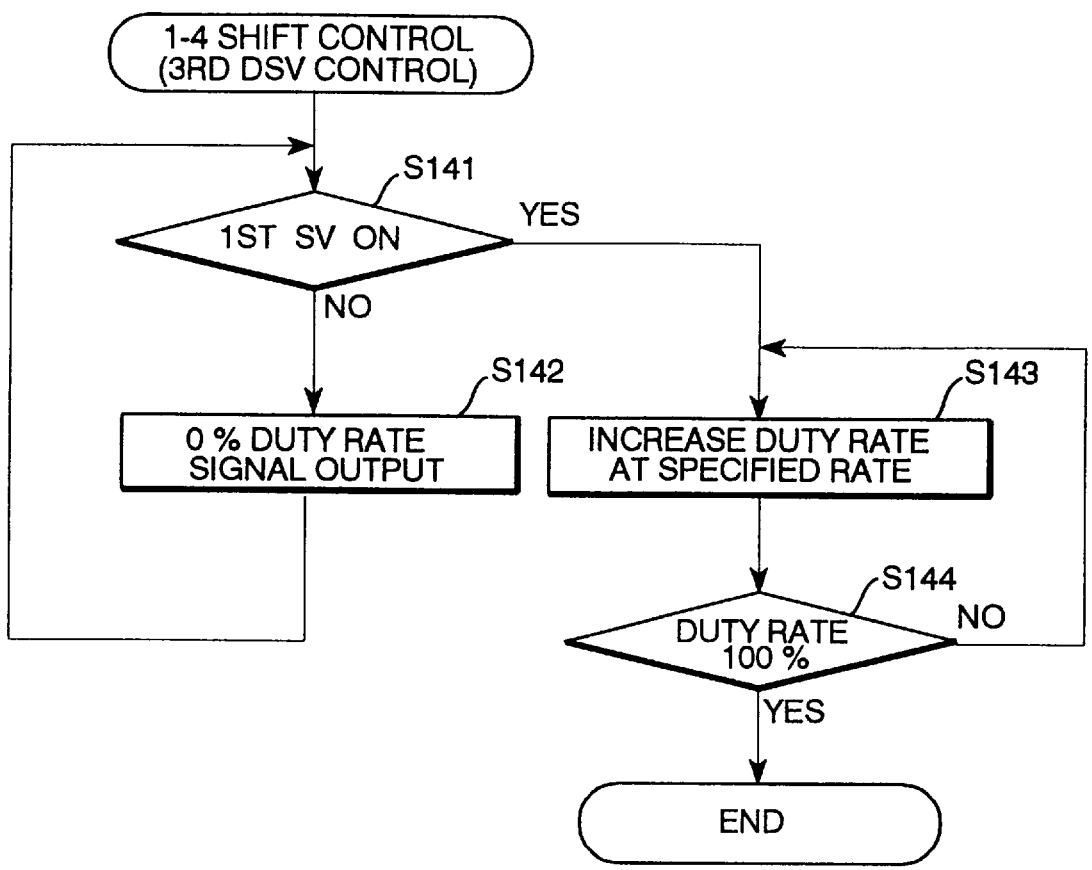
FIG. 97 is a flowchart illustrating a control sequence for the third duty solenoid valve (DSV) during 1-4 shifting.

Meanwhile, for the 1-4 gear shift, discharging of the forward clutch pressure is controlled through the third duty solenoid valve 1023 in accordance with the program shown in FIG. 97. Specifically, after switching of the first solenoid valve 1011 in state from the OFF state to the ON state at step S141, a decision is made at step S142 as to whether or not the 3-4 shift valve 1005 has switched oil passages. Before switching the oil passages, since there is communication between the servo release pressure line 1121 and the 3-4 clutch pressure line 1127, the operating pressure is provided for to the servo release pressure chamber 54b of the 2-4 brake 54 the servo release pressure equal to the 3-4 clutch pressure (as indicated by symbol E in FIG. 98). On the other hand, until the first solenoid valve 1011 attains the ON state, the duty rate of the third duty solenoid valve 1023 is held at 0% at step S142, allowing the forward clutch pressure to be supplied.

When the switching of the oil passages is caused through the first solenoid valve 1011 and the 3-4 shift valve 1005, the duty rate for the third duty solenoid valve 1023 is increased at a fixed rate to 100% so as to discharge the forward clutch pressure at a linear gradient through steps S143 and S144. During discharging, the servo release pressure line 1121 is brought into communication with the forward clutch pressure line 1119, discharging servo release pressure, which was supplied simultaneously with the 3-4 clutch pressure in the first half of the gear shift, is discharged along with the forward clutch pressure in the second half of the gear shift (as indicated by symbol F in FIG. 98).

In this way, with a timing shown in FIG. 98, supplying the 3-4 clutch pressure and the servo apply pressure, and discharging forward clutch are timely accomplished.

1st SV Switching

As described above, for the 1-4 gear shift, the 3-4 shift valve 1005 is switched in state by the first solenoid valve 1011. As seen in the hydraulic control circuit 1000 shown in FIG. 57, the relay valve 1007, which is disposed between the first solenoid valve 1011 and the 3-4 shift valve 1005, shifts its spool with the 3-4 clutch pressure controlled through the second duty solenoid valve 1022. For this arrangement, the first solenoid valve 1011 is controlled to switch from the OFF state to the ON state after an increase in the 2-4 clutch pressure above a specified level sufficient for the first solenoid valve 1011 and the 3-4 shift valve to be brought into communication through the relay valve 1007.

Figure 99:
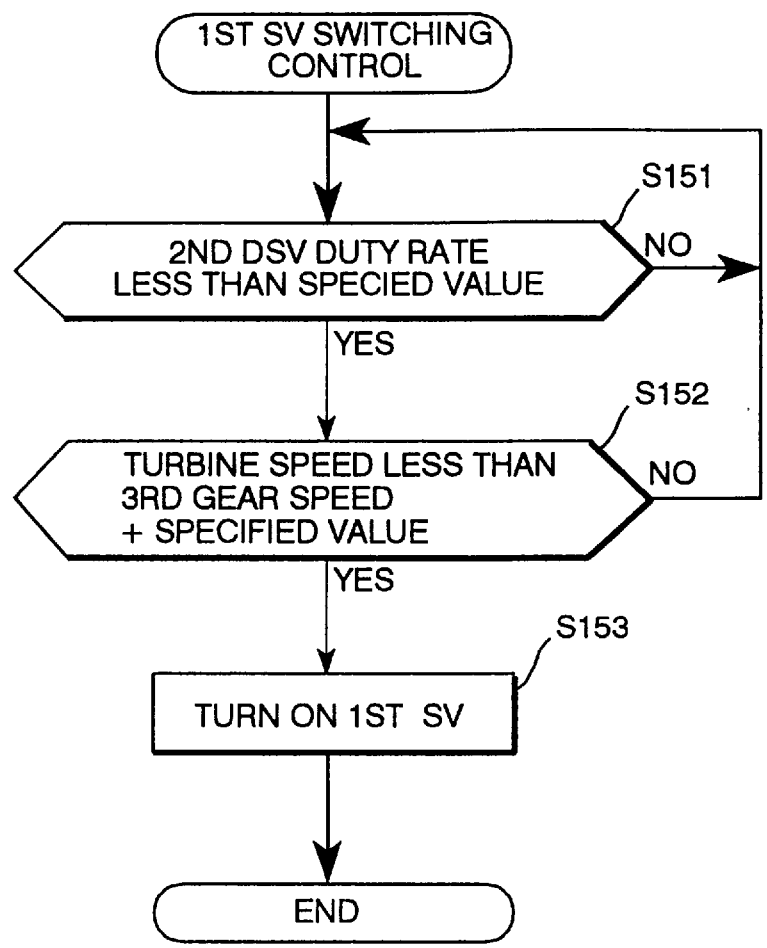
FIG. 99 is a flowchart illustrating a switching control sequence for a first solenoid valve (SV) during 1-4 shifting.

This control is executed in accordance with the program shown in FIG. 99. Specifically, at first, a decision is made at step S151 as to whether or not the output of the second duty solenoid valve 1022 has dropped below a specified level. Further, at step S152, another decision is made as to whether or not the turbine speed Nt has get less than a speed which is one obtained by adding a specified value to the turbine speed for the third gear immediately before the 1-4 gear shift. When any judgement result is YES, in other words, when the 3-4 clutch pressure has increased up sufficiently for the relay valve 1007 to shift its spool against the return spring and when it is monitored that the gear ratio has reached at least the gear ratio of the third gear, the first solenoid valve 1011 is switched to the ON state. Thus, the 3-4 shift valve 1005 is reliably switched with the pilot pressure from the first solenoid valve 1011, discharging forward clutch pressure and the servo release pressure appropriately.

F: 2-4 Gear Shift Control

A 2-4 gear shift is achieved by creating a state in which the forward clutch 51 is unlocked and the 3-4 clutch 53 is locked from a state in which both forward clutch 51 and 2-4 brake 54 are locked. Consequently, during the 2-4 gear shift, control is made of supplying the 3-4 clutch pressure through the second duty solenoid valve 1022 and discharging forward clutch 51 through the third duty solenoid valve 1023. Similarly to the 1-4 gear shift, the 3-4 shift valve 1005 is switched following switching the first solenoid valve 1011 from the OFF state to the ON state during shifting so as to switch the communication of the servo release pressure line 1121 to with the forward clutch pressure line 1119 from with the 3-4 clutch pressure line 1127.

2nd duty solenoid valve Control

Figure 100:
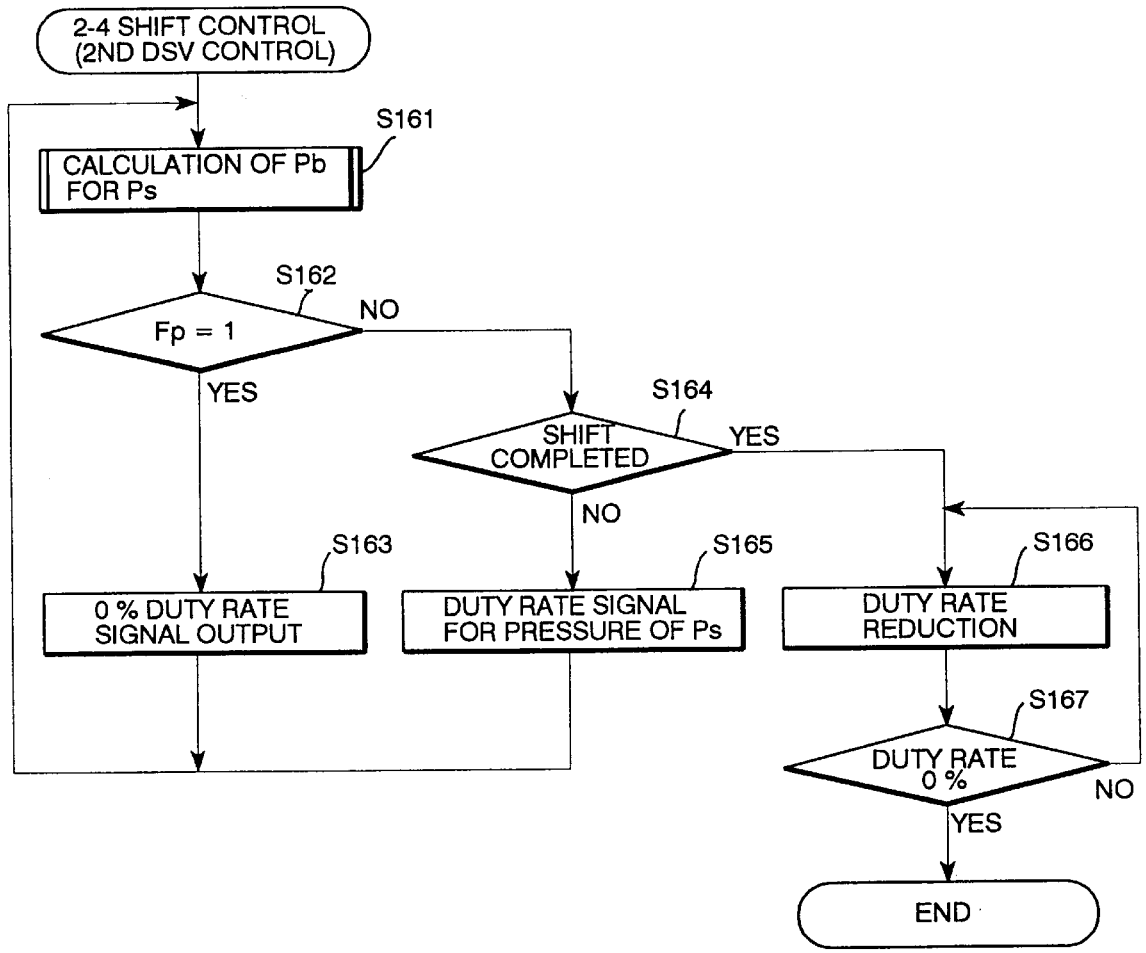
FIG. 100 is a flowchart illustrating a control sequence for the second duty solenoid valve (DSV) during 2-4 shifting.

The control of supplying an operating pressure through the second duty solenoid valve 1022 during a 2-4 gear shift is conducted in accordance with the program shown in FIG. 100, which is the same as the control by the second duty solenoid valve 1022 during the 1-4 gear shift previously described. Specifically, at step S161, the base operating pressure Pb is found as the computed operating pressure Ps. During the pre-charge period (Fp=1) that is determined at step S162, the duty rate takes 0% at step S163 so as to promptly fill the pressure line leading to the operating pressure chamber of the 3-4 clutch 53 with the operating oil. In addition, when the pre-charge period is concluded (Fp=0), the duty rate corresponding to the operating pressure Ps, i.e the base pressure Pb, is computed through steps S164 and S165 and is output to the second duty solenoid valve 1022 until the completion of the 2-4 gear shift. Furthermore, after the completion of the 2-4 gear shift, the duty rate is caused to reduce to 0% at a fixed rate through steps S166 and S167.

Also during the 2-4 gear shift, both feedback control and learning control are interrupted and, in addition, an initial pressure Pb' for the base operating pressure Pb is determined based only the turbine speed Nt prior to the 2-4 gear shift in accordance with a program similar to that shown in FIG. 95 for the 1-4 gear shift.

3rd duty solenoid valve Control

Figure 101:
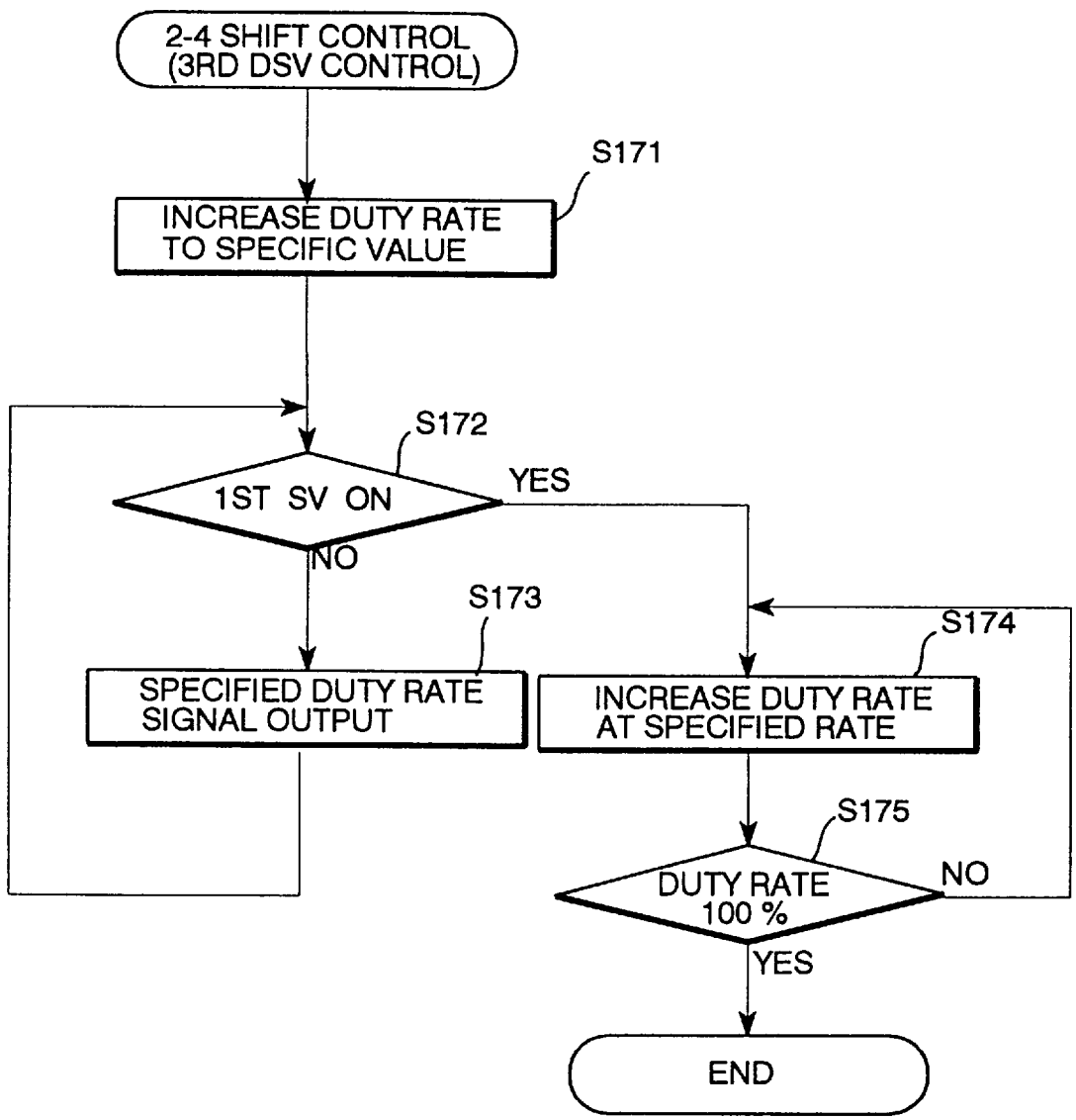
FIG. 101 is a flowchart illustrating a control sequence for the third duty solenoid valve (DSV) during 2-4 shifting.
Figure 102:
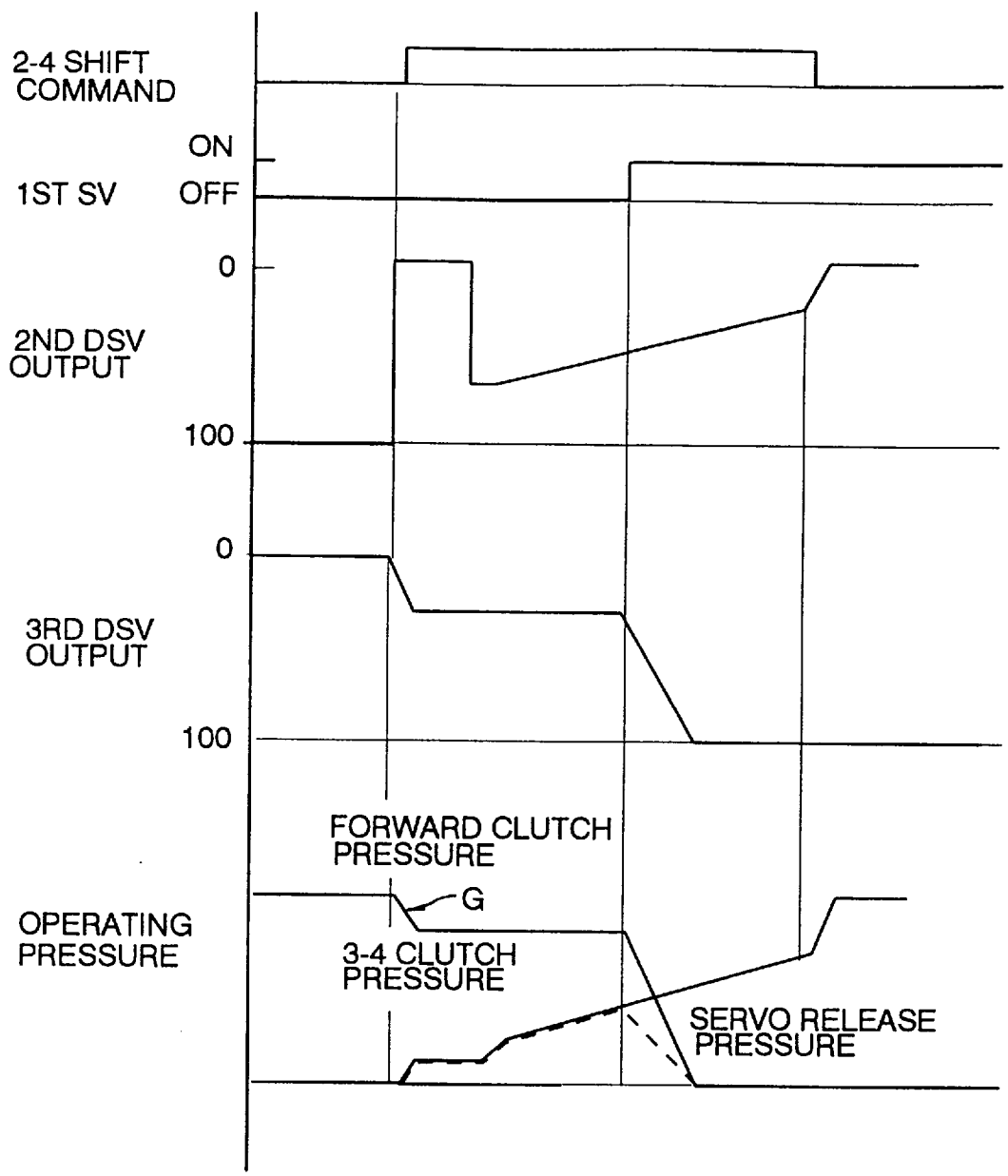
FIG. 102 is a time chart showing changes in various factors during 2-4 shifting.

On the other hand, the discharge control of the forward clutch pressure through the third duty solenoid valve 1023 during the 2-4 gear shift is conducted in accordance with the program shown in FIG. 101. In this discharge control, at the commencement of shifting, the forward clutch pressure is controlled to reduce to a predetermined level by increasing the duty rate from 0% to a predetermined rate at step S171 (see symbol "G" in FIG. 102). Other than. the reduction in the duty rate, the program is the same as that exercised during the 1-4 gear shift.

Specifically, even during the 2-4 gear shift, the relay valve 1007 shifts its spool due to a rise in the 3-4 clutch pressure and changes the ON state from the OFF state when the 3-4 shift valve 1005 is enabled to switch by the first solenoid valve 1011. At the time, the forward clutch pressure is discharged so as to decline at a predetermined gradient due to the linear increase in the duty rate of the third duty solenoid valve 1023. Together, at this time, the servo release pressure which has been supplied in conjunction with the 3-4 clutch pressure is exhausted together with the forward clutch pressure. In such a manner, the supply of the 3-4 clutch pressure, the supply of the servo apply pressure and the discharge of the forward clutch pressure are caused in the time sequence shown in FIG. 102.

In this instance, whether the relay valve 1007 may shift its spool is determined on the basis of whether or not the duty rate for the second duty solenoid valve 1022 has reached a rate such that the 3-4 clutch pressure causes the relay valve 1007 to shift the spool against the return spring. Until the determination of shifting the spool based on the duty rate is completed, the 2-4 gear shift is always achieved via the third gear.

(2) Down-Shift

A following description will be directed to down-shifts.

In general, during down-shifts of the transmission gear, in particular a torque demand down-shift in which two friction coupling elements are coupled and uncoupled, respectively, and accompanies a particular increase in engine throttle opening, uncoupling one element to be uncoupled is caused in advance of coupling another element so as to cause slippage of the one element, thereby creating an inertia phase in which the turbine speed Nt allowed to rise. At a moment the turbine speed Nt reaches the final turbine speed $Nt_0$ predicted for the termination of the torque demand down-shift, coupling the other element to be coupled is caused to create the torque phase.

Figure 103:
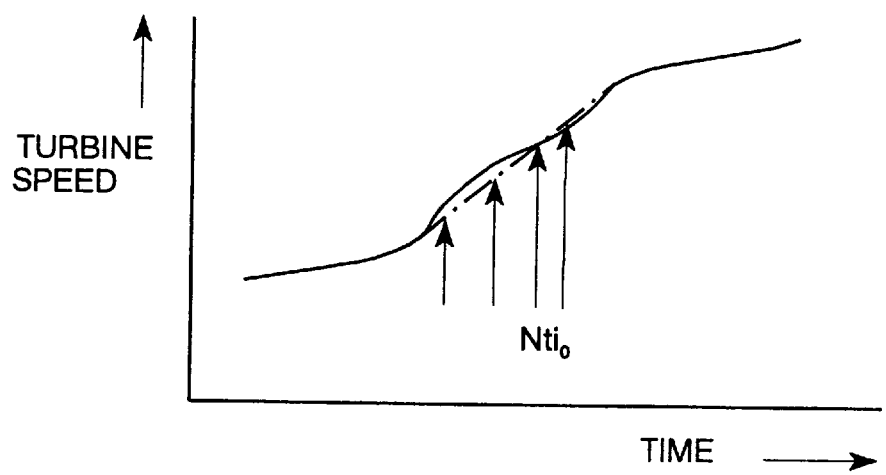
FIG. 103 is an explanatory diagram showing turbine speed of rotation as a control target during down-shifting.

In this down-shift, the feedback control is conducted of the unlocking pressure for the one friction coupling element so as to make the turbine speed Nt in the inertia phase to conform with the target turbine speed $Nti_0$ for every specific control cycle, as shown in FIG. 103. This is because, with regard to the torque demand down-shift, importance is attached to responsiveness rather than shift shocks and, consequently, it is necessary to raise the turbine speed Nt rapidly to the speed to be attained after the gear shift.

A: 4-3 Gear Shift Control

A 4-3 gear shift is caused by supplying servo release pressure and forward clutch pressure through the third duty solenoid valve 1023, while the first solenoid valve 1011 takes the ON state so as to bring the servo release line 1121 in communication with the forward clutch pressure line 1119 through the 3-4 shift valve 1005 in the hydraulic control circuit 1000 shown in FIG. 57. At this time, the feedback control is exercised of the servo apply pressure by means of the first duty solenoid valve 1021 so as to control the rise in the turbine speed Nt accompanying the uncoupling of the 2-4 brake 54 caused by the servo release pressure.

1st DSV Control

Figure 104:
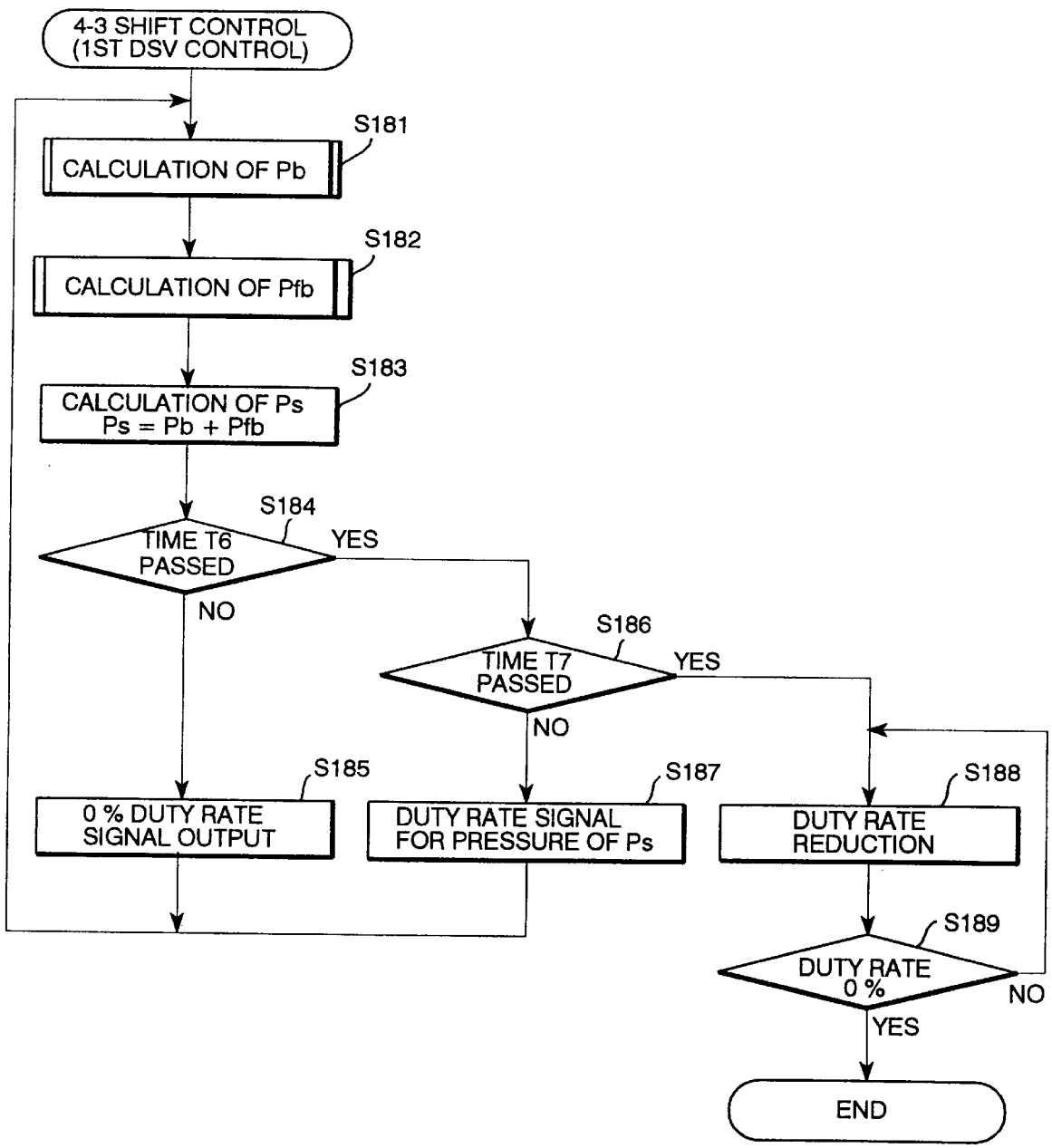
FIG. 104 is a flowchart illustrating a control sequence for the first duty solenoid valve (DSV) during 4-3 shifting.

Control of supplying the servo apply pressure through the first duty solenoid valve 1021 during the 4-3 gear shift is exercised in accordance with the program shown in FIG. 104. After computing the base pressure Pb and the feedback pressure Pfb steps S181 and S182, respectively, these pressure are added together at step S183 to find the computed pressure Ps. At step S184, a decision is made as to whether or not a predetermined delay time T6 (see FIG. 113) has passed following the output of a gear shift command. Until the delay time T6 has passed, the program waits at step S185 with the duty rate of the first duty solenoid valve 1021 maintained at 0%. This is in order to conduct the control described below after the line pressure, which tends to rise rapidly accompanying an increase in engine throttle opening during the torque demand gear shift, has been stabilized.

When the delay time T6 passes, a decision is made as to whether or not a predetermined time T7 has passed from a moment the turbine speed Nt has risen to a speed that is lower than the final turbine speed $Nt_0$ at a termination of the gear shift by only a very small predetermined value ΔNt at step S186. In this instance, the turbine speed Nt less than the final turbine speed $Nt_0$ by only the predetermined speed ΔNt is hereafter referred to as a directly before-gear shift termination turbine speed. Until a lapse of the time T7, a signal representative of the duty rate which corresponds to the computed operating pressure Ps found as noted above is output to the first duty solenoid valve 1021 at step S187 so as to control the servo apply pressure. On the other hand, when the predetermined time T7 has passed, a signal is output representative the duty rate decreased at a fixed rate until the duty rate becomes 0% through steps S188 and S189

The reason that the feedback control is performed of the servo apply pressure until the lapse of the predetermined time T7 after the attainment of the directly before-gear shift termination turbine speed ($Nt_0$–ΔNt) is that execution of the control of supplying the servo apply pressure is forced to continue until the completion of the gear shift, that is to say, until the forward clutch 51 is completely coupled.

Base Pressure Calculation

Figure 105:
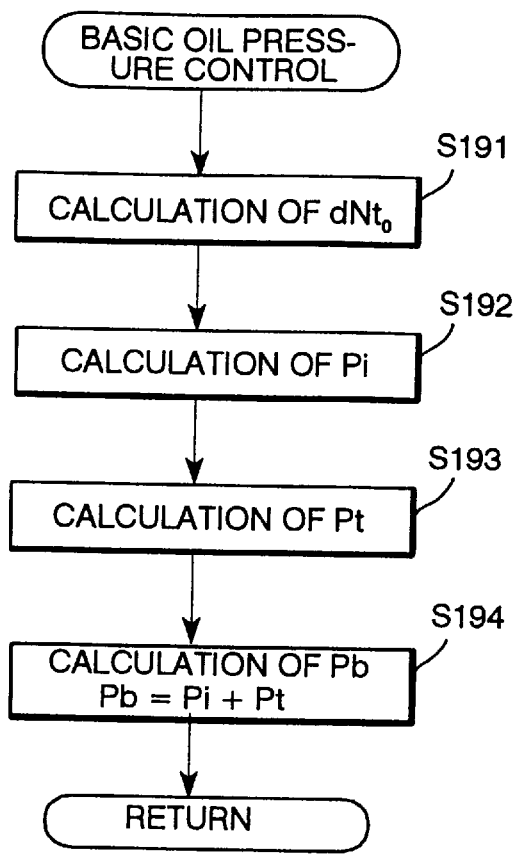
FIG. 105 is a flowchart illustrating a sequence for a calculation of base pressure during 4-3 shifting.

Calculation of the base operating pressure Pb at step S181 of the program shown in FIG. 104 is conducted as follows in accordance with the program shown in FIG. 105. Following the calculation pf the target turbine speed change ratio $dNt_0$ during the 4-3 gear shift at step S191, the operating pressure Pi corresponding to the target turbine speed change ratio $dNt_0$ is found in the map at step S192. Subsequently, at step S193, the operating pressure Pt corresponding to the target turbine torque $Tr_0$ during the 4-3 gear shift is found in the map and, at step S194, the base operating pressure Pb is calculated by adding these operating pressures Pi and Pt together.

Figure 106:
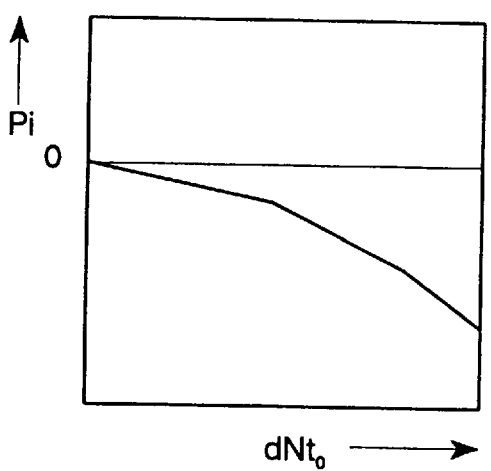
FIG. 106 is a diagram illustrating a map of hydraulic pressure with regard to a change in target turbine speed used in the calculation of base pressure during 4-3 shifting.
Figure 107:
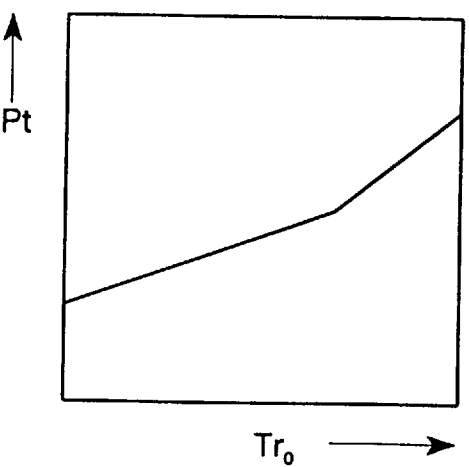
FIG. 107 is a diagram illustrating a map of hydraulic pressure with regard to target turbine torque used in the calculation of base pressure during 4-3 shifting.

The computation of the base operating pressure Pb is the same as in the computation of the base operating pressure during the up-shift described in connection with the 1-2 gear shift, with the exception of the omission of the operating pressure Pt2 corresponding to the squared target turbine torque $Tr_0$. However, the maps used in the computation of the operating pressure Pi and Pt are those shown in FIGS. 106 and 107, respectively and a fixed operating pressure found as described above is used as the base operating pressure Pb during the 4-3 gear shift (see FIG. 113).

Feedback Pressure Calculation

Figure 108:
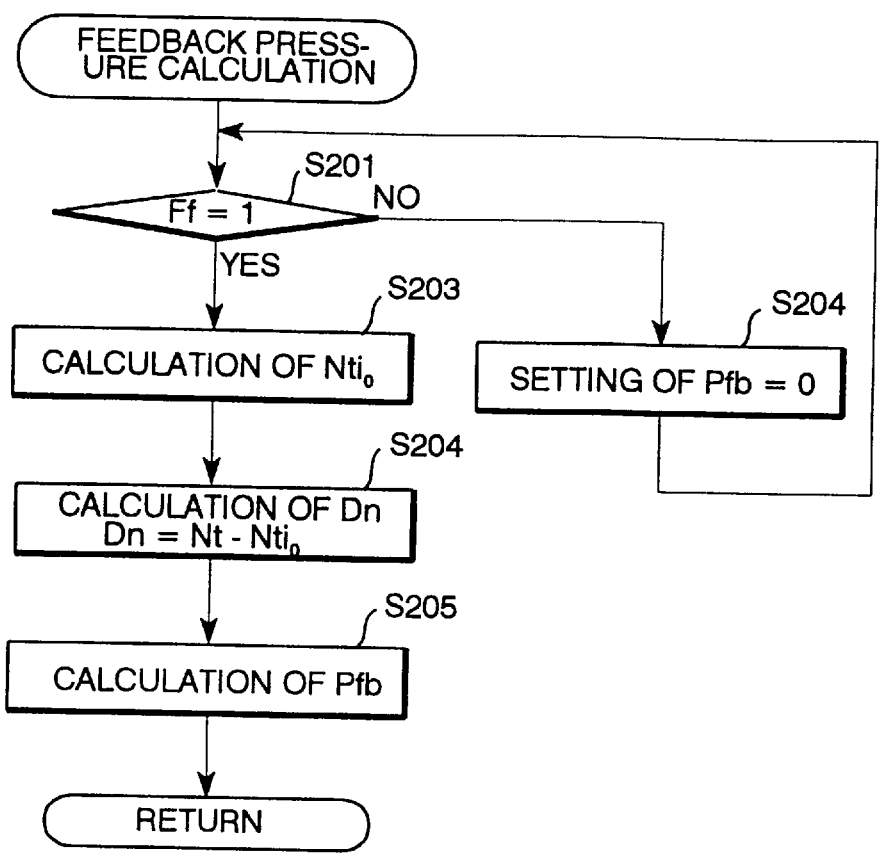
FIG. 108 is a flowchart illustrating a sequence for a calculation of feedback pressure during 4-3 shifting.
Figure 109:
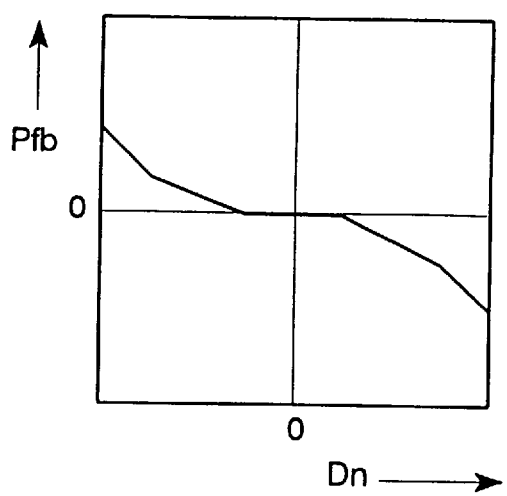
FIG. 109 is a diagram illustrating a map of feedback pressure used in the calculation of base pressure.

Calculation of the feedback pressure Pfb at step S182 of the program in FIG. 104 is made in accordance with the program shown in FIG. 108. At step S201, a feedback flag Ff, indicating whether or not the condition for starting the feedback control, which will be described later, have been satisfied, is examined. Subsequently, the feedback pressure Pfb is maintained at a level of 0 at step S202 until the start condition has been attained which is represented by the feedback flag Ff set to a state of 1. Otherwise, if the start condition has been attained and, consequently, the feedback flag Ff has been up or set to the state of 1, the target turbine speed $Nti_0$ at the present time is calculated at step S203. This calculation is conducted on the basis of the difference between the turbine speeds before and after the 4-3 gear shift and a predetermined optimal shifting time so as to find the target turbine speed $Nti_0$ for each control cycle during the control cycle. Subsequently, a deviation Dn of the actual turbine speed Nt from the target turbine speed $Nti_0$ ($Nt-Nti_0$) is found at step S204 and the feedback pressure Pfb corresponding to the deviation Dn is computed on the basis of the map shown in FIG. 109 at step S205. In this map, the feedback pressure Pfb, which is set to be a negative value when the deviation Dn is positive and to be a positive value when the deviation Dn is negative, has an absolute value in conformity with the absolute value of the deviation Dn.

Feedback Control Start Condition

Figure 110:
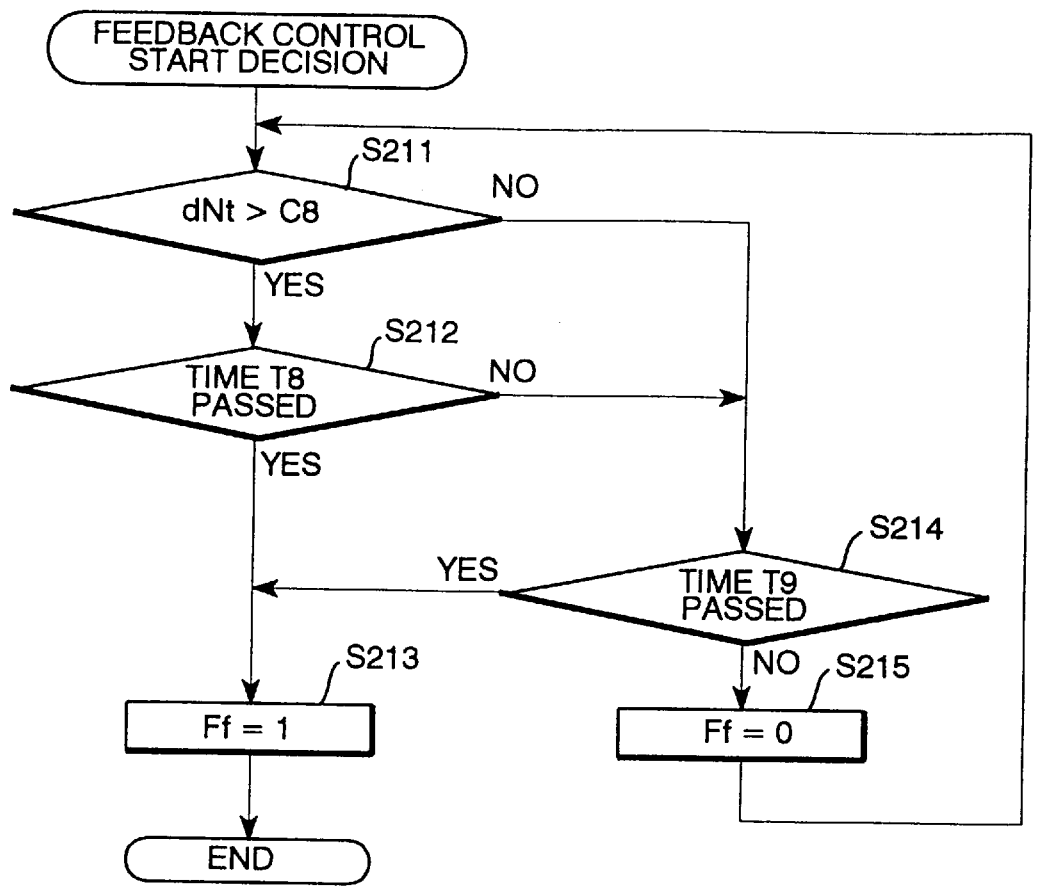
FIG. 110 is a flowchart illustrating a sequence for a judgement of commencement of the feedback control during 4-3 shifting.
Figure 111:
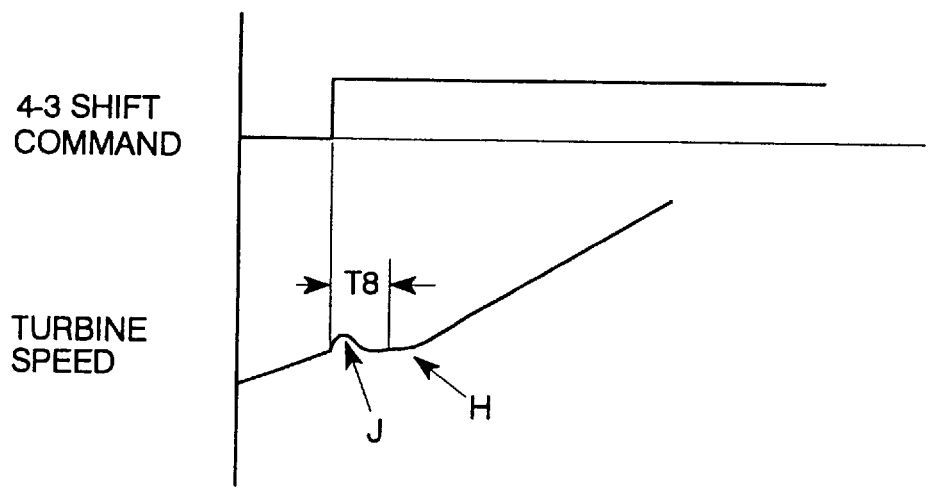
FIG. 111 is an explanatory diagram showing a change in turbine speed of rotation during 4-3 shifting.

The feedback pressure Pfb is calculated for use in the feedback control when the predetermined condition is attained. Attainment of the start condition establishment is determined in accordance with the program shown in FIG. 110. First, at step S211, a decision is made as to whether or not the turbine speed change ratio dNt has exceeded a predetermined value C8. As indicated by symbol "H" in FIG. 113, this decision is made to determine a time the turbine speed Nt starts to rise, or otherwise a time the rate of rise becomes large, which is when the 4-3 gear shift starts, due to the commencement of an inertial phase during the 4-3 gear shift. At step S212, another decision is subsequently made as to whether or not a predetermined time T8 has passed from the output of a shift command. This is for the following reasons.

Figure 112:
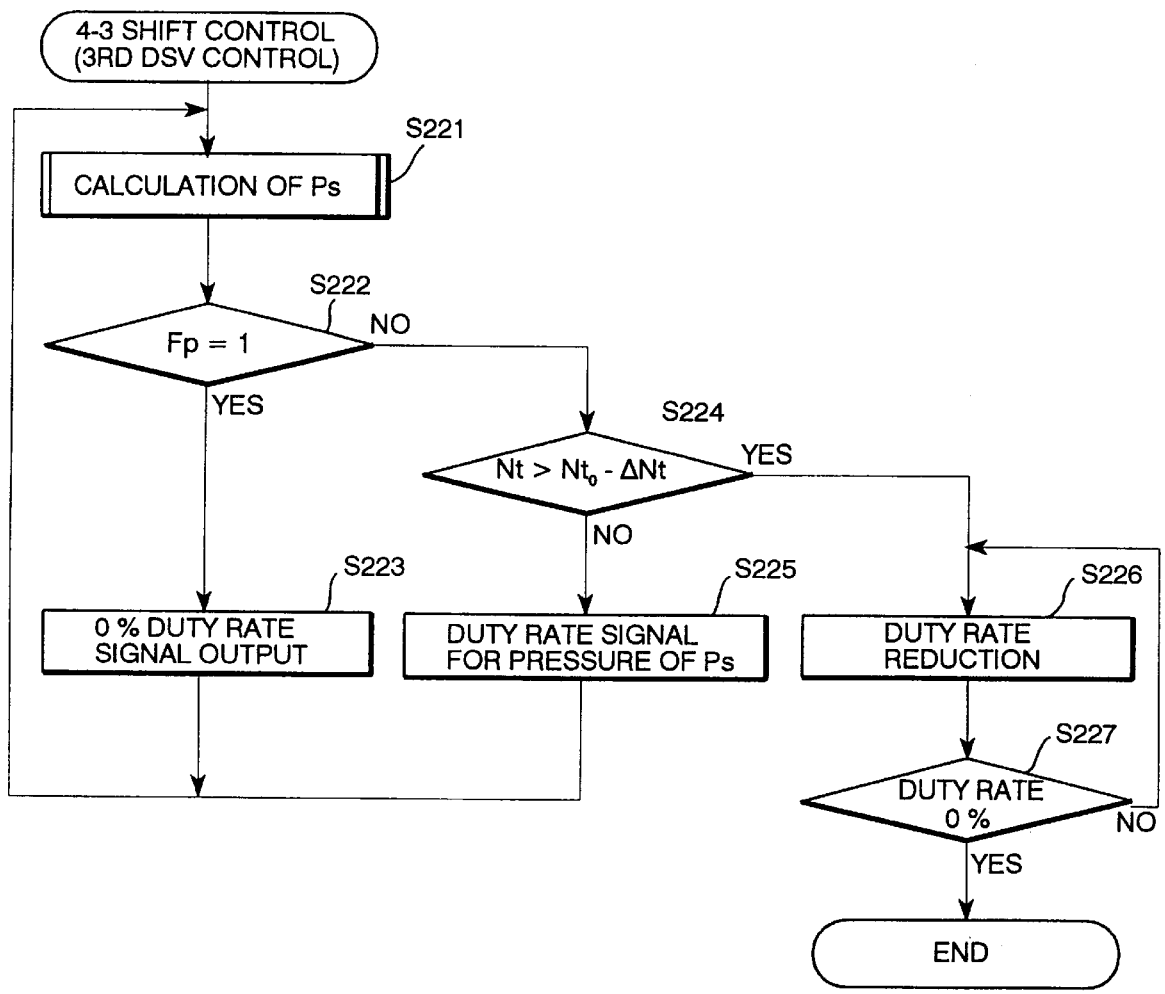
FIG. 112 is a flowchart illustrating a control sequence for the third duty solenoid valve (DSV) during 4-3 shifting.

As indicated by symbol "I" in FIG. 112, when the engine throttle valve opens abruptly and largely, the turbine speed sensor 1205 for detecting the turbine speed Nt rotates with respect to the turbine shaft due to rolling of the engine, causing a temporary increase in the apparent turbine speed. Because this phenomenon is created immediately after the output of a shift command, the start of shifting is determined erroneously through this apparent increase in the turbine speed if the decision made at step S211 is made only as to whether or not the turbine speed change ratio dNt has exceeded the predetermined value C8. Accordingly, the time T8 is established as an interval between an actual commencement of shifting and an occurrence of this kind of phenomenon following the output of a shift command, as indicated by the symbol "H". The commencement of shifting is determined only when the turbine speed change ratio dNt has exceeded the predetermined value C8 following the lapse the time T8. In this case, the feedback flag Ff is set to the state of 1, this indicates that the feedback control start condition has been attained, at step S213. In this instance, the predetermined time T8 is set to be longer than the delay time T6 at the beginning of the control.

Even if it is determined at steps S211 and S212 that one or both of the conditions have not been attained, a decision is made at step S214 as to whether or not the backup timer has counted a predetermined backup time T9 given when a shift command is output. When the backup time T9 has passed, the decision at step S213 is executed and the feedback flag Ff is set to the state of 1.

Specifically, if uncoupling the 2-4 brake occurs very gently due, for instance, to a high servo apply base pressure Pb which is supplied at a lapse of the delay time T6 after the output of a shift command, the turbine speed change ratio dNt does possibly not become larger than the predetermined value C8 and, in this kind of case, it is necessary to wait for the backup time T9 to pass before a promptly start of the feedback control. If it is determined at step S211 and step S212 that at least one of the these two start conditions has not yet attained, while the condition has not attained either at step S214, then, the feedback flag Ff is reset to the state of 0 at step S215. during the feedback flag is down, the feedback pressure Pfb is maintained at a level of 0 through the program in FIG. 108.

As described above, as shown in FIG. 113, the first duty solenoid valve 1021 moves in control mode to control with a fixed duty rate corresponding to the base operating pressure Pb from control with a duty rate of 0% (at which the first duty solenoid valve 1021 keeps completely opened) at a lapse of the delay time T6 after the occurrence of a shift command. Subsequently, the first duty solenoid valve 1021 resumes the feedback control when the conditions are attained such as the turbine speed change ratio dNt exceeding the predetermined value C8.

Through the control, at a lapse of the predetermined time T7 after the turbine speed Nt has risen as far as the directly before-gear shift termination turbine speed ($Nt_0-\Delta Nt$) due to proceeding to the inertia phase, the duty rate is controlled so as to again decrease to 0%. Accompanying this, the servo apply pressure, after having once risen, is feedback controlled so as to make the turbine speed Nt conform with the target turbine speed $Nti_0$ at a present point of control in time and to raise again to a predetermined level when the 4-3 gear shift is concluded, as shown in the FIG. 113.

3rd DSV Control

On the other hand, control of the forward clutch pressure and the servo release pressure through the third duty solenoid valve 1023 during the 4-3 gear shift is conducted in accordance with the program shown in FIG. 112. First, at step S221, the computed operating pressure Ps is found. During the pre-charge period (Fp=1), the duty rate of the third duty solenoid valve 1023 is changed to 0% so as to cause the pressure to swiftly fill the oil passage leading to the pressure chamber of the forward clutch 51 and the servo release pressure chamber 54b of the 2-4 brake 54 through steps S222 and S223. When the pre-charge period is concluded (Fp=0), a decision is made at step S224 as to whether or not the turbine speed Nt has risen as far as the directly before-gear shift termination turbine speed ($Nt_0-\Delta Nt$). During the rise of the turbine speed Nt to that specific speed, a signal of the duty rate corresponding to the computed operating pressure Ps is output to the third duty solenoid valve 1023 at step S225. In this instance, the computed operating pressure Ps, which is in conformity with the thrust force of the return spring loaded in the forward clutch 51, maintains the piston of the clutch 51 immediately before coupling the clutch 51 when supplied to the pressure chamber of the forward clutch 51. Subsequently, when the turbine speed Nt has risen as far as the directly before-gear shift termination turbine speed ($Nt_0 - \Delta Nt$), the duty rate is caused to decline to 0% at a fixed rate through steps S226 and S227.

Figure 113:
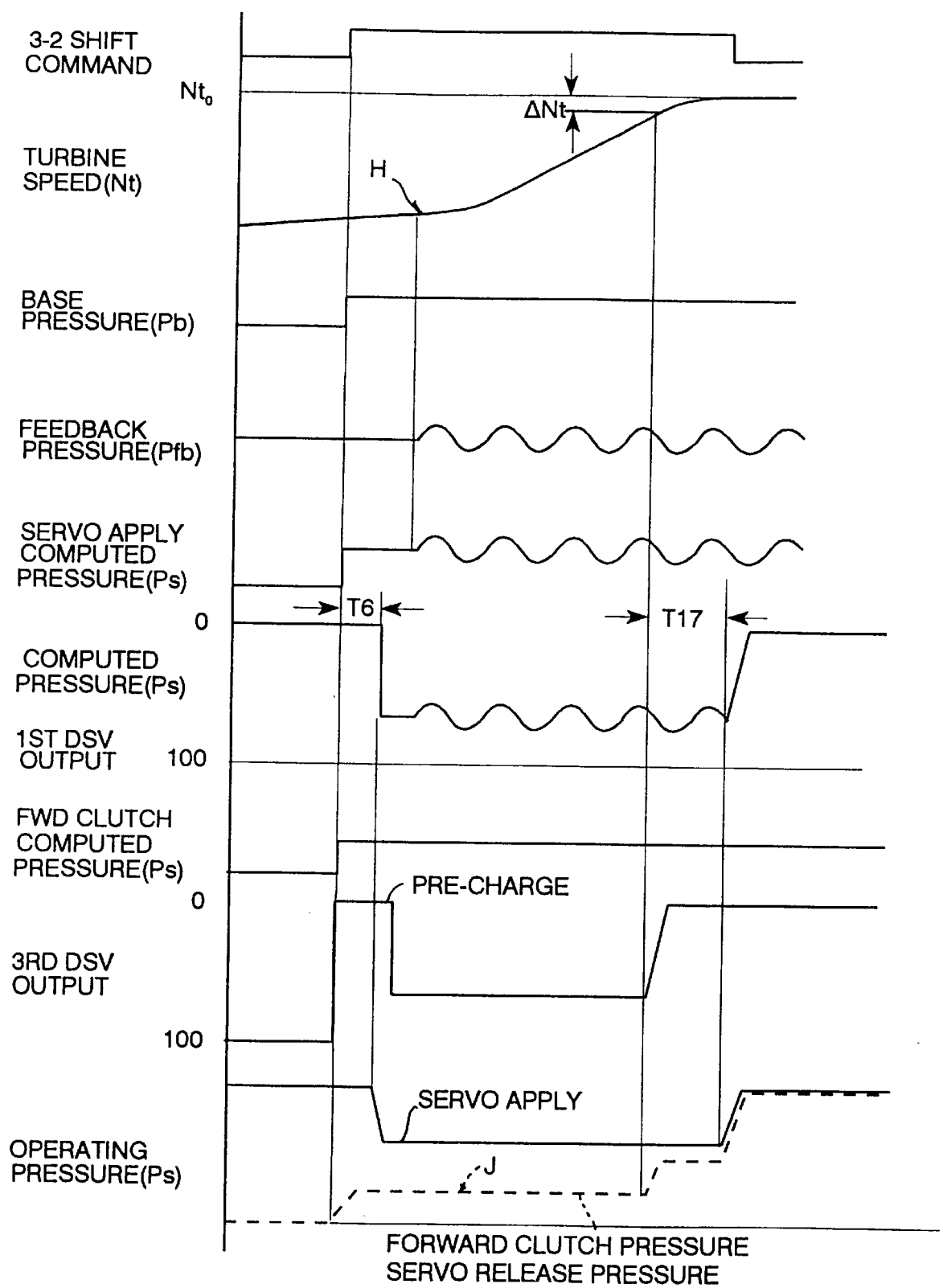
FIG. 113 a time chart showing changes in various factors during 4-3 shifting.

With the control, while the forward clutch pressure is maintained at a level to place the forward clutch 51 immediately before coupling during uncoupling the 2-4 brake 54, as indicated by symbol "J" in FIG. 113, it is raised to a predetermined level at a time the turbine speed Nt has risen as far as a final turbine speed $Nt_0$ due to slippage of the 2-4 brake 54 which is caused through the feedback control of the servo apply pressure, bringing the forward clutch 51 into coupling. In this instance, since the forward clutch pressure is immediately below a level for coupling, the forward clutch 51 is coupled swiftly without a delay in response.

B: 3-2 Gear Shift Control

A 3-2 gear shift is caused by coupling the 2-4 brake 54 simultaneously with uncoupling the 3-4 clutch 53. This gear shift control is achieved in the hydraulic control circuit 1000 by placing the first solenoid valve 1011 into the OFF state so as to bring the servo release pressure line 1121 and the 3-4 clutch pressure line 1127 into communication with each other through the 3-4 shift valve 1005 and, in this state, exhausting the servo release pressure and the 3-4 clutch pressure through controlling the second duty solenoid valve 1022 while the servo apply pressure is in the 2-4 brake 54. During this control, the leveled transitional pressure is controlled by controlling the servo apply pressure through the first duty solenoid valve 1021 during coupling the 3-4 clutch 53.

Specifically, similar to the 2-3 gear shift described previously, because the pressure line 1125 and the pressure line 1126, leading to the servo release pressure line 1121 and the 3-4 clutch line 1127, respectively, branch off from the pressure line 1124 extending from the second duty solenoid valve 1022 after the orifice 1051, the servo release pressure and 3-4 clutch pressure to be supplied to and discharged from, respectively, are not controlled by the second duty solenoid valve 1022, but controlled by the pressure in the servo release pressure chamber 54a and the servo apply pressure chamber 54b of the servo cylinder 543 which are divided by the piston 544. The second duty solenoid valve 1022 regulates the flow quantity of the operating pressure which is discharged from the servo release pressure chamber 54b of the 2-4 brake 54 and the pressure chamber of the 3-4 clutch 53, so as to maintain a transition period in which the leveled transitional pressure continues in the inertia phase during uncoupling the 3-4 clutch 53.

With this 3-2 gear shift control, the magnitude and transition period of the 3-4 clutch pressure for the leveled transitional pressure are controlled by the first duty solenoid valve 1021 through the servo apply pressure and the second duty solenoid valve 1021, respectively.

1st DSV Control

Figure 114:
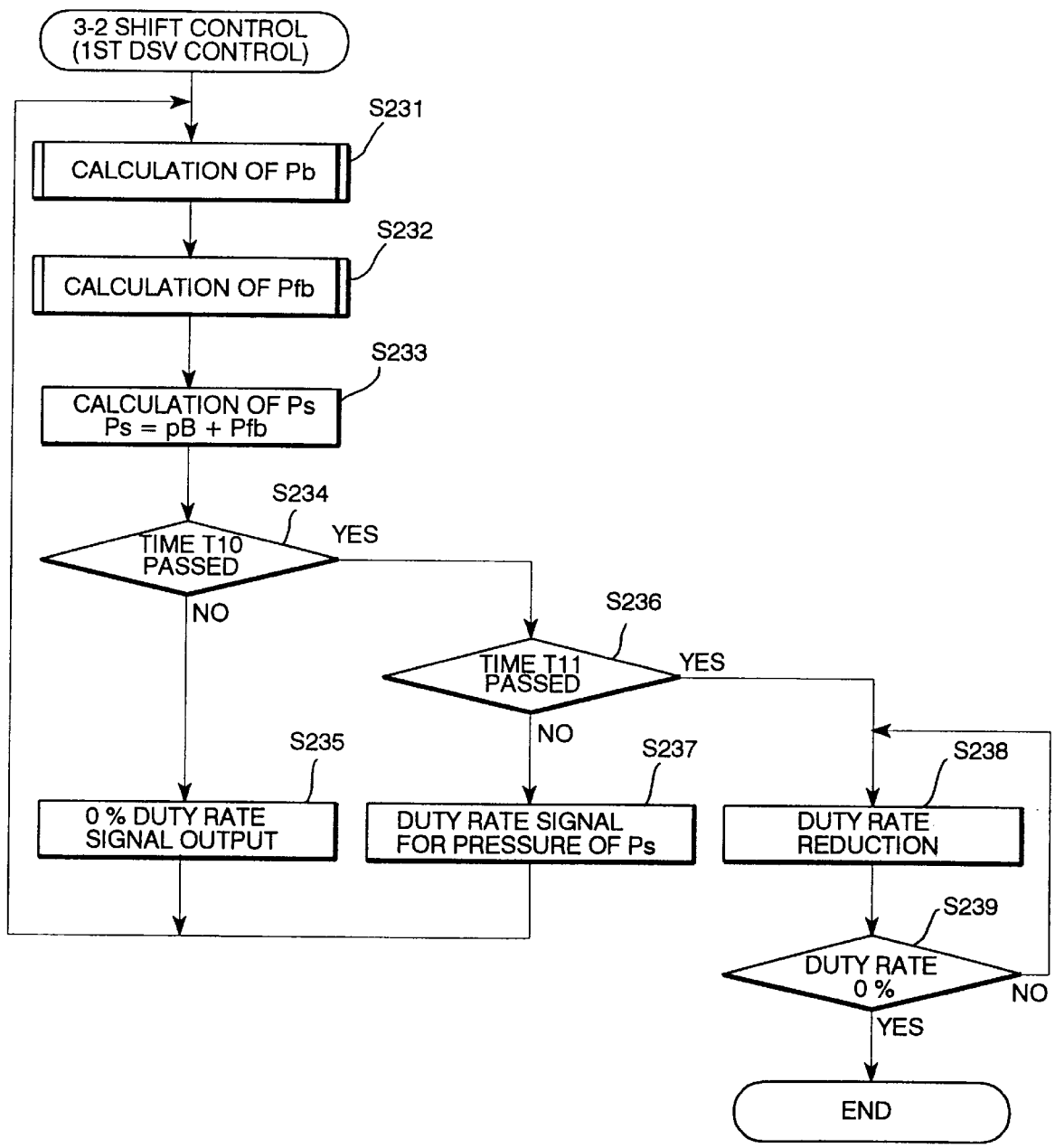
FIG. 114 is a flowchart illustrating a control sequence for the first duty solenoid valve (DSV) during 3-2 shifting.

The control of the servo apply pressure through the first duty solenoid valve 1021 is executed in accordance with the program shown in FIG. 114, which is similar in operation to that during the 4-3 gear shift described above.

At first tow steps S231 and S232, the base pressure Pb and the feedback pressure Pfb are computed, respectively. Subsequently, the pressure Ps is found at step S233 by adding these base pressure Pb and feedback pressure Pfb together. At step S234, a decision is made as to whether or not a predetermined delay time T10 has passed following the output of a 3-2 shift command. Until the delay time T10 has passed, the duty rate of the first duty solenoid valve 1021 is maintained at 0% at step S235. This is made in order to hold the stability of the line pressure that rises abruptly accompanying an increase in engine throttle opening, similarly to the 4-3 gear shift. In addition, the calculations of these base pressure Pb and feedback pressure Pfb are also made in accordance with a program similar to that provided for the 4-3 gear shift shown in FIGS. 105 and 108.

If the delay time T10 has passed, a decision is made at step S236 as to whether or not a predetermined time T11 has passed after the turbine speed Nt has risen as far as the directly before-gear shift termination turbine speed ($Nt_0 - \Delta Nt$). Until the predetermined time T11 passes, a signal of the duty rate, corresponding to the computed pressure Ps, is output to the first duty solenoid valve 1021 at step S237 so as to feedback control the servo apply pressure. The servo apply pressure feedback control manages the leveled transitional pressure during uncoupling the 3-4 clutch 53 by means of the servo release pressure in such a way to cause a reduction in the 3-4 clutch pressure so as to commence the inertia phase of the 3-2 gear shift and provide an increase in the turbine speed Nt. If the predetermined time T11 has elapsed following a rise in the turbine speed Nt as far as the directly before-gear shift termination turbine speed ($Nt_0 - \Delta Nt$), the feedback control is concluded. Thereafter, the duty ratio is reduced at a fixed rate until it reaches 0% through steps S238 and S239.

2nd DSV Control

Figure 115:
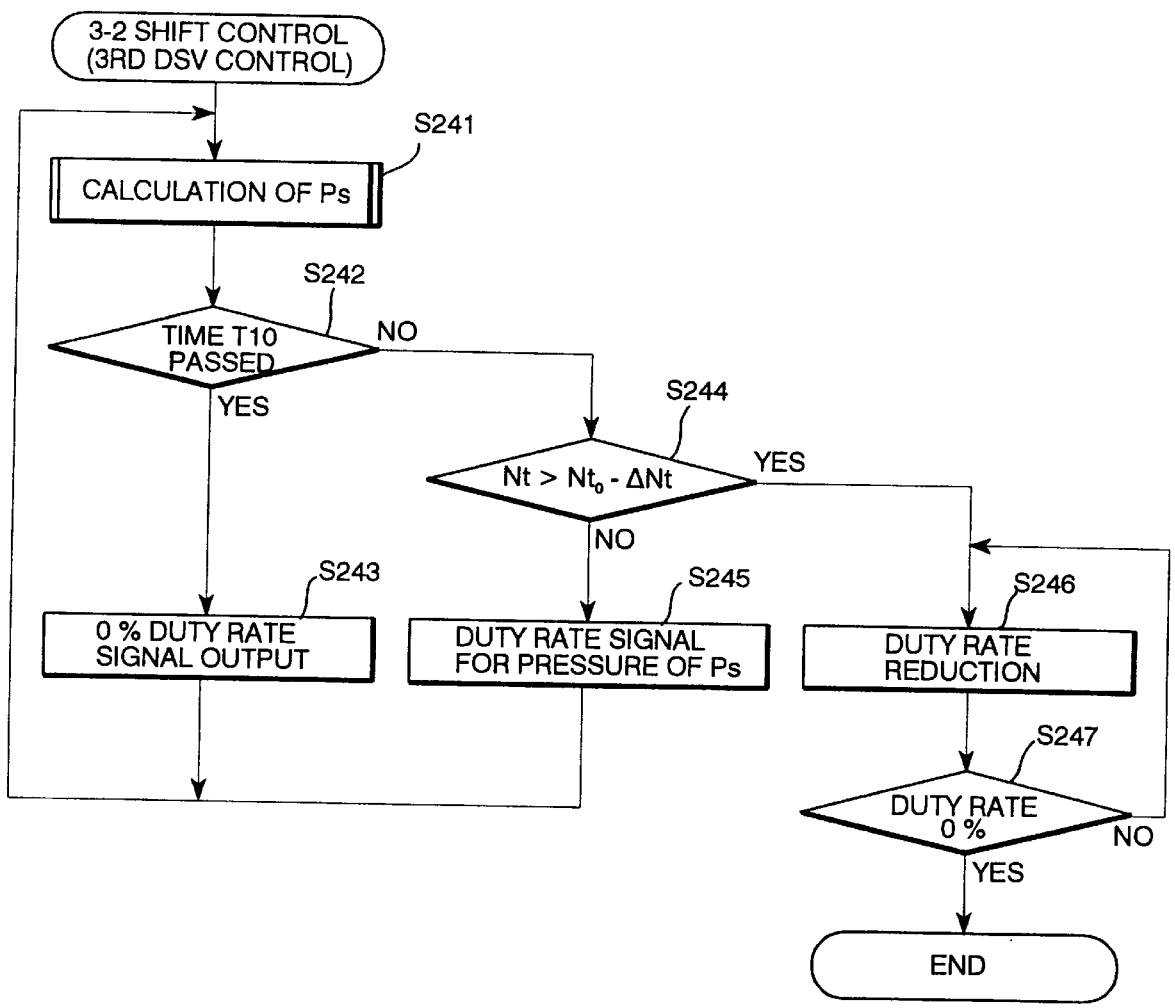
FIG. 115 is a flowchart illustrating a control sequence for the second duty solenoid valve (DSV) during 3-2 shifting.

On the other hand, discharge control of the 3-4 clutch pressure and the servo release pressure through the second duty solenoid valve 1022 is executed in accordance with the program shown in FIG. 115. First, at step S241, the computed operating pressure Ps is found, following which, at step S242, the program waits for the delay time T10 to pass. Similarly to the first duty solenoid valve 1021, the duty ratio is maintained at 0% until the delay time T10 has passed. When the delay time T10 passes, a decision is made at step S244 as to whether or not the turbine speed Nt has risen as far as the directly before-gear shift termination turbine speed ($Nt_0 - \Delta Nt$). Until the turbine speed Nt has risen to the speed, i.e. while the leveled transitional pressure control of the 3-4 clutch 53 is being executed through the feedback control for the first duty solenoid valve 1021, a signal of the duty rate corresponding to the computed hydraulic pressure Ps obtained at step S241 is output to the second duty solenoid valve 1022. In this case, the computed operating pressure Ps as the servo release pressure is such that, as indicated by the symbol "K" in FIG. 116, the pressure obtained by adding to the servo release pressure a hydraulic pressure S substituted for the thrust force of the return spring 546 is slightly less than the servo line pressure as a counter pressure in the servo cylinder 543 of the 2-4 brake 54. As was previously described, the discharge flow quantity of the hydraulic oil from the pressure chamber of the 3-4 clutch 53 and the servo release pressure chamber 54b of the 2-4 brake 54 is controlled by the orifice 1051 and the second duty solenoid valve 1022, causing the piston 544 to shift smoothly in a direction in which the 2-4 brake couples. By means of this action, a period of the inertia phase is attained long enough for the turbine speed Nt to rise with certainty to the final turbine speed at the termination of the 3-2 gear shift.

When the turbine speed Nt has risen as far as the directly before-gear shift termination turbine speed ($Nt_0 - \Delta Nt$), the duty ratio is increased up to 100% at a fixed rate through steps S246 and S247. As a result, the 3-4 clutch pressure and the servo release pressure in leveled transitional states are discharged completely, uncoupling on one hand the 3-4 clutch 53 and coupling on the other hand the 2-4 brake.

C: 2-1 Gear Shift control

A 2-1 gear shift is achieved by discharging servo apply pressure through the first duty solenoid valve 1021.

1st DSV Control

Figure 116:
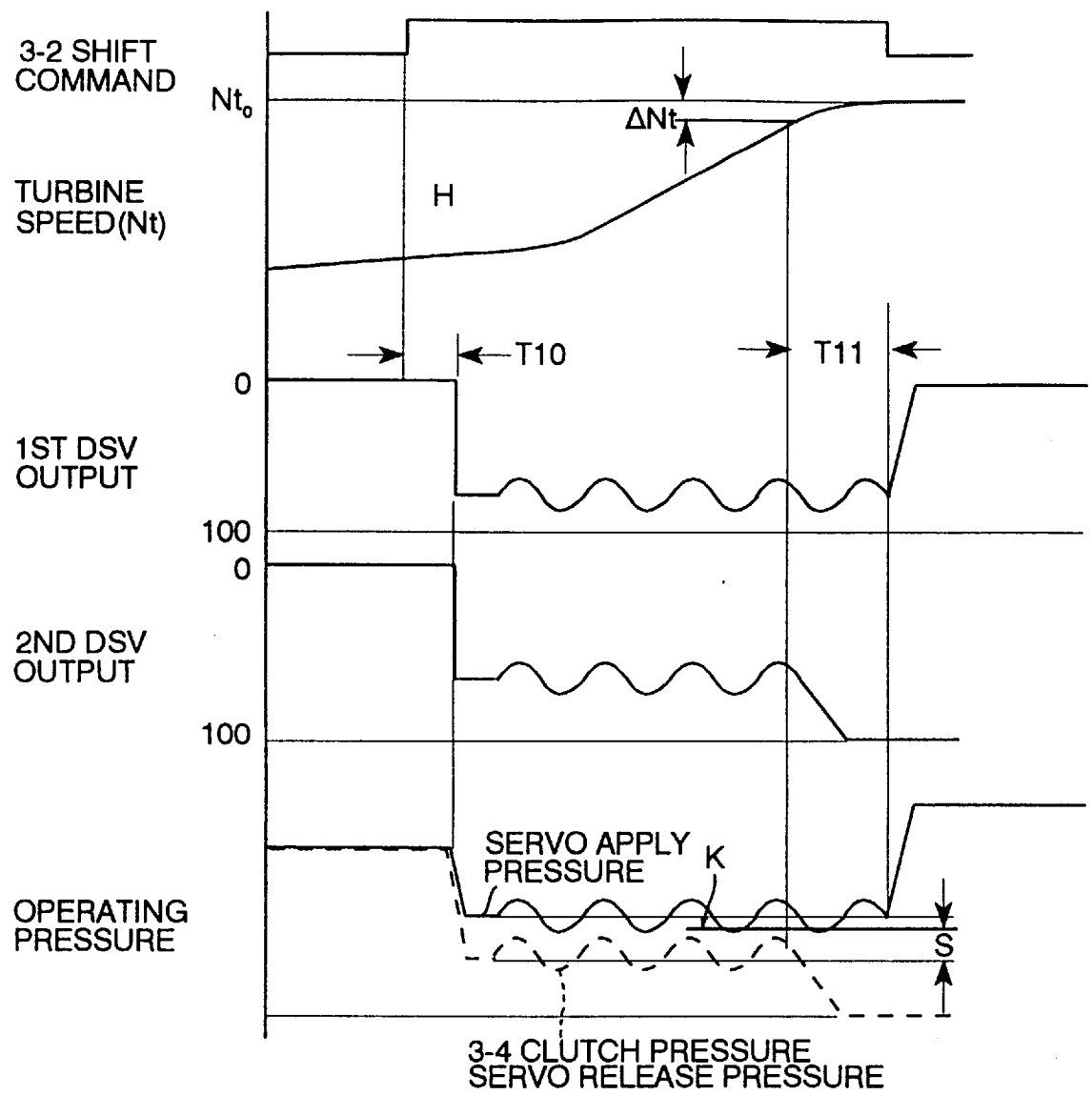
FIG. 116 is a time chart showing changes in various factors during 3-2 shifting.
Figure 117:
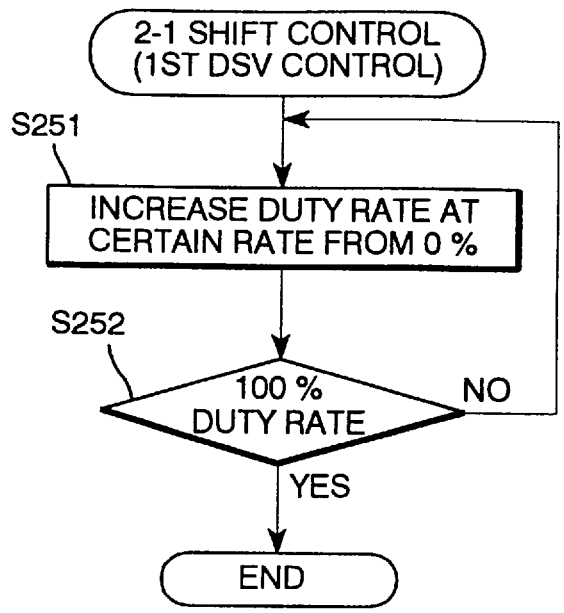
FIG. 117 is a flowchart illustrating a control sequence for the first duty solenoid valve (DSV) during 2-1 shifting.
Figure 118:
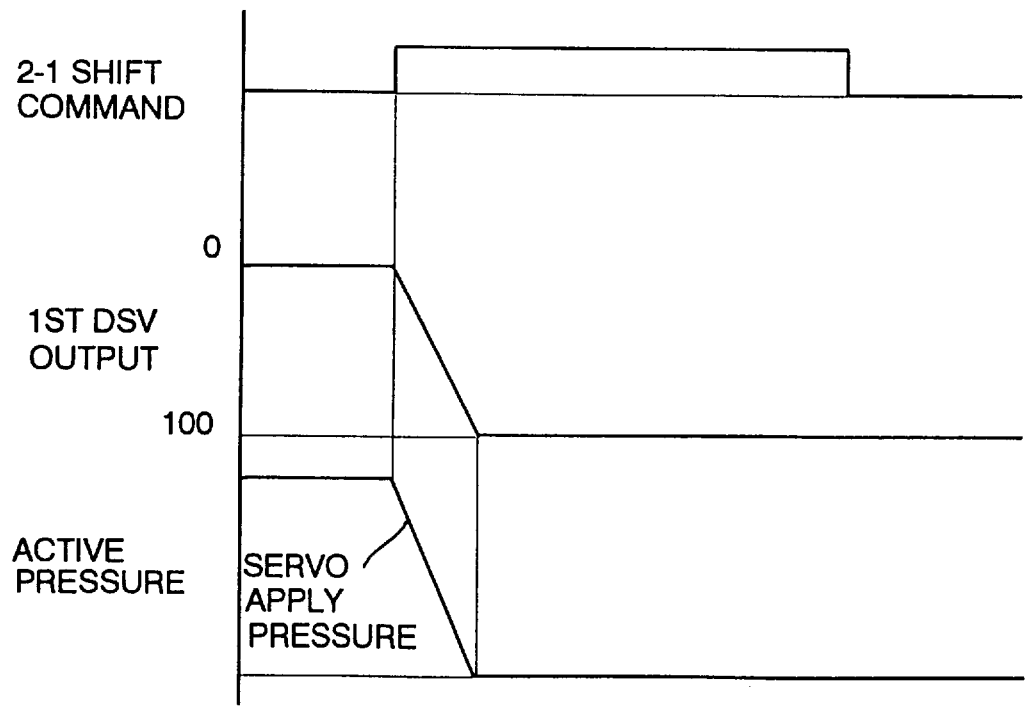
FIG. 118 is a time chart showing changes in various factors during 2-1 shifting.

Control of the first duty solenoid valve 1021 during the 2-1 gear shift is executed in accordance with a program shown in FIG. 117. Upon an occurrence of a shift command, the control is exercised only to increase the duty ratio 0% to 100% at a fixed rate through steps S251 and S252. As a result, the servo apply pressure is discharged with a fixed gradient, uncoupling the 2-4 brake 54 as shown in FIG. 116.

D: 4-2 Gear-Shift Control

A 4-2 gear shift is made by uncoupling the 3-4 clutch 53 with the 2-4 brake 54 remaining coupled and, simultaneously with this, coupling the forward clutch 51. Accordingly, discharge control of the 3-4 clutch pressure through the second duty solenoid valve 1022 and supply control of the forward clutch pressure through the third duty solenoid valve 1023 are coincidentally conducted. Of these the former discharge control is conducted through the feedback control.

During the 4-2 gear shift, in the operating pressure control circuit 1000, the first duty solenoid valve 1011 takes its OFF state so as to bring the servo release pressure line 1121 and the 3-4 clutch pressure line 1127 in communication with each other through the 3-4 shift valve 1005, thereby discharging servo release pressure simultaneously with discharging 3-4 clutch pressure.

2nd DSV Control

Figure 119:
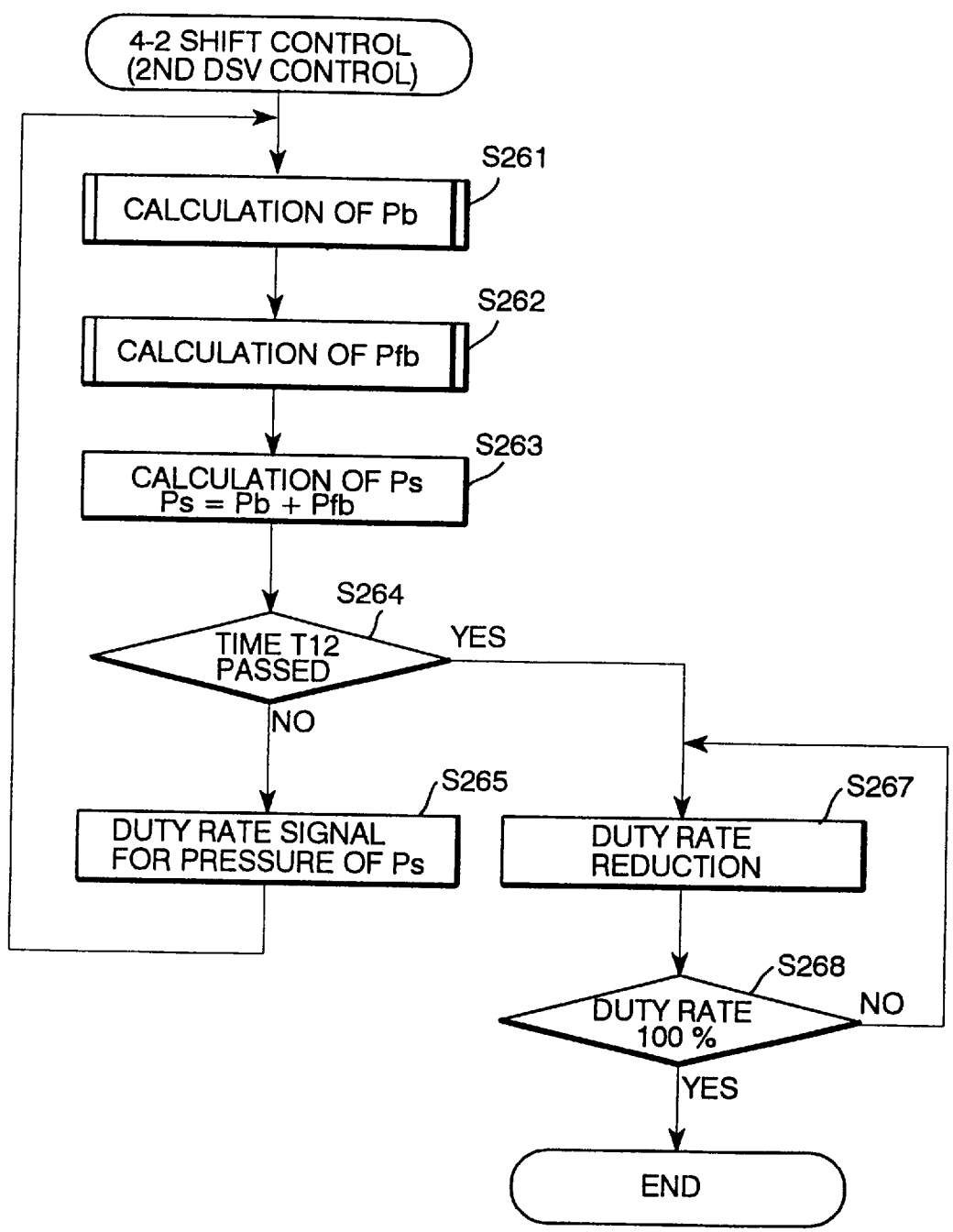

Discharge control of the 3-4 clutch pressure through the second duty solenoid valve 1022 during a 4-2 gear shift is executed in accordance with the program shown in FIG. 119. Through steps S261 through S263, computations of the base operating pressure Pb, the feedback pressure Pfb and the computed operating pressure Ps by adding these together are conducted, respectively. Subsequently, a decision is made at step S264 as to whether or not a predetermined time T12 has passed after the turbine speed Nt has risen as far as the directly before-gear shift termination turbine speed ($Nt_0$–$\Delta Nt$). Prior to a lapse of the time T12, a signal for the duty rate corresponding to the computed operating pressure Ps found as described above is output to the second duty solenoid valve 1022 at step S265 in such a way to control the 3-4 clutch pressure so as to cause a rise in the turbine speed Nt while conforming with the target turbine speed $Nti_0$.

When the predetermined time T12 has passed after the turbine speed Nt has attained the directly before-gear shift termination turbine speed ($Nt_0$–$\Delta Nt$), the duty ratio is caused to increase up to 100% at a fixed rate through steps S267 and S267 so as to uncouple the 3-4 clutch 53 completely.

The reason that the feedback control takes place until the predetermined time T12 has passed from the attainment of the directly before-gear shift termination turbine speed ($Nt_0$–$\Delta Nt$) is the same as for the control of the servo apply pressure during the 4-3 gear shift or the 3-2 gear shift described previously. However, the 4-2 gear shift differs from the cases of the 4-3 gear shift and the 3-2 gear shift in that the control starts immediately after a shift command without passing any delay time.

3rd DSV Control

Figure 120:
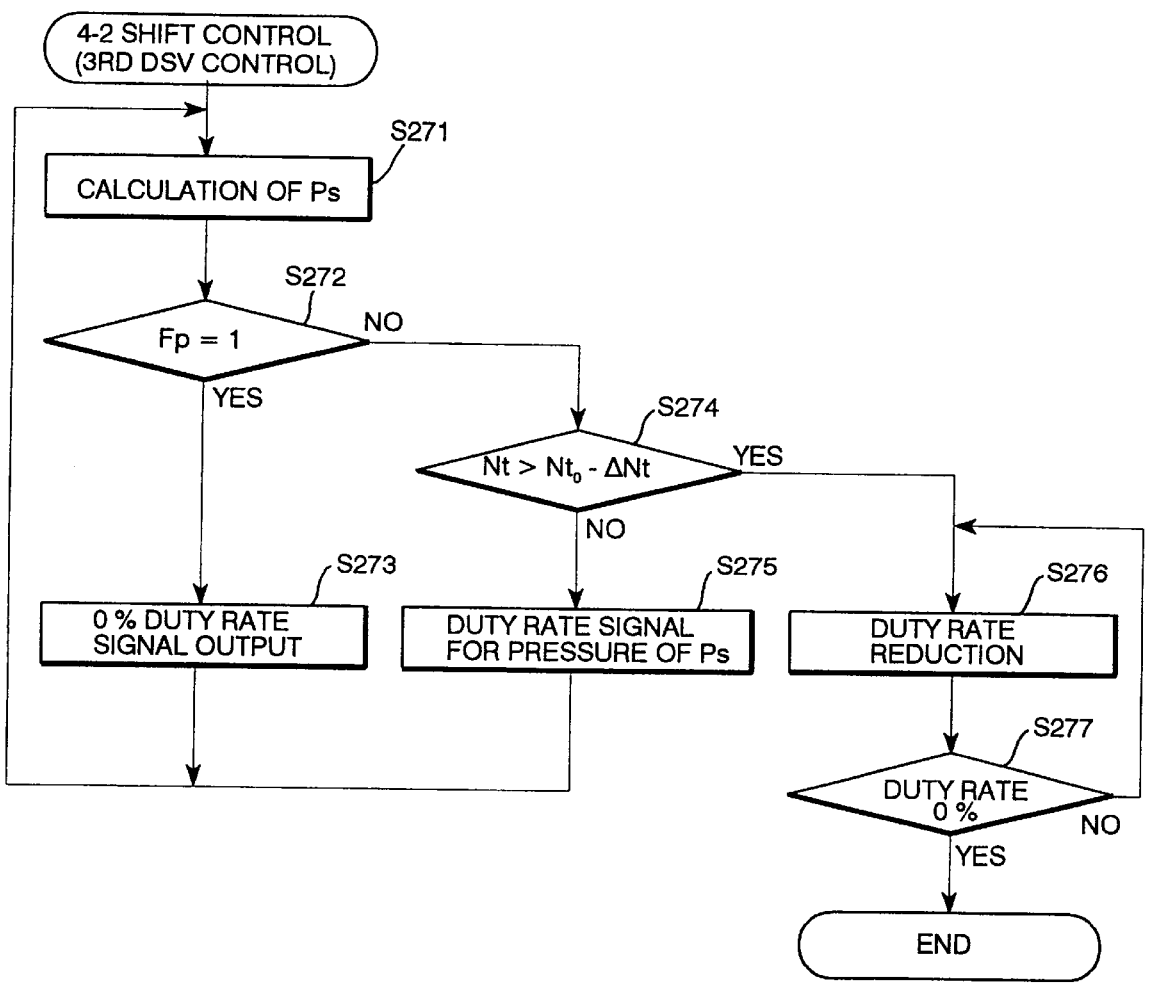
Figure 121:
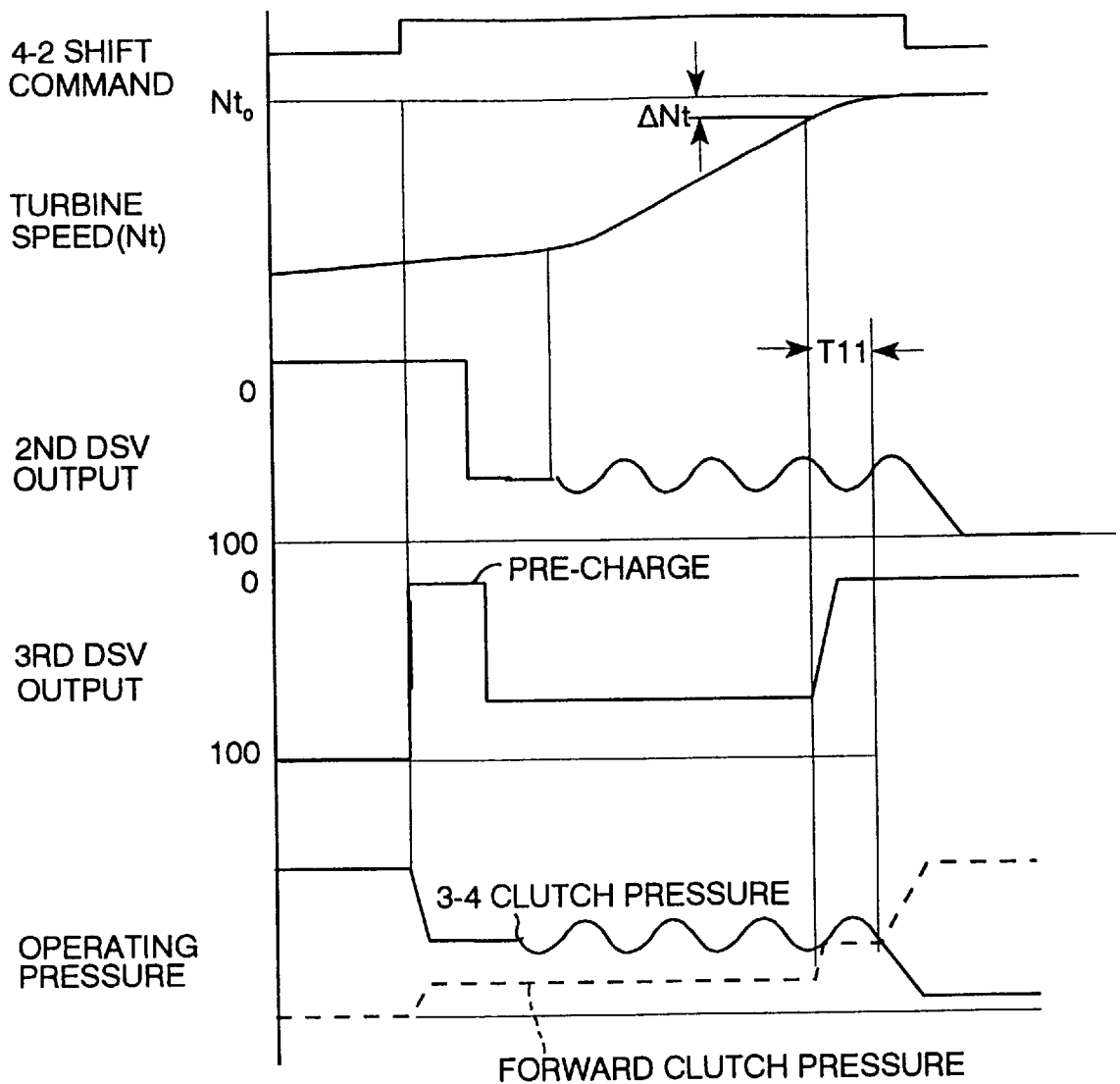

On the other hand, the control of supply of the forward clutch pressure through the third duty solenoid valve 1023 during the 4-2 gear shift is executed in accordance with a program shown in FIG. 120. This control differs from the control for the 4-3 gear shift in which both forward clutch pressure and servo release pressure are simultaneously controlled, in that the control of pressure supply is made only for the forward clutch pressure. All other respects are the same as the control of the forward clutch pressure supply during the 4-3 gear shift shown in the program in FIG. 112.

Specifically, at step S271, the computed operating pressure Ps is found, while, on the other hand, the operating pressure is caused to swiftly fill the oil path leading to the pressure chamber of the forward clutch 51 with the duty rate of the third duty solenoid valve held at 0%, during the pre-charge interval (Fp=1), through steps S272 and S273. When the pre-charge control has been concluded (Fp=0), a decision is made at step S274 as to whether or not the turbine speed Nt has risen as far as the directly before-gear shift termination turbine speed ($Nt_0$–$\Delta Nt$). While the turbine speed is rising to the directly before-gear shift termination turbine speed ($Nt_0$–$\Delta Nt$), a signal of the duty rate corresponding to the computed operating pressure Ps is output to the second duty solenoid valve 1022 at step S275. In this case, the computed operating pressure Ps is also set immediately below a level for coupling the forward clutch 51, likely the 4-3 gear shift. When the number of turbine rotations Nt attains the directly before-gear shift termination turbine speed ($Nt_0$–$\Delta Nt$), the duty ratio is reduced to 0% at a fixed rate through steps S276 and S277.

Figure 126:
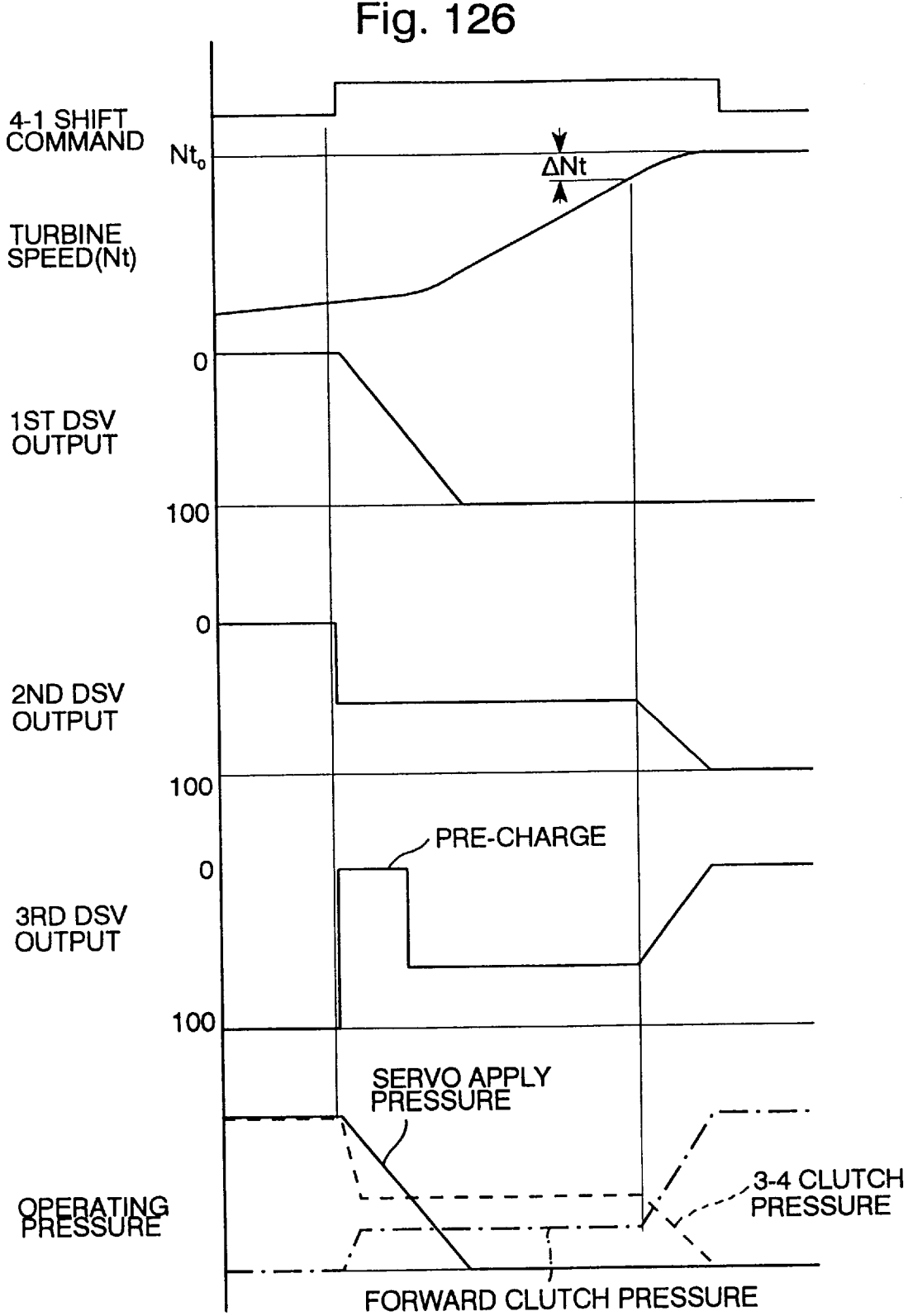

With the control, the forward clutch 51 is maintained immediately below a level for coupling the forward clutch 51 during slippage of the 3-4 clutch 53 allowed through feedback control, as shown in FIG. 126. Further, by means of the slippage of the 3-4 clutch 53, the forward clutch pressure is raised to the predetermined level when the turbine speed Nt has attained the directly before-gear shift termination turbine speed ($Nt_0$–$\Delta Nt$), so as to couple the forward clutch 51. Accordingly, the forward clutch 51 is coupled quickly without accompanying any delay in response.

E: 4-1 Gear Shift Control

A 4-1 gear shift is executed by, on one hand, uncoupling both 2-4 brake 54 and 3-4 clutch 53 and, on the other hand, coupling the forward clutch 51. Accordingly, what is controlled are discharge of the servo apply pressure through the first duty solenoid valve 1021, discharge of the servo release pressure and the 3-4 clutch pressure through the second duty solenoid valve 1022 with the servo release pressure line 1121 and the 3-4 clutch pressure line 1127 communicated with each other through the 3-4 shift valve 1005, and supply of the forward clutch pressure through the third duty solenoid valve 1023. In this case, because shifting is concluded through operation of the one-way clutch 56 in the torque demand 4-1 gear shift due to an increase in engine throttle opening, no feedback control is conducted with respect to any of these pressures.

1st DSV Control

Figure 122:
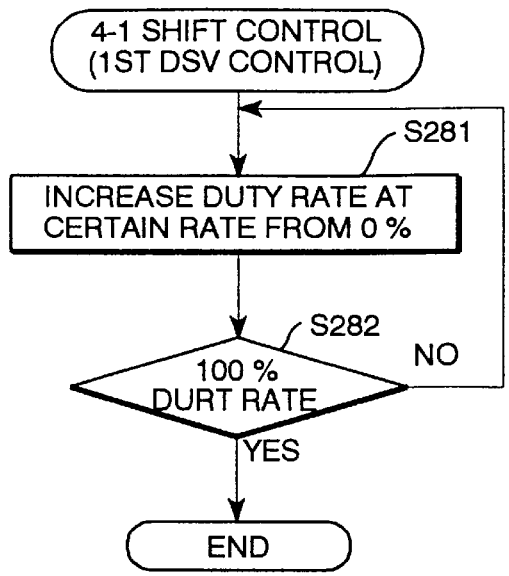

The discharge control of the servo apply pressure through the first duty solenoid valve 1021 is executed in accordance with the program shown in FIG. 122. This control consists of only causing an increase of the duty rate of the first duty solenoid valve 1021 from 0% to 100% at a fixed rate through steps S281 and S282 in response to a shift command. As a result, as shown in FIG. 126, the servo apply pressure is discharged relatively quickly at a fixed gradient.

2nd DSV Control

Figure 123:
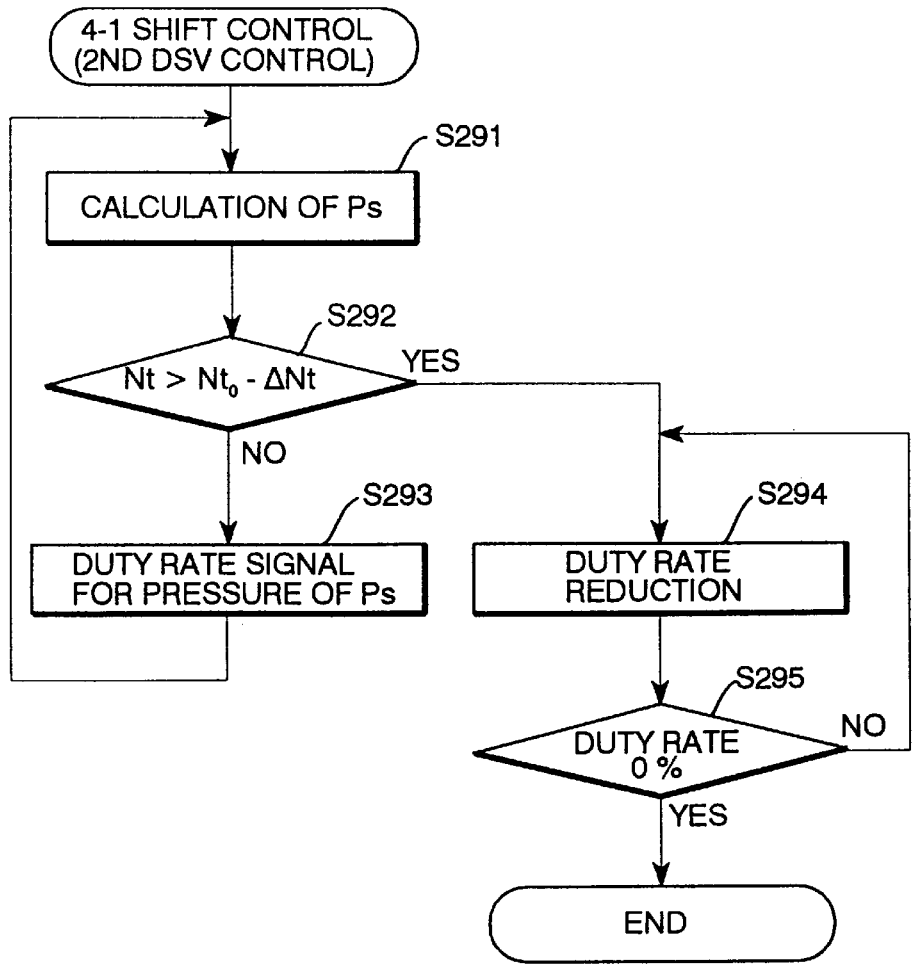

In addition, the discharge control of the servo release pressure and the 3-4 clutch pressure through the second duty solenoid valve 1022 is executed in accordance with the program shown in FIG. 123. First, at step S291, the computed operating pressure Ps is found. Subsequently, a decision is made at step S292 as to whether or not the number of turbine rotations Nt has risen as far as the directly before-gear shift termination turbine speed ($Nt_0-\Delta Nt$). Until this turbine speed ($Nt_0-\Delta Nt$) is attained, a signal representative of the duty rate corresponding to the computed operating pressure Ps is output to the second duty solenoid valve 1022 at step S293. In this case, the computed operating pressure Ps is obtained on the basis of a map which has been set so that the pressure becomes higher with an increase in the turbine speed Nt' immediately prior to the 4-1 gear shift. The 3-4 clutch 53 is allowed to slip suitably by the control of the 3-4 clutch pressure through the second duty solenoid valve 1022 at the duty rate corresponding to this computed operating pressure Ps. That is, the number turbine speed Nt is caused to rise smoothly by allowing the 3-4 clutch 53 to slip after the 2-4 brake 54 has been uncoupling quickly.

When the turbine speed Nt attains the directly before-gear shift termination turbine speed ($Nt_0-\Delta Nt$), the duty ratio is increased up to 100% at a fixed rate through steps S294 and S295. As a result, the 3-4 clutch 53 is completely uncoupled.

3rd DSV Control

On the other hand, the supply control of the forward clutch pressure through the third duty solenoid valve 1023 is executed in accordance with the program shown in FIG. 125. This control is the same in operation as the control of the third duty solenoid valve 1023 during the 4-2 gear shift. That is, at step S301, the computed operating pressure Ps is found. While, during the pre-charge period (Fp=1), the operating pressure is caused to fill quickly the pressure line leading to the pressure chamber of the forward clutch 51 with the duty rate of the third duty solenoid valve 1023 set at 0% through steps S302 and S303. On the other hand, when the pre-charge period is concluded (Fp=0), a decision is made at step S304 as to whether or not the turbine speed Nt has risen as far as the directly before-gear shift termination turbine speed ($Nt_0-\Delta Nt$). Until this turbine speed ($Nt_0-\Delta Nt$) has been attained, a signal representative of the duty rate corresponding to the computed operating pressure Ps is output to the second duty solenoid valve 1022 at step S305. In this case, the computed operating pressure Ps is the same as that during the 4-3 gear shift and the 4-2 gear shift with respect to the fact that the operating pressure keeps the forward clutch 51 in the state prior immediately prior to coupling.

When the turbine speed Nt has risen as far as the number of rotations immediately prior to completion of the directly before-gear shift termination turbine speed ($Nt_0-\Delta Nt$), the duty rate is reduced to 0% at a fixed rate through steps S306 and S307. By means of this control, while the forward clutch pressure is held at a level so as to place the 3-4 clutch 53 immediately prior to coupling during the slippage control, as shown in FIG. 126, it is raised quickly when the turbine speed Nt attains the directly before-gear shift termination turbine speed ($Nt_0-\Delta Nt$), so as to completely uncouple the forward clutch 51.

F: 3-1 Gear Shift Control

A 3-1 gear shift is achieved by uncoupling both 2-4 brake 54 and 3-4 clutch 53, with the forward clutch 51 coupled. Accordingly, the 3-1 gear shift control is the same in operation as the 4-1 gear shift control, with the exception of the fact that supply control of the forward clutch pressure through the third duty solenoid valve 1023 is not conducted. Discharge control of the servo apply pressure through the first duty solenoid valve 1021, and discharge control of the servo release pressure and the 3-4 clutch pressure through the second duty solenoid valve 1023 are conducted. Even in a torque demand 3-1 gear shift accompanying an increase in engine throttle opening, the fact that the feedback control of the operating pressure is not conducted is the same as for the 4-1 gear shift.

1st DSV Control

Figure 127:
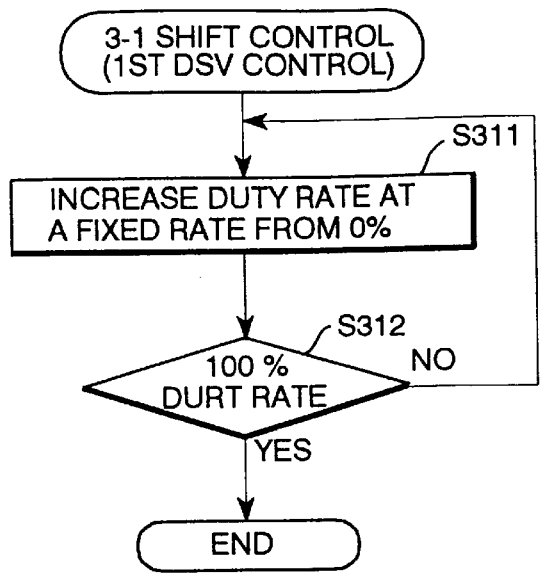
Figure 129:
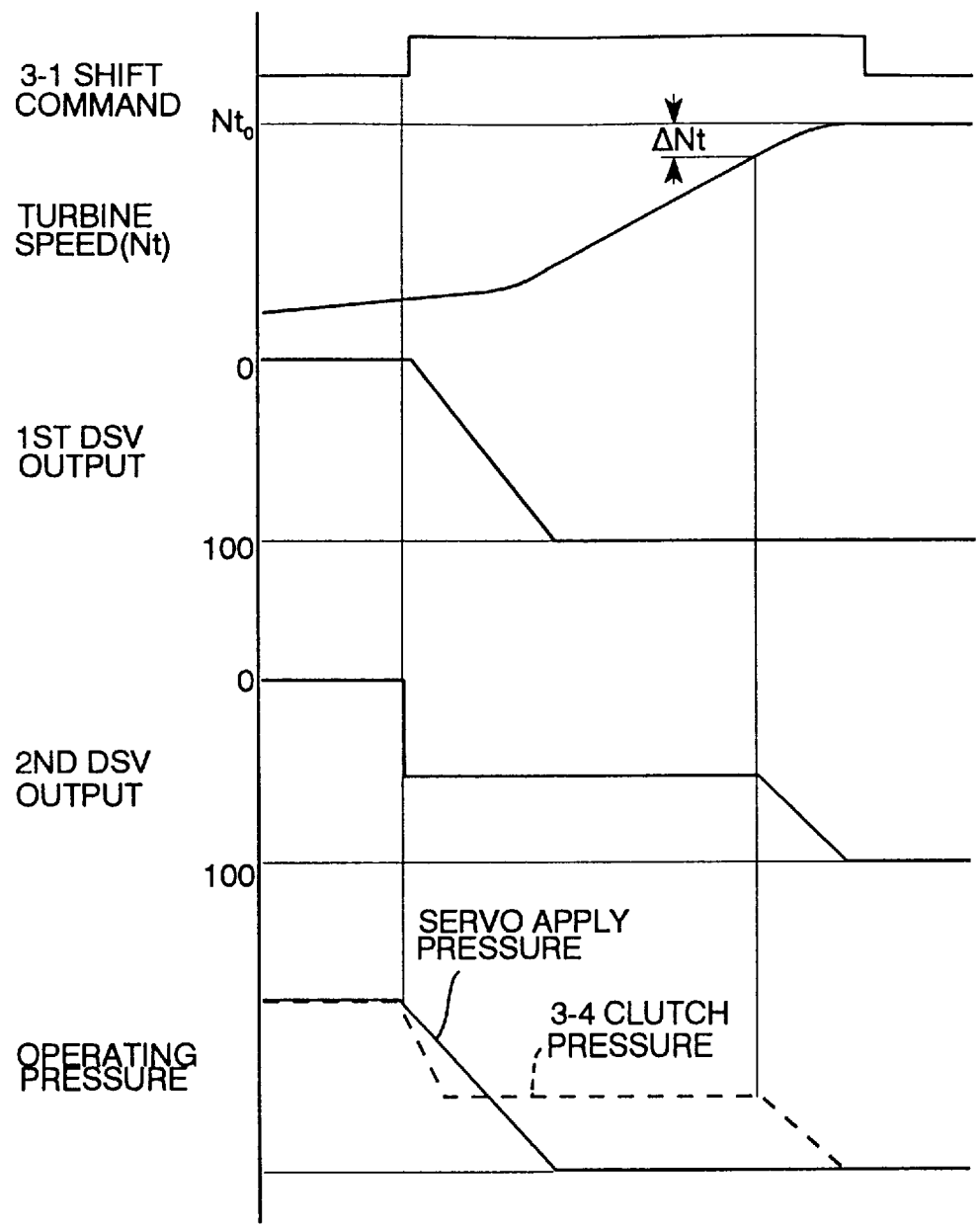

The discharge control of the servo apply pressure through the first duty solenoid valve 1021 is executed in accordance with the program shown in FIG. 127. When a shift command is given, the duty rate of the first duty solenoid valve 1021 is increased from 0% to 100% at a fixed rate through steps S311 and S312. By means of this control, the servo apply pressure is discharged relatively swiftly with a fixed gradient, as shown in FIG. 129.

2nd DSV Control

Figure 128:
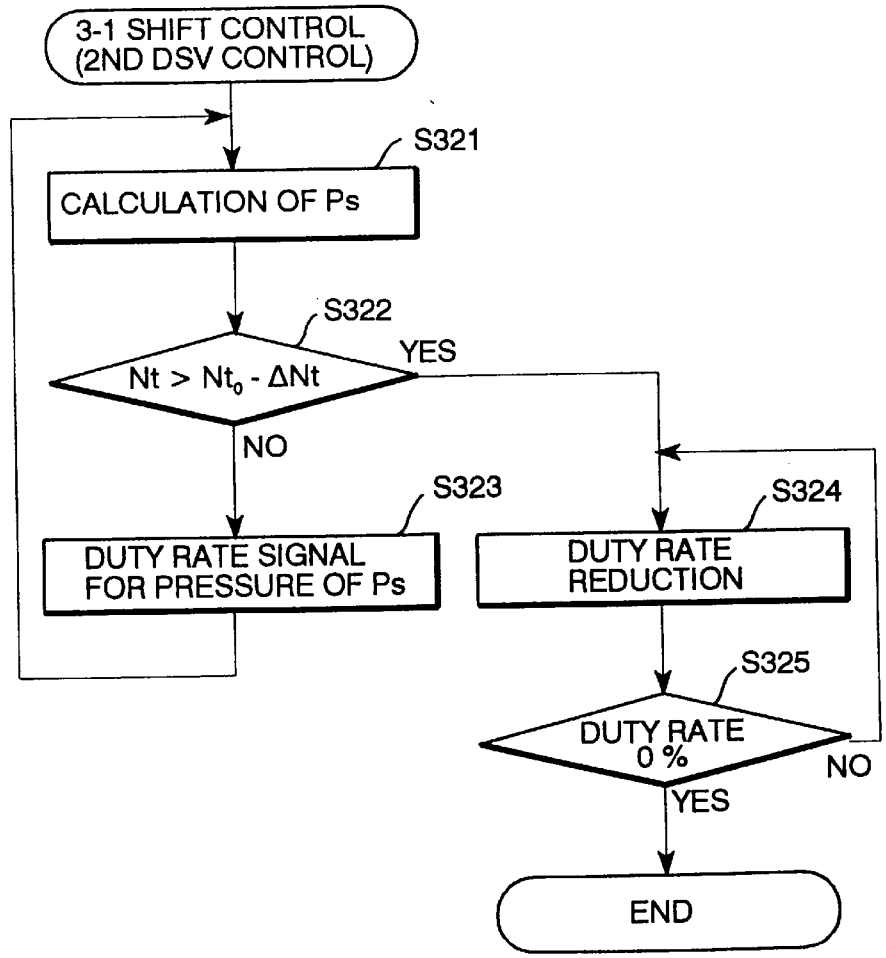

The discharge control of the servo apply pressure and the 3-4 clutch pressure through the second duty solenoid valve 1022 is executed in accordance with the program shown in FIG. 128. After founding the computed operating pressure Ps at step S321, a decision is made at step S322 as to whether or not the turbine speed Nt has risen as far as the directly before-gear shift termination turbine speed ($Nt_0-\Delta Nt$). Until this turbine speed ($Nt_0-\Delta Nt$) is attained, a signal representative of the duty ratio corresponding to the computed operating pressure Ps is output to the second duty solenoid valve 1022 at step S323. In this case, the computed operating pressure Ps is set to become higher as the turbine speed Nt' before the shift is higher so as to allow the 3-4 clutch 53 to cause appropriate slippage and, thereby, cause the turbine speed Nt to increase smoothly. The setting is made on the basis of the same map as the one shown in FIG. 124 provided for the 4-1 gear shift.

When this turbine speed Nt attains the directly before-gear shift termination turbine speed ($Nt_0-\Delta Nt$), the duty rate is increased up to 100% at a fixed rate through steps S324 and S325 so as to couple the 3-4 clutch 53 completely.

(3) Manual Down-Shift Control

Down-shifts to the first gear in the L range from second to any one of the second to fourth gears in the D range or the like by the manual operation of the shift lever will be described.

A: 2-L1 Gear Shift Control

A gear shift from the second gear in the drive range to the first gear in the low-speed range will be described. This 2-L1 gear shift is caused by uncoupling the 2-4 brake 54 and coupling the low reverse brake 55. In the hydraulic control circuit 1000, both first and second solenoid valves 1011 and 1012 switch their states from OFF to ON as shown in FIG. 64, so as to direct the operating pressure to the bypass valve 1004 at the control port 1004*a* through the first solenoid valve 1011, thereby forcing the bypass valve 1004 to shift the spool. Accompanying this, the operating pressure is directed and supplied to the low-reverse valve 1003 at the control port 1003*a* from the second solenoid valve 1012 through the bypass valve 1004, so as to force the low-reverse valve 1003 to shift the spool.

As a result, the pressure line 1114 downstream from the first duty solenoid valve 1021 is switched from communication with the servo apply pressure line 1115 to communication with the low-reverse brake pressure line 1116, so as to enable discharge control of the servo apply pressure and supply control of the low-reverse brake pressure through the first duty solenoid valve 1021 only.

1st DSV Control

Figure 130:
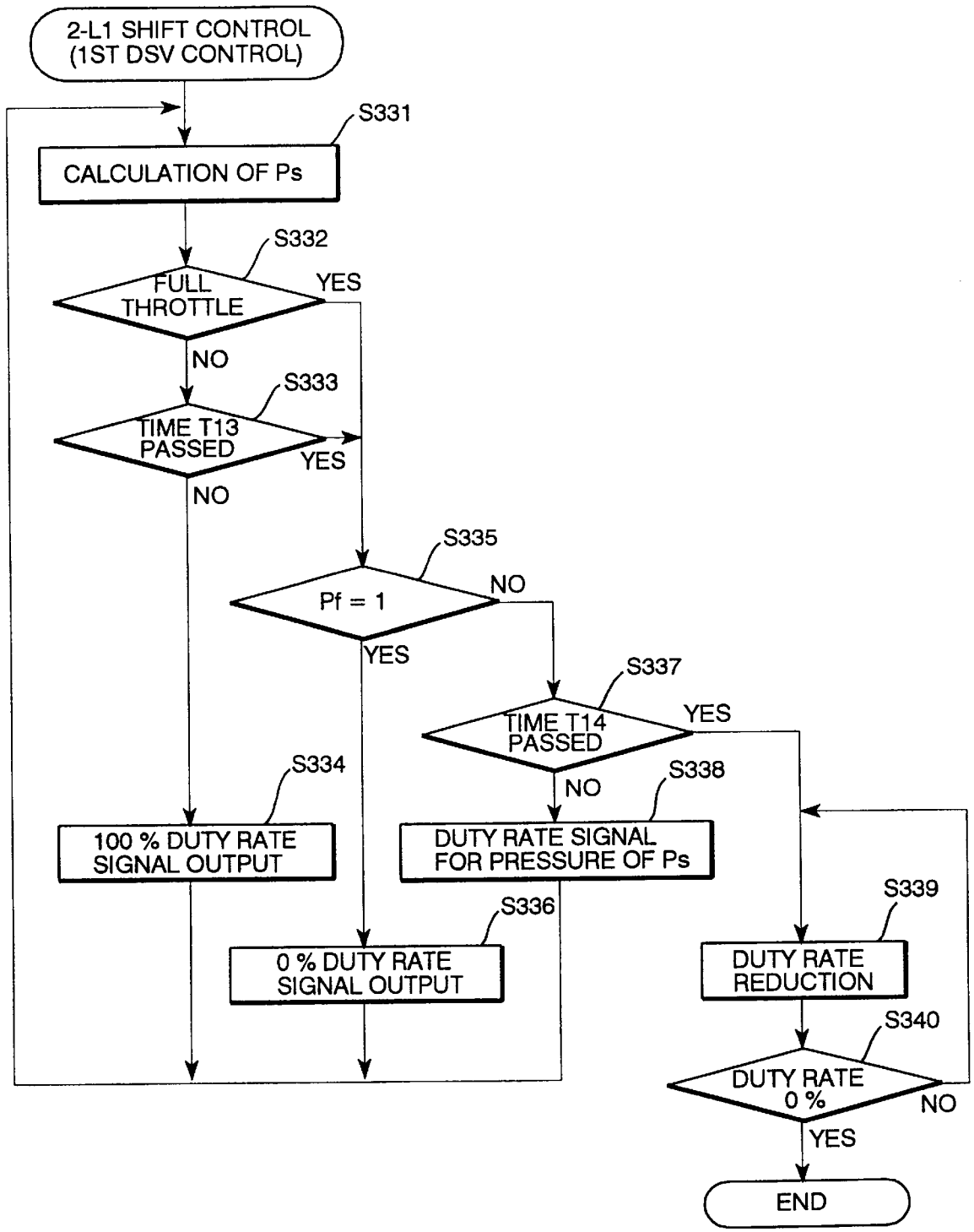

The control through the first duty solenoid valve 1021 during the 2-L1 gear shift is executed in accordance with the program shown in FIG. 130. At first, the computed operating pressure Ps is found on the basis of the map as shown in FIG. 131 at step S331. This computed operating pressure Ps map defines the operating pressure which becomes higher as the turbine speed Nt' prior to the gear shift becomes larger. Subsequently, a decision is made at step S332 as to whether or not the engine throttle opening is fully closed. When the engine throttle is not fully closed, the duty rate is set to 100% at step S333 and the first duty solenoid valve 1021 is drained at its downstream side until a predetermined delay time T13 has passed at step S334. This is because, in the 2-L1 gear shift during acceleration, the one-way clutch 56 operates and, consequently, causing the transmission gear mechanism to interlock if the low reverse brake pressure is supplied too early with respect to discharging of the servo apply pressure. For this reason, the low-reverse brake pressure is supplied after having completely discharged the servo apply, so as to prevent the transmission gear mechanism from interlocking. When the delay time T13 passes, the program proceeds to steps S335 and S336 for the pre-charge control.

For the 2-L1 gear shift with the engine throttle completely closed where the one-way clutch 56 does not operate and an immediate effect of engine braking is required, the pre-charge control is conducted promptly without following the delay time T3, using the servo apply pressure as the low-reverse brake pressure (indicated by symbol "L" in FIG. 132), through steps S335 and S336. That is, during the pre-charge period (FP=1), the first duty solenoid valve 1021 operates at a duty rate of 0% so as to fill promptly the pressure line leading to the pressure chamber of the low-reverse brake 55 with the operating pressure.

In the hydraulic control circuit 1000, the operating pressure that is supplied the servo apply pressure chamber 54a of the 2-4 brake 54 through the first duty solenoid valve 1021 in the second gear is introduced into and accumulated in the second accumulator 1042 and then, supplied to the pressure chamber of the low-reverse brake 55 through the low-reverse valve 1003 during the gear shift to the first gear in the low-speed (L) range, so that the pre-charge period by the first duty solenoid valve 1021 is correspondingly shortened.

When the pre-charge control is concluded (Fp=0), a decision is made at step S337 as to whether or not the 2-L1 gear shift has been concluded, or the backup timer has counted a backup time T14. Until a lapse of the backup time, a signal representative of the duty rate corresponding to the computed operating pressure Ps is output to the first duty solenoid valve 1021 at step S338. In this instance, the computed operating pressure Ps is set to conform with the turbine speed Nt' prior to the 2-L1 gear shift as described above, so as to allow the low-reverse brake 55 to cause appropriate slippage, thereby provides an increase in the turbine speed Nt in the backup time.

Subsequently, when the 2-L1 gear shift is concluded or the backup time T14 passes, the duty rate is reduced to 0% at a fixed rate through steps S339 and S340 so as to couple the low-reverse brake 55 completely. The decision concerning the conclusion of the 2-L1 gear shift is made based on the satisfaction of that the difference between the turbine speeds Nt immediately before and after the 2-L1 gear shift has become at least as great as a computed value; that the turbine speed change rate dNt has changed from a positive value to a negative value; or that the turbine speed change rate dNt has become less than half the rate during the 2-L1 gear shift.

B: 3-L1 Shift Control

A manual gear shift to the first gear in the L range from the third gear of the D range is achieved by means of locking the low reverse brake 55 through the first duty solenoid valve 1021 and unlocking the 3-4 clutch 53 through the second duty solenoid valve 1022. During the gear shift, with the hydraulic control circuit 1000, as was the case of the 2-L1 gear shift, the first and second solenoid valves 1011 and 1012 are jointly switched from the OFF state to the ON state through the switching of the bypass valve 1004, causing the low reverse valve 1003 to switch the communication of the pressure line 1114 downstream from the first duty solenoid valve 1021 from with the servo apply pressure line 1115 to with the low reverse brake line 1116. By this means, control is accomplished for discharge of the servo apply pressure and supply of the low reverse brake pressure through the first duty solenoid valve 1021. However, during the gear shift from the third gear to the first gear of the L range, since the 3-4 clutch pressure is supplied to the control port 1007a of the relay valve 1007 which disconnects the communication between the first solenoid valve 1011 and the bypass valve 1004, the switching of the bypass valve 1004 cannot be accomplished by means of the operating pressure from the first solenoid valve 1011, render the low reverse valve 1003 disabled to cause switching of the communication of the pressure line 1114 downstream from the first duty solenoid valve 1021.

Therefore, for this gear shift, following switching the first and second solenoid valves 1011 and 1012 from the OFF state to the ON state after the relay valve 1007 has shifted the spool to the right end position as shown in FIG. 64 as a result of discharging 3-4 clutch pressure, the control of supply of the low reverse brake pressure through the first duty solenoid valve 1021 is effected. In this instance, as concerns switching of the spool position of the relay valve 1007, discriminating control is accomplished in a manner described separately.

1st DSV Control

Control of the first duty solenoid valve 1021 during the 3-L1 gear shift is executed in accordance with the program shown in FIG. 135. First of all, the operating pressure Ps developed at step S341 is calculated on the basis of a pressure map. The operating pressure Ps map is the same as that utilized for the 2-L1 gear shift and defines to allow the operating pressure to become higher with an increase in the turbine speed Nt' prior to shifting. Subsequently, at step S342, a determination is made as to the value of the relay valve switch flag Fr. The flag Fr indicates that, when it is up or set to the state of 1, the relay valve 1007 has shifted its spool from the left end to the right end position. If it is prior to switching (Fr=0), the duty rate is held at 100% at step S343 so as to drain the first duty solenoid valve 1021 at its downstream side. As was previously described, this is because, at this time, while the low reverse brake pressure cannot be supplied, only discharge of the servo apply pressure is carried out as indicated by label M in FIG. 136.

When the relay valve 1007 shifts its spool (Fr=1), the control proceeds to pre-charge processes at steps S344 and S345. In other words, during the period in which the pre-charge flag Ft is up or set to the state of 1, the duty rate of the first duty solenoid valve 1021 is held at 0% so as to fill rapidly the passage leading to the pressure chamber of the low reverse brake 55 with the operating oil. On the other hand, when the pre-charge control has terminated (Fr=0), a decision is made at step S346 as to whether or not the gear shift has completed, i.e. the back-up timer has counted a specified backup time T15. Before a lapse of the backup time T15, a duty rate corresponding to the computed operating pressure Ps is output to the first duty solenoid valve 1021 at step S347. In this instance, the computed operating pressure Ps, by giving it a rate corresponding to the turbine speed Nt' immediately prior to shifting, allows the low reverse brake 55 to slip appropriately so as to provide an increase the turbine speed Nt during slippage.

Subsequently, when the gear shift is completed, or the specified backup time T15 has passed, the duty rate is reduced at a fixed rate to 0% through steps S348 and S349. In such a way, the low reverse brake 55 is completely locked.

2nd DSV Control

During the 3-L1 gear shift, control for discharge of the 3-4 clutch pressure (as well as the servo release pressure) through the second duty solenoid valve 1022 is executed in accordance with the program shown in FIG. 134. Specifically, through steps S351 and S352, the duty rate output to the second duty solenoid valve 1022 is increased in a fixed rate until reaching 100%. With this increasing duty rate, the 3-4 clutch pressure is discharged with a linear gradient following an occurrence of a shift command so as to unlock the 3-4 clutch 53.

Switching of Relay Valve

Switching the relay valve 1007 in spool position which comprises the condition of switching the first and second solenoid valves 1011 and 1012 from the OFF state to the ON state and commencing the control of low reverse brake pressure through the first duty solenoid valve 1021 is determined through the program shown in FIG. 135. Specifically, first of all, a determination is made at step S361 as to whether or not the duty rate of the second duty solenoid valve 1022 is greater than a specified rate C9, in other words, whether or not the 3-4 clutch pressure discharged through the second duty solenoid valve 1022 is less in level than the specific pressure corresponding to the urging force of the return spring of the relay valve 1007. Until it is reduced to below the specific pressure, the relay valve switch flag Fr is held in the state of 0 at step S362. When it becomes less in level then the specific pressure, i.e. the duty rate has increased greater then the specified rate C9, then, at step S363, a lapse of a specified time T16 is waited.

When the specified time T16 has passed, the relay valve switch flag Fr is set to the state of 1 at step S364, so as to cause the first and second solenoid valves 1011 and 1012 to turn to the ON state, starting control over the low reverse brake pressure.

C: 4-L1 Gear Shift Control

A manual gear shift to the first gear in the low-speed (L) range from the fourth gear in the drive (D) range is exactly the same as the gear shift control to the first gear in the low-speed (L) range from the third gear, with the exception of points in which locking of the forward clutch 51 is needed.

First SV Control

Control of the 4-L1 gear shift by means of controlling the first duty solenoid valve 1021 is executed in accordance with the program shown in FIG. 137. At first, the operating pressure Ps is calculated at step S371 on the basis of a map similar to the map used in the 2-L1 gear shift, following which, through steps S372 and S373, the duty rate is held at 100% so as to discharge the servo apply pressure quickly until it is determined the relay valve 1007 has switched (Fr=0). When the relay valve 1007 switches (Fr=1), the pre-charge control is executed with a duty rate of 0% for the pre-charge period (Fp=1) through steps S374 and S375. On the other hand, when the pre-charged period is over (Fp=0), at step 376, a decision is made as to whether or not the 4-L1 gear shift has been completed or the back-up timer has counted a specified backup time T17. Before the completion of the gear shift, a duty ratio corresponding to the computed operating pressure Ps is output to the first duty solenoid valve 1021.

With this control, the low reverse brake 55 is allowed to cause appropriate slippage so as to provide an increase in the turbine speed Nt during the slippage. Subsequently, when the gear shift is completed, or the backup time T17 has passed, the duty ratio is reduced in a fixed rate until it reaches 0% through steps S378 and S379, causing the low reverse brake 55 to lock completely.

2nd DSV Control

During the 4-L1 gear shift, control is carried out for discharging 3-4 clutch pressure (as well as the servo release pressure) through the second duty solenoid valve 1022 in accordance with the program shown in FIG. 138. At first, through steps S381 and S382, the duty ratio of to the second duty solenoid valve 1022 is increased in a fixed rate until it reaches 100%. Following an occurrence of a shift command, the 3-4 clutch pressure is discharged at a linear gradient with the increasing duty rate, causing the 3-4 clutch 53 to unlock.

3rd DSV Control

Control for the forward clutch pressure through the third duty solenoid valve 1023 is executed in accordance with the program shown in FIG. 139. At steps S391 and S392, a duty rate output to the third duty solenoid valve 1023 is decreased in a fixed rate until it reaches 0%. With the linearly increasing duty rate, the forward clutch pressure is supplied at a linear gradient, following an occurrence of a shift command, so as to lock the forward clutch 51. In this instance, the forward clutch 51 is caused to lock in advance of locking the low reverse brake 55, i.e. during the neutral state, following unlocking the 2-4 brake 54 by means of the first duty solenoid valve 1021, it is not necessary for the low-reverse brake 55 to be precisely feedback controlled.

(4) Coast Down-Shift Control

As one of down-shifts, other than torque demand down-shifts which are accompanied with an increase in throttle opening, there are coast downshifts caused due to manually operated gear shifts with the engine throttle valve in the full position or reducing vehicle speed. Of these, a 4-3 gear shift, in particular, which needs locking the forward clutch 51 requires special control.

Specifically, as compared with a torque demand down-shift for which feedback control is made to control locking pressure of a friction coupling element to be unlocked (which is the 2-4 brake 54 in the case of the 4-3 gear shift) so as to provides a smooth increase in the turbine speed Nt to a turbine speed $Nt_0$ to be expected at the completion of the gear shift, for the coast down-shift, an increase in the turbine speed Nt is provided by controlling the friction coupling element to be locked. In the case of the 4-3 coast down-shift, locking the forward clutch 51 is controlled. In this instance, since the forward clutch 51 is structured with a great capacity so as to be able to bearing a large portion of torque occurring due to acceleration, it is essential for the forward clutch to perform delicate control with operating pressure at a low level during coasting where the input torque is extremely small.

On the other hand, with regard to the output pressure relative to the duty rate of the duty solenoid valve, as shown by a label N in FIG. 141, in a low pressure region corresponding to the stroking pressure of the clutch piston, there is a region where the output pressure shows a sudden change relative to changes in the duty rate. Therefore, it is significantly difficult to control locking the forward clutch which needs to be controlled within a low pressure region. For this reason, with the 4-3 gear shift during coasting, by making utilization of an accumulator, locking control of the forward clutch 51 is accomplished with satisfaction by means of the third duty solenoid valve 1023.

As shown in FIG. 62, when a 4-3 shift command is provided during coasting, the first solenoid valve 1021 is switched from the ON state to the OFF state, causing the 3-4 shift valve 1005 to shift its spool to the left end position as viewed in the figure so as to bring a first accumulator 1041 into communication with the forward clutch pressure line 1119. At the same time, the feedback control is commenced over the forward clutch pressure by means of the third duty solenoid valve 1023. Shifting the spool of the 3-4 shift valve 1005 to the left end position provides communication between the servo release pressure line 1121 and the 3-4 clutch pressure line 1127, so as to force the 3-4 clutch pressure to enter the servo release pressure chamber 54b of the 2-4 brake 54 as a servo release pressure through the second duty solenoid valve 1022.

3rd DSV Control

Control of supply of the forward clutch pressure through the third duty solenoid valve 1023 during coasting is executed in accordance with the program shown in FIG. 142. First of all, through steps S401 and S402, calculations are made of the base pressure Pb and the feedback pressure Pfb. Subsequently, at step S403, these are added together in order to obtain an operating pressure Ps. Through steps S404 and S405, during the pre-charge period (Fp=1), the pre-charge control is executed. When the pre-charge period is over (Fp=0), a decision is made at step S406 as to whether or not the gear shift has been completed or a specified backup time T18 has been counted up by the back-up timer. Until a lapse of the backup time T18, at step S407, a signal representative of the duty ratio corresponding to the computed pressure Ps is output to the third duty solenoid valve 1023. On the other hand, when the gear shift is over, that is, the backup time T18 has passed, the duty ratio is reduced in a fixed rate until reaching a duty ratio of 0% through steps S408 and S409. In this instance, the calculations of these base pressure Pb and feedback pressure Pfb made, respectively, at steps S401 and S402 are executed in accordance with the same program as the program (FIGS. 105 and 108) for the feedback control of servo apply pressure through the first duty solenoid valve 1021 during a torque demand 4-3 gear shift.

With the control described above, as shown in FIG. 143, during the control of the forward clutch pressure, the turbine speed Nt increases to a turbine speed $Nt_0$ expected at completion of shifting. Particularly, at the beginning of shifting, performing the supply of operating pressure from the first accumulator 1041, in addition to the pre-charge through the third duty solenoid valve 1023, enables the forward clutch pressure to raise in a very short time as indicated by a label O.

In addition, a dumping effect of the first accumulator 1041 mitigates a sharp change in operating characteristics of the duty solenoid valve shown in FIG. 141 in a low pressure region, providing a smoothly change in the output pressure relative to changes in the duty rate, as indicated by a label P. With this control, the forward clutch pressure, which is particularly required to be controlled precisely in a low pressure region for a 4-3 gear shift during coasting, is satisfactorily realized.

In this instance, down-shifts during coasting other than the 4-3 gear shift do not require minute control particularly in the low pressure region and consequently, avoids any necessity of the feedback control such as described above.

(5) Manual Shift Operation

A description will be hereafter provided with respect to control of manual shift operation between the respective ranges, in particular, while stopping.

A: N,R-D Range Shift Control

When manual Range shift operation is ma de from the neutral (N) range or the reverse (R) range to the drive (D) range, the forward clutch 51 is locked. For locking the forward clutch 51, in order the forward clutch 51 to generate only reduced shock upon locking, shift control is performed such that the transmission passes through the third gear before creating the first gear. Accordingly, when this shift operation takes place, control is performed for supply and discharge of the forward clutch pressure through the second duty solenoid valve 1022 and supply of the forward clutch pressure through the third duty solenoid valve 1023. In this instance, in accomplishing this control, control is common to both shift operations from the neutral (N) range to the drive (D) range and from the reverse (R) range to the drive (D) range. However, for the reverse (R) to drive (D) range shift operation, control is performed over discharging low reverse brake pressure.

1st DSV Control

When a manual range shift operation is conducted from the reverse (R) range to the drive (D) range, discharge control is accomplished over the low reverse brake pressure through the first duty solenoid valve 1021 as described above. As shown in FIG. 144, this discharge control is accomplished only by providing a duty rate of 100% for the first duty solenoid valve 1021 at step S411. Only with the duty rate, the low reverse brake pressure is discharged. Though a manual range shift operation from the neutral (N) range to the drive (D) range is controlled in the same manner, since, in the neutral (N) range, the manual shift valve 1002 has shut off the source pressure to the first duty solenoid valve 1021, the low-reverse brake has been already drained.

3rd DSV Control

Control of the forward clutch pressure is executed in accordance with the program shown in FIG. 145 through the third duty solenoid valve 1023. After having obtained the computed operating pressure Ps at step S421 in accordance with the program described later, the pre-charge control is conducted through steps S422 and S423. When the pre-charge control is over (Fp=0), then, through steps S414 and S415, a signal representative of the duty rate corresponding to the computed operating pressure Ps is output to the duty solenoid valve 1023 until completion of the manual range shift to the drive (D) range so as to provide the forward clutch pressure in accordance with the computed pressure Ps.

Subsequently when the manual range shift is over, then, through steps S425 and S427, the duty rate is reduced at a fixed rate until reaching 0%, increasing the forward clutch pressure to a specified level.

Calculation of Pressure Ps

The calculation of operating pressure Ps at step S421 in the program above mentioned is performed in accordance with the program shown in FIG. 146.

In the program, pressures Pe and Pt corresponding to the engine speed Ne and throttle opening θ, respectively, both immediately prior to the manual range shift to the drive (D) range, are found on the basis of maps at steps S431 and S432, respectively. Subsequently, at step S433, either one of these pressures Pe and Pt which is higher than the other is adopted as an initial value Ps' for the computed pressure Ps. Here, as shown in FIGS. 147 and 158, the pressure maps defines the pressures Pe and Pt corresponding to engine speed Ne throttle opening θ, respectively, such that these pressures Pe and Pt are high with increases engine speed Ne and throttle opening θ, respectively. At step S434, a decision is made as to whether or not a specified time T19 has passed following the manual range shift operation to the drive (D) range. Until it has passed, the computed oil pressure Ps is maintained equal to the initial pressure Ps' at step S435. On the other hand, when the specified time T19 passes, the computed pressure Ps is increased by a fixed rate with progress of time with the progress of time from the lapse of the specified time at step S436.

With this control, the duty rate of the third duty solenoid valve 1023, and hence the forward clutch pressure corresponding to the duty rate, changes as shown in FIG. 150. In accompaniment with which, the turbine speed Nt drops directly down upon the occurrence of a manual range shift from the neutral (N) range and, upon the occurrence of a manual range shift from the reverse (R) range, comes down following a spontaneous increase due to discharge of the low reverse brake pressure.

2nd DSV Control

Control of the 3-4 clutch pressure, as well as the servo release pressure, is controlled through the second duty solenoid valve 1022 for a manual range shift to the drive (D) range is executed in accordance with the programs shown in FIG. 149. That is, a decision is made at step S441 as to whether or not a previous speed Nt' of the turbine was greater than a specified speed C11 and a current speed Nt is smaller than the specified speed C11. In other words, it is a decision as to whether or not the turbine speed Nt has decreasingly varied across the specified value C11. In discriminating a time at which the turbine speed Nt becomes below the specified value C11, determining the relativity of speed only utilizing the simple formula of Nt<C11 renders it difficult to discriminate correctly a reduction in the turbine speed Nt. this is because the discriminatory formula is effective within a region of turbine speeds indicated by a label Q in FIG. 150 and the reduction in the turbine speed Nt cannot be accurately ascertained. In other words, by conducting the discriminating of a reduction in the turbine speed under the conditions given at step S441, the program is effective commonly to both manual range shifts to the drive (D) range from the neutral (N) range and from the reverse (R) range.

Until turbine speed Nt decreasingly varies across the specified speed C11 from the commencement of a manual range shift operation, the second duty solenoid valve 1022 is operated with a duty rate so as to provide for the specified 3-4 clutch a desired pressure, thereby causing a rapid increase in the 3-4 clutch pressure. By holding the increased 3-4 clutch pressure, the 3-4 clutch 53 is locked to create the third gear.

Subsequently, when the turbine speed Nt decreasingly varies across the specified speed C11, the duty ratio is changed at a fixed rate until reaching 100% through steps S443 and S444 so as to unlock the 3-4 clutch 53, thereby completing range shifting to the first gear.

B: R-L Shift Control

Although control for a manual range shift from the reverse (R) range to the low-speed (L) range differ from the control of operation from the reverse (R) range to the drive (D) range in locking the low-reverse brake 55 after the R-L range shift operation, because the 3-4 clutch 53 is locked to temporarily create the third gear, there occurs interlock of the transmission gear mechanism when locking the 3-4 clutch 53 takes place while the low reverse brake 55 is locked.

For this reason, during the R-L range shift, the first duty solenoid valve 1021 is controlled to discharge the low reverse brake pressure once and supplies it again after the temporary creation of the third gear due to locking the 3-4 clutch 53.

3rd DSV Control

Control is executed for supply of the forward clutch pressure through the third duty solenoid valve 1023 during the R-L range shift in accordance with the program shown in FIG. 151. This control is exactly the same as the control accomplished for the range shift to the D range from the N range or from the R range. After having obtained the operated pressure Ps at step S451, the pre-charge control is performed (Fp=1) through the following steps S452 and S453. Subsequently, when the pre-charge control is over (Fp=1), a signal representative of the duty rate corresponding to the computed pressure Ps is output to the third duty solenoid valve 1023 until the completion of the range shift through steps S454 and S455 so as to supply the forward clutch pressure corresponding to the computed pressure Ps. Subsequently, when the manual range shift is over, the duty rate is reduced at a fixed rate until it reaches a duty ratio of 0% through steps S456 and S457, raising the forward clutch pressure to a specified level. In this instance, the calculation of the pressure Ps is accomplished in this same manner as for the manual range shift to the D range from the N range or from the R range, as shown in FIG. 146.

2nd DSV Control

Control of supply of the 3-4 clutch pressure (as well as the servo release pressure) through the second duty solenoid valve 1022 is executed in accordance with the program shown in FIG. 152. In this instance as well, the control is accomplished in the same manner as for the range shift to the D range from the N range or from the R range. Specifically, at step S461, a decision is made as to whether or not the turbine speed Nt has decreasingly varied across a specified speed C12 as it declined. Until it varies across the specified speed C12, a desired duty rate is provided for the second duty solenoid valve 1022 so as to develop the specified 3-4 clutch pressure at a predetermined level at step S462, thereby causing a rapid increase in the 3-4 clutch pressure. The increased 3-4 clutch pressure is held at the level, locking the 3-4 clutch 53 to create the third gear.

When the turbine speed Nt decreasingly varies across the specified speed C12 as it declines, the duty rate is increased at a fixed rate until reaching 100% through steps S463 and S464, unlocking the 3-4 clutch 53.

1st DSV Control

Control of the low reverse brake pressure during the manual range shift to the L range from the R range is executed through the first duty solenoid valve 1021 in accordance with the program shown in FIG. 153. At step S471, a decision is made as to whether or not a specified time T20 has passed since the turbine speed Nt decreasingly varies across the specified speed C12 as it declined. Until a lapse of the specified time T20, a signal representative of a duty rate of 100% is output to the first duty solenoid valve 1021 at step S472. As a result, as indicated by a label R, the low reverse brake pressure is completely discharged. When the specified time T20 has passed from a moment at which the specified value C12 is crossed by the decreasing turbine speed Nt, a signal of a duty ratio of 0% is again output at step S473 so as to supply the low reverse brake pressure and lock the low reverse brake 55 once again.

With this control, while the third gear takes place immediately following operation for the R-L range shift, the low reverse brake 55 stands ready for locking, so as to prevent concurrent locking of the low reverse brake 55 and the 3-4 clutch 53, thereby placing the transmission gear mechanism free from interlocking. Thereafter, the first gear in the L range is created.

C: L-R Shift Control

In a manual range shift from the L range or from the N range to the R range, while the reverse clutch 52 and the low reverse brake 55 are locked, the line pressure is supplied as it is as the reverse clutch pressure to the pressure chamber of the reverse clutch 53 through the manual shift valve 1002 in the hydraulic control circuit. Together, the low reverse brake pressure is supplied to the pressure chamber of the low reverse brake 54 through the first duty solenoid valve 1021.

Meanwhile, because the low reverse brake 54 has been locked upon the manual range shift from the L range to the R range, the shift to the R range causes the reverse clutch 52 to lock with the low reverse brake 54 locked. In such a case, the manual shift valve supplies the line pressure directly to the reverse clutch 52, forcing it to lock abruptly, which always generates heavy shocks. For this reason, during the range shift from the L range to the R range, after the low reverse brake pressure has been discharged through the first duty solenoid valve 1021 once, it is introduced again after locking the reverse clutch 52.

1st DSV Control

Control of the first duty solenoid valve 1021 is accomplished in accordance with the program shown in FIG. 157. After having obtained the computed pressure Ps at step S41, a decision is made at step S42 as to whether or not the L timer has counted a counted a count Lt greater then a specified value C13. The L timer measures a time from the point in time from transition from the L range to another range based on a signal from an inhibitor switch for detecting shift lever positions, the measurement being accomplished in accordance with a program explained later. When the count Lt of the L timer is still less than the specified value C13 which is slightly short, or in other words when the range shift from the L range is directly to the R range, a 100% duty rate is held until a lapse of a specified delay time T21 through steps S483, and S484 so as to discharge the low reverse brake pressure through the first duty solenoid valve 1021 (indicated by a label P in FIG. 158). This is for avoiding heavy shocks that the reverse clutch 52 produces when locking abruptly upon a range shift to the R range while the low reverse brake 55 is in the locked state.

When the delay time T21 has passed, the pre-charge control takes place through steps S485 and S486. When the count Lt of the L timer is greater than the specified value C13, or in other words when the range shift is made from a range other than the L range, such as the N range, to the R range, the pre-charge control takes place immediately even before a lapse of the delay time T18 (indicated by a label Q in FIG. 158). This is because the range shift from a range other than the L range to the R range is not accompanied by an occurrence of locking the low reverse clutch 52 while the low reverse brake 55 has locked. In such the case, during the pre-charge period (Fp=1), the first duty solenoid valve 1021 is operated at a duty rate of 0% so as to fill the oil passage leading to the pressure chamber of the low reverse brake 55 with the operating oil quickly. On the other hand, when the pre-charge control has been completed (Fp=0), a decision is made at step S487 as to whether or not the range shift has been completed. Until the range shift is complete, a signal of the duty rate corresponding to the computed pressure Ps is output to the first duty solenoid valve 1021 at step S488. Upon the completion of the range shift the duty ratio is reduced at a fixed rate until it reaches 0% through steps S489 and S490. In this way, the low reverse brake 55 is completely locked.

Calculation of Pressure Ps

Calculation of the pressure Ps in the low reverse brake pressure supply control by means of the first duty solenoid valve 1021 is accomplished in accordance with the program shown in FIG. 156. In this program, the calculation is accomplished in the same manner as for the calculation of pressure Ps for the forward clutch during a range shift from the R range to the D range. After having calculated pressures Pe and Pt corresponding to the engine speed Ne prior to the range shift to the R range and the throttle opening θ, respectively, both being values immediately prior to the range shift to the R range, are calculated on the basis of maps at steps S491 and S492, respectively. These maps are the same used for the range shift from the N range or the R range to the D range shown in FIGS. 147 and 140. At step S493, either one of these pressures Pe and Pt, which is higher than the other, is taken as an initial pressure Ps' for the computed pressure Ps. A decision is subsequently made at step S494 as to whether or not a specified time T22 has passed from the operation of range shift to the D range. Until a lapse of the specified time, the computed pressure Ps is maintained at the initial level Ps' at step S495. On the other hand, when the specified time T22 is over, at step S496, the computed pressure is increased at a fixed rate with the progress of time from the lapse of the specified time.

With this control, as shown in FIG. 158, the low reverse brake pressure following the operation of a range shift to the R range increases, passing the specified leveled transitional pressure, so that, while the low reverse brake 54 has been coupled, the reverse clutch 52 locks without the occurrence of a great shock.

L Timer Control

The L Timer which measures a time progress from the range shift operation to a range from the L range operates in accordance with the program shown in FIG. 157. Following the initialization of the L timer at step S501, a decision is made at step S502 as to whether or not a current range is the L range. If it is the L range, the counter value Lt is maintained at 0. On the other hand, when a range shift actually takes place from the L range to another range, the L timer starts to count a time passing from a time at which the range shift commences at step S504.

D: R-N Range Shift Control

During a manual range shift from the R range to the N range, the reverse clutch pressure and the low reverse brake pressure are discharged so as to unlock the reverse clutch 52 and the low reverse brake 55, respectively. One of these, namely the reverse clutch pressure, is discharged immediately through the operation of the manual shift valve 1002. The other, namely the low-reverse brake pressure, is however discharged comparatively smoothly with the assistance of operation of the dish plate installed in the low reverse brake 55. Owing to this, if the reverse clutch 52 is unlocked abruptly prior to the low reverse brake 55, there will occur a heavy shock.

Therefore, with the hydraulic control circuit 1000, when a range shift from the R range to the N range takes place, a delayed control is performed so as to cause a delay in unlocking the reverse clutch 52 through the second solenoid valve 1012 and, during the delayed unlock control, the low reverse brake pressure is discharged from the manual shift valve 1002 through the first duty solenoid valve 1021. Specifically, in the R range, both first and second solenoid valves 1011 and 1012 are in their ON states so as to cause the low reverse valve 1003 to place the spool in the left end position and, thereby, bring the first duty solenoid valve 1021 and the third output pressure line 1113 led from the manual shift valve 1002 into communication with the low reverse brake pressure line 1116 and the reverse clutch pressure line 1130, respectively, for instance, in the hydraulic control circuit 1000 as shown in FIG. 65. The range shift operation to the N range causes switching in state of the second solenoid valve 1012 to the OFF state, forcing the low reverse valve 1003 to shift the spool to the right end position so as to cause a joint drain to the low reverse brake pressure line 1116 as well as the reverse clutch pressure line 1130. However, through delaying this operation, discharge of the reverse clutch pressure is delayed and, during this delay, the low reverse brake pressure is discharged.

2nd SV Control

Control of the second solenoid valve 1012 during the R-N range shift is executed in accordance with the program shown in FIG. 159. This control is performed only to delay switching of the second solenoid valve 1012 from the ON state to the OFF state by a specified time T23 from an occurrence of the R-N range shift through steps S501 and S512.

With this delay control, following the range shift to the N range, the low reverse valve 1003 holds the spool in the left end position, leaving the first duty solenoid valve 1021 the third output pressure line 1113 led from the manual shift valve 1112 in communication with the low reverse brake pressure line 1116 and the reverse clutch pressure line 1130, respectively, even after the range shift. Since even in the N range, the line pressure is introduced into the third output pressure line 1113 from the manual shift valve 1002, it is supplied as the reverse clutch pressure to the pressure chamber of the reverse clutch 52 and discharged when the second solenoid valve 1012 is changed to the OFF state upon a lapse of the specified time T20 as shown in FIG. 151.

1st DSV Control

On the other hand, control is executed for discharge of the low reverse brake pressure through the first duty solenoid valve 1021 during the range shift from the R range to the N range in accordance with the program shown in FIG. 160. This control takes a single step at step S521 where a signal representative of a duty ratio of 0% is output. This control causes discharge of the low reverse brake pressure from the manual shift valve 1002 through the first duty solenoid valve 1021 which occurs smoothly due to the effects of the dish plate and the second accumulator 1042 (see FIG. 65) as shown in FIG. 161.

Since the reverse clutch 52 is unlocked following the smooth discharge of the low reverse pressure, there is no shock produced even if the reverse clutch 52 is unlocked abruptly.

Inhibitor Switch Fail-Safe Control

When performing an R-N range shift, a signal from the inhibitor switch is switched from an R signal level to an N signal level. There is a period for which no signal is provided. On the other hand, if a signal from the inhibitor switch comes to a halt, a fail-safe feature is effected, in which all of the solenoid valves operate in the operating pattern for the third gear where they take the OFF states. Accordingly, if a signal from the inhibitor switch comes momentarily to a halt, there is a possibility that, during the period of switching from the R signal level to the N signal level, the solenoid pattern for the third gear might temporarily occur. In such a case, in the hydraulic control circuit 1000, depending on the timing of switching the solenoid pattern, the low reverse valve 1003 shifts its spool temporarily, causing simultaneous discharge of the reverse clutch pressure and the low reverse brake pressure which always possibly produce shocks.

In order to avoid such shocks, special control is conducted as shown in FIG. 162. Even if there is no N signal output trailing an R signal, the first and second solenoid valves 1011 and 1012 are left in the ON states until a lapse of a specified time T24 from the termination of the R signal, so as to achieve the range shift to the N range during that period. Further, if there is not yet provided an N signal even after the lapse of the specified time T24, then, the fail-safe control is activated so as to create the solenoid pattern in which all of the solenoid valves take the OFF states.

(6) Lock-Up Control

As shown in FIG. 1, the lock-up clutch 26 is provided in torque converter 20 for mechanically coupling the engine output shaft 1, i.e. the converter input shaft, directly to the turbine shaft 27 as an output shaft of the torque converter 20 together. The lock-up control is accomplished by means of the third duty solenoid valve 1023. Specifically, as shown in FIG. 57, when the lock-up control valve 1006 positions its spool in the left end position as viewed in the figure, the third duty solenoid valve 1023 is brought into communication with the front pressure chamber (FPC) of the lock-up clutch 26 through the pressure line 1128 downstream therefrom. If the third duty solenoid valve 1023 operates to discharge the operating pressure within the front chamber (which is hereafter referred to as "front pressure"), the lock-up clutch 26 locks the torque converter. On the other hand if it operates to introduce the line pressure as the front pressure into the front chamber of the lock-up clutch 26, the lock-up clutch 26 is placed in an unlocking or converter mode. Further, if changing the front pressure, the lock-up clutch 26 is placed in one of slip modes where the torque converter is allowed to slip. The lock-up control is accomplished in these three modes in accordance with operating conditions. In this instance, there are provided two slip modes; namely an acceleration slip mode for high engine torque and a deceleration slip mode for low engine torque. In the lock-up control, although the lock-up control valve 1006 disconnect the communication of the third duty solenoid valve 1023 with the forward clutch 51, since operating pressure is delivered to the forward clutch 51 from the main pressure line 1100 through the lock-up control valve 1006, there is no impediment to creating an intended gear. In other words, since gear shifting is not coincident with locking up the torque converter, regulation of operating pressure for the friction coupling element may be executed during shifting, which allows the third duty solenoid valve 1023 to be common to both gear shifting and locking-up.

A: Lock-up Control for Transition from Acceleration to Deceleration

Transition from acceleration to deceleration calls for switching from the full locked-up mode or the acceleration slip mode to the deceleration slip mode. In the deceleration slip mode, the feedback control is effected through the third duty solenoid valve 1023 so as to make the difference between the engine speed Ne and turbine speed Nt reach a target speed difference. However, if the engine torque sharply drops due to transition to the deceleration mode from the full lock-up mode where the lock-up clutch 26 exerts a great lock-up force against the torque converter correspondingly to high engine torque or from the acceleration slip mode which is called for when the engine torque is high, the lock-up clutch 26 tends to provide temporarily locking force too high relative to the engine torque due to a delayed response in the feedback control which cause shocks.

In order for the lock-up clutch 26 to avoid such shocks, control is accomplished through the third duty solenoid valve 1023. 3rd DSV Control As shown in FIG. 163, at step S531, a decision is made as to whether or not the engine throttle is completely closed. If the engine throttle opens to some extent which indicate the engine is accelerating, the control is executed in the full locked-up mode or in the acceleration slip mode at step S532. If the engine throttle closes completely, a decision is made at step S533 as to whether or not the difference between the turbine speed Nt and the engine speed Ne is greater than a specified value C15. In other words, as shown in FIG. 164, through the transition from the acceleration to the deceleration, there occurs a reversal in speed difference from a state where the engine speed Ne is higher than the turbine speed Nt. The above decision is made based on the reversal in speed difference with respect to the specified value C15.

Until the speed difference (Nt−Ne) becomes greater than the specified value C15, namely, during a period immediately after the reversal in which the lock-up clutch 26 does not provide a sufficient reduction in locking pressure relative to the engine torque due to a delayed response of the control even when the feedback control in the deceleration slip mode occurs simultaneously with the reversal, the lock-up control is executed in the feed-forward control in the deceleration slip mode at step S534. In such a case, the resulting output of the feed-forward control (M. the duty rate of the third duty solenoid valve 1023) is set based on the turbine speed and a current gear, such that the higher the turbine speed Nt becomes, the larger the duty rate is (so as to provide high locking force), and the higher the gear is, the larger the duty ratio is (so as to provide small locking force).

Through the feed-forward control with the output, the lock up clutch 26 reduces its locking pressure quickly following a reduction in the engine torque so as to conform appropriately with the reducing engine torque, controlling shocks caused in accompaniment with the transition from the full locked-up mode or from the acceleration slip mode to the deceleration slip mode.

Thereafter, if the speed difference (Nt−Ne) becomes greater than the specified value C15, the feedback control is performed in the deceleration slip mode until another acceleration occurs so as to bring the speed difference (Nt−Ne) in conformity with a target value through steps S535 and S536.

C: Calculation of Feedback Control Value

When the lock-up mode 26 is placed in the slip mode, as was previously described, the feedback control of the front pressure is conducted through the third duty solenoid valve 1023 so as to bring slippage, i.e. the speed difference between the engine speed Ne and the turbine speed Nt, into conformity with the target valve. The calculation of the feedback control valve is accomplished in accordance with the program shown in FIG. 165. In this instance, an actual speed difference and a target speed difference are represented by $\Delta N$ and $\Delta N_0$, respectively.

In the control, a engine speed Ne and a turbine speed Nt are detected at steps S551 and S552, respectively. Subsequently, at step S553, a proportional (P) value for the PID control, which refers to a proportional value proportional to a deviation, is obtained from the following formula:

$$P=\Delta N-\Delta N_0$$

In addition, at step S554, a differential (D) value, which is the differentiated value of the P value, is obtained from the following Formula:

$$D=\Delta N(i-1)-\Delta N$$

In this instance, (i−1) is an additional character which indicates a cycle one cycle before the current cycle.

Subsequently, at step S555, a decision is made as to whether or not the speed difference $\Delta N$ is greater than a specified difference C17, in other words, whether or not the lock-up clutch is in the unlock or converter mode. When it is not in the converter mode, at step S546, an integral (I) value is obtained from the following Formula.

$$I=I(i-1)+P$$

When, in the converter mode, the I value is cleared at step S557. This is because to start the calculate of the integrated I value when the lock-up clutch gets out of the converter mode, i.e. from a time of commencement of the feedback control.

Subsequently, at step S558, the duty rates Dp, Dd and Di which represent respectively the P, D and I values as feedback control values. At step S559, the total duty rate Dfb of these duty rates is calculated.

The total duty rate Dfb, which serves as a feedback value in the PID feedback control, is used directly in the feedback control, there occur problems such as over control owing to a delay in response of operating pressure and signal detection, which lead to divergence hunting of hydraulic pressure.

Therefore, at step S560, a phase correction value Dfb' for the total duty rate Dfb is calculated as a feedback value from the following Formula:

$$Dfb'=Dfb-\Sigma[Dfb'(i-1)\times f(t)]$$

Where, the function f(t) is one as a coefficient established so that, as a time t becomes longer, it becomes smaller than one, namely the older the value, the smaller than 1, as shown in FIG. 166. The phase correction value Dfb' is obtained by subtracting from the current total duty rate Dfb the total of the results obtained by multiplying the respective corrective values Dfb'(i−n) obtained in the previous specified number of cycles by this coefficient. In this case, since the value which is subtracted from the current total duty rate is weighted more greatly as it becomes latest, compensation can be effectively made for the delay in response the operating pressure and the like, causing effectively controlled convergence of the speed difference $\Delta N$ to the target speed difference $\Delta N_0$.

(7) Target Shift Gear Setting Control

Generally, a target gear which is intended to be created is determined in accordance with scheduled shift pattern established according to driving regions with respect to vehicle speed and throttle opening as parameters. When there is a change in the gear determined based on the patterns from one to another, a shift command is provided to shift the automatic transmission to the other gear as a target and causes the shift control to create the target gear. In this case, there are instances in which it is not always desirable to shift the automatic transmission into the target gear in accordance with the shift command and, in such a case, it sometimes occurs to provide a destination of shifting different from the gear indicated by the shift command. In other cases, there are instances in which special control is made in a specific state.

A: 1-3(4) Shift Command Control

When a shift command is provided for a jump gear shift from the first gear or the third gear to the fourth gear, as shown by the program in FIG. 167, a decision is made at step S561 as to whether or not the throttle opening is smaller than a specified opening C18, for example ⅛. When it is greater than the specified opening C18, at step S562, another decision is made as to whether or not a specified time T25 from the occurrence of the shift command has passed. Until a lapse of the specified time T25, at step S563, the second gear, which is different from the target gear indicated by a shift command, is established as a target gear, to which the control is directed.

Subsequently, if the specified time T25 has passed, then, at step S564, the control is executed to create the third gear or the fourth gear which is one that is indicated as the target gear for shifting by the shift command. That is, in the case in which the 1-3 shift command or the 1-4 shift command is provided when the throttle opening is greater than the specified value C18, after leaving the automatic transmission to stay in the second gear for the period of a specified time T25, the third gear or the fourth gear is created as shown in FIG. 168. This is because, particularly in a 1-4 gear shift, while it is essentially necessary to exercise control over unlocking the forward clutch 51 simultaneously with locking the 3-4 clutch 53 is locked, nevertheless, because of a structural reason of the hydraulic control circuit 1000, there is a need to coordinate the locking and unlocking the these clutches 51 and 53 independently but timely which always results in a complicated control. Therefore, when the throttle opening is low, where there is no need to coordinate the timing of locking and unlocking, shifting is accomplished in accordance with a shift command. However, in other instances, the jump gear shift control is prevented.

The prevention of the jump gear shift from the first gear directly to the third gear is primarily accomplished to prevent a reduction in durability of related friction coupling elements due to abruptly locking the friction coupling elements.

B: 2-4 Shift Command Control

Control in cases where a jump gear shift command is output for shifting from the second gear to the fourth gear is executed in accordance with the program shown in FIG. 169, in a similar way to the control for controlling the 1-3 jump gear shift or the 1-4 jump gear shift. A decision is made at step S571 as to whether or not the throttle opening is entirely closed. When it is not entirely closed, another decision is made at step S572 as to whether or not a specified time T26 has passed since an occurrence of a shift command. Prior to a lapse of the specified time T26, at step S573, there is established another target, gear, namely the third gear, different one indicated by the shift command and shifting to the third gear starts. If the specified time T23 has passed, the control is executed at step S574 so as to provide the fourth gear indicated as the target gear by the shift command.

In other words, while the throttle opening is not entirely closed, when the 2-4 shift command is output, shifting is accomplished to the fourth gear after staying the third gear for the period of the specified time T26 as shown in FIG. 170. The reason for this is that, as with the case of the 1-4 gear shift, since control in coordinating the timing of locking the 3-4 clutch 53 and unlocking the forward clutch 51 is extremely complicated. Consequently, other than the case where which the throttle opening is entirely closed, at which there is no need to coordinate the timing, the jump shift control is prohibited.

C: 4-2(1) Shift Command Control

In the case where a shift command for a jump shift from the fourth gear or from the second gear to the first gear is output, the program shown in FIG. 171 is executed. At first, decisions are made at steps S581 and S582, respectively, as to whether or not the throttle opening is entirely closed and whether or not the vehicle speed is lower than a specified speed C19, respectively. When the throttle opening is not entirely closed, and the vehicle speed is higher than the specified value C19, then, through steps S583 and S584, the control progress so as to create the third gear as a temporary target gear during a period of time from the occurrence of the shift command to a lapse of the specified time T27. When the specified time T27 has passed, the control starts so as to create the target gear, namely the second gear or the first gear, indicated by the shift command. With this control, when the 4-2 or 4-1 shift command has been output during acceleration or while the vehicle speed is relatively high, shifting stays for a period from the occurrence of the shift command to a lapse of the specified time T27 as shown in FIG. 172.

D: 3-1 Shift Command Control

When a command for jump gear shift from the third gear to the first gear is output, control is accomplished in accordance with the program shown in FIG. 173. The control is the same as for the 4-1 or 4-2 gear shift. At step S591 and S592, decisions are made as to whether or not the throttle opening is entirely closed and whether or not the vehicle speed is less than a specified speed C20, respectively. If the throttle opening is not entirely closed and the vehicle speed is higher than the specified speed C20, then, the control progress so as to create the second gear as a temporary target gear during a period of time from the occurrence of the shift command to a lapse of the specified time T28 through steps S583 and S584. When the specified time T28 has passed, the control starts so as to create the target gear, namely the first gear, indicated by the shift command. With this control, when the 3-1 gear shift command has been output while the vehicle is accelerating or running at a relatively high speed, shifting stays for a period from the occurrence of the shift command to a lapse of the specified time T28 as shown in FIG. 174.

The prevention of the 3-1 jump gear shifts, as well as the jump gear shifts for these 4-2 gear shift and 4-1 gear shift, is contributory to preventing the associated friction coupling elements from providing aggravation of durability due to abrupt locking.

B: Re-shift prevention control

Separately from these jump shift commands, there are instances in which a shift command is provided due, for example, a sudden change in throttle opening, immediately following a first shift command. If, while shifting is progressing according to the first shift command, the second shift command is output and causes a sudden transition of shifting operation for the second shift command, producing a pronounced shift shock.

In order to avoid such an event, control is accomplished in accordance with the program shown in FIG. 175.

When a first shift command is output at step S601, a measurement is made of the progress of time t from the output of the first shift command at step S602. Subsequently, a decision is made at step S603 as to whether or not a gear shift indicated by the first shift command is completed. If it is completed, the control is terminated. Until the completion of the gear shift indicated by the first shift command, a decision is made at step S604 as to whether or not a second shift command has been output. Until the second shift command is output, while measuring a lapse of the time t at step S602, the completion of the gear shift indicated by the first shift command is repeated at step S603.

If there is output a second shift command prior to the completion of the primary commanded gear shift, a decision is made at step S604 as to whether or not the measured time t has exceed a specified time T29. If the specified time T29 has not been exceeded, it is determined that the primary commanded gear shift has not yet commenced, then, shifting is immediately changed to the secondary commanded gear shift at step S606 as indicated by a label U in FIG. 176. In this way, shifting is controlled well responding to a shift command.

On the other hand, if the second shift command is output prior to the completion of the primary commanded gear shift, upon a lapse of the time t from the output of the first shift command has exceeded the specified time T26, it is determined that the primary commanded gear shift has already been initiated. Then, in such a case, at step S607, the primary commanded gear shift is immediately terminated and thereafter, the control is immediately changed to cause the secondary commanded gear shift as indicated by a label V in FIG. 176.

With this changeable control, there is no occurrence of a pronounced shock due to a sudden transition of control to the secondary commanded gear shift from the primary commanded gear shift.

F: N-D Shift Control During Running

When the shift lever is operated to the N range and subsequently to any one of the D, S and L ranges during travelling, control tries to establish a gear in conformity with the vehicle speed and the throttle opening at the operation of shift lever. ]In the accomplishment of shifting control in such a condition, unlike the N-D range shift during the vehicle is stopping, the turbine speed and/or the locked state of the forward clutch 51 are unstable. Therefore, when, in this state, once shift control commences in response to a shift command, the shift control becomes momentarily confused, there is the possibility of an occurrence of a pronounced heavy shift shock.

In order to control avoid such a problem, control is executed in accordance with the program shown in FIG. 177.

In this control, a decision is first made t step S611 as to whether or not the vehicle speed is greater than a specified speed at which such a problem is significant. If the vehicle speed is greater than the specified speed, another decision is made at step S612 as to whether or not a N-D range shift is made. If in fact the N-D range shift is made, a further decision is made through steps S613 and S614 as to whether or not another shift command has been output prior to a lapse of a specified time T30 from the operation of shift lever.

If another shift command has been output prior to the lapse of the specified time from the range shift operation, shifting to a gear shift indicated by the other shift command starts after the lapse of the specified time T30 at step S615.

With this control, a gear shift which accompanies an N-D range shift during travelling is initiated only when the N-D range shift is concluded and, consequently, each of the related friction coupling elements becomes stabilized, avoiding an occurrence of a heavy shift shock.

G: Lock-up Prevention at Jump Shift

During a jump shift from the first or the second gear to the fourth gear, control is made of unlocking the forward clutch 51 through the 3rd duty solenoid valve 1023. This control is also conducted also for the lock-up control. For this reason, during controlling such jump shifts, the lock-up control is interrupted.

Specifically, with the program shown in FIG. 199, when a shift command indicating a gear shift from the first or second gear to the fourth gear is output, then lock-up control is prevented through steps S621 and S622. Also, on the basis of the shift command, the lock-up control valve 1006 shifts its spool so as to change communication of the pressure line 1128 downstream from the third duty solenoid valve duty solenoid valve 1023 from with the front chamber of the lock-up clutch 26 to with the forward clutch pressure line 1119. In this state, discharge of the forward clutch pressure is controlled.

Further, if a gear shift to the fourth gear is completed, the lock-up control valve 1006 returns the spool to the position where the spool is positioned before the gear shift through steps S623 and S624, starting the lock-up control through the third duty solenoid valve 1023 at step S624. Although, unlocking the forward clutch 51 is controlled also during the 3-4 gear shift, it is not necessary to interrupt the lock-up control through the third duty solenoid valve 1023, because the discharge control is achieved by that the forward clutch line 1119 merges with the servo release pressure line 1121 and is brought into communication with the 3-4 shift valve 1005 at the drain port through the pressure line 1118 via the lock-up control valve 1006.

(8) Line Pressure Control

For controlling the operating pressure during the manual range shifts and various gear shifts described above, the hydraulic control circuit 1000 shown in FIG. 57 regulates the line pressure as the source pressure for the various control by means of the regulator valve 1001. The operating pressure is appropriately controlled in accordance with various conditions.

A: Ordinary Line Pressure Control

Ordinary line pressure control is accomplished in accordance with the program shown in FIG. 180. First of all, calculations are made at steps S631–S633, respectively, to obtain line pressures P1, P2 and P3 corresponding to the turbine torque Tt, the throttle opening X. and the vehicle speed V, respectively. In other words, from the maps shown in FIGS. 184, 185 and 186, line pressures P1', P2' and P3' corresponding, respectively, to the turbine torque Tt, the throttle opening $\lambda$ and the vehicle speed V are found. By multiplying each of these map values of line pressures P1', P2' and P3' by a coefficient C21 corresponding to a selected stage in a selected range, each of the line pressures P1, P2, and P3 is obtained.

Subsequently, at step S634, a line pressure P4 is obtained depending upon execution or interruption of the lock-up control which needs a relatively high control pressure P4' during execution and a relatively low control pressure P4" during interruption.

In this instance, while a necessary line pressure for assuring the torque transmission capacity of each friction coupling element may be the line pressure P1 obtained by multiplying the line pressure P1' corresponding to the turbine torque Tt by a torque sharing rate of the specific friction coupling element having been locked in a current gear and range, a gear ratio, or a coefficient C21 depending upon the converter specification, nevertheless, the line pressure P1 corresponding to the torque transmission capacity of a friction coupling element coupled in, for instance, the third gear or the fourth gear is low, leading to an insufficient quantity of lubricating correspondingly to the low line pressure, as shown by the map in FIG. 181.

Therefore, the line pressures P2 and P3 are established so as to correspond to the throttle opening $\lambda$ and the vehicle speed as shown in the maps of FIGS. 182 and 183, respectively. The pressure line P3 is in conformity with a required quantity of lubrication oil.

In addition, during the lock-up control, since the front pressure of the lock-up clutch 26 which is duty controlled is developed from the line pressure as a source pressure, in order for duty control to be readily and reliably accomplished, there is a demand for providing the line pressure as a relatively high fixed level of pressure P4'. Accordingly, at step S635, selection is made of the highest line pressure from among the line pressures P1, P2, P3 and P4 so as to establish it as a target line pressure $P_O$ for the ordinary line pressure control.

B: Line Pressure Control on N-D Shift

During a shift from the N(P) range to the D(S,L), line pressure control is accomplished in order to lock the friction coupling elements. This control is accomplished in accordance with the program shown in FIG. 184. First of all, a decision is made at step S641 as to whether or not a specified time T31 has passed from the shift operation. If the time T31 has passed, the ordinary line pressure control is executed.

On the other hand, until a lapse of the specified time T31 from the N-D shift operation, line pressures P5 and P6 corresponding respectively to the engine speed Ne and the throttle opening λ upon the shift operation are obtained from maps shown in FIGS. 185 and 186, respectively, at step S642 and step S643, In this instance, while the line pressure P5 may fundamentally be acceptable as the line pressure, nevertheless, in instances where an N-D shift operation is made with pressing on the accelerator during idling, the line pressure P5 is not always sufficient to lock positively the friction coupling element. For this reason, the line pressure P6 corresponding to the throttle opening is obtained. Thereafter, at step S644, the line pressure control is accomplished with using either one of these line pressures P5 and P6 which is higher than the other as the target line pressure $P_O$.

Line pressure for shifts other the shifts from the N range or the P range is controlled using a lined pressure as the target line pressure $P_O$ found from the same map as that shown in FIG. 186.

(9) Torque Down Control

During gear shifting, in order for the gear shift to take place quickly and smoothly, torque down control in which the engine torque is controlled to drop temporarily is executed.

A: Torque Down Control during Up-Shift

Torque down control during an up-shift is accomplished in accordance with the programs shown in FIG. 187. At step S651, a decision is made as to whether or not the turbine speed change ratio dNt is changed lower than a specified ratio C22, by which commencement of gear shift is determined. If it is lower than the specified ratio C22, at step S652, the torque down control is immediately commenced as indicated by W in FIG. 188. In this instance, because of a delay of response of the engine which performs the torque down control, practical torque down starts after commencement of the feedback control executed at step S21 in FIG. 74. Subsequently, another decision is made at step S653 as to whether or not the turbine speed Nt has dropped lower than a speed which is higher than a turbine speed $Nt_O$ after the gear shift by only a specified value C23. If it is lower than the speed ($Nt_O$+C23), then, at step S654, the torque down control is terminated upon the speed drop to the speed ($Nt_O$+C23). On the other hand, when it is not detected that the turbine speed Nt is lower than the speed ($Nt_O$+C23), the torque down is continued until the turbine speed Nt declines below the speed ($Nt_O$+C23). In this instance, the specified value C23 is established such that it becomes large as the turbine speed Nt prior to a gear shift increases so as to terminate the torque down control early, preventing a delay in termination of the torque down control.

Owing to the up-shift torque down control, as shown by a label X in FIG. 188, torque down is accomplished during the period of an inertia phase during a gear shift, reducing the turbine speed quickly.

The amount of torque down during an up-shift is established according to the throttle opening to which the magnitude of shift shock corresponds and increased as the throttle opening becomes large. There are differences depending upon types of gear shift. For example, the amount of torque down is set to be great during a 1-2 gear shift which provides a great change in gear ratio and, however, to be small during a 3-4 gear shift which provides less change in gear ratio.

B: Torque Down Control during Down-Shift

On the other hand, the torque down control for down-shifts is accomplished in accordance with the program shown in FIG. 189. Specifically, at step 661, a decision is made as to whether or not the turbine speed Nt has raised greater than a speed which is smaller than the turbine speed $Nt_O$ after gear shift by a specified speed C24. If it is still higher than the speed ($Nt_O$−C24), the torque down control is initiated at step S662 as indicated by a label W in FIG. 190. Subsequently, another decision is made at step S663 as to whether or not the turbine speed change ratio dNt has become smaller than a specified ratio C25. If it is smaller than the specified ratio C25, the torque down control is terminated at step S664. On the other hand, if it is not detected that the turbine speed change ratio dNt is lower than the specified ratio C25, the torque down is continued until the turbine speed Nt declines below the specified ratio C25.

In this instance, the specified speed C24, which is utilized in the decision of torque down control commencement, is established to be large with an increase in the turbine speed Nt prior to the commencement of shift so as to allow the torque down control to start rather earlier, thereby preventing a delay in response to its commencement. In addition, the specified ratio C25, which is used in the decision of the torque down control termination, is established at values between the turbine speed change ratios dNt and $dNt_O$ during and after a gear shift, respectively, as indicated by a label X in FIG. 190. In this manner, torque down is terminated at a time of transition to ordinary acceleration from gear shifting. In this instance, the specified ratio C25 is established to be greater with an increase in the turbine speed Nt at the commencement of gear shifting, or in other words it is great to the extent that acceleration in ordinary acceleration driving after a gear shift is great. In addition, it is established to be great for gear shifts, following which there is provided an increase in acceleration.

In this manner, as shown in FIG. 190, while, during the inertia phase in the first half of the gear shift, the turbine speed Nt increases quickly due to relatively high engine torque, there occurs torque down during the torque phase in the latter half of the gear shift, reducing shocks of the locked friction coupling element upon locking. The amount of torqued down during down-shifts is determined depending upon types of shifting. As was the case with up-shifting, for example, the amount of torque down is large during a 2-1 down-shift which causes a great change in gear ratio and, however, small during a 4-3 down-shift which provides a small change in gear ration. Particularly, during a gear shift for which the one way clutch 56 must be locked and which tends to produce a significantly heavy shock, a great amount of torque down is provided.

FIGS. 191–201 show a hydraulic pressure control circuit 2000 for an automatic transmission according to another preferred embodiment of the present invention. Because the hydraulic pressure control circuit 2000 is basically similar to that previously described, excepting including an accumulator 2300 and its associated parts or elements, the following description will be directed mainly to operation of the hydraulic pressure control circuit 2000 with regard to the accumulator 2300.

The following description will be directed to a hydraulic control circuit for supplying hydraulic pressure to and drawing hydraulic pressure from pressure chambers of the respective friction coupling elements 51–55.

(1) Overall Structure

As shown in FIG. 191, a hydraulic pressure control circuit 1000A includes as essential elements a regulator valve 1001 for generating a line pressure, a manual shift valve 1002 for changing ranges of the automatic transmission 10 according to range selections by the shift lever, a first and second shift valves 2011 and 1012 for selectively opening and closing oil paths leading to the friction coupling elements 51–55 according to gear shifts, The control circuit 1000 further includes first and second ON-OFF solenoid valves 1011 and 1012 for actuating these shift valves 2011 and 1012, and first to third duty solenoid valves 1021–1023 for controlling and regulating hydraulic pressure supply or discharge for the friction coupling elements 51–55. All these valves and friction coupling elements are similar in operation and structure to those of the hydraulic pressure control circuit 1000.

The regulator valve 1001 generates a line pressure and directs it to a manual shift valve 1002 through a main pressure line 2200 and also to a reducing valve 1008 and a third duty solenoid valve 1023 as a control source pressure. The line pressure is also directed as a back pressure to the accumulator 2300 for locking the forward clutch (FWC) 51.

The line pressure supplied to and reduced to a predetermined level by the reducing valve 1008 is directed to the solenoid valves 1011 and 1012 through pressure line 2201 and 2202, respectively. When the first solenoid valve 1011 is ON, the predetermined level of hydraulic pressure is further delivered to the first shift valve 2011 at a control port 2011$a$ as a pilot pressure through a pressure line 2203, so as to force the first shift valve 2011 to shift its spool to the right end position as viewed in the figure. On the other hand, when the first solenoid valve 1011 is OFF, the predetermined level of hydraulic pressure is delivered to the second shift valve 2012 at a control port 2012$a$ through a pressure line 2204, so as to force the second shift valve 2012 to shift its spool to the left end position as viewed in the figure. Further, the predetermined level of hydraulic pressure from the reducing valve 1008 is also delivered to the regulator valve 1001 at its regulation port 1001$a$ through a pressure line 2205. In this instance, the predetermined level of hydraulic pressure is regulated by a linear solenoid valve 1031 provided in a pressure line 2205 according, for instance, to engine loads. In this way, the line pressure is regulated by the regulator valve 1001.

The line pressure delivered to the manual shift valve 1002 through the main pressure line 2200 is directed to first or forward clutch pressure line 2206 in a forward range, such as the drive (D) range, the slow speed (S) range and the low speed (L) range, and to the second or reverse output pressure line 2207 in a reverse (R) range. First one of three pressure lines 2211–2213 branching off from the forward clutch pressure line 2206 leads to the first duty solenoid valve 1021 to supply the line pressure as a control source pressure to it; second one 2212 leads to the first shift valve 2011 to supply the line pressure to it; and third one leads 2213 to leads to the second shift valve 2012 to supply the line pressure to it. When the second shift valve 2012 has placed its spool in the right end position, it brings the third pressure line 2213 into communication with a pressure line 2214 so as to supply the line pressure to the first shift valve 2011 and also supplies the line pressure to the second duty solenoid valve 1022 through a line pressure 2215 branching off from the line pressure 2214.

Downstream from the first duty solenoid valve 1021 there is provided an orifice 2073 in a forward clutch pressure line 2221 leading to a pressure chamber of the forward clutch (FWC) 51. A pressure line 2222 branching off from the forward clutch pressure line 2221 leads to the first shift valve 2011. The forward clutch pressure line 2221 is provided with a bypass pressure line 2223 so as to bypass the orifice 2073. A bypass valve 2074 is provided in the bypass pressure line 2223.

The second duty solenoid valve 1022 is in communication with the first shift valve 2011 through branching pressure lines 2224 and 2225. The third duty solenoid valve 1023 is in communication with the second shift valve 2012 through a pressure line 2226.4 and 2225.

The reverse pressure line 2207, into which the manual shift valve 1001 introduces the line pressure in the reverse range, leads to the second shift valve 2012 so as to supply the line pressure to it. The regulator valve 1001 receives at the regulation port 1001$b$ the line pressure through a line pressure 2227 and regulates it to a generally higher level in the reverse range than in the forward range. The first and second shift valves 2011 and 2012 connect and disconnects selectively communication of these pressure lines with the friction coupling elements 51–55 according to operated conditions of the first and second solenoid valves 1011 and 1012.

A lock-up control valve 1006 is supplied with a converter pressure through a converter pressure line 2231 with a relief valve 1009. Further, the lock-up control valve 1006 is connected at its control ports 1006$a$ and 1006$b$ to pressure lines 2232 and 2233 leading to the first and second solenoid valves 1011 and 1012, respectively. In ordinary conditions, the pilot pressure introduced from the first solenoid valve 1011 forces the lock-up control valve 1006 to place its spool in the right end position, so as to bring the converter pressure line 2231 into communication with a release pressure line 2234 leading to a front pressure chamber 26$a$ of the lock-up clutch 26, thereby introducing a release pressure into the front pressure chamber 26$a$ and release the lock-up clutch 26. On the other hand, when the second solenoid valve 1011 receives a pilot pressure at its second pilot port 1011$b$, it shifts the spool to the left end position, so as to bring the converter pressure line 2231 into communication with a coupling pressure line 2235 leading to a rear pressure chamber 26$b$ of the lock-up clutch 26, thereby introducing a coupling pressure into the rear pressure chamber 26$b$. Simultaneously, the release pressure line 2234 is brought into communication with the second duty solenoid valve 1022 through a pressure line 2236 via the first shift valve 2011, so as to drain the release pressure from the front pressure chamber 26$a$, thereby coupling the lock-up clutch 26.

The hydraulic control circuit 2000 cooperates with a controller shown in FIG. 59 for controlling operation of the first and second solenoid valves 1011 and 1012, the duty solenoid valves 1021–1023, and the linear solenoid valve 1031. The controller 1200 receives various control signals, including at least a signal representative of a vehicle speed from the speed sensor 1201, a signal representative of engine throttle opening as an engine load from a throttle opening sensor 1203 and a signal representative of a shift positions or range selected by the shift lever from a position sensor 1204, based on which the controller 1200 controls the various solenoid valves 1011, 1012, 1021–1023 and 1031 according to engine operating conditions represented by these control signals.

(2) Hydraulic Circuit Operation

The following description will be directed to operation of the solenoid valves 1011, 1012 and 1021–1023 in connection with supply of hydraulic pressures to the friction coupling elements 51–55 in each gear.

The solenoid valves 1011, 1012 and 1021–1023 take various operation patterns for creating the respective gears as shown in the following Table III. In the Table II, a circle in parentheses indicates a state, such as the ON or activated state of a solenoid valve 1011, 1012 and the OFF or deactivated state of a duty solenoid valve, where pressure lines upstream and downstream from the related valve are in communication with each other so as to allow a hydraulic pressure to pass therethrough; a cross or X in parentheses indicates a state, such as the OFF or deactivated state of a solenoid valve 1011, 1012 and the ON or activated state of a duty solenoid valve, where an upstream pressure line from the related valve is shut off and a downstream pressure line is drained. Further, the term "duty" indicates an operating condition that a duty solenoid regulates a source pressure according to duty rates and thereafter delivers it downstream.

TABLE III

| Range | D (S) | | | | | | | | |
|---|---|---|---|---|---|---|---|---|---|
| Gear | 1st | Mid. | 2rd | Mid. | 3rd | Mid. | 4th | L | R |
| 1st SV (1011) | O | O | O | O | X | X | O | O | O |
| 2nd SV (1012) | X | X | X | X | X | X | X | O | O |
| 1st DSV (1021) | O | O | O | O | O | duty | X | O | O |
| 2nd DSV (1022) | X | X | X | duty | X | X | X | X | O |
| 3rd DSV (1023) | X | duty | O | duty | O | duty | O | O | O |

1st Gear

As shown in Table III and FIG. 192, in the first (1st) gear in the forward range excepting the low-speed (L) range, only the first duty solenoid valve 1021 directs the line pressure in the pressure line 2211 branching off from the forward clutch pressure line 2206 directly to the forward clutch pressure line 2221. Accordingly, the line pressure is supplied as a locking pressure to the forward clutch (FWC) 51 and locks it. In this instance, at the commencement of supply of the locking pressure to the forward clutch (FWC) 51, when the hydraulic pressure in the forward clutch pressure line 2221 upstream from the orifice 2073 increases higher than a predetermined level, the bypass valve 2074 in parallel with the orifice 2073 shifts its spool to the left end position, so as to open the bypass pressure line 2223. As a result, the locking pressure is supplied gently through the orifice 2072 at the beginning of the supply and thereafter, quickly through the bypass valve 2038.

Together, the first solenoid valve 1011 provides communication between its upstream and downstream sides, so as to supply a pilot pressure to the first solenoid valve 1012 at the control ports 1011a, forcing it to shift the spool to the right end position. This communicates the pressure line 2222 branching off from the forward clutch pressure line 2221 with the pressure line 2241 leading to the accumulator 2300. Accordingly, when the forward clutch (FWC) 51 is locked resulting from, for instance, a neutral (N) to drive (D) range shift, the accumulator 2300 causes the forward clutch (FWC) 51 to lock quickly and, in cooperation with an effect of the orifice, prevents an occurrence of a shift shock.

2nd Gear

As shown in Table III and FIG. 193, in the second (2nd) gear, the third duty solenoid valve 1023 generates regulates the line pressure as a working pressure. On the other hand, the second solenoid valve 1012 drains the second shift valve 2012 at the control port 2012a through the pressure line 2204, so as to cause the second shift valve 2012 to shift the spool to the right end position. As a result, the working pressure generated by the third duty solenoid valve 1023 is directed as a servo apply pressure to the servo apply pressure chamber (APC) 54a of the 2-4 brake (2-4B) 54 through the pressure lines 2226 and 2242 via the second shift valve 2012, so as to lock the 2-4 brake (2-4B) 54 as well as the forward clutch (FWC) 51.

1-2 Gear Shift

In an in-between position (which is indicated by "Mid." in Table III) during a 1-2 gear shift, the third duty solenoid valve 1023 regulates the servo apply pressure at a duty rate so as to lock the 2-4 brake (2-4B) 54 smoothly. Further, the third duty solenoid valve 1023 supplies the line pressure as a servo apply pressure after a conclusion of the gear shift to the second gear.

2-3 Gear Shift

Further, in an in-between position (which is indicated by "Mid." in Table III) during a 2-3 gear shift, as shown in FIG. 194, the second duty solenoid valve 1022 regulates the working pressure using the line pressure as a source pressure which is delivered through the pressure lines 2213 2215 via the second shift valve 2012 from the forward clutch pressure line 2206. The working pressure is introduced to the first shift valve 2011 through the pressure lines 2224 and 2225, so as to cause the second shift valve 2012 to shift the spool to the right end position, thereby bringing these pressure lines 2224 and 2225 into communication with the servo release pressure line 2243 leading to the servo release pressure chamber (RPC) 54b of the 2-4 brake 54 and the 3-4 clutch pressure line 2244 leading to the 3-4 clutch chamber 53, respectively. Accordingly, the working pressure regulated by the second duty solenoid valve 1022 is introduced into to the servo release pressure chamber (RPC) 54b of the 2-4 brake 54 and the 3-4 clutch chamber 53, respectively, causing the 2-4 brake (2-4B) 54 to unlock and the 3-4 clutch (3-4) 53 to lock.

As indicated in Table III, during the 2-3 gear shift, while the second duty solenoid valve 1022 provides the servo release pressure and the 3-4 clutch locking pressure with a duty rate under control, the third duty solenoid valve 1023, which supplies the line pressure to the servo apply pressure chamber 54a of the 2-4 brake 54, regulates the servo apply pressure with a duty rate under control, so that unlocking the 2-4 brake 54 and locking the 3-4 clutch 53 are timely caused, thereby appropriately reducing shift shocks during the 2-3 gear shift. As shown in FIG. 195, when shifting to the third gear is concluded, while the second duty solenoid valve 1022 terminates regulation of the servo release pressure and the 3-4 clutch locking pressure, the first solenoid valve 1011 drains the first shift valve 2011 through the pressure line 2203 so as to cause the first shift valve 2011 to shift the spool to the left end position. As a result, the forward clutch coupling pressure is supplied as a servo release pressure to the servo release pressure chamber 54b of the 2-4 brake 54 through the line pressure 2222 branching off from the forward clutch pressure line 2221. Together, the line pressure is directly supplied to the 3-4 brake 53 through the pressure line 2214 extending from the forward pressure line 2206 through the pressure line 2213 and the second shift valve 2012 via the first shift valve 1011. In addition, the third duty solenoid valve 1023, which provides a servo apply pressure, supplies the line pressure directly to the servo apply pressure chamber 54a of the 2-4 brake 54.

3rd Gear

As shown in FIGS. 194 and 195, in the third gear, the 3-4 clutch pressure is introduced to the second shift valve 2012 at its lock port 2012b at an end, opposite to the end where the control port 2012a is provided, through a pressure line 2245 branching off from the 3-4 clutch pressure line 2244, so as to cause the second shift valve 2012 to hold the spool in the right end position. This takes place in high gears where the 3-4 clutch is locked so as to prevent the working pressure to be supplied to the low-reverse brake 55 which is used to create the first gear for effecting engine braking or the reverse gear.

4th Gear

In the fourth gear, as shown in FIG. 196, the first duty solenoid 1021 stops to provide a working pressure and drains the forward clutch pressure line 2221 downstream therefrom. In this instance, since, when the second gear was created, the first solenoid valve 1011 has drained the first shift valve 2011 at the control port 2011a so as to cause the first shift valve 2011 to shift the spool to the left end position and consequently, communicate the forward clutch pressure line 2221 with the servo release pressure line 2243 through the pressure line 2222, the first duty solenoid valve 1021 stop to provide the working pressure and drains itself at the downstream side. This causes the forward clutch pressure and the servo release pressure to be simultaneously drained through the first solenoid valve 1021. Accordingly, while the forward clutch 51 is unlocked, the 2-4 brake 54 is locked again.

3-4 Gear Shift

As indicated in Table III, during a 3-4 gear shift, by causing the first duty solenoid valve 1021 to regulate a working pressure with a duty rate under control, control is properly made to timely cause discharging servo release pressure and the forward clutch pressure and to regulate the servo apply pressure at an appropriate level during disthese pressures, so as to reduce shift shocks during the 3-4 gear shift.

1st Gear in Low-Speed (L) Range

As shown in FIG. 197, in the first gear in the low-speed range, the first duty solenoid valve 1021 directs, likely in the first gear in the drive range, the line pressure as a forward clutch pressure to the forward clutch pressure line 2221 from the forward pressure line 2206 and the pressure line 2211 so as to lock the forward clutch 51. Simultaneously, while the third duty solenoid valve 1023 directs the line pressure to the main pressure line 2200 to the pressure line 2226, the second solenoid valve 1011 supplies a pilot pressure to the second shift valve 2012 at the control port 2011a so as to cause the second shift valve 2012 to shift the spool to the left end position. As a result, the line pressure from the third duty solenoid valve 1023 is further directed to the low-reverse brake pressure line 2246, so that, in the first gear in the low-speed range, the low-reverse clutch 55 is locked as well as the forward clutch 51, thereby creating the first gear with an effect of engine braking.

Though, in the first gear in the low-speed range, the second shift valve 2012 places the spool in the left end position, it shut off the line pressure 2213 branching off from the forward pressure line 2206, so as to prevent the line pressure from being directed to the first shift valve 2011 and the second duty solenoid valve 1022 through the pressure line 2214. Accordingly, in the first gear in the low-speed range, the working pressure is prevented from being supplied to the 3-4 clutch 53, avoiding interlocking of the transmission mechanism comprising the planetary gearsets 30 and 40 which is caused due to simultaneous lock of the low-reverse brake 55 and the 3-4 clutch 53.

Reverse (R) Range

As shown in FIG. 198, in the reverse range, likely in the first gear in the low-speed range, while the third duty solenoid valve 1023 directs the line pressure to the pressure line 2216 from the main pressure line 2200, the second solenoid valve 1012 directs a pilot pressure to the second shift valve 2012 at the control port 2012a, so as to cause the second shift valve 2012 to shift the spool to the left end position. As a result, the line pressure is introduced into the low-reverse brake pressure line 2246, locking the low-reverse brake 55. Together, the line pressure is introduced into the reverse pressure line 2207 through the manual shift valve 1002 shown in FIG. 191 and directed to the reverse clutch pressure line 2247 through the second shift valve 2012. Accordingly, the reverse clutch 52 is supplied with the line pressure from the manual shift valve 1002, locking the reverse clutch 52. In such a manner, both reverse clutch 52 and low-reverse clutch 55 are locked in the reverse range.

Because, in the reverse range, no line pressure is introduced into the forward pressure line 2206, the forward clutch 51 and the 3-4 clutch 53 are not supplied with any working pressure in spite of operated conditions of the first and second duty solenoid valves 1021 and 1022.

4-3 Gear Shift

During a 4-3 gear shift in an engine power off mode, the solenoid valves take an operation pattern shown in Table IV.

TABLE IV

| Range | D (S) | | |
|---|---|---|---|
| Gear | 4th | Mid. | 3rd |
| 1st SV (1011) | X | O | X |
| 2nd SV (1012) | X | X | X |
| 1st DSV (1021) | O | duty | O |
| 2nd DSV (1022) | X | O | X |
| 3rd DSV (1023) | O | duty | O |

Because, in the fourth gear, the first solenoid valve 1011 takes the OFF state, the accumulator 2300 accumulates the line pressure as shown in FIG. 196. Upon an occurrence of a 4-3 shift command, the first solenoid valve 1011 transitionally takes the ON state as indicated in Table IV.

Accordingly, during the 4-3 gear shift, the first solenoid valve 1011 shifts the spool to the right end position as shown in FIG. 199, forcing out the accumulated high level pressure in the accumulator 2300 into the forward clutch 51 through the forward clutch pressure line 2221 via the first shift valve 2011. This forms what is called a stroke related transitional pressure at a remarkably low level, as indicated by "P" in FIG. 200, due to hydraulic piston movement. At a time t1 of a trailing end of the stroke related, a leveled transitional pressure, as shown in FIG. 201, an operating pressure regulated by the first duty solenoid valve 1021 with a duty rate under control flows together with the working pressure provided by the accumulator 2300 through the orifice 2073 to the forward clutch 51. In this instance, since the first solenoid valve 1011 holds the ON state and keeps the spool of the first shift valve 2011 placed in the right end position, the accumulator 2300, which is empty, resumes accumulating the working pressure therein, so as to form a transitional pressure at a predetermined level as indicated by "Q" in FIG. 200. This leveled transitional pressure prevents the forward clutch 51 from causing shocks upon locking. The 4-3 gear shift in the engine power-on mode takes a transitional operation pattern indicated in Table III. That is, by regulating the working pressure by means of the first and third duty solenoid valves 1021 and 1023 with duty rates under control, control is properly made to timely cause discharging servo release pressure and the forward clutch pressure and to regulate the servo apply pressure at an appropriate level during these pressures, so as to reduce shift shocks during the 4-3 gear shift.

As described above, with the hydraulic control circuit 2000, the working pressures, which are supplied to pressure chambers of the friction coupling elements necessary to create forward gears, namely the forward clutch 51, the 3-4 brake 53, the 2-4 brake 54 and the low-reverse clutch 55, are regulated by the first and second solenoid valves 1011 and 1012 and the first to third duty solenoid valves 1021–1023. This circuit makes control of the working pressure for the various friction coupling elements simple. Furthermore, because, in the 4-3 gear shift in the engine power-off mode, the working pressure accumulated in the accumulator 2300 is supplied to the forward clutch 51, a time for which a stroke-related, leveled transitional pressure is formed becomes short, gear shifts such as, for instance, scheduled down-shifts taking place following a decline in vehicle speed and manual down-shifts, are achieved in a short time without accompanying shift shocks in excess of the forward clutch 51.

FIGS. 202 and 203 shows a hydraulic control circuit 2000A for an automatic transmission according to still another preferred embodiment of the present invention. Because the hydraulic control circuit 2000A is basically similar to the previous embodiment shown in FIGS. 191–201, the following description will be directed only to a significant difference of the embodiment from the previous embodiment.

As shown in FIG. 202, a pressure line 2240, which branches off from the main pressure line 2200 and is connected to the first shift valve 2011, is brought into communication with a pressure line 2241 leading to the accumulator 2300, which is only the difference of the hydraulic control circuit 2000A from the hydraulic control circuit 2000 shown in FIG. 191. With the hydraulic control circuit 2000A, when the first solenoid valve 1011 takes the OFF state and causes the first shift valve 2011 to place the spool in the right end position, the accumulator 2300 is brought into communication with the main pressure line 2200 through the pressure lines 2240 and 2241, so as to accumulate the line pressure in the main pressure line 2200 in the accumulator 2300 even in the neutral (N) range shown in FIG. 202. When shifting from the neutral (N) range to the drive (D) range, the solenoid valves 1011, 1012 and 1021–1023 change in operation to the operation pattern for the first gear. In this instance, the solenoid valves take two transitional operation patterns (Mid.1 and Mid.2) between the neutral (N) range to the drive (D) range as indicated in Table V.

TABLE V

| Range | D | | | |
|---|---|---|---|---|
| Gear | N | Mid. 1 | Mid. 2 | 1st |
| 1st SV (1011) | X | O | O | |
| 2nd SV (1012) | X | X | X | X |
| 1st DSV (1021) | O | duty | duty | O |
| 2nd DSV (1022) | O | duty | X | X |
| 3rd DSV (1023) | X | X | X | X |

At first, in the first transitional operation pattern Mid.1, the first solenoid valve 1011 takes the ON state so as to direct a pilot pressure to the first shift valve 2011 at the control port 2011a. As a result, as shown in FIG. 203, the first shift valve 2011 shifts the spool to the right end position, forcing out the accumulated high level pressure in the accumulator 2300 into the forward clutch 51 through the forward clutch pressure line 2221 via the first shift valve 2011. A working pressure regulated by the first duty solenoid valve 1021 with a duty rate under control flows together with the working pressure provided from the accumulator 2300 through the orifice 2073 to the forward clutch 51. In this instance, since the first solenoid valve 1011 holds the ON state and keeps the spool of the first shift valve 2011 placed in the right end position, the accumulator 2300, which is empty, resumes accumulating the working pressure therein, so as to form a transitional pressure at a predetermined level which prevent the forward clutch 51 from producing locking shocks. At this time, the second duty solenoid valve 1022 is duty controlled so as to supply the working pressure as the servo release pressure and the 3-4 clutch pressure to the 2-4 brake 54 and the 3-4 clutch 53, respectively, thereby creating transitionally the third gear. Thereafter, the valves take the second transitional operation pattern Mid.2 wherein the second duty solenoid valve 1022 takes the OFF state. As a result, after the 3-4 clutch 53 has unlocked and consequently, created the first gear, the duty control for the first solenoid valve 1021 terminates, directing the line pressure to the forward clutch 51.

In this embodiment, during the 4-3 gear shift in the engine power-off mode, the working pressure accumulated in the accumulator 2300 is supplied to the forward clutch 51 immediately after commencement of shifting.

According to the hydraulic control circuit 2000A, a neutral to drive range gear shift, as well as gear shifts such as, for instance, scheduled down-shifts taking place following a decline in vehicle speed and manual down-shifts, is achieved in a short time without accompanying shift shocks in excess of the forward clutch 51.

The first duty solenoid valve 1021 may be replaced with a regulator valve 2302. Specifically, as shown in FIG. 204, the regulator valve 2302 is disposed between the forward pressure line 2206 extending from the manual shift valve 2002 and the forward pressure line 2221 leading to the forward clutch 51. The regulator valve 2301 receives a pilot pressure regulated by a duty solenoid valve 2302.

Otherwise, the duty solenoid valve 1021 may be replaced with a linear solenoid valve 2303. Specifically, as shown in FIG. 205, the regulator valve 2302 is disposed between the forward pressure line 2206 extending from the manual shift valve 2002 and the forward pressure line 2221 leading to the forward clutch 51.

Alternatively, as shown in FIG. 206, the duty solenoid valve 1021 may be replaced with a shift valve 2304 disposed between the forward pressure line 2206 extending from the manual shift valve 2002 and the forward pressure line 2221 leading to the forward clutch 51.

It is to be understood that although the present invention has been described with respect to preferred embodiments thereof, various other embodiments and variants may occur to those skilled in the art, which are within the spirit and scope of the present invention, and such other embodiments and variants are intended to be covered by the following claims.

What is claimed:

1. A control system for an automatic transmission of the type having a plurality of friction coupling elements which are selectively locked and unlocked with hydraulic pressure to change power transmission paths of the automatic transmission between an engine and drive wheels of an automotive vehicle and include a specific friction coupling element which is locked when the automotive vehicle is driven in a first specified range of driving conditions and unlocked when the automotive vehicle is driven in a second specified range of driving conditions, said control system comprising:

driving condition detecting means for detecting driving conditions of said vehicle; source pressure generating means for generating source pressure;

an accumulator in communication with said source pressure generating means for accumulation of hydraulic pressure;

a first hydraulic pressure supply path through which hydraulic pressure is supplied to said specific friction coupling element from said source pressure generating means;

operating pressure regulating means disposed in said first hydraulic pressure supply path between said source pressure generating means and said specific friction coupling element for regulating and supplying said source pressure as said operating hydraulic pressure to said specific friction coupling element;

a second hydraulic pressure supply path through which hydraulic pressure is supplied to said accumulator from said source pressure generating means;

a third hydraulic pressure supply path through which said accumulator is connected with said first hydraulic pressure supply path between said operating pressure regulating means and said specific friction coupling element;

first switching means disposed in said second hydraulic pressure supply path for connecting and disconnecting communication between said source pressure generating means and said accumulator;

second switching means disposed between said third hydraulic pressure supply path for connecting and disconnecting communication between said specific friction coupling element and said accumulator; and control means for controlling said first switching means to disconnect said communication between said source pressure generating means and said accumulator while controlling said operating pressure regulating means to supply a specified level of said operating hydraulic pressure to said specific friction coupling element when said driving condition detecting means detects driving conditions in said first specified range, controlling said first switching means to connect said communication between said source pressure generating means and said accumulator while controlling said second switching means to disconnect said communication between said specific friction coupling element and said accumulator when said driving condition detecting means detects driving conditions in said second specified range, and controlling said second switching means to connect said communication between said specific friction coupling element and said accumulator so as to supply hydraulic pressure accumulated in said accumulator to said specific friction coupling element when said driving condition detecting means detects a change in driving condition from said second specified range to said first specified range.

2. A control system as defined in claim 1, wherein said first switching means and said second switching means are comprised by a single shift valve.

3. A control system as defined in claim 1, wherein said control means determines target gears of the automatic transmission according to said driving conditions and causes said control system to unlock said specific friction coupling element when determining a specific one of forward gears as said target gear and lock said specific friction coupling element when determining one of other forward gears excluding said specific forward gear as said target gear.

4. A control system as defined in claim 3, wherein said control means controls said second switching means to connect said communication between said specific friction coupling element and said accumulator when a down shift is caused from said specific forward gear to one of said other forward gears.

5. A control system as defined in claim 1, wherein said driving condition detecting means detects engine load on said engine as one of said driving conditions, and said control means controls said second switching means to connect said communication between said specific friction coupling element and said accumulator only when said driving condition detecting means detects engine load lower than specified engine load while detecting said change in driving condition from said second specified range to said first specified range.

6. A control system as defined in claim 1, wherein said driving condition detecting means detects engine load on said engine as one of said driving conditions, and said control means determines target gears of the automatic transmission according to said driving conditions and causes said control system to unlock said specific friction coupling element when determining a specific on of forward gears as said target gear and lock said specific friction coupling element when determining one of other forward gears excluding said specific forward gear as said target gear and controls said second switching means to connect said communication between said specific friction coupling element and said accumulator only when said driving condition detecting means detects engine load lower than specified engine load while detecting said change in driving condition from said second specified range to said first specified range when a down shift is caused from said specific forward gear to one of said other forward gears.

7. A control system as defined in claim 1, wherein said second specified range of driving conditions is defined by those provided when the automatic transmission disconnects transmission of drive torque between said engine and said drive wheels and said first specified range of driving conditions is defined by those provided when the automatic transmission connects transmission of drive torque between said engine and said drive wheels.

8. A control system for an automatic transmission of the type having a plurality of friction coupling elements which are selectively locked and unlocked with hydraulic pressure to change power transmission paths of the automatic transmission between an engine and drive wheels of an automotive vehicle and include a specific friction coupling element which is locked when the automotive vehicle is driven in a first specified range of engine operating conditions and unlocked when the automotive vehicle is driven in a second specified range of engine operating conditions, said control system comprising:

driving condition detecting means for detecting operating conditions, including at least engine load and an engine speed, of said engine;

a hydraulic pump for dishydraulic pressure of levels according to engine speeds detected by said driving condition detecting means;

pressure regulating means for regulating said hydraulic pressure from said hydraulic pump as source pressure;

pressure supply means for supplying said source pressure as said operating hydraulic pressure to said specific friction coupling element;

pressure accumulation means for accumulating said operating hydraulic pressure from said pressure regulating means;

switching means for connecting and disconnecting communication between said specific friction coupling element and said accumulation means; and control means for controlling said switching means to connect said communication between said specific friction coupling element and said pressure accumulation means so as to supply said operating hydraulic pressure to said specific friction coupling element from said pressure accumulation means when said driving condition detecting means detects engine load lower than specified engine load while detecting said change in driving condition from said second specified range to said first specified range.

* * * * *